US012041335B2

(12) United States Patent
Wang et al.

(10) Patent No.: US 12,041,335 B2
(45) Date of Patent: Jul. 16, 2024

(54) CAMERA MODULE, CIRCUIT BOARD ASSEMBLY AND MANUFACTURING METHOD THEREOF, AND ELECTRONIC DEVICE WITH CAMERA MODULE

(71) Applicant: NINGBO SUNNY OPOTECH CO., LTD., Zhejiang (CN)

(72) Inventors: Mingzhu Wang, Zhejiang (CN); Nan Guo, Zhejiang (CN); Zhenyu Chen, Zhejiang (CN); Bojie Zhao, Zhejiang (CN); Takehiko Tanaka, Nara (JP); Feifan Chen, Zhejiang (CN); Ye Wu, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 0 days.

(21) Appl. No.: 17/986,436

(22) Filed: Nov. 14, 2022

(65) Prior Publication Data
US 2023/0083133 A1     Mar. 16, 2023

Related U.S. Application Data

(62) Division of application No. 16/472,405, filed as application No. PCT/CN2017/118336 on Dec. 25, 2017, now Pat. No. 11,653,079.

(30) Foreign Application Priority Data

Dec. 23, 2016 (CN) .......................... 201611207393.9
Apr. 1, 2017 (CN) .......................... 201710214811.5
(Continued)

(51) Int. Cl.
*H04N 23/57* (2023.01)
*G01N 15/06* (2024.01)
(Continued)

(52) U.S. Cl.
CPC ......... *H04N 23/57* (2023.01); *G01N 15/0656* (2013.01); *G03B 17/02* (2013.01);
(Continued)

(58) Field of Classification Search
CPC .. H04N 5/2257; H04N 5/2253; H04N 5/2254; H04N 5/2251; G01N 15/0656; G03B 17/02; G03B 17/28; H04M 1/0264
(Continued)

(56) References Cited

U.S. PATENT DOCUMENTS 6,680,525 B1   1/2004  Hsieh et al.
6,893,169 B1   5/2005  Exposito et al.
(Continued)

FOREIGN PATENT DOCUMENTS

CN       1591884        3/2005
CN       2725916        9/2005
(Continued)

*Primary Examiner* — Lin Ye
*Assistant Examiner* — Chan T Nguyen
(74) *Attorney, Agent, or Firm* — Wenderoth, Lind & Ponack, L.L.P.

(57) ABSTRACT

The present disclosure provides a camera module, a circuit board assembly and a manufacturing method thereof, and an electronic device with the camera module, wherein the circuit board assembly comprises at least one electronic component, a substrate, and a molding unit. At least one of the electronic components is connected to the substrate conductively on a back face of the substrate. The molding unit comprises a back molding portion and a molding base, wherein the molding base is bonded to a front face of the substrate integrally when the back molding portion is bonded to at least a part of an area of the back face of the substrate integrally. There may be no need to reserve a position on the front face of the substrate to conductively connect the electronic components, so that the length and
(Continued)

width of the camera module can be reduced, thereby reducing the volume of the camera module.

19 Claims, 78 Drawing Sheets

(30) Foreign Application Priority Data

| Apr. 1, 2017 | (CN) | ........................ 201710214886.3 |
| Apr. 1, 2017 | (CN) | ........................ 201710214887.8 |
| Apr. 1, 2017 | (CN) | ........................ 201720344605.1 |
| Apr. 1, 2017 | (CN) | ........................ 201720344964.7 |
| Apr. 1, 2017 | (CN) | ........................ 201720346336.2 |

(51) Int. Cl.
    *G03B 17/02*     (2021.01)
    *H04M 1/02*     (2006.01)
    *H04N 23/54*     (2023.01)
    *H04N 23/55*     (2023.01)

(52) U.S. Cl.
    CPC .......... *H04M 1/0264* (2013.01); *H04N 23/54* (2023.01); *H04N 23/55* (2023.01)

(58) Field of Classification Search
    USPC ......................................................... 348/294
    See application file for complete search history.

(56) References Cited

U.S. PATENT DOCUMENTS

| 11,653,079 | B2 | 5/2023 | Wang et al. |
| 2003/0025825 | A1 | 2/2003 | Nakajoh |
| 2004/0166763 | A1* | 8/2004 | Hanada ............ H01L 27/14625 |
| | | | 445/51 |
| 2004/0251509 | A1 | 12/2004 | Choi |
| 2005/0116138 | A1 | 6/2005 | Hanada et al. |
| 2006/0091487 | A1 | 5/2006 | Hanada et al. |
| 2008/0273111 | A1 | 11/2008 | Gustavsson et al. |
| 2016/0103247 | A1* | 4/2016 | Hitomi .................. G02B 5/208 |
| | | | 438/69 |
| 2017/0244872 | A1 | 8/2017 | Wang et al. |

FOREIGN PATENT DOCUMENTS

| CN | 101075603 | | 11/2007 |
| CN | 105611134 | | 5/2016 |
| CN | 105681637 | | 6/2016 |
| CN | 207251756 | | 4/2018 |
| JP | 2003-219284 | | 7/2003 |
| JP | 2005-5720 | | 1/2005 |
| JP | 2005-72978 | | 3/2005 |
| JP | 2005-101711 | | 4/2005 |
| JP | 2006-148473 | | 6/2006 |
| JP | 2006018473 | * | 6/2006 |
| JP | 2009-188828 | | 8/2009 |
| JP | 2010-50771 | | 3/2010 |

* cited by examiner

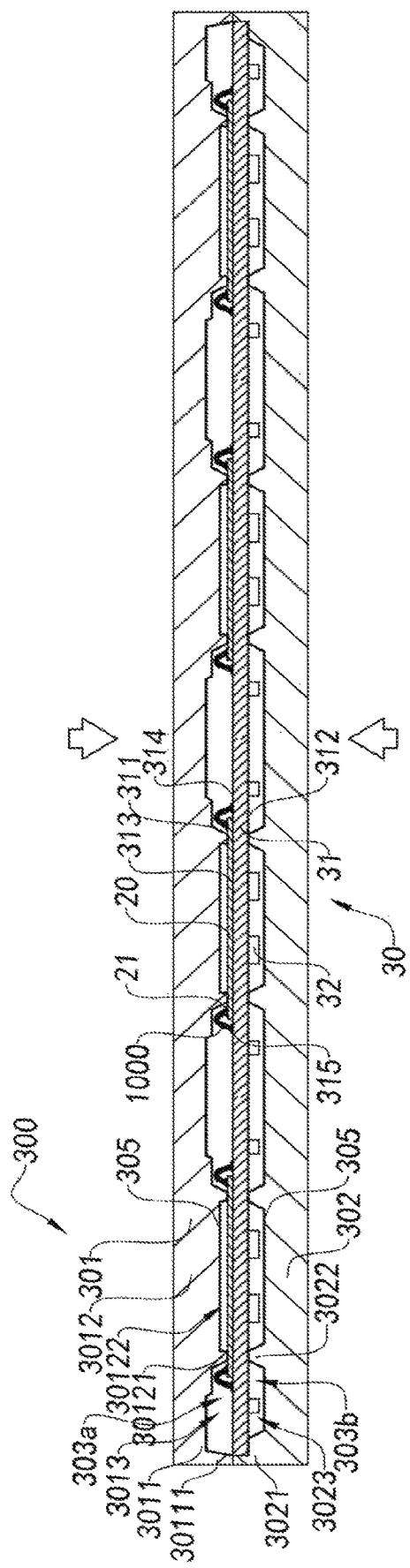
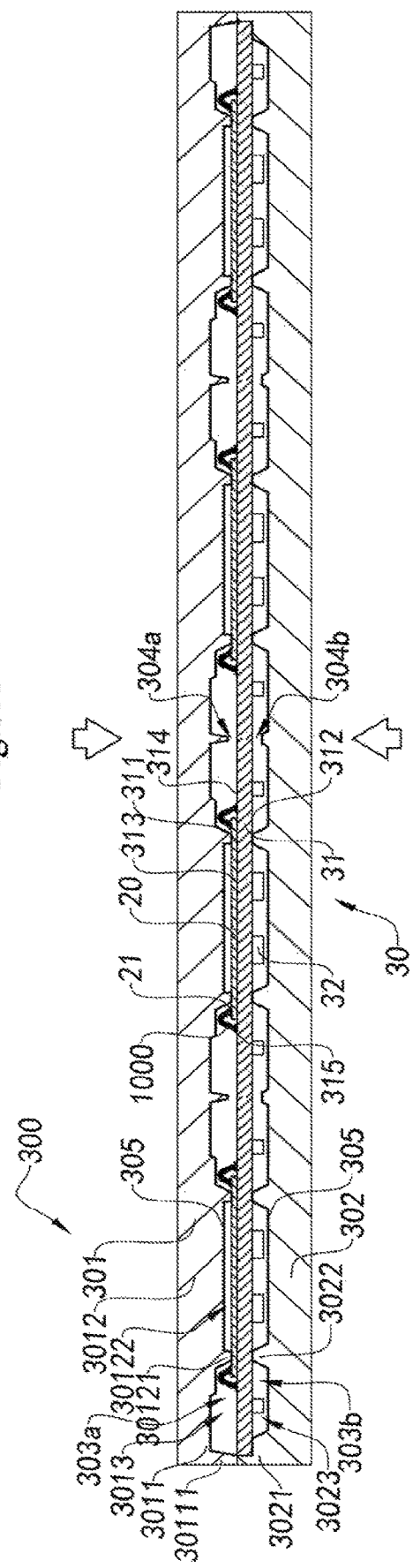
Fig.3A
Fig.3B

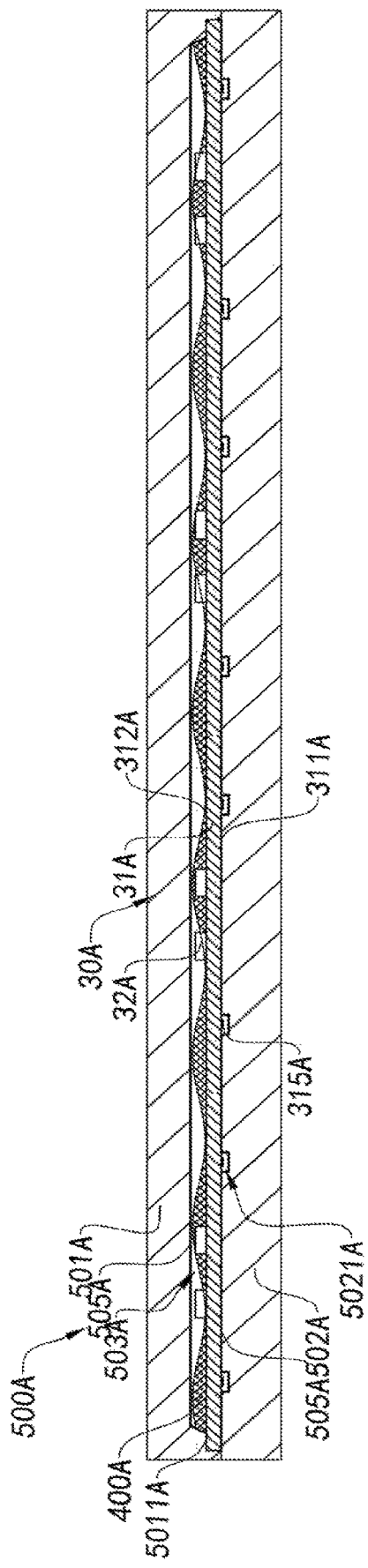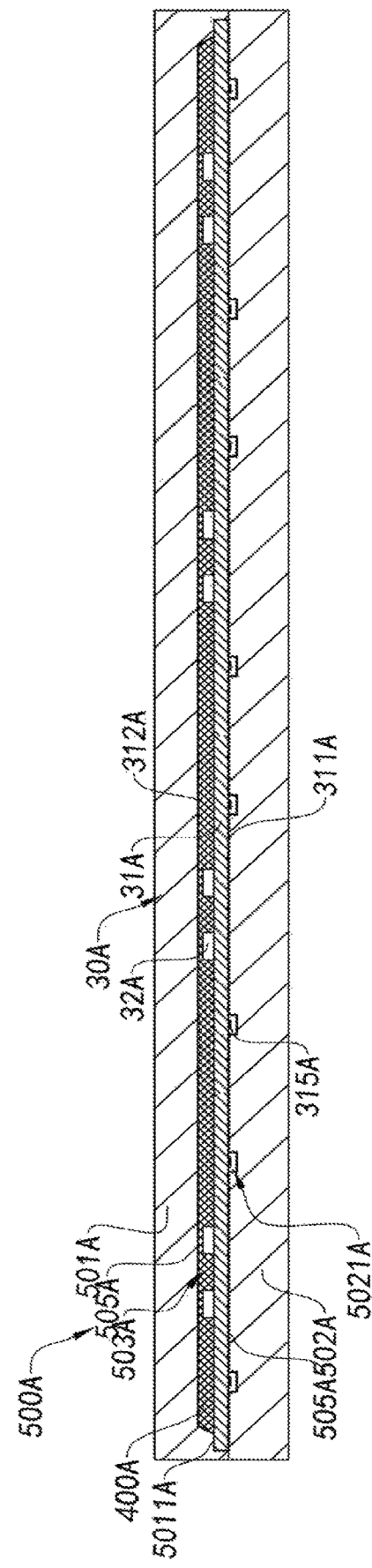

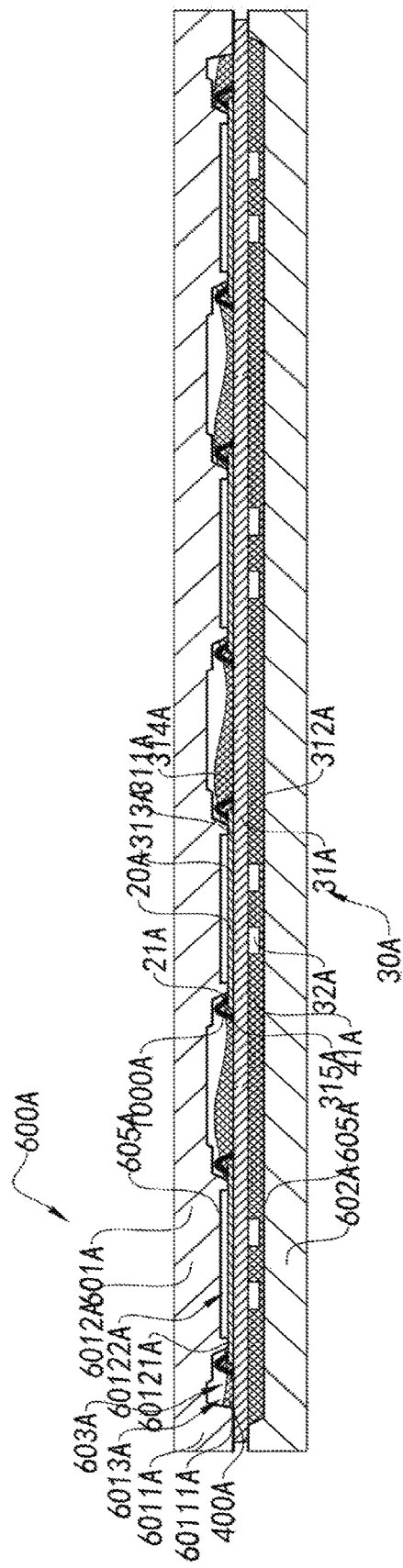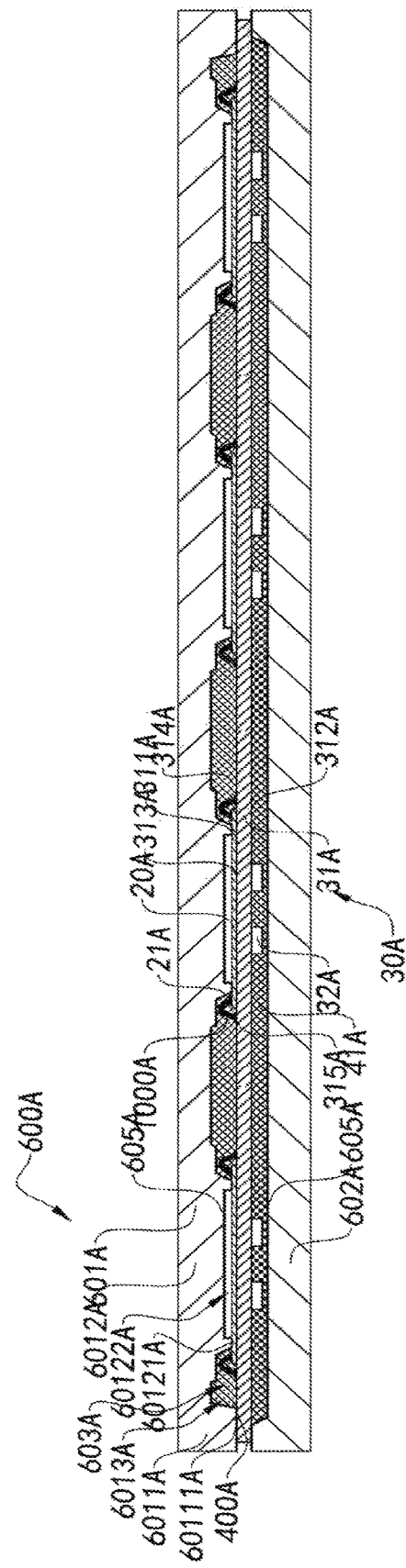

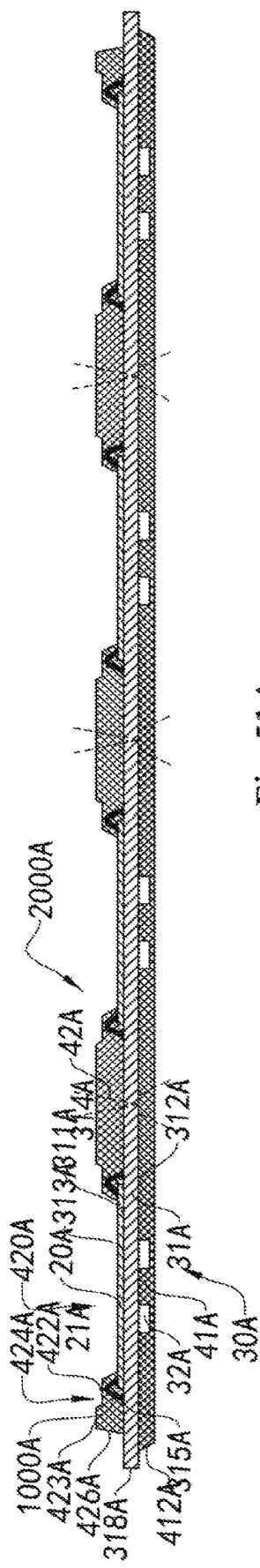
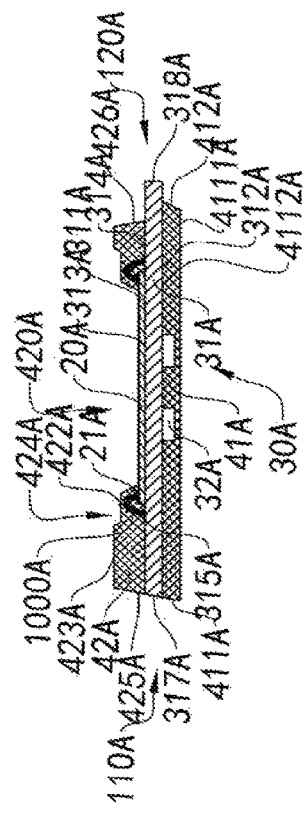

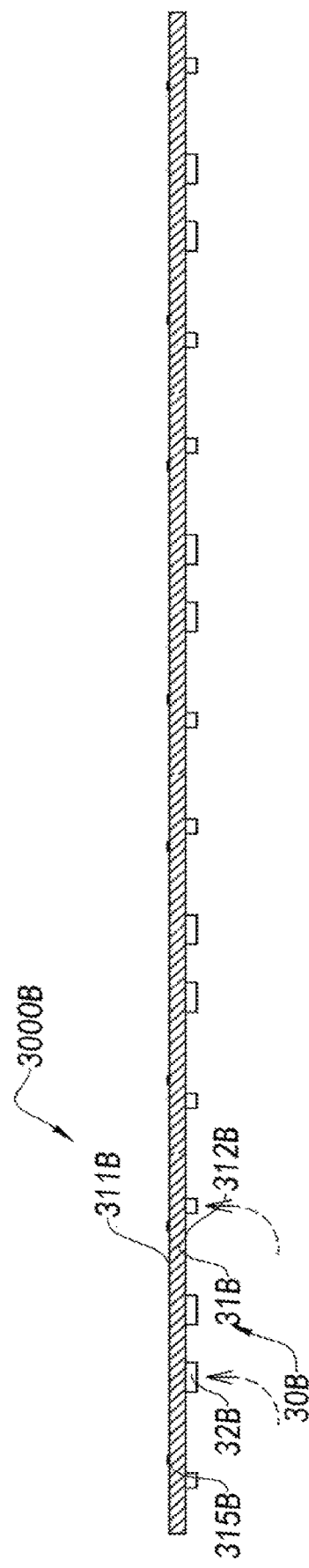

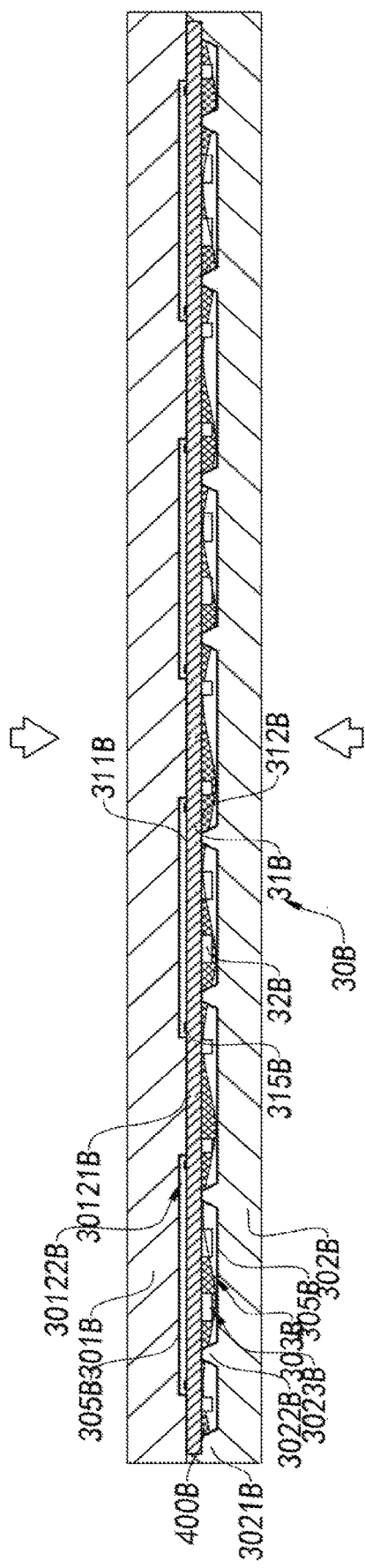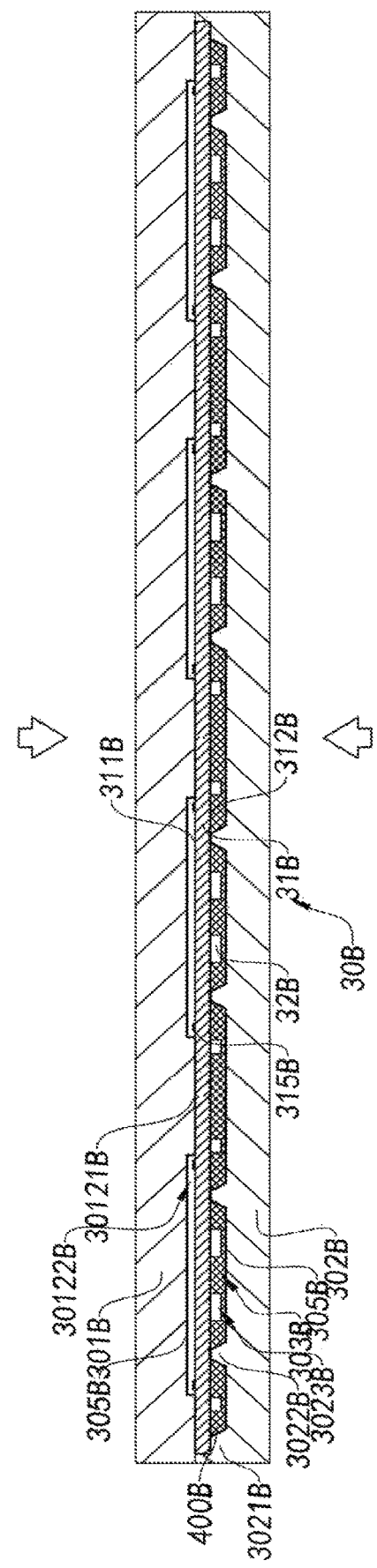

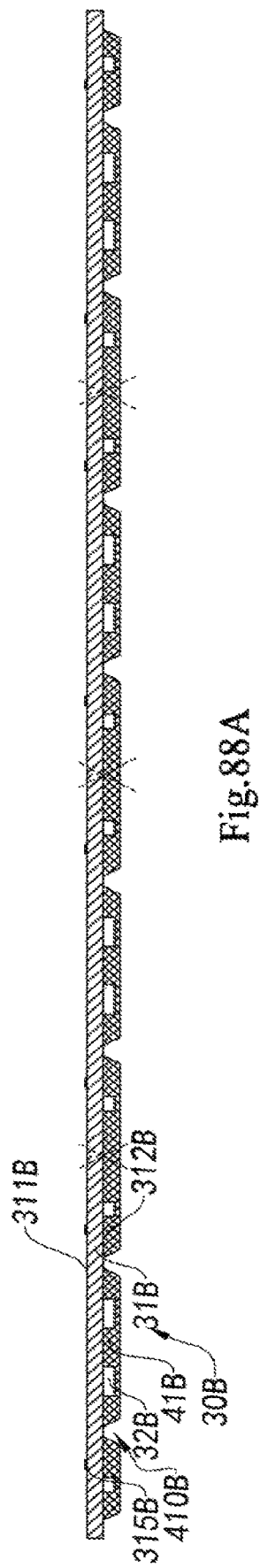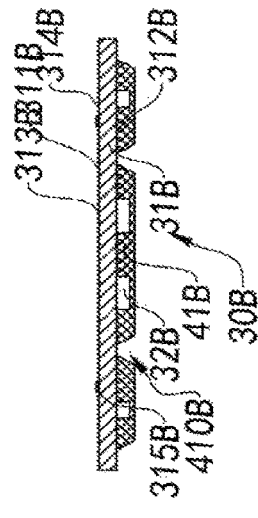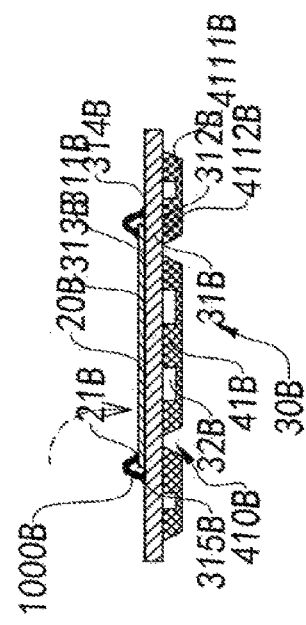
Fig.88A
Fig.88B
Fig.89

CAMERA MODULE, CIRCUIT BOARD ASSEMBLY AND MANUFACTURING METHOD THEREOF, AND ELECTRONIC DEVICE WITH CAMERA MODULE

TECHNICAL FIELD

The present disclosure relates to the field of optical imaging, and in particular to a camera module, a circuit board assembly and manufacturing method thereof, and an electronic device with the camera module.

BACKGROUND

Currently, electronic devices are increasingly developed to be more intelligent, lighter and thinner, which imposes more strict requirements on the size and imaging quality of camera modules, which is one of the standard configurations of electronic products.

On one hand, in order to meet the development trend of making the electronic products more intelligent, it is necessary to configure more intelligent modules or mechanisms for the electronic products, such as sensors, and improve the imaging quality of the camera modules. It is appreciated that, due to the development trend of making the electronic products lighter and thinner, the premise of configuring more intelligent modules or mechanisms for the electronic products is to reduce the size of other modules or mechanisms. The camera module occupies more space inside the electronic device due to its large size. Therefore, it is necessary to consider how to reserve, by reducing the size of the camera module, more space for the electronic product to be configured with more intelligent modules or mechanisms.

On the other hand, in order to meet the development trend of making the electronic products more intelligent, it is necessary to configure the camera module with a photosensitive element of a larger photosensitive area and passive electronic components larger in volume and amount, which may increase the size of the camera module inevitably and thus is disadvantageous for making the electronic products lighter and thinner. Both a photosensitive chip and a passive electronic component of a current camera module are attached to the same side of a circuit board. Such arrangement of the photosensitive chip, the passive electronic component, and the circuit board makes the passive electronic component to be disposed only along an outer peripheral side of the photosensitive chip, and a safe distance must be reserved between adjacent passive electronic components so as to avoid adverse effects on the imaging quality of the camera module due to the mutual interference between the adjacent passive electronic components, which causes the length and width of the camera module not to be reduced effectively. Those skilled in the art would understand that due to the higher and higher imaging quality requirements for the camera module and the increasingly large number of the passive electronic components, these passive electronic components are disposed around the photosensitive chip on the same side of the photosensitive chip in a mutually spaced manner, which may further increase the length and width of the camera module. Therefore, with the development trend of the camera module, the electronic device cannot be developed to be more intelligent, lighter, and thinner. That is, the development trend of the current camera module results in the effect that for the development trend of making the electronic device more intelligent, the camera module is required to provide good imaging quality, which results in an increase in the size of the camera module and thus is disadvantageous for making the electronic device lighter and thinner, while for the development trend of making the electronic device lighter and thinner, the volume of the camera module is required to be reduced, which results in reduction in the imaging quality of the camera module and thus is disadvantageous for making the electronic device more intelligent. Therefore, how to reduce the volume of the camera module while ensuring the imaging quality of the camera module is an urgent technical problem to be resolved.

SUMMARY

An object of the present disclosure is to provide a camera module, a circuit board module, wherein the size of the camera module can be effectively reduced, so that the camera module is particularly suitable for being applied to an electronic device that is intended to be lighter and thinner.

An object of the present disclosure is to provide a camera module, a circuit board assembly and manufacturing method thereof, and an electronic device with the camera module, wherein the length and width of the camera module can be reduced effectively, so that when the camera module is applied to the electronic device that is intended to be lighter and thinner, the camera module may occupy less internal space of the electronic device, and thus, more intelligent components with larger size can be disposed inside the electronic device, thereby facilitating making the electronic device more intelligent.

An object of the present disclosure is to provide a camera module, a circuit board assembly and manufacturing method thereof, and an electronic device with the camera module, wherein the camera module is provided with a substrate and at least one electronic component, and the electronic component can be located on a back face of the substrate, so that there is no need to reserve too many positions for connecting the electronic components on a front face of the substrate, or even no need to reserve any position for connecting the electronic components, thereby facilitating reducing the length and width of the camera module.

An object of the present disclosure is to provide a camera module, a circuit board assembly and manufacturing method thereof, and an electronic device with the camera module, the photosensitive chip and the electronic component are corresponding to each other in a height direction of the camera module of the present disclosure, for example, the photosensitive chip and the electronic component can overlap with each other from a top view compared with disposing electronic components along a circumferential direction of a photosensitive chip in a conventional camera module, so that the length and width of the camera module can be reduced effectively.

An object of the present disclosure is to provide a camera module, a circuit board module, wherein the camera module is provided with a molding unit, and the molding unit comprises a back molding portion integrally bonded to a back face of the substrate, and the back molding portion can embed the electronic component, so that the back molding portion can isolate a surface of the electronic component from the external environment so as to prevent the surface of the electronic component from being oxidized, thereby ensuring the good electrical property of the electronic component.

An object of the present disclosure is to provide a camera module, a circuit board assembly and manufacturing method thereof, and an electronic device with the camera module, wherein the back molding portion can isolate adjacent electronic components by embedding the electronic components so as to avoid an undesirable phenomenon of mutual interference between the adjacent electronic components.

An object of the present disclosure is to provide a camera module, a circuit board assembly and manufacturing method thereof, and an electronic device with the camera module, wherein the back molding portion can avoid mutual interference between adjacent electronic components, so that more electronic components with larger size can be connected on a limited area of the back face of the substrate, thereby facilitating improving the performance of the camera module.

An object of the present disclosure is to provide a camera module, a circuit board assembly and manufacturing method thereof, and an electronic device with the camera module, wherein the back molding portion can reinforce the strength of the substrate and ensure the flatness of the substrate so as to ensure the flatness of the photosensitive chip that is attached in an attaching area of the substrate.

An object of the present disclosure is to provide a camera module, a circuit board assembly and manufacturing method thereof, and an electronic device with the camera module, wherein the back molding portion can reinforce the strength of the substrate and ensure the flatness of the substrate, so that a thinner plate can be employed for the substrate to further reduce the height of the camera module.

An object of the present disclosure is to provide a camera module, a circuit board assembly and manufacturing method thereof, and an electronic device with the camera module, wherein the back molding portion has good inertness, so that when heat generated by the photosensitive chip is transferred to the back molding portion, the back molding portion would not have deformation, and the substrate is prevented from being deformed so as to further ensure the flatness of the photosensitive chip and the good electrical property of the substrate.

An object of the present disclosure is to provide a camera module, a circuit board assembly and manufacturing method thereof, and an electronic device with the camera module, wherein the back molding portion has a good capability of heat dissipation so as to irradiate the heat generated by the photosensitive chip to the outside of the camera module rapidly, thereby ensuring the reliability of the camera module when it is used.

An object of the present disclosure is to provide a camera module, a circuit board assembly and manufacturing method thereof, and an electronic device with the camera module, wherein in a process of mounting the camera module to the electronic device, there is no need to worry that the electronic component is scratched or falls off from the substrate due to a collision between the electronic component and a mounting component of the electronic device so as to ensure the reliability of the camera module when it is mounted.

An object of the present disclosure is to provide a camera module, a circuit board assembly and manufacturing method thereof, and an electronic device with the camera module, wherein the back molding portion embeds the electronic component after being bonded to the back face of the substrate, so that when the camera module is inadvertently vibrated, the electronic component prevents the back molding portion from falling off from the back face of the substrate.

An object of the present disclosure is to provide a camera module, a circuit board module, wherein the molding unit comprises a molding base, and the molding base is integrally bonded to the front face of the substrate, thus in this way, there is no need to provide a connection medium such as glue between the substrate and the molding base, therefore, the height of the camera module can be reduced, and moreover, there is no need to worry that the connection medium such as glue may contaminate the photosensitive chip.

An object of the present disclosure is to provide a camera module, a circuit board assembly and manufacturing method thereof, and an electronic device with the camera module, wherein the molding base embeds at least a part of a non-photosensitive area of the photosensitive chip, so that the molding base, the photosensitive chip, and the substrate are integrally bonded.

An object of the present disclosure is to provide a camera module, a circuit board assembly and manufacturing method thereof, and an electronic device with the camera module, wherein the molding base embeds the non-photosensitive area of the photosensitive chip, so that there is no need to reserve a safe position between the molding base and the photosensitive chip so as to further reduce the length and width of the camera module.

An object of the present disclosure is to provide a camera module, a circuit board assembly and manufacturing method thereof, and an electronic device with the camera module, wherein the molding base integrally embeds a connection wire for conductively connecting the substrate and the photosensitive chip so as to ensure the good electrical property of the connection wire.

An object of the present disclosure is to provide a camera module, a circuit board assembly and manufacturing method thereof, and an electronic device with the camera module, wherein an optical lens has a non-circular cross-sectional shape so as to reduce the unnecessary volume of the optical lens, thereby further reducing the length and width of the camera module.

An object of the present disclosure is to provide a camera module, a circuit board module, wherein the front face of the substrate of the camera module can be only connected to the photosensitive chip conductively, which is advantageous for reducing the length and width of the camera module, so that the camera module is particularly suitable for being applied to the electronic device that is intended to be lighter and thinner.

An object of the present disclosure is to provide a camera module, a circuit board assembly and manufacturing method thereof, and an electronic device with the camera module, wherein the camera module is integrally formed with a molding base on the front face of the substrate to replace a lens base of the conventional camera module, which can reduce steps of manufacturing the camera module, thereby facilitating reducing the manufacturing cost of the camera module and improving the production efficiency of the camera module.

An object of the present disclosure is to provide a camera module, a circuit board assembly and manufacturing method thereof, and an electronic device with the camera module, wherein the molding base is integrally bonded to the substrate, so that there is no need for adhesives such as glue between the molding base and the substrate, which can not only reduce steps of glue applying, but also reduce the height of the camera module, thereby facilitating miniaturization of the camera module.

An object of the present disclosure is to provide a camera module, a circuit board assembly and manufacturing method thereof, and an electronic device with the camera module, wherein the molding base is integrally bonded to the substrate, so that there is no need for adhesives such as glue between the molding base and the substrate, thus in this way, in a process of manufacturing the camera module, there is no need to worry that an adhesive in a fluid state may contaminate the attaching area of the substrate, and thus, the flatness of the attaching area of the substrate is ensured so as to further ensure the flatness of the photosensitive chip attached to the attaching area of the substrate.

An object of the present disclosure is to provide a camera module, a circuit board module, wherein the molding base embeds the non-photosensitive area of the photosensitive chip, so that there is no need to reserve a safe distance between the molding base and the photosensitive chip in a circumferential direction of the camera module, thereby further reducing the length and width of the camera module.

An object of the present disclosure is to provide a camera module, a circuit board assembly and manufacturing method thereof, and an electronic device with the camera module, wherein the molding base embeds the non-photosensitive area of the photosensitive chip, so that there is no need to reserve a safe distance between the molding base and the photosensitive chip in the height direction of the camera module, thereby further reducing the height of the camera module.

An object of the present disclosure is to provide a camera module, a circuit board assembly and manufacturing method thereof, and an electronic device with the camera module, wherein the molding base reinforces the strength of the substrate, so that a thinner plate can be employed for the substrate to further reduce the height of the camera module.

An object of the present disclosure is to provide a camera module, a circuit board assembly and manufacturing method thereof, and an electronic device with the camera module, wherein the molding base embeds the non-photosensitive area of the photosensitive chip, so that the molding base ensures the flatness of the photosensitive chip by means of being bonded to the photosensitive chip integrally.

An object of the present disclosure is to provide a camera module, a circuit board assembly and manufacturing method thereof, and an electronic device with the camera module, wherein the flatness of the photosensitive chip is ensured by the molding base, so that when the substrate is deformed upon being heated, the flatness of the photosensitive chip is not affected, thereby facilitating the imaging quality of the camera module.

An object of the present disclosure is to provide a camera module, a circuit board assembly and manufacturing method thereof, and an electronic device with the camera module, wherein the molding base can radiate the heat to the external environment rapidly when the heat generated by the photosensitive chip is transferred to the molding base, thereby facilitating the reliability of the camera module when it has been used for a long time.

An object of the present disclosure is to provide a camera module, a circuit board assembly and manufacturing method thereof, and an electronic device with the camera module, wherein the electronic components of the camera module of the present disclosure are located on the back face of the substrate compared with disposing electronic components along the circumferential direction of the photosensitive chip in the conventional camera module, so that there is no need to reserve a position on the front face of the substrate for conducting the electronic components, which is advantageous for further reducing the length and width of the camera module.

An object of the present disclosure is to provide a camera module, a circuit board assembly and manufacturing method thereof, and an electronic device with the camera module, wherein the photosensitive chip and the electronic component are corresponding to each other in the height direction of the camera module, for example, the photosensitive chip and the electronic component may overlap with each other from a top view, so that the length and width of the camera module can be reduced effectively.

An object of the present disclosure is to provide a camera module, a circuit board assembly and manufacturing method thereof, and an electronic device with the camera module, wherein the back molding portion of the camera module can isolate adjacent electronic components so as to avoid an undesirable phenomenon of mutual interference between the adjacent electronic components.

An object of the present disclosure is to provide a camera module, a circuit board assembly and manufacturing method thereof, and an electronic device with the camera module, wherein the back molding portion can isolate the surface of the electronic component from the external environment by embedding the electronic component so as to prevent the surface of the electronic component from being oxidized due to exposure, thereby ensuring the good electrical property of the electronic component.

An object of the present disclosure is to provide a camera module, a circuit board assembly and manufacturing method thereof, and an electronic device with the camera module, wherein the back molding portion can isolate adjacent electronic components by embedding the electronic components so as to avoid an undesirable phenomenon of mutual interference between the adjacent electronic components.

An object of the present disclosure is to provide a camera module, a circuit board assembly and manufacturing method thereof, and an electronic device with the camera module, wherein the back molding portion can isolate adjacent electronic components and avoid mutual interference between the adjacent electronic components, so that more electronic components with larger size may be connected on a limited area of the back face of the substrate, thereby facilitating improving the performance of the camera module.

An object of the present disclosure is to provide a camera module, a circuit board assembly and manufacturing method thereof, and an electronic device with the camera module, wherein the back molding portion can reinforce the strength of the substrate and ensure the flatness of the substrate so as to ensure the flatness of the photosensitive chip that is attached in a attaching area of the substrate.

An object of the present disclosure is to provide a camera module, a circuit board assembly and manufacturing method thereof, and an electronic device with the camera module, wherein the back molding portion can reinforce the strength of the substrate and ensure the flatness of the substrate, so that a thinner plate may be employed for the substrate to further reduce the height of the camera module.

An object of the present disclosure is to provide a camera module, a circuit board assembly and manufacturing method thereof, and an electronic device with the camera module, wherein the back molding portion would not deform when being heated, and further prevents the attaching area of the substrate from being deformed, thereby facilitating ensuring the flatness of the photosensitive chip.

An object of the present disclosure is to provide a camera module, a circuit board module, wherein the back molding portion has a good capability of heat dissipation so as to irradiate the heat generated by the photosensitive chip to the external environment of the camera module rapidly, thereby ensuring the reliability of the camera module when it is used.

An object of the present disclosure is to provide a camera module, a circuit board assembly and manufacturing method thereof, and an electronic device with the camera module, wherein in the process of mounting the camera module on the electronic device, there is no need to worry that the electronic component is scratched or falls off from the substrate due to a collision between the electronic component and a mounting component of the electronic device so as to ensure the reliability of the camera module when it is used.

An object of the present disclosure is to provide a camera module, a circuit board assembly and manufacturing method thereof, and an electronic device with the camera module, wherein the back molding portion covers the back face of the substrate so as to prevent the back face of the substrate from exposure, thereby avoiding scratching the back face of the substrate during mounting the camera module onto the electronic device, and thus ensuring electrical properties of the substrate.

An object of the present disclosure is to provide a camera module, a circuit board assembly and manufacturing method thereof, and an electronic device with the camera module, wherein the back molding portion is provided with at least one mounting space for accommodating the mounting components of the electronic device, so that the camera module may be corresponding to the mounting components of the electronic device mutually in the circumferential direction of the camera module.

An object of the present disclosure is to provide a camera module, a circuit board assembly and manufacturing method thereof, and an electronic device with the camera module, wherein the size, position and number of the mounting spaces of the back molding portion may be provided as needed so as to improve the flexibility of the camera module when it is mounted.

An object of the present disclosure is to provide a camera module, a circuit board assembly and manufacturing method thereof, and an electronic device with the camera module, wherein the back molding portion can embed the electronic component after being bonded to the back face of the substrate, so that when the camera module is inadvertently vibrated, the electronic component can prevent the back molding portion from falling off from the back face of the substrate.

An object of the present disclosure is to provide a camera module, a circuit board assembly and manufacturing method thereof, and an electronic device with the camera module, wherein the camera module is provided with a substrate, and there is no need to reserve a position on the front face of the substrate for connecting the electronic components, thereby facilitating reducing the length and width of the camera module.

An object of the present disclosure is to provide a camera module, a circuit board assembly and manufacturing method thereof, and an electronic device with the camera module, the photosensitive chip and the electronic component are corresponding to each other in the height direction of the camera module, for example, the photosensitive chip and the electronic component may overlap with each other from a top view compared with disposing electronic devices along a circumferential direction of a photosensitive chip in the conventional camera module, so that the length and width of the camera module can be reduced effectively.

An object of the present disclosure is to provide a camera module, a circuit board assembly and manufacturing method thereof, and an electronic device with the camera module, wherein the camera module provides a back molding portion, wherein the back molding portion is integrally bonded to at least a part of an area of the back face of the substrate, and the back molding portion can protect the electronic component.

An object of the present disclosure is to provide a camera module, a circuit board assembly and manufacturing method thereof, and an electronic device with the camera module, wherein the back molding portion can embed the electronic component, so that the back moding portion can prevent the surface of the electronic component from being oxidized by isolating the surface of the electronic component from the external environment, thereby ensuring the good electrical property of the electronic component.

An object of the present disclosure is to provide a camera module, a circuit board assembly and manufacturing method thereof, and an electronic device with the camera module, wherein the back molding portion can isolate adjacent electronic components by embedding the electronic components so as to avoid an undesirable phenomenon of mutual interference between the adjacent electronic components.

An object of the present disclosure is to provide a camera module, a circuit board assembly and manufacturing method thereof, and an electronic device with the camera module, wherein the back molding portion can avoid mutual interference between adjacent electronic components, so that the distance between the adjacent electronic components can be reduced, and thus, more electronic components with larger size can be connected on a limited area of the back face of the substrate, thereby facilitating improving the performance of the camera module.

An object of the present disclosure is to provide a camera module, a circuit board assembly and manufacturing method thereof, and an electronic device with the camera module, wherein the back molding portion can reinforce the strength of the substrate and ensure the flatness of the substrate so as to ensure the flatness of the photosensitive chip that is attached in a attaching area of the substrate.

An object of the present disclosure is to provide a camera module, a circuit board assembly and manufacturing method thereof, and an electronic device with the camera module, wherein the back molding portion can reinforce the strength of the substrate and ensure the flatness of the substrate, so that a thinner plate can be employed for the substrate to further reduce the height of the camera module.

An object of the present disclosure is to provide a camera module, a circuit board module, wherein when heat generated by the photosensitive chip is transferred to the back molding portion, the back molding portion would not have deformation, and the substrate is prevented from being deformed so as to further ensure the flatness of the photosensitive chip and the good electrical property of the substrate.

An object of the present disclosure is to provide a camera module, a circuit board assembly and manufacturing method thereof, and an electronic device with the camera module, wherein the back molding portion has a good capability of heat dissipation so as to irradiate the heat generated by the photosensitive chip to the outside of the camera module rapidly, thereby ensuring the reliability of the camera module when it is used.

An object of the present disclosure is to provide a camera module, a circuit board assembly and manufacturing method thereof, and an electronic device with the camera module, wherein the back molding portion prevents the electronic component from being exposed, so that when the camera module is mounted on the electronic device, there is no need to worry that the electronic component is scratched or falls off from the substrate due to a collision between the electronic component and a mounting component of the electronic device so as to ensure the reliability of the camera module when it is mounted.

An object of the present disclosure is to provide a camera module, a circuit board assembly and manufacturing method thereof, and an electronic device with the camera module, wherein the back molding portion embeds the electronic component after being bonded to the back face of the substrate, so that when the camera module is inadvertently vibrated, the electronic component prevents the back molding portion from falling off from the back face of the substrate.

An object of the present disclosure is to provide a camera module, a circuit board assembly and manufacturing method thereof, and an electronic device with the camera module, wherein the electronic component and the photosensitive chip are held on both sides of the substrate respectively, therefore, there is no need to worry that contaminants falling off the electronic component or contaminants falling off from a connection position between the electronic component and the substrate may contaminate the photosensitive area of the photosensitive chip, thereby ensuring the imaging quality of the camera module.

An object of the present disclosure is to provide a camera module, a circuit board assembly and manufacturing method thereof, and an electronic device with the camera module, wherein the electronic component is embedded by the back molding portion, so that the back molding portion can prevent contaminants from falling off from the surface of the electronic component or falling off from the connection position between the electronic component and the substrate.

An object of the present disclosure is to provide a camera module, a circuit board assembly and manufacturing method thereof, and an electronic device with the camera module, wherein the back molding portion can embed the connection position between the substrate and the electronic component so as to prevent the electronic component from falling off from the substrate, thereby ensuring the reliability of the camera module.

An object of the present disclosure is to provide a circuit board assembly, a camera module and a manufacturing method thereof, and an electronic device with the camera module, wherein the size of the camera module can be reduced effectively, so that the camera module is particularly suitable for being applied to an electronic device that is intended to be lighter and thinner.

An object of the present disclosure is to provide a camera module, a circuit board assembly and manufacturing method thereof, and an electronic device with the camera module, wherein the length and width of the camera module can be reduced effectively, so that when the camera module is applied to the electronic device that is intended to be lighter and thinner, the camera module can occupy less space, thereby facilitating making the camera module more intelligent.

An object of the present disclosure is to provide a camera module, a circuit board assembly and manufacturing method thereof, and an electronic device with the camera module, wherein the circuit board assembly comprises a circuit board and at least one electronic component, and at least one of the electronic components being attached to the back face of the circuit board.

An object of the present disclosure is to provide a camera module, a circuit board assembly and manufacturing method thereof, and an electronic device with the camera module, wherein each of the electronic components is attached to a back face of the circuit board respectively.

An object of the present disclosure is to provide a camera module, a circuit board assembly and manufacturing method thereof, and an electronic device with the camera module, wherein at least one of the electronic components is attached to the back face of the circuit board, and other electronic components are attached to a front face of the circuit board.

An object of the present disclosure is to provide a camera module, a circuit board assembly and manufacturing method thereof, and an electronic device with the camera module, wherein the at least one of the electronic components that is attached to the back face of the circuit board is embedded by an embedding portion so as to prevent the electronic component from coming into contact with the external environment, thereby preventing the surface of the electronic component from being oxidized.

An object of the present disclosure is to provide a camera module, a circuit board assembly and manufacturing method thereof, and an electronic device with the camera module, wherein the at least one of the electronic components that is attached to the back face of the circuit board is embedded by the embedding portion, so that adjacent electronic components are isolated by the embedding portion, and in this way, even if the distance between two adjacent electronic components is relatively short, an undesirable phenomenon of mutual interference may not occur to the adjacent electronic components, thereby improving the imaging quality of the camera module.

An object of the present disclosure is to provide a camera module, a circuit board assembly and manufacturing method thereof, and an electronic device with the camera module, wherein at least one photosensitive chip of the camera module can be attached to the front face of the circuit board of the circuit board assembly.

An object of the present disclosure is to provide a camera module, a circuit board assembly and manufacturing method thereof, and an electronic device with the camera module, wherein the electronic component and the photosensitive chip can be corresponding to each other in the height direction of the camera module, so that the electronic components of the camera module would not be disposed along the circumferential direction of the photosensitive chip like the conventional camera module, and in this way, the length and width of the camera module can be reduced effectively.

An object of the present disclosure is to provide a camera module, a circuit board assembly and manufacturing method thereof, and an electronic device with the camera module, wherein the circuit board has at least one accommodation space for accommodating the photosensitive chip, thereby further reducing the height of the camera module.

An object of the present disclosure is to provide a camera module, a circuit board assembly and manufacturing method thereof, and an electronic device with the camera module, wherein the front face of the circuit board is formed with a molding base.

An object of the present disclosure is to provide a camera module, a circuit board assembly and manufacturing method thereof, and an electronic device with the camera module, wherein the molding base can embed the at least one of the electronic components that is attached to the front face of the circuit board.

An object of the present disclosure is to provide a camera module, a circuit board assembly and manufacturing method thereof, and an electronic device with the camera module, wherein the molding base is configured to prevent the electronic component from coming into contact with the external environment, thereby avoiding the oxidation of the surface of the electronic component.

An object of the present disclosure is to provide a camera module, a circuit board assembly and manufacturing method thereof, and an electronic device with the camera module, wherein the molding base can isolate adjacent electronic components, so that even if the distance between two adjacent electronic components is relatively short, an undesirable phenomenon of mutual interference may not occur to the adjacent electronic components, thereby improving the imaging quality of the camera module.

An object of the present disclosure is to provide a camera module, a circuit board assembly and manufacturing method thereof, and an electronic device with the camera module, wherein the molding base isolates the electronic component from the photosensitive area of the photosensitive chip so as to prevent the photosensitive area of the photosensitive chip from being contaminated.

An object of the present disclosure is to provide a camera module, a circuit board assembly and manufacturing method thereof, and an electronic device with the camera module, wherein the molding base embeds the electronic component that is attached to the front face of the circuit board, so that the molding base is prevented from falling off from the circuit board by the electronic component, thereby ensuring the reliability of the camera module.

An object of the present disclosure is to provide a camera module, a circuit board assembly and manufacturing method thereof, and an electronic device with the camera module, wherein either of the embedding portion and the molding base can enable adjacent electronic components to be closer, so that more electronic components with larger size can be attached over a limited attaching area of the circuit board, thereby improving the performance of the camera module.

An object of the present disclosure is to provide a camera module, a circuit board assembly and manufacturing method thereof, and an electronic device with the camera module, wherein a distance from an outer side of the photosensitive chip to an edge of the circuit board can be 0.1 mm to 3 mm, for example, on the side provided with a lead, the distance from the outer side of the photosensitive chip to the edge of the circuit board can be 0.1 mm to 3 mm, preferably 0.3 mm to 1 mm.

An object of the present disclosure is to provide a camera module, a circuit board module, wherein a distance from an outer side of the photosensitive chip to an edge of the circuit board can be 0.05 mm to 3 mm, for example, on the side without a lead, the distance from the outer side of the photosensitive chip to the edge of the circuit board can be 0.05 mm to 3 mm, preferably 0.1 mm to 0.8 mm.

An object of the present disclosure is to provide a camera module, a circuit board assembly and manufacturing method thereof, and an electronic device with the camera module, wherein the thickness of the embedding portion can be 0.1 mm to 2 mm, preferably 0.2 mm to 1 mm.

According to an aspect of the present disclosure, the present disclosure provides a camera module, comprising:

at least one optical lens;

at least one photosensitive chip;

at least one circuit board, comprising a substrate and at least one electronic component, wherein the photosensitive chip is conductively connected to the substrate and the substrate has a front face and a back face, wherein at least one of the electronic components is conductively connected to the substrate on the back face of the substrate; and a molding unit, comprising a back molding portion and a molding base, wherein the molding base is integrally bonded to the front face of the substrate at the same time when the back molding portion is integrally bonded to at least a part of an area of the back face of the substrate, the molding base has at least one light window, a photosensitive area of the photosensitive chip corresponds to the light window of the molding base, the optical lens is disposed in a photosensitive path of the photosensitive chip, and the light window of the molding base forms a light path between the optical lens and the photosensitive chip.

According to an embodiment of the present disclosure, the molding base embeds a non-photosensitive area of the photosensitive chip, so that the molding base, the photosensitive chip, the substrate, and the back molding portion are integrally bonded.

According to an embodiment of the present disclosure, the camera module further comprises at least a set of connection wires, wherein the photosensitive chip is attached to the front face of the substrate, and two end portions of the connection wire are connected to a substrate connector of the substrate and a chip connector of the photosensitive chip respectively so as to connect the photosensitive chip and the substrate conductively via the connection wire.

According to an embodiment of the present disclosure, the camera module further comprises at least one frame-shaped supporting element, wherein the supporting element is disposed in the non-photosensitive area of the photosensitive chip, or the supporting element is formed in the non-photosensitive area of the photosensitive chip, and the molding base embeds at least a part of the supporting element.

According to an embodiment of the present disclosure, the back molding portion embeds at least a part of at least one of the electronic components.

According to an embodiment of the present disclosure, the back molding portion forms at least one mounting space.

According to an embodiment of the present disclosure, at least one of the electronic components is accommodated in the mounting space of the back molding portion.

According to an embodiment of the present disclosure, the height of the back molding portion is a parameter H, and the height that the electronic component protrudes from the back face of the substrate is a parameter h, wherein the numerical value of the parameter H is greater than or equal to the numerical value of the parameter h.

According to an embodiment of the present disclosure, at least one of the electronic components is conductively connected to the front face of the substrate.

According to an embodiment of the present disclosure, the molding base embeds at least a part, which is located on the front face of the substrate, of at least one of the electronic components.

According to an embodiment of the present disclosure, the back molding portion isolates the electronic component from the photosensitive chip that are located on the front face of the substrate.

According to an embodiment of the present disclosure, the back molding portion is in the shape of "□"; or the back molding portion is in the shape of "Π"; or the back molding portion is in the shape of "T"; or the back molding portion is in the shape of "I"; or the back molding portion is in the shape of "II"; or the back molding portion is in the shape of "III"; or the back molding portion is in the shape of "X"; or the back molding portion is in the shape of "L"; or the back molding portion is in the shape of "C"; or the back molding portion is in the shape of "日"; or the back molding portion is in the shape of "井"; or the back molding portion is in the shape of "田"; or the back molding portion is in the shape of a grid; or the back molding portion is in the shape of a square; or the back molding portion is in the shape of a rectangle; or the back molding portion is in the shape of a trapezoid; or the back molding portion is in the shape of a circle; or the back molding portion is in the shape of an oval.

According to an embodiment of the present disclosure, the number of the back molding portions is at least one, wherein the back molding portion is integrally molded in at least one corner of the substrate, or the back molding portion is integrally bonded to at least one side portion of the substrate, or the back molding portion is integrally bonded to a center portion of the substrate.

According to an embodiment of the present disclosure, the number of the back molding portions is at least two, wherein at least one of the back molding portions is integrally molded in at least one corner of the substrate, and the other back molding portion is integrally bonded to least one side portion of the substrate; or at least one of the back molding portions is integrally molded in at least one corner of the substrate, and the other back molding portion is integrally bonded to the center portion of the substrate; or at least one of the back molding portions is integrally bonded to at least one side portion of the substrate, and the other back molding portion is integrally bonded to the center portion of the substrate.

According to an embodiment of the present disclosure, the at least one mounting space of the back molding portion corresponds to the non-photosensitive area and/or the photosensitive area of the photosensitive chip.

According to an embodiment of the present disclosure, the substrate has at least one molding space, wherein at least one of the molding spaces is implemented as a through hole so as to communicate the front face of the substrate with the back face of the substrate, and wherein the molding base and the back molding portion are connected to each other through the molding space.

According to an embodiment of the present disclosure, the circuit board comprises at least one connection plate, wherein a module connection side of the connection plate is connected to the substrate on the front face of the substrate.

According to an embodiment of the present disclosure, the molding base embeds the module connection side of the connection plate.

According to an embodiment of the present disclosure, the circuit board comprises at least one connection plate, wherein a module connection side of the connection plate is connected to the substrate on the back face of substrate.

According to an embodiment of the present disclosure, the back molding portion embeds the module connection side of the connection plate.

According to an embodiment of the present disclosure, the camera module further comprises at least one filtering element, the filtering element is attached to the photosensitive chip, so that the filtering element is held between the optical lens and the photosensitive chip, and the molding base embeds an outer edge of the filtering element.

According to an embodiment of the present disclosure, the camera module further comprises at least one filtering element, wherein the filtering element is attached to a top surface of the molding base, so that the filtering element is held between the optical lens and the photosensitive chip.

According to an embodiment of the present disclosure, the camera module further comprises at least one filtering element and a frame-shaped bracket, wherein the filtering element is attached to the bracket, and the bracket is attached to the top surface of the molding base, so that the filtering element is held between the optical lens and the photosensitive chip.

According to an embodiment of the present disclosure, the camera module further comprises at least one filtering element, wherein the filtering element is attached to the optical lens, so that the filtering element is held between the optical lens and the photosensitive chip.

According to an embodiment of the present disclosure, the camera module further comprises at least one driver, wherein the optical lens is drivably disposed in the driver, and the driver is attached to the top surface of the molding base, so that the optical lens is held in the photosensitive path of the photosensitive chip via the driver.

According to an embodiment of the present disclosure, the camera module further comprises at least one lens tube, wherein the optical lens is disposed in the lens tube, and the lens tube is attached to the top surface of the molding base, or the lens tube integrally extends over the molding base, so that the optical lens is held in the photosensitive path of the photosensitive chip via the lens tube.

According to an embodiment of the present disclosure, the optical lens is in the shape of a circle in a top view; or the optical lens is in the shape of an oval in a top view; or the optical lens is in the shape of a square in a top view.

According to an embodiment of the present disclosure, the optical lens has one planar side and one curved side, and two side portions of the planar side are connected to two side portions of the curved side respectively.

According to an embodiment of the present disclosure, the optical lens has two planar sides and one curved side, wherein one side portion of either of the planar sides is connected to a side portion of the curved side, and the other side portion is connected to a side portion of the other planar side.

According to an embodiment of the present disclosure, the optical lens has two planar sides and two curved sides, wherein the two planar sides are symmetrical with each other, and the two curved sides are symmetrical with each other, and side portions of either of the planar sides are respectively connected to side portions of the two curved sides.

According to an embodiment of the present disclosure, the optical lens has four planar sides and four curved sides, wherein each two planar sides are symmetrical with each other, and each two curved sides are symmetrical with each other, and side portions of any one of the planar sides are respectively connected to side portions of the two curved sides.

According to another aspect of the present disclosure, the present disclosure provides an electronic device, comprising:
    a device body; and
    at least one camera module, wherein the camera module is disposed in the device body; and wherein the camera module further comprises:
        at least one optical lens;
        at least one photosensitive chip;
        at least one circuit board, comprising a substrate and at least one electronic component, wherein the photosensitive chip is conductively connected to the substrate and the substrate has a front face and a back face, wherein at least one of the electronic components is conductively connected to the substrate on the back face of the substrate; and a molding unit, comprising a back molding portion and a molding base, wherein the molding base is integrally bonded to the front face of the substrate at the same time when the back molding portion is integrally bonded to at least a part of an area of the back face of the substrate, the molding base has at least one light window, a photosensitive area of the photosensitive chip corresponds to the light window of the molding base, the optical lens is disposed in a photosensitive path of the photosensitive chip, and the light window of the molding base forms a light path between the optical lens and the photosensitive chip.

According to another aspect of the present disclosure, the present disclosure further provides a circuit board assembly, comprising:

at least one electronic component;

a substrate, having a front face and a back face, wherein at least one of the electronic components is conductively connected to the substrate on the back face of the substrate; and a molding unit, comprising a back molding portion and a molding base, wherein the molding base is integrally bonded to the front face of the substrate at the same time when the back molding portion is integrally bonded to at least a part of an area of the back face of the substrate.

According to an embodiment of the present disclosure, the circuit board assembly further comprises at least one photosensitive chip, wherein the molding base has at least one light window, the photosensitive chip is attached to the front face of the substrate through the light window of the molding base, and the photosensitive chip is conductively connected to the substrate and a photosensitive area of the photosensitive chip corresponds to the light window of the molding base.

According to an embodiment of the present disclosure, the circuit board assembly further comprises at least one photosensitive chip, wherein the photosensitive chip is attached to the front face of the substrate, the photosensitive chip is conductively connected to the substrate, the molding base has at least one light window, the molding base embeds a non-photosensitive area of the photosensitive chip, and the photosensitive area of the photosensitive chip corresponds to the light window of the molding base.

According to an embodiment of the present disclosure, the circuit board assembly further comprises a frame-shaped supporting element, wherein the supporting element is disposed in the non-photosensitive area of the photosensitive chip, or the supporting element is formed in the non-photosensitive area of the photosensitive chip, and the molding base embeds at least a part of the supporting element.

According to an embodiment of the present disclosure, the back molding portion embeds at least a part of at least one of the electronic components.

According to an embodiment of the present disclosure, the back molding portion forms at least one mounting space.

According to an embodiment of the present disclosure, at least one of the electronic components is accommodated in the mounting space of the back molding portion.

According to an embodiment of the present disclosure, the height of the back molding portion is a parameter H, and the height that the electronic component protrudes from the back face of the substrate is a parameter h, wherein the numerical value of the parameter H is greater than or equal to the numerical value of the parameter h.

According to an embodiment of the present disclosure, at least one of the electronic components is conductively connected to the front face of the substrate.

According to an embodiment of the present disclosure, the molding base embeds at least a part, which is located on the front face of the substrate, of at least one of the electronic components.

According to an embodiment of the present disclosure, the back molding portion isolates the electronic component from the photosensitive chip that are located on the front face of the substrate.

According to an embodiment of the present disclosure, the back molding portion is in the shape of "▢"; or the back molding portion is in the shape of "II"; or the back molding portion is in the shape of "T"; or the back molding portion is in the shape of "I"; or the back molding portion is in the shape of "II"; or the back molding portion is in the shape of "III"; or the back molding portion is in the shape of "X"; or the back molding portion is in the shape of "L"; or the back molding portion is in the shape of "C"; or the back molding portion is in the shape of "日"; or the back molding portion is in the shape of "井"; or the back molding portion is in the shape of "田"; or the back molding portion is in the shape of a grid; or the back molding portion is in the shape of a square; or the back molding portion is in the shape of a rectangle; or the back molding portion is in the shape of a trapezoid; or the back molding portion is in the shape of a circle; or the back molding portion is in the shape of an oval.

According to an embodiment of the present disclosure, the number of the back molding portions is at least one, wherein the back molding portion is integrally molded in at least one corner of the substrate, or the back molding portion is integrally bonded to at least one side portion of the substrate, or the back molding portion is integrally bonded to a center portion of the substrate.

According to an embodiment of the present disclosure, the number of the back molding portions is at least two, wherein at least one of the back molding portions is integrally molded in at least one corner of the substrate, and the other back molding portion is integrally bonded to least one side portion of the substrate; or at least one of the back molding portions is integrally molded in at least one corner of the substrate, and the other back molding portion is integrally bonded to the center portion of the substrate; or at least one of the back molding portions is integrally bonded to at least one side portion of the substrate, and the other back molding portion is integrally bonded to the center portion of the substrate.

According to an embodiment of the present disclosure, the at least one mounting space of the back molding portion corresponds to the non-photosensitive area and/or the photosensitive area of the photosensitive chip.

According to an embodiment of the present disclosure, the substrate has at least one molding space, wherein at least one of the molding spaces is implemented as a through hole so as to communicate the front face of the substrate with the back face of the substrate, and wherein the molding base and the back molding portion are connected to each other through the molding space.

According to an embodiment of the present disclosure, the circuit board comprises at least one connection plate, wherein a module connection side of the connection plate is connected to the substrate on the front face of the substrate.

According to an embodiment of the present disclosure, the circuit board comprises at least one connection plate, wherein a module connection side of the connection plate is connected to the substrate on the back face of substrate.

According to an embodiment of the present disclosure, the molding base embeds the module connection side of the connection plate.

According to an embodiment of the present disclosure, the back molding portion embeds the module connection side of the connection plate.

According to another aspect of the present disclosure, the present disclosure further provides a method for manufacturing a camera module, comprising the following steps:
- (a) conductively connecting at least one electronic component on a back face of a substrate;
- (b) simultaneously forming a back molding portion integrally bonded to the substrate on the back face of the substrate and a molding base integrally bonded to the substrate on a front face of the substrate, wherein the molding base has at least one light window;
- (c) making a photosensitive area of a photosensitive chip conductively connected to the substrate to correspond to the light window of the molding base; and
- (d) holding an optical lens in a photosensitive path of the photosensitive chip, thereby manufacturing the camera module.

According to an embodiment of the present disclosure, in the step (a), at least one of the electronic components is conductively connected to the front face of the substrate.

According to an embodiment of the present disclosure, in the step (c), the manufacturing method further comprises the following steps:
- (c.1) attaching the photosensitive chip on the front face of the substrate through the light window of the molding base; and
- (c.2) forming a connection wire between a chip connector of the photosensitive chip and a substrate connector of the substrate so as to connect the photosensitive chip and the substrate conductively.

According to an embodiment of the present disclosure, in the above method, the photosensitive chip is attached to the front face of the substrate and the photosensitive chip is conductively connected to the substrate first, and then, the molding base integrally bonded to the substrate is formed on the front face of the substrate, so that the molding base embeds a non-photosensitive area of the photosensitive chip and makes the photosensitive area of the photosensitive chip correspond to the light window of the molding base.

According to an embodiment of the present disclosure, in the above method, after the photosensitive chip is conductively connected to the substrate, a frame-shaped supporting element is disposed in the non-photosensitive area of the photosensitive chip, or the frame-shaped supporting element is formed in the non-photosensitive area of the photosensitive chip, and then, the molding base integrally bonded to the substrate is formed on the front face of the substrate, so that the molding base embeds at least a part of the supporting element.

According to an embodiment of the present disclosure, in the step (b), the back molding portion is made to embed at least a part of at least one of the electronic components.

According to an embodiment of the present disclosure, in the step (b), the molding base is made to embed at least a part of at least one of the electronic components.

According to an embodiment of the present disclosure, in the step (b), the back molding portion is made to form at least one mounting space.

According to an embodiment of the present disclosure, the electronic component is accommodated in the mounting space.

According to an embodiment of the present disclosure, the mounting space corresponds to the non-photosensitive area and/or the photosensitive area of the photosensitive chip.

According to an embodiment of the present disclosure, in the step (b), the manufacturing method further comprises the following steps:
- (b.1) placing the substrate into a molding die;
- (b.2) performing a clamping process on the molding die so as to form a first molding space between an upper die of the molding die and the front face of the substrate and to form a second molding space between a lower die of the molding die and the back face of the substrate, wherein the first molding space and the second molding space are in communication with each other;
- (b.3) adding a fluid medium to at least one of the first molding space and the second molding space, so that the fluid medium fills up the first molding space and the second molding space and is solidified in the first molding space and the second molding space; and
- (b.4) forming the molding base integrally bonded to the front face of the substrate on the front face of the substrate and the back molding portion integrally bonded to the back face of the substrate on the back face of the substrate, after performing a demolding process on the molding die.

According to an embodiment of the present disclosure, in the step (b.1), an jointed board unit formed by a plurality of substrates is placed into the molding die, so that the step (b.4) further comprises the following steps:
- (b.4.1) demolding the molding die so as to form a semi-finished product of a circuit board assembly, wherein the circuit board assembly comprises the substrate and the molding base and the back molding portion that are integrally bonded to the substrate; and
- (b.4.2) dividing the semi-finished product of the circuit board assembly so as to obtain the circuit board assembly.

According to an embodiment of the present disclosure, in the step (b.2), a plurality of first molding spaces and a first communication channel that communicates adjacent first molding spaces are formed between the upper die and the front face of the substrate, a plurality of second molding spaces and a second communication channel that communicates adjacent second molding spaces are formed between the lower die and the back face of the substrate, wherein at least one of the first molding spaces and at least one of the second molding spaces are in communication with each other, so that in the step (b.3), the fluid medium fills up all the first molding spaces and second molding spaces.

According to another aspect of the present disclosure, the present disclosure provides a camera module, comprising:
- at least one optical lens;
- at least one photosensitive chip;
- at least one circuit board, comprising at least one substrate and at least one electronic component, wherein the substrate has a front face and a back face, the photosensitive chip is conductively connected to the substrate, and at least one of the electronic components is conductively connected to the substrate on a back face of the substrate; and
- a molding unit, comprising at least one back molding portion and at least one molding base, wherein the back molding portion is integrally bonded to at least a portion of an area of the back face of the substrate, the molding base has at least one light window, the molding base is integrally bonded to a part of an area of the front face of the substrate, and a photosensitive area of the photosensitive chip corresponds to the light window of the molding base, and wherein the optical lens is held in a photosensitive path of the photosensitive chip, so that the light window of the molding base forms a light path between the optical lens and the photosensitive chip.

According to an embodiment of the present disclosure, the camera module further comprises a connection plate, wherein the connection plate has a module connection side, which is connected to the front face of the substrate.

According to an embodiment of the present disclosure, the camera module further comprises a connection plate, wherein the connection plate has a module connection side, which is connected to the back face of the substrate.

According to an embodiment of the present disclosure, the molding base embeds the module connection side of the connection plate.

According to an embodiment of the present disclosure, the back molding portion embeds the module connection side of the connection plate.

According to an embodiment of the present disclosure, the module connection side of the connection plate is accommodated in a mounting space of the back molding portion.

According to an embodiment of the present disclosure, the back molding portion has at least one mounting space.

According to an embodiment of the present disclosure, at least one of the electronic components is accommodated in at least one of the mounting spaces of the back molding portion.

According to an embodiment of the present disclosure, the height of the back molding portion is a parameter H, and the height that the electronic component protrudes from the back face of the substrate is a parameter h, wherein the numerical value of the parameter H is greater than or equal to the numerical value of the parameter h.

According to an embodiment of the present disclosure, the back molding portion embeds at least a part of at least one of the electronic components.

According to an embodiment of the present disclosure, at least one of the electronic components is conductively connected to the front face of the substrate.

According to an embodiment of the present disclosure, at least one of the electronic components is conductively connected to the front face of the substrate.

According to an embodiment of the present disclosure, the molding base isolates the electronic component from the photosensitive chip.

According to an embodiment of the present disclosure, the molding base embeds at least a part of at least one of the electronic components.

According to an embodiment of the present disclosure, the molding base embeds the non-photosensitive area of the photosensitive chip.

According to an embodiment of the present disclosure, the camera module further comprises at least one frame-shaped supporting element, wherein the supporting element is disposed in the non-photosensitive area of the photosensitive chip, or the supporting element is formed in the non-photosensitive area of the photosensitive chip, and the molding base embeds at least a part of the supporting element.

According to an embodiment of the present disclosure, the back molding portion is in the shape of "□"; or the back molding portion is in the shape of "Π"; or the back molding portion is in the shape of "Τ"; or the back molding portion is in the shape of "I"; or the back molding portion is in the shape of "II"; or the back molding portion is in the shape of "III"; or the back molding portion is in the shape of "X"; or the back molding portion is in the shape of "L"; or the back molding portion is in the shape of "C"; or the back molding portion is in the shape of "日"; or the back molding portion is in the shape of "#"; or the back molding portion is in the shape of "田"; or the back molding portion is in the shape of a grid; or the back molding portion is in the shape of a square; or the back molding portion is in the shape of a rectangle; or the back molding portion is in the shape of a trapezoid; or the back molding portion is in the shape of a circle; or the back molding portion is in the shape of an oval.

According to an embodiment of the present disclosure, the number of the back molding portions is at least one, wherein the back molding portion is integrally molded in at least one corner of the substrate, or the back molding portion is integrally bonded to at least one side portion of the substrate, or the back molding portion is integrally bonded to a center portion of the substrate.

According to an embodiment of the present disclosure, the number of the back molding portions is at least two, wherein at least one of the back molding portions is integrally molded in at least one corner of the substrate, and the other back molding portion is integrally bonded to least one side portion of the substrate; or at least one of the back molding portions is integrally molded in at least one corner of the substrate, and the other back molding portion is integrally bonded to the center portion of the substrate; or at least one of the back molding portions is integrally bonded to at least one side portion of the substrate, and the other back molding portion is integrally bonded to the center portion of the substrate.

According to an embodiment of the present disclosure, the back molding portion has at least one first die releasing side, and the substrate has at least one die releasing edge, wherein the first die releasing side of the back molding portion and the die releasing edge of the substrate are corresponding to and displaced from each other.

According to an embodiment of the present disclosure, the molding base has at least one second die releasing side, and the substrate has at least one die releasing edge, wherein the second die releasing side of the molding base and the die releasing edge of the substrate are corresponding to and displaced from each other.

According to an embodiment of the present disclosure, the molding base has at least one second die releasing side, wherein the second die releasing side of the molding base and the die releasing edge of the substrate are corresponding to and displaced from each other.

According to an embodiment of the present disclosure, a distance parameter between the first die releasing side of the back molding portion and the die releasing edge of the substrate is L1, and a distance parameter between the second die releasing side of the molding base and the die releasing edge of the substrate is L2, wherein the numerical value of the parameter L2 is different from the numerical value of the parameter L1.

According to an embodiment of the present disclosure, a value range of the parameter L1 is: $0.1\ mm \leq L1 \leq 10\ mm$, and a value range of the parameter L2 is: $0.1\ mm \leq L2 \leq 10\ mm$.

According to an embodiment of the present disclosure, the camera module further comprises at least one filtering element, wherein the filtering element is attached to the photosensitive chip, so that the filtering element is held between the optical lens and the photosensitive chip.

According to an embodiment of the present disclosure, the camera module further comprises at least one filtering element, wherein the filtering element is attached to the optical lens, so that the filtering element is held between the optical lens and the photosensitive chip.

According to an embodiment of the present disclosure, the camera module further comprises at least one filtering element, wherein the filtering element is attached to a top surface of the molding base, so that the filtering element is held between the optical lens and the photosensitive chip.

According to an embodiment of the present disclosure, the camera module further comprises at least one filtering element and at least one frame-shaped bracket, wherein the filtering element is attached to the bracket, and the bracket is attached to the top surface of the molding base, so that the filtering element is held between the optical lens and the photosensitive chip.

According to an embodiment of the present disclosure, the camera module further comprises at least one driver, wherein the optical lens is drivably disposed in the driver, and the driver is attached to the top surface of the molding base, so that the optical lens is held in the photosensitive path of the photosensitive chip via the driver.

According to an embodiment of the present disclosure, the molding base has at least one attaching groove, and the filtering element is held in the attaching groove.

According to an embodiment of the present disclosure, the molding base has at least one filtering groove, and the bracket is held in the filtering groove.

According to an embodiment of the present disclosure, the camera module further comprises at least one lens tube, wherein the optical lens is disposed in the lens tube, and the lens tube is attached to the top surface of the molding base, or the lens tube integrally extends over the molding base, so that the optical lens is held in the photosensitive path of the photosensitive chip via the lens tube.

According to an embodiment of the present disclosure, the optical lens is attached to the top surface of the molding base, so that the optical lens is held in the photosensitive path of the photosensitive chip.

According to an embodiment of the present disclosure, the camera module further comprises at least one lens tube, wherein the lens tube is attached to the top surface of the molding base, or the lens tube integrally extends over the molding base, and the optical lens is attached to the top surface of the molding base, so that the optical lens is held in the photosensitive path of the photosensitive chip and located inside the camera module.

According to an embodiment of the present disclosure, the optical lens is in the shape of a circle in a top view; or the optical lens is in the shape of an oval in a top view; or the optical lens is in the shape of a square in a top view.

According to an embodiment of the present disclosure, the optical lens has one planar side and one curved side, two side portions of the planar side are connected to two side portions of the curved side respectively.

According to an embodiment of the present disclosure, the optical lens has two planar sides and one curved side, wherein one side portion of either of the planar sides is connected to a side portion of the curved side, and the other side portion is connected to a side portion of the other planar side.

According to an embodiment of the present disclosure, the optical lens has two planar sides and two curved sides, wherein the two planar sides are symmetrical with each other, the two curved sides are symmetrical with each other, and side portions of either of the planar sides are respectively connected to side portions of the two curved sides.

According to an embodiment of the present disclosure, the optical lens has four planar sides and four curved sides, wherein each two planar sides are symmetrical with each other, each two curved sides are symmetrical with each other, and side portions of any one of the planar sides are respectively connected to side portions of the two curved sides.

According to another aspect of the present disclosure, the present disclosure further provides an electronic device, comprising:
  a device body; and
  at least one camera module, wherein the camera module is disposed in the device body; and wherein the camera module further comprises:
    at least one optical lens;
    at least one photosensitive chip;
    at least one circuit board, comprising at least one substrate and at least one electronic component, wherein the substrate has a front face and a back face, the photosensitive chip is conductively connected to the substrate, and at least one of the electronic components is conductively connected to the substrate on a back face of the substrate; and
    a molding unit, comprising at least one back molding portion and at least one molding base, wherein the back molding portion is integrally bonded to at least a part of an area of the back face of the substrate, the molding base has at least one light window, the molding base is integrally bonded to a part of an area of the front face of the substrate, and a photosensitive area of the photosensitive chip corresponds to the light window of the molding base, and wherein the optical lens is held in a photosensitive path of the photosensitive chip, so that the light window of the molding base forms a light path between the optical lens and the photosensitive chip.

According to another aspect of the present disclosure, the present disclosure further provides a molding circuit board assembly, comprising:
  at least one circuit board, comprising at least one substrate and at least one electronic component, wherein the substrate has a front face and a back face, and at least one of the electronic components is conductively connected to the substrate on a back face of the substrate; and
  a molding unit, comprising at least one back molding portion and at least one molding base, wherein the back molding portion is integrally bonded to at least a part of an area of the back face of the substrate, the molding base has at least one light window, and the molding base is integrally bonded to a part of an area of the front face of the substrate.

According to an embodiment of the present disclosure, the molding circuit board assembly further comprises at least one photosensitive chip, wherein the photosensitive chip is conductively connected to the substrate, and a photosensitive area of the photosensitive chip corresponds to the light window of the molding base.

According to an embodiment of the present disclosure, the molding base embeds the non-photosensitive area of the photosensitive chip.

According to an embodiment of the present disclosure, the molding circuit board assembly further comprises at least one frame-shaped supporting element, wherein the supporting element is disposed in the non-photosensitive area of the photosensitive chip, or the supporting element is formed in the non-photosensitive area of the photosensitive chip, and the molding base embeds at least a part of the supporting element.

According to an embodiment of the present disclosure, the molding circuit board assembly further comprises a connection plate, wherein the connection plate has a module connection side, which is connected to the front face of the substrate.

According to an embodiment of the present disclosure, the molding circuit board assembly further comprises a connection plate, wherein the connection plate has a module connection side, which is connected to the back face of the substrate.

According to an embodiment of the present disclosure, the molding base embeds the module connection side of the connection plate.

According to an embodiment of the present disclosure, the back molding portion embeds the module connection side of the connection plate.

According to an embodiment of the present disclosure, the back molding portion has at least one mounting space.

According to an embodiment of the present disclosure, at least one of the electronic components is accommodated in at least one of the mounting spaces of the back molding portion.

According to an embodiment of the present disclosure, the height of the back molding portion is a parameter H, and the height that the electronic component protrudes from the back face of the substrate is a parameter h, wherein the numerical value of the parameter H is greater than or equal to the numerical value of the parameter h.

According to an embodiment of the present disclosure, the back molding portion embeds at least a part of at least one of the electronic components.

According to an embodiment of the present disclosure, at least one of the electronic components is conductively connected to the front face of the substrate.

According to an embodiment of the present disclosure, at least one of the electronic components is conductively connected to the front face of the substrate.

According to an embodiment of the present disclosure, the molding base isolates the electronic component from the photosensitive chip.

According to an embodiment of the present disclosure, the molding base embeds at least a part of at least one of the electronic components.

According to an embodiment of the present disclosure, the back molding portion is in the shape of "☐"; or the back molding portion is in the shape of "Π"; or the back molding portion is in the shape of "T"; or the back molding portion is in the shape of "I"; or the back molding portion is in the shape of "II"; or the back molding portion is in the shape of "III"; or the back molding portion is in the shape of "X"; or the back molding portion is in the shape of "L"; or the back molding portion is in the shape of "C"; or the back molding portion is in the shape of "日"; or the back molding portion is in the shape of "卅"; or the back molding portion is in the shape of "田"; or the back molding portion is in the shape of a grid; or the back molding portion is in the shape of a square; or the back molding portion is in the shape of a rectangle; or the back molding portion is in the shape of a trapezoid; or the back molding portion is in the shape of a circle; or the back molding portion is in the shape of an oval.

According to an embodiment of the present disclosure, the number of the back molding portions is at least one, wherein the back molding portion is integrally molded in at least one corner of the substrate, or the back molding portion is integrally bonded to at least one side portion of the substrate, or the back molding portion is integrally bonded to a center portion of the substrate.

According to an embodiment of the present disclosure, the number of the back molding portions is at least two, wherein at least one of the back molding portions is integrally molded in at least one corner of the substrate, and the other back molding portion is integrally bonded to least one side portion of the substrate; or at least one of the back molding portions is integrally molded in at least one corner of the substrate, and the other back molding portion is integrally bonded to the center portion of the substrate; or at least one of the back molding portions is integrally bonded to at least one side portion of the substrate, and the other back molding portion is integrally bonded to the center portion of the substrate.

According to an embodiment of the present disclosure, the back molding portion has at least one first die releasing side, and the substrate has at least one die releasing edge, wherein the first die releasing side of the back molding portion and the die releasing edge of the substrate are corresponding to and displaced from each other.

According to an embodiment of the present disclosure, the molding base has at least one second die releasing side, and the substrate has at least one die releasing edge, wherein the second die releasing side of the molding base and the die releasing edge of the substrate are corresponding to and displaced from each other.

According to an embodiment of the present disclosure, the molding base has at least one second die releasing side, wherein the second die releasing side of the molding base and the die releasing edge of the substrate are corresponding to and displaced from each other.

According to an embodiment of the present disclosure, a distance parameter between the first die releasing side of the back molding portion and the die releasing edge of the substrate is L1, and a distance parameter between the second die releasing side of the molding base and the die releasing edge of the substrate is L2, wherein the numerical value of the parameter L2 is different from the numerical value of the parameter L1.

According to an embodiment of the present disclosure, a value range of the parameter L1 is: $0.1 \text{ mm} \leq L1 \leq 10 \text{ mm}$, and a value range of the parameter L2 is: $0.1 \text{ mm} \leq L2 \leq 10 \text{ mm}$.

According to another aspect of the present disclosure, the present disclosure further provides a method for manufacturing a camera module, comprising the following steps:
(a) conductively connecting at least one electronic component to a substrate on a back face of the substrate;
(b) bonding a back molding portion to at least a part of an area of the back face of the substrate integrally by a molding process;
(c) bonding a molding base to a part of an area of a front face of the substrate integrally by the molding process, and forming a light window of the molding base while the molding base is formed;
(d) enabling a photosensitive area of a photosensitive chip conductively connected to the substrate to correspond to the light window of the molding base; and
(e) holding an optical lens in a photosensitive path of the photosensitive chip, and forming a light path between the optical lens and the photosensitive chip by the light window of the molding base so as to produce the camera module.

According to an embodiment of the present disclosure, in the step (a), at least one of the electronic components is conductively connected to the front face of the substrate.

According to an embodiment of the present disclosure, the step (c) precedes the step (b), so that the molding base is integrally bonded to the front face of the substrate firstly, and then, the back molding portion is integrally bonded to the back face of the substrate.

According to an embodiment of the present disclosure, in the step (d), the photosensitive chip is attached to the front face of the substrate through the light window of the molding base, so that the photosensitive chip is conductively connected to the substrate, and a photosensitive area of the photosensitive chip corresponds to the light window of the molding base.

According to an embodiment of the present disclosure, the step (d) precedes the step (c), thus, the photosensitive chip is attached to the front face of the substrate firstly, so that the photosensitive chip is conductively connected to the substrate, and then, the molding base is integrally bonded to the front face of the substrate, so that the photosensitive area of the photosensitive chip corresponds to the light window of the molding base.

According to an embodiment of the present disclosure, the molding base embeds the non-photosensitive area of the photosensitive chip.

According to an embodiment of the present disclosure, the molding base embeds at least a part of at least one of the electronic components.

According to another aspect of the present disclosure, the present disclosure provides a camera module, comprising:
at least one optical lens;
at least one photosensitive chip;
at least one back molding portion; and
at least one circuit board, comprising a substrate and at least one electronic component, wherein the photosensitive chip is conductively connected to the substrate, at least one of the electronic components is conductively connected to the substrate on a back face of the substrate, and the back molding portion is integrally bonded to at least a part of an area of the back face of the substrate.

According to an embodiment of the present disclosure, the photosensitive chip is attached to a front face of the substrate, and a chip connector of the photosensitive chip is conductively connected to a substrate connector of the substrate directly.

According to an embodiment of the present disclosure, the camera module further comprises at least a set of connection wires, wherein the photosensitive chip is attached to the front face of the substrate, and two end portions of the connection wire are connected to the chip connector of the photosensitive chip and the substrate connector of the substrate respectively so as to conductively connect the photosensitive chip and the substrate via the connection wire.

According to an embodiment of the present disclosure, the camera module further comprises at least one holder, wherein the holder has at least one light through hole and is attached to the front face of the substrate, so that the light through hole of the holder forms a light path between the optical lens and the photosensitive chip.

According to an embodiment of the present disclosure, the camera module further comprises at least one driver, wherein the optical lens is drivably disposed in the driver, and the driver is attached to the holder, so that the optical lens is held in the photosensitive path of the photosensitive chip via the driver.

According to an embodiment of the present disclosure, the camera module further comprises at least one lens tube, wherein the optical lens is assembled into the lens tube, and the lens tube is attached to the holder, so that the optical lens is held in the photosensitive path of the photosensitive chip via the lens tube.

According to an embodiment of the present disclosure, the optical lens is attached to the holder, so that the optical lens is held in the photosensitive path of the photosensitive chip.

According to an embodiment of the present disclosure, the camera module further comprises at least one filtering element, wherein the filtering element is attached to the holder, so that the filtering element is held between the optical lens and the photosensitive chip.

According to an embodiment of the present disclosure, the camera module further comprises at least one filtering element, wherein the filtering element is attached to the optical lens, so that the filtering element is held between the optical lens and the photosensitive chip.

According to an embodiment of the present disclosure, the back molding portion embeds at least a part of at least one of the electronic components.

According to an embodiment of the present disclosure, at least one of the electronic components is conductively connected to the front face of the substrate.

According to an embodiment of the present disclosure, the back molding portion forms at least one mounting space.

According to an embodiment of the present disclosure, at least one of the electronic components is accommodated in the mounting space of the back molding portion.

According to an embodiment of the present disclosure, the height of the back molding portion is a parameter H, and the height that the electronic component protrudes from the back face of the substrate is a parameter h, wherein the numerical value of the parameter H is greater than or equal to the numerical value of the parameter h.

According to an embodiment of the present disclosure, the height of the back molding portion is a parameter H, and the height that the electronic component protrudes from the back face of the substrate is a parameter h, wherein the numerical value of the parameter H is greater than or equal to the numerical value of the parameter h.

According to an embodiment of the present disclosure, the back molding portion is in the shape of "☐"; or the back molding portion is in the shape of "Π"; or the back molding portion is in the shape of "⊤"; or the back molding portion is in the shape of "⊥"; or the back molding portion is in the shape of "Ⅱ"; or the back molding portion is in the shape of "Ⅲ"; or the back molding portion is in the shape of "X"; or the back molding portion is in the shape of "L"; or the back molding portion is in the shape of "C'"; or the back molding portion is in the shape of "目"; or the back molding portion is in the shape of "井"; or the back molding portion is in the shape of "田"; or the back molding portion is in the shape of a grid; or the back molding portion is in the shape of a square; or the back molding portion is in the shape of a rectangle; or the back molding portion is in the shape of a trapezoid; or the back molding portion is in the shape of a circle; or the back molding portion is in the shape of an oval.

According to an embodiment of the present disclosure, the number of the back molding portions is at least one, wherein the back molding portion is integrally molded in at least one corner of the substrate, or the back molding portion is integrally bonded to at least one side portion of the substrate, or the back molding portion is integrally bonded to a center portion of the substrate.

According to an embodiment of the present disclosure, the number of the back molding portions is at least two, wherein at least one of the back molding portions is integrally molded in at least one corner of the substrate, and the other back molding portion is integrally bonded to least one side portion of the substrate; or at least one of the back molding portions is integrally molded in at least one corner of the substrate, and the other back molding portion is integrally bonded to the center portion of the substrate; or at least one of the back molding portions is integrally bonded to at least one side portion of the substrate, and the other back molding portion is integrally bonded to the center portion of the substrate.

According to an embodiment of the present disclosure, the circuit board comprises at least one connection plate, wherein a module connection side of the connection plate is connected to the substrate on the back face of substrate.

According to an embodiment of the present disclosure, the back molding portion embeds the module connection side of the connection plate.

According to an embodiment of the present disclosure, the circuit board comprises at least one connection plate, wherein a module connection side of the connection plate is connected to the substrate on the front face of substrate.

According to an embodiment of the present disclosure, the optical lens is in the shape of a circle in a top view; or the optical lens is in the shape of an oval in a top view; or the optical lens is in the shape of a square in a top view.

According to an embodiment of the present disclosure, the optical lens has one planar side and one curved side, two side portions of the planar side are connected to two side portions of the curved side respectively.

According to an embodiment of the present disclosure, the optical lens has two planar sides and one curved side, wherein one side portion of either of the planar sides is connected to a side portion of the curved side, and the other side portion is connected to a side portion of the other planar side.

According to an embodiment of the present disclosure, the optical lens has two planar sides and two curved sides, wherein the two planar sides are symmetrical with each other, the two curved sides are symmetrical with each other, and side portions of either of the planar sides are respectively connected to side portions of the two curved sides.

According to an embodiment of the present disclosure, the optical lens has four planar sides and four curved sides, wherein each two planar sides are symmetrical with each other, each two curved sides are symmetrical with each other, and side portions of any one of the planar sides are respectively connected to side portions of the two curved sides.

According to another aspect of the present disclosure, the present disclosure further provides an electronic device, comprising:
  a device body; and
  at least one camera module, wherein the camera module is disposed in the device body; and wherein the camera module further comprises:
    at least one optical lens;
    at least one photosensitive chip;
    at least one back molding portion; and
    at least one circuit board, comprising a substrate and at least one electronic component, wherein the photosensitive chip is conductively connected to the substrate, at least one of the electronic components is conductively connected to the substrate on a back face of the substrate, and the back molding portion is integrally bonded to at least a part of an area of the back face of the substrate.

According to another aspect of the present disclosure, the present disclosure further provides a circuit board assembly, comprising:
  at least one back molding portion;
  at least one electronic component; and
  a substrate, wherein at least one of the electronic components is conductively connected to the substrate on a back face of the substrate, and the back molding portion is integrally bonded to at least a part of an area of the back face of the substrate.

According to an embodiment of the present disclosure, the back molding portion embeds at least a part of at least one of the electronic components.

According to an embodiment of the present disclosure, at least one of the electronic components is conductively connected to the front face of the substrate.

According to an embodiment of the present disclosure, the back molding portion forms at least one mounting space.

According to an embodiment of the present disclosure, at least one of the electronic components is accommodated in the mounting space of the back molding portion.

According to an embodiment of the present disclosure, the height of the back molding portion is a parameter H, and the height that the electronic component protrudes from the back face of the substrate is a parameter h, wherein the numerical value of the parameter H is greater than or equal to the numerical value of the parameter h.

According to an embodiment of the present disclosure, the back molding portion is in the shape of "口"; or the back molding portion is in the shape of "Π"; or the back molding portion is in the shape of "T"; or the back molding portion is in the shape of "I"; or the back molding portion is in the shape of "II"; or the back molding portion is in the shape of "III"; or the back molding portion is in the shape of "X"; or the back molding portion is in the shape of "L"; or the back molding portion is in the shape of "C"; or the back molding portion is in the shape of "日"; or the back molding portion is in the shape of "井"; or the back molding portion is in the shape of "田"; or the back molding portion is in the shape of a grid; or the back molding portion is in the shape of a square; or the back molding portion is in the shape of a rectangle; or the back molding portion is in the shape of a trapezoid; or the back molding portion is in the shape of a circle; or the back molding portion is in the shape of an oval.

According to an embodiment of the present disclosure, the number of the back molding portions is at least one, wherein the back molding portion is integrally molded in at least one corner of the substrate, or the back molding portion is integrally bonded to at least one side portion of the substrate, or the back molding portion is integrally bonded to a center portion of the substrate.

According to an embodiment of the present disclosure, the number of the back molding portions is at least two, wherein at least one of the back molding portions is integrally molded in at least one corner of the substrate, and the other back molding portion is integrally bonded to least one side portion of the substrate; or at least one of the back molding portions is integrally molded in at least one corner of the substrate, and the other back molding portion is integrally bonded to the center portion of the substrate; or at least one of the back molding portions is integrally bonded to at least one side portion of the substrate, and the other back molding portion is integrally bonded to the center portion of the substrate.

According to another aspect of the present disclosure, the present disclosure further provides a method for manufacturing a camera module, comprising the following steps:
(A) conductively connecting at least one electronic component to a substrate on a back face of the substrate;
(B) forming a back molding portion integrally bonded to the back face of the substrate;
(C) conductively connecting at least one photosensitive chip to the substrate; and
(D) holding an optical lens in a photosensitive path of the photosensitive chip, thereby producing the camera module.

BRIEF DESCRIPTION OF THE DRAWINGS

FIG. 3A and FIG. 3B are schematic sectional views of a third manufacturing step of the camera module according to the above preferred embodiment of the present disclosure.

FIG. 42 is a schematic sectional view of the third manufacturing step of the camera module according to the above preferred embodiment of the present disclosure.

FIG. 43 is a schematic sectional view of the fourth manufacturing step of the camera module according to the above preferred embodiment of the present disclosure.

FIG. 47 is a schematic sectional view of the eighth manufacturing step of the camera module according to the above preferred embodiment of the present disclosure.

FIG. 48 is a schematic sectional view of the ninth manufacturing step of the camera module according to the above preferred embodiment of the present disclosure.

FIG. 51A and FIG. 51B are schematic sectional views of a twelfth manufacturing steps of the camera module according to the above preferred embodiment of the present disclosure.

FIG. 82 is a schematic sectional view of a first manufacturing step of a camera module according to a preferred embodiment of the present disclosure.

FIG. 84 is a schematic sectional view of a third manufacturing step of the camera module according to the above preferred embodiment of the present disclosure.

FIG. 85 is a schematic sectional view of a fourth manufacturing step of the camera module according to the above preferred embodiment of the present disclosure.

FIG. 88A and FIG. 88B are schematic sectional views of a seventh manufacturing step of the camera module according to the above preferred embodiment of the present disclosure.

FIG. 89 is a schematic sectional view showing an eighth manufacturing step of the camera module according to the above preferred embodiment of the present disclosure.

FIG. 113A is a stereoscopic diagram of a camera module according to a preferred embodiment of the present disclosure.

FIG. 113B is a schematic diagram of a usage state of the camera module according to the above preferred embodiment of the present disclosure.

FIG. 114 is an exploded view of the camera module according to the above preferred embodiment of the present disclosure.

FIG. 115 is a sectional view of the camera module according to the above preferred embodiment of the present disclosure.

FIG. 116A is a sectional view of a circuit board assembly of the camera module according to the above preferred embodiment of the present disclosure.

FIG. 116B is a top view of the circuit board assembly of the camera module according to the above preferred embodiment of the present disclosure.

FIG. 117 is a schematic sectional view of a variant implementation of the camera module according to the above preferred embodiment of the present disclosure.

FIG. 118 is a schematic sectional view of another variant implementation of the camera module according to the above preferred embodiment of the present disclosure.

FIG. 119 is a schematic sectional view of another variant implementation of the camera module according to the above preferred embodiment of the present disclosure.

FIG. 120A is a schematic sectional view of another variant implementation of the camera module according to the above preferred embodiment of the present disclosure.

FIG. 120B is a schematic sectional view of another variant implementation of the camera module according to the above preferred embodiment of the present disclosure.

FIG. 121 is a schematic sectional view of another variant implementation of the camera module according to the above preferred embodiment of the present disclosure.

Figure 122:
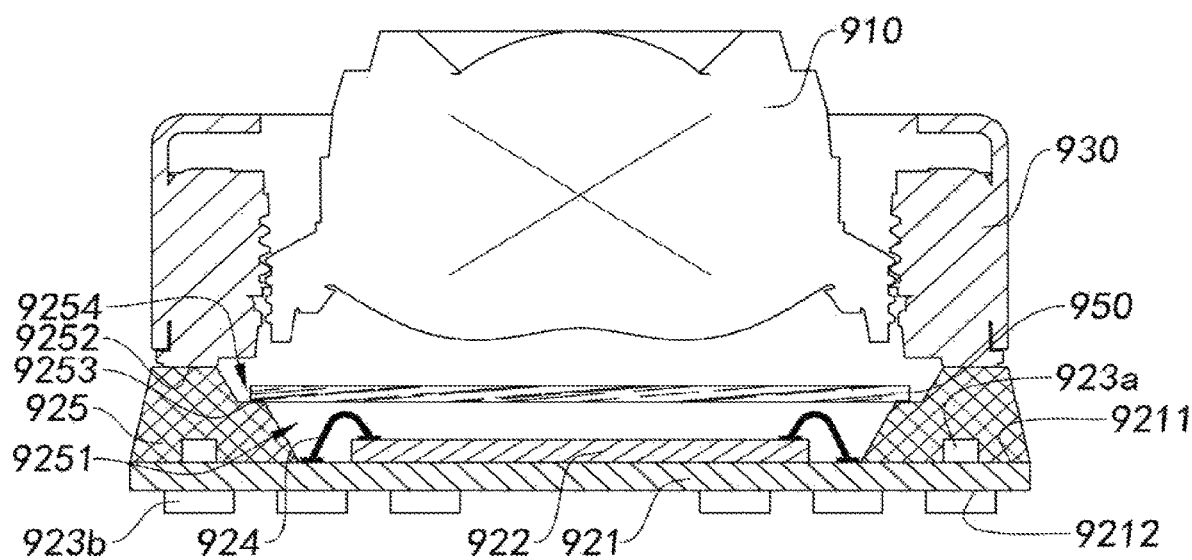

FIG. 122 is a schematic sectional view of another variant implementation of the camera module according to the above preferred embodiment of the present disclosure.

Figure 123:
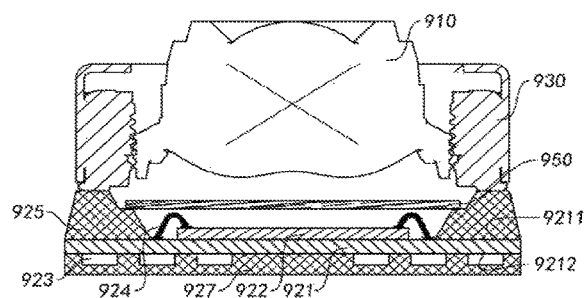

FIG. 123 is a schematic sectional view of another variant implementation of the camera module according to the above preferred embodiment of the present disclosure.

Figure 124:
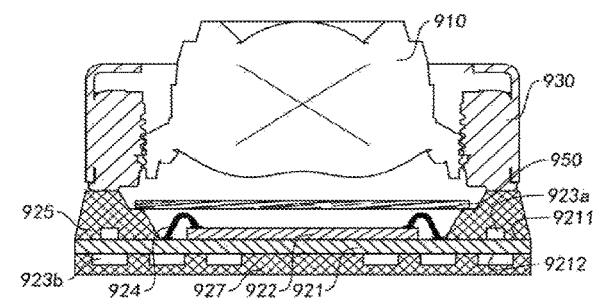

FIG. 124 is a schematic sectional view of another variant implementation of the camera module according to the above preferred embodiment of the present disclosure.

Figure 125:
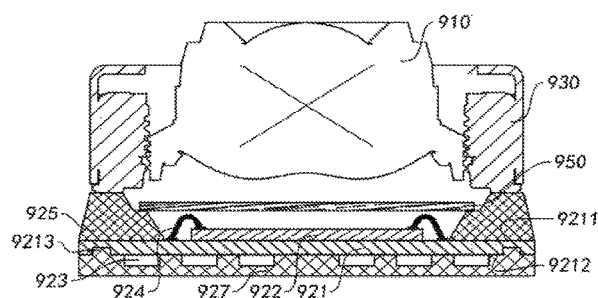

FIG. 125 is a schematic sectional view of another variant implementation of the camera module according to the above preferred embodiment of the present disclosure.

Figure 126:
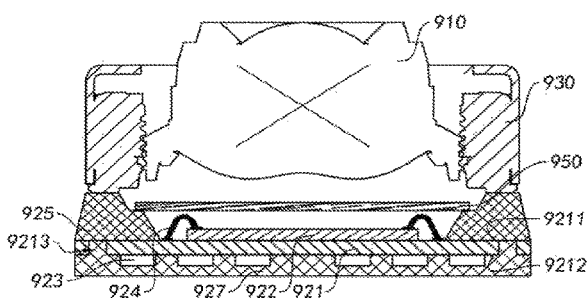

FIG. 126 is a schematic sectional view of another variant implementation of the camera module according to the above preferred embodiment of the present disclosure.

Figure 127A:
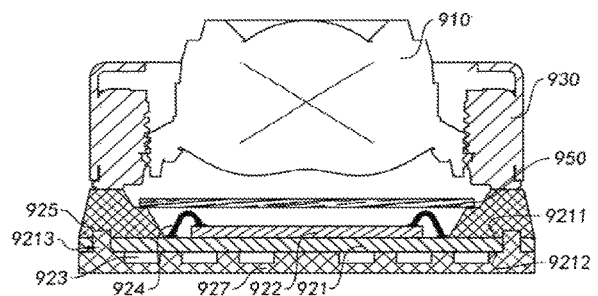

FIG. 127A is a schematic sectional view of another variant implementation of the camera module according to the above preferred embodiment of the present disclosure.

Figure 127B:
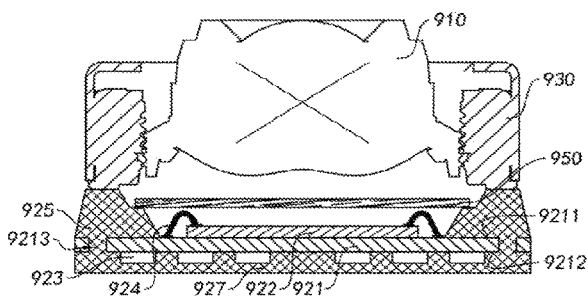
Figure 128A:
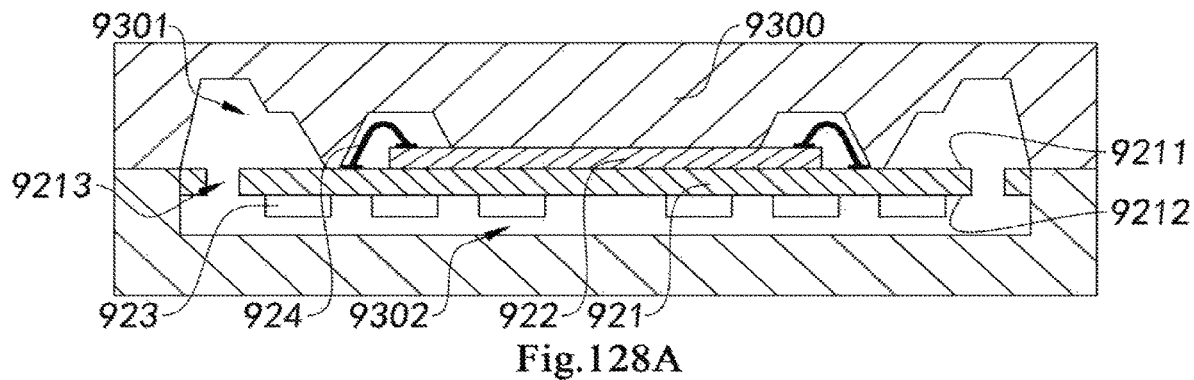
Figure 128B:
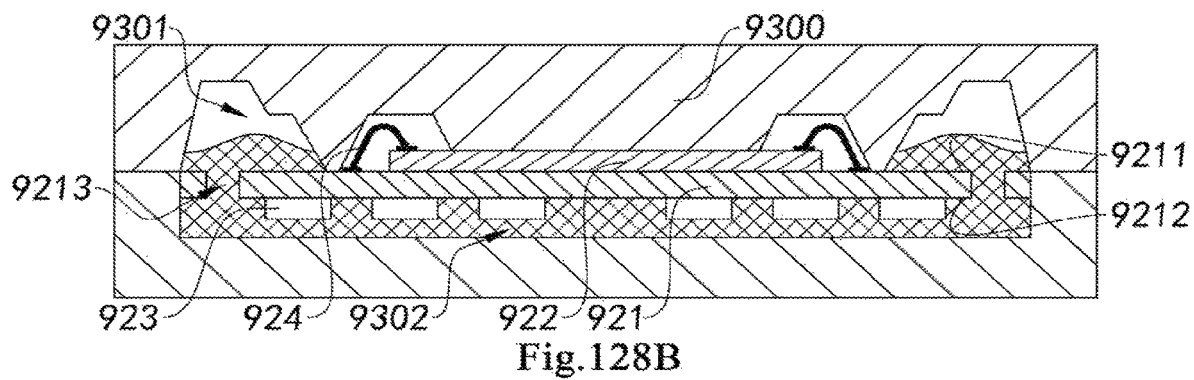
Figure 128C:
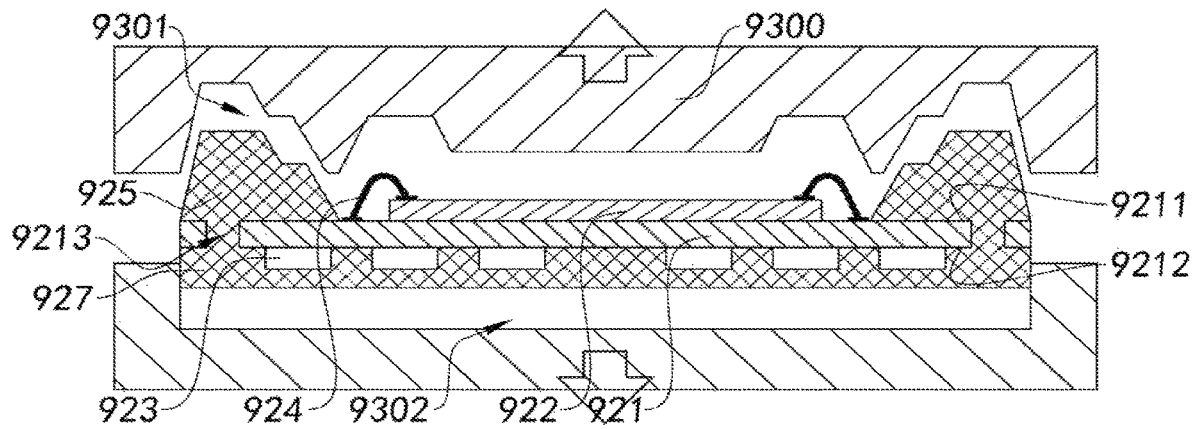
Figure 128D:
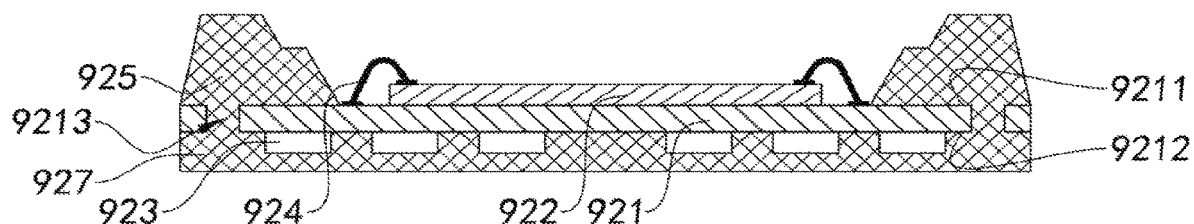
Figure 128E:
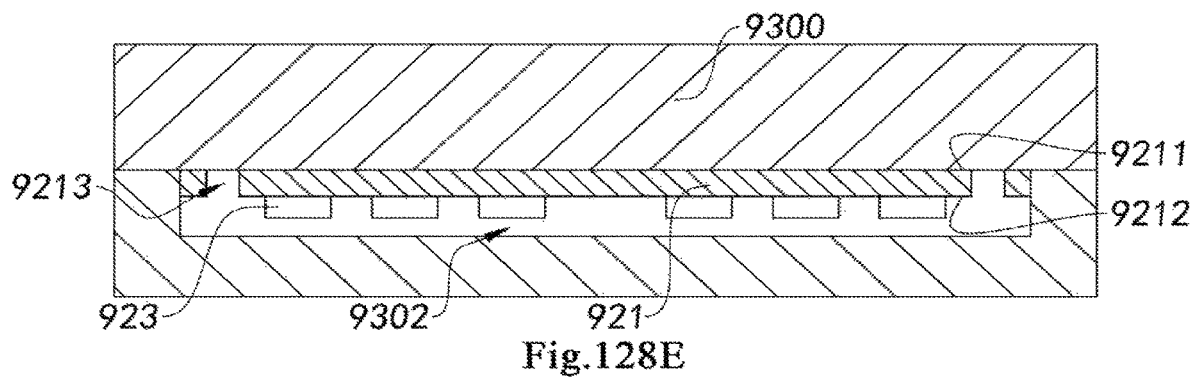
Figure 128F:
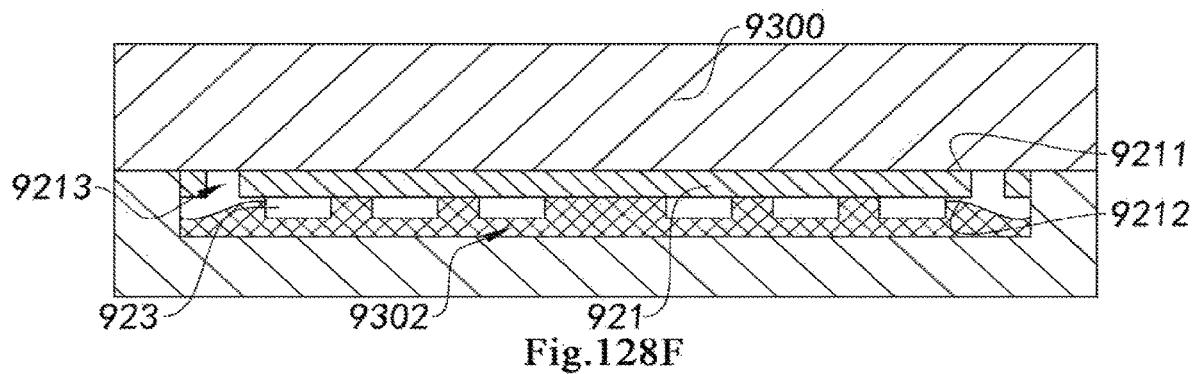
Figure 128G:
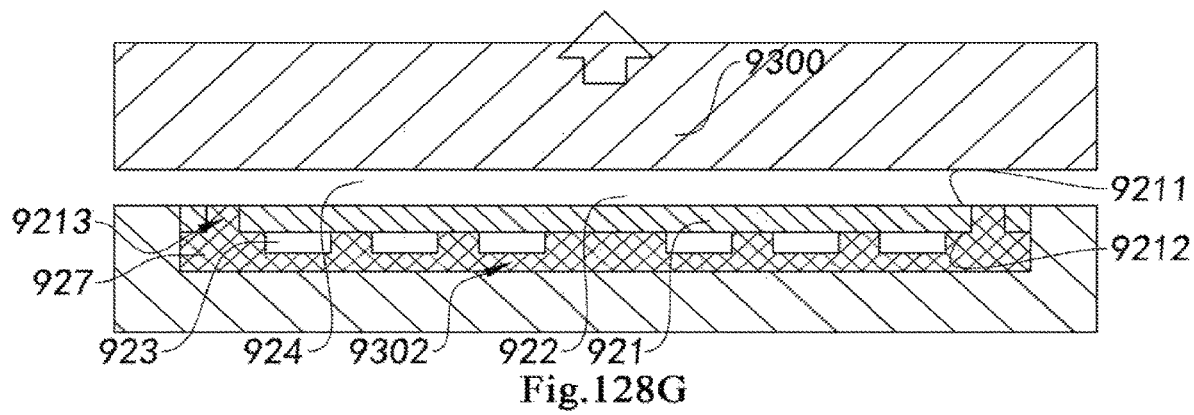
Figure 128H:
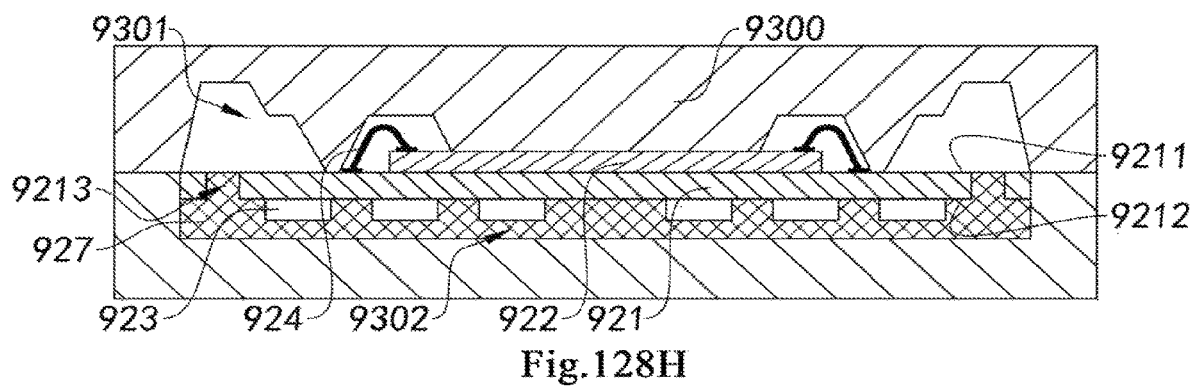
Figure 128I:
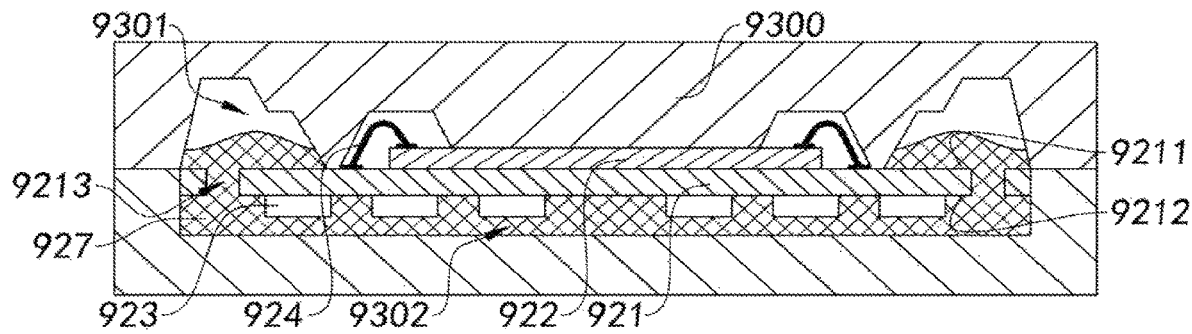
Figure 128J:
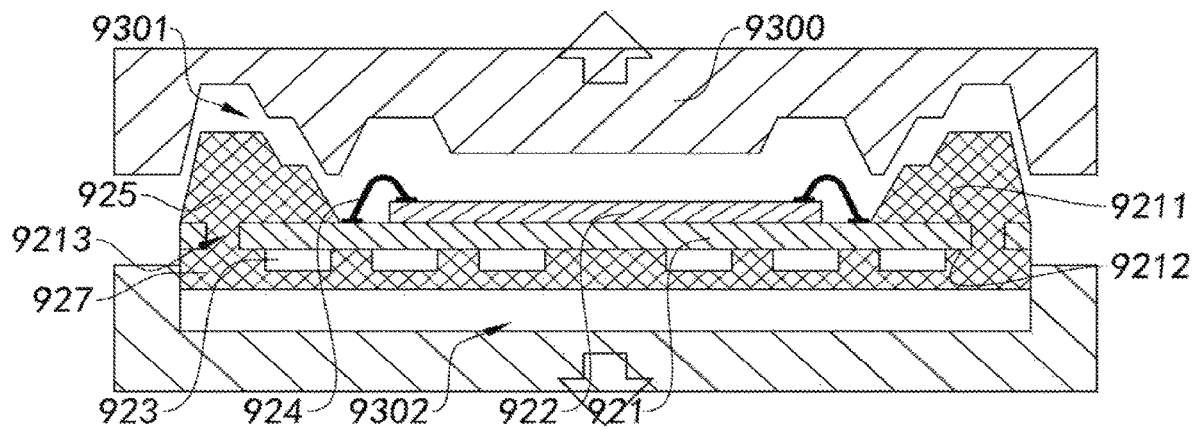
Figure 128K:
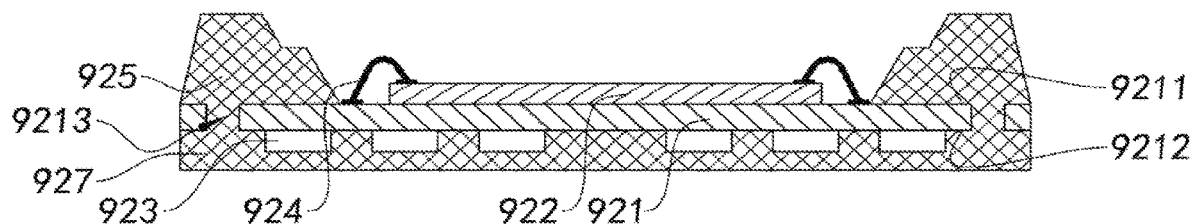

FIG. 127B is a schematic sectional view of another variant implementation of the camera module according to the above preferred embodiment of the present disclosure.

FIG. 128A to FIG. 128K are schematic sectional views of another variant implementation of the camera module according to the above preferred embodiment of the present disclosure, and a manufacturing process thereof respectively.

Figure 129:
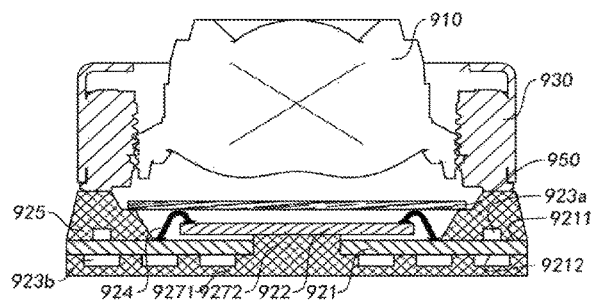

FIG. 129 is a schematic sectional view of another variant implementation of the camera module according to the above preferred embodiment of the present disclosure.

Figure 130:
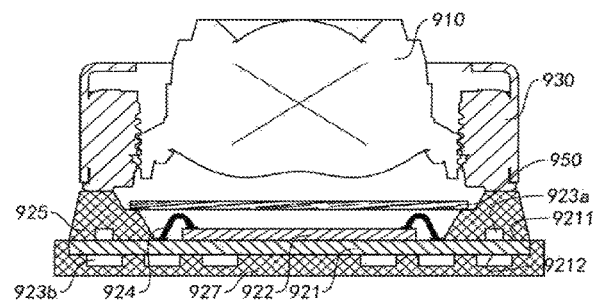

FIG. 130 is a schematic sectional view of another variant implementation of the camera module according to the above preferred embodiment of the present disclosure.

Figure 131:
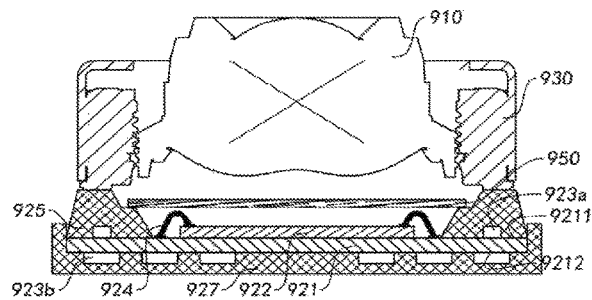

FIG. 131 is a schematic sectional view of another variant implementation of the camera module according to the above preferred embodiment of the present disclosure.

Figure 132:
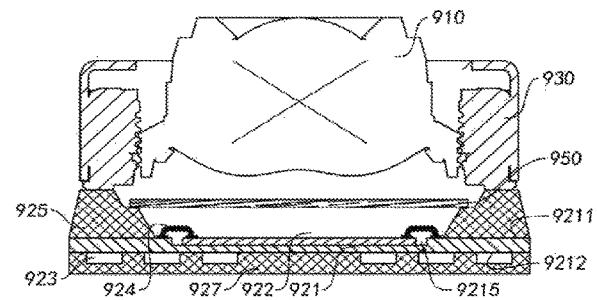

FIG. 132 is a schematic sectional view of another variant implementation of the camera module according to the above preferred embodiment of the present disclosure.

Figure 133A:
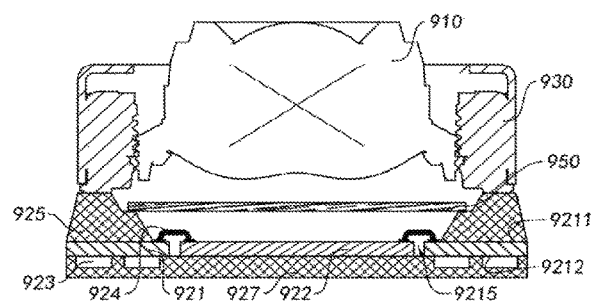

FIG. 133A is a schematic sectional view of another variant implementation of the camera module according to the above preferred embodiment of the present disclosure.

Figure 133B:
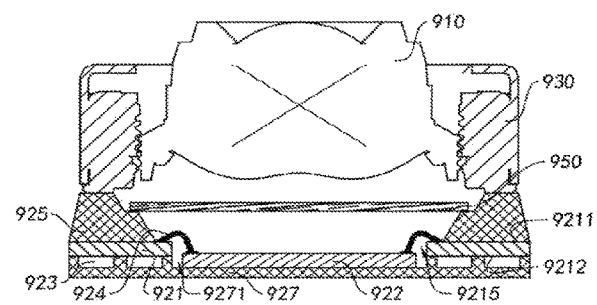

FIG. 133B is a schematic sectional view of another variant implementation of the camera module according to the above preferred embodiment of the present disclosure.

Figure 134:
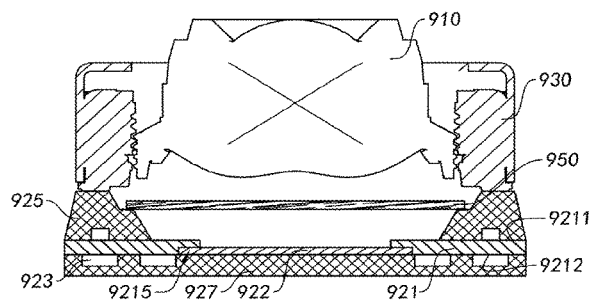

FIG. 134 is a schematic sectional view of another variant implementation of the camera module according to the above preferred embodiment of the present disclosure.

Figure 135:
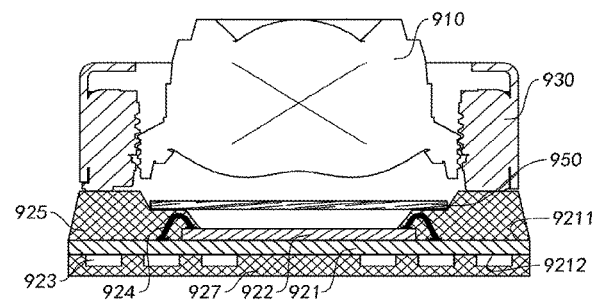

FIG. 135 is a schematic sectional view of another variant implementation of the camera module according to the above preferred embodiment of the present disclosure.

Figure 136:
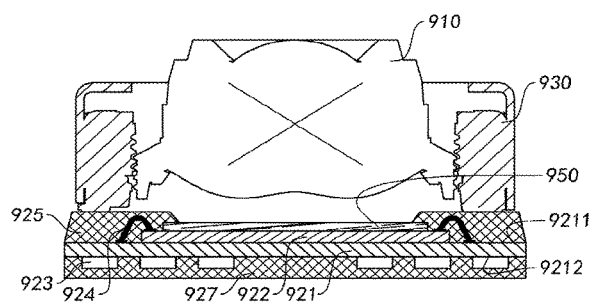

FIG. 136 is a schematic sectional view of another variant implementation of the camera module according to the above preferred embodiment of the present disclosure.

Figure 137:
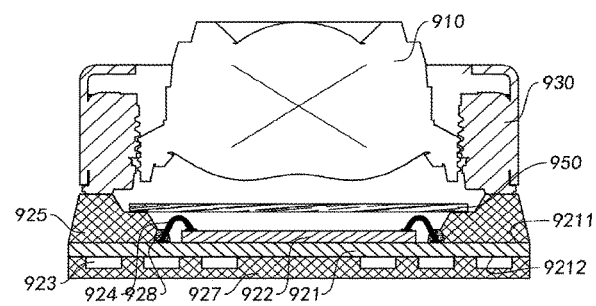

FIG. 137 is a schematic sectional view of another variant implementation of the camera module according to the above preferred embodiment of the present disclosure.

Figure 138:
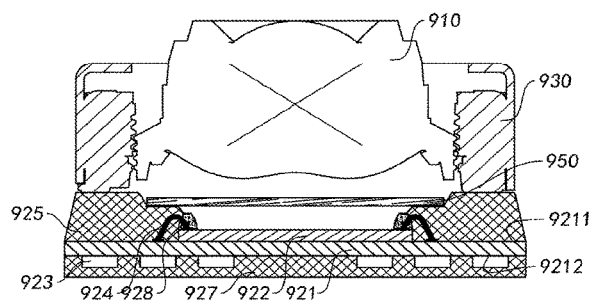

FIG. 138 is a schematic sectional view of another variant implementation of the camera module according to the above preferred embodiment of the present disclosure.

Figure 139:
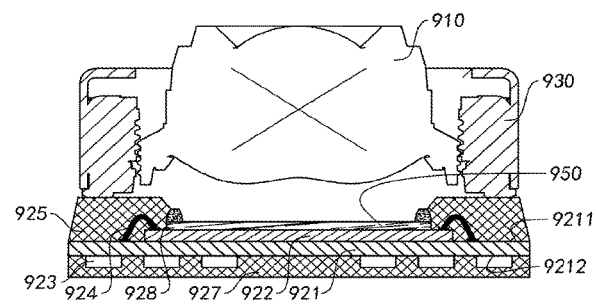

FIG. 139 is a schematic sectional view of another variant implementation of the camera module according to the above preferred embodiment of the present disclosure.

DESCRIPTION OF EMBODIMENT

The following description is used to disclose the present disclosure to enable those skilled in the art to implement the present disclosure. The preferred embodiments in the following description are by way of example only, and other obvious variations will occur to those skilled in the art. The basic principles of the present disclosure as defined in the following description may be applied to other embodiments, modifications, improvements, equivalents, and other technical solutions without departing from the spirit and scope of the present disclosure.

It should be understood by those skilled in the art that in the disclosure of the present disclosure, the orientation or positional relationship indicated by terms "longitudinal", "transverse", "upper", "lower", "front", "back", "left", "right", "vertical", "horizontal", "top", "bottom", "inside", "outside", etc. is based on the orientation or positional relationship shown in the drawings, which is merely for the convenience of describing the present disclosure and for the simplification of the description, and not to indicate or imply that the device or element referred to must have a specific orientation, be constructed and operated in a specific orientation. Therefore, the above terms shall not be construed as a limitation of the present disclosure.

It can be understood that the term "a" is understood to mean "at least one" or "one or more", that is, in one embodiment, the number of an element can be one, and in another embodiment, the number of elements can be plural, and the term "a" cannot be construed as limiting the quantity.

Figure 11A:
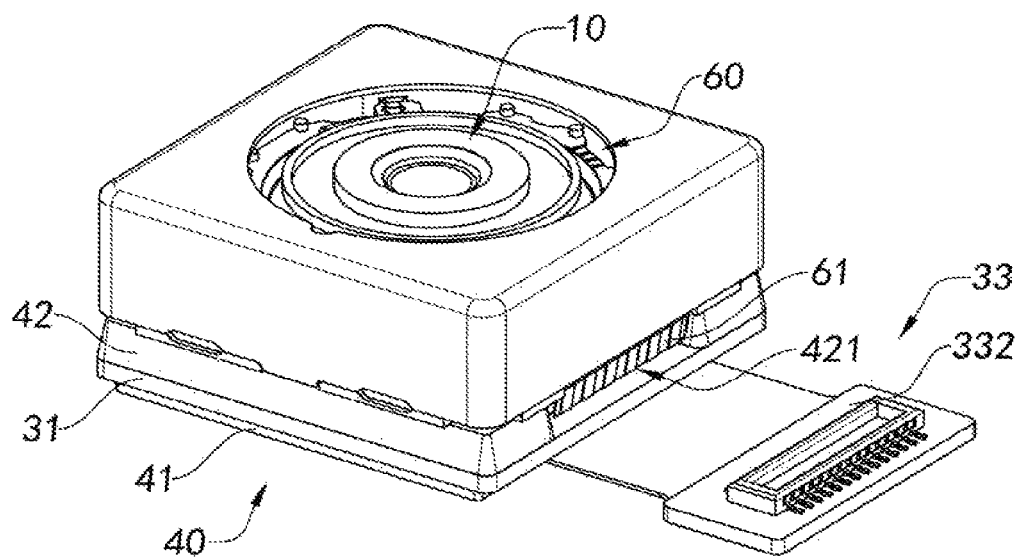
FIG. 11A is a stereoscopic schematic diagram of an angle of view of the camera module according to the above preferred embodiment of the present disclosure.
Figure 11B:
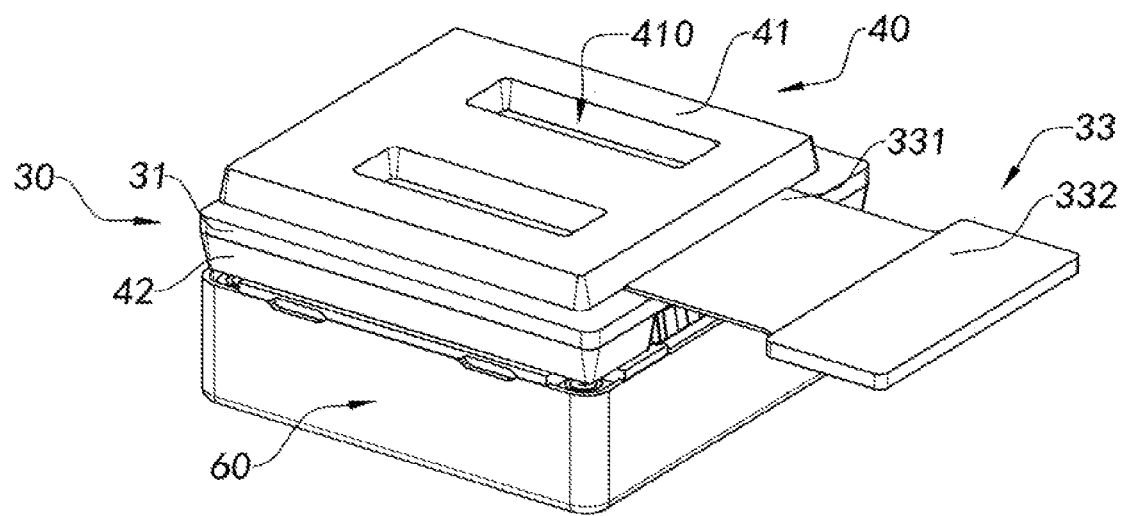
FIG. 11B is a stereoscopic schematic diagram of another angle of view of the camera module according to the above preferred embodiment of the present disclosure.
Figure 12:
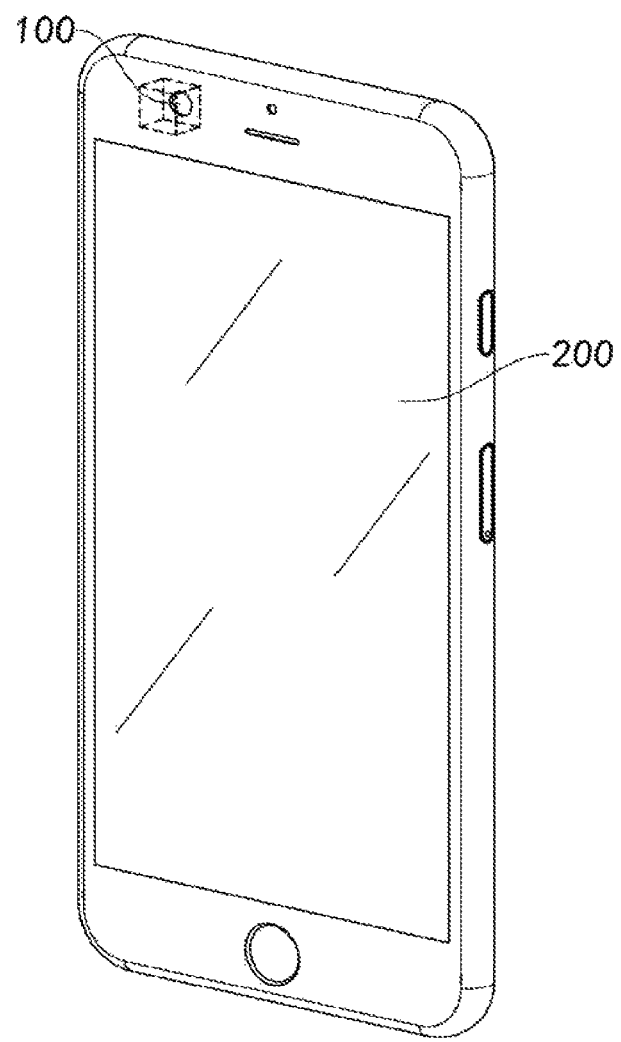
FIG. 12 is a stereoscopic schematic diagram of an application state of the camera module according to the above preferred embodiment of the present disclosure.

With reference to FIG. 1 to FIG. 12 of the accompanying drawings of the present disclosure, a camera module 100 and an application of the camera module 100 according to a preferred embodiment of the present disclosure is set forth in the following description, wherein at least one of the camera modules 100 can be mounted on a device body 200 so that the camera module 100 and the device body 200 can form an electronic device, with reference to FIG. 12.

In other words, the electronic device comprises the device body 200 and at least one of the camera modules 100 disposed in the device body 200, wherein the camera module 100 can be configured to acquire images (such as video or images).

It is worth mentioning that, although in the example of the electronic device shown in FIG. 12, the camera module 100 is disposed on the back side of the device body 200 (the side of the opposite of a display screen of the device body 200), it can be understood that the camera module 100 can also be disposed on the front side of the device body 200 (the side where the display screen of the device body 200 is located), or at least one of the camera modules 100 is disposed on the back side of the device body 200 and at least one of the camera modules 100 is disposed on the front side of the device body 200, that is, at least one of the camera modules 100 is provided on the back side and the front side of the device body 200. Nonetheless, it can be understood by those skilled in the art that in other examples of the electronic device, it is also possible to have one or more of the camera modules 100 disposed on the side face of the device body 200.

In addition, although the device body 200 of the electronic device illustrated in FIG. 12 is a smart phone, in other examples, the device body 200 may also be implemented as, but not limited to, a tablet, an electronic book, an MP3/4/5, a personal digital assistant, a camera, a television, a washing machine, a refrigerator, and any electronic product that can be configured with the camera module 100.

Figure 10:
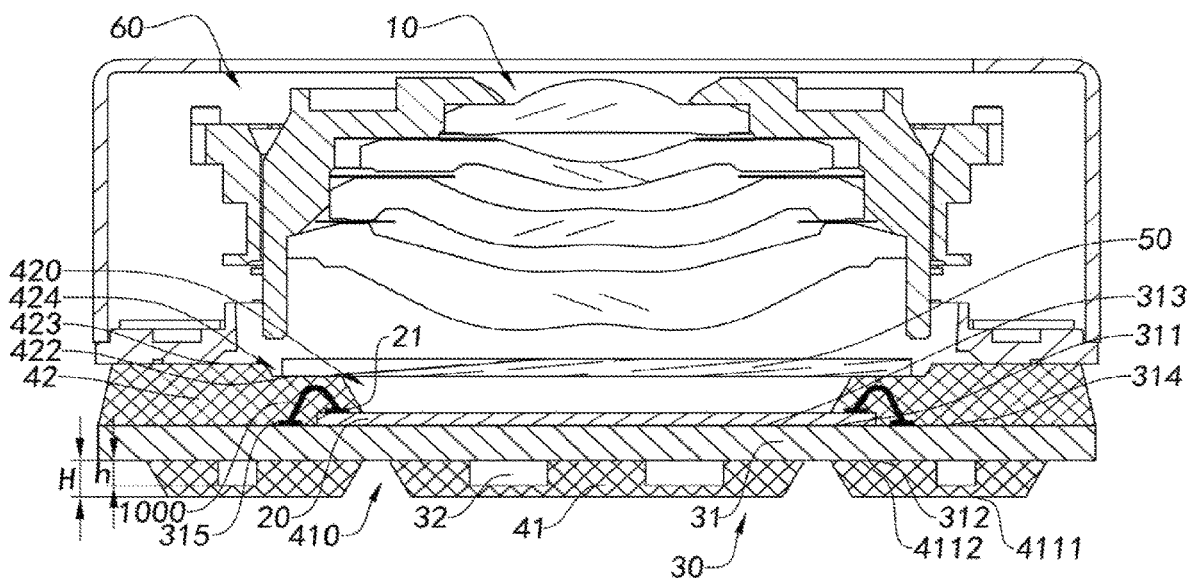
FIG. 10 is a schematic diagram of an internal structure of the camera module taken along an intermediate position according to the above preferred embodiment of the present disclosure.

FIG. 10 is a schematic diagram showing an internal structure of the camera module 100 taken along an intermediate position, and FIGS. 11A and 11B respectively show the stereoscopic state of the camera module 100 from different angles of view. Specifically, the camera module 100 comprises at least one optical lens 10, at least one photosensitive chip 20, and a circuit board 30, wherein the photosensitive chip 20 is conductively connected to the circuit board 30, the optical lens 10 is held in the photosensitive path of the photosensitive chip 20.

The light reflected by the object enters the interior of the camera module 100 from the optical lens 10, and then is received by the photosensitive chip 20 and imaged after photoelectric conversion. Electrical signals related to the image of an object obtained by the photoelectric conversion of the photosensitive chip 20 can be transmitted by the circuit board 30, for example, the circuit board 30 can transmit the electrical signals related to the image of the object to the device body 200 that is connected to the circuit board 30. That is, the circuit board 30 can be conductively connected to the device body 200 to mount the camera module 100 to the device body 200 to form the electronic device.

Further, with reference to FIG. 10, the circuit board 30 comprises a substrate 31 and at least one electronic component 32, wherein each of the electronic components 32 is conductively connected to the substrate 31, respectively.

Specifically, the substrate 31 has a front face 311 and a back face 312. Generally, the substrate 31 is plate-like, and the front face 311 and the back face 312 of the substrate 31 are parallel to each other, so that the distance between the front face 311 and the back face 312 of the substrate 31 can be used to define the thickness of the substrate 31.

Nonetheless, it can be understood by those skilled in the art that in other examples of the camera module 100 of the present disclosure, at least one of the front face 311 and the back face 312 of the substrate 31 may be provided with a convex structure or a groove, and the camera module 100 of the present disclosure is not limited in this respect.

It is worth mentioning that the type of the substrate 31 is also not limited in the camera module 100 of the present disclosure. For example, the substrate 31 can be selected but not limited to a hard plate, a soft plate, a soft and hard combined plate, and a ceramic plate, etc.

Further, at least one of the electronic components 32 is conductively connected to the substrate 31 on the back face 312 of the substrate 31. Preferably, in this specific example of the camera module 100 of the present disclosure, all of the electronic components 40 may be conductively connected to the substrate 31 on the back face 312 of the substrate 31. In this way, the front face 311 of the substrate 312 does not need to reserve a position for connecting the electronic component 32, thereby facilitating reducing the length and width of the camera module 100.

It is worth mentioning that the type of the electronic component 32 is not limited in the camera module 100 of the present disclosure. For example, the electronic component 32 can be implemented as, but not limited to, a processor, a relay, a memory, a driver, a resistor, a capacitor, etc.

In a specific example of the camera module 100 of the present disclosure, the electronic component 32 can be attached to the back face 312 of the substrate 31, so that the electronic component 32 is conductively connected to the substrate 31 on the back face 312 of the substrate 31.

In another specific example of the camera module 100 of the present disclosure, the electronic component 32 may also be half-embedded in the substrate 31 on the back face 312 of the substrate 31, so that the electronic component 32 is be conductively connected to the substrate 31, that is, a portion of the electronic component 32 is exposed on the back face 312 of the substrate 31. In this way, the height of the camera module 100 can be further reduced. Alternatively, the electronic component 32 may also be entirely embedded inside the substrate 31.

In addition, the circuit board 30 may further comprise a connection plate 33, wherein the connection plate 33 has a module connection side 331 and a device connection side 332, and the module connection side 331 of the connection plate 33 is connected to the substrate 31. For example, the module connection side 331 of the connection plate 33 may be connected to the front face 311 of the substrate 31, or the module connection side 331 of the connection plate 33 may be connected to the back face 312 of the substrate 31. The connection manner between the module connection side 331 of the connection plate 33 and the substrate 31 is not limited. For example, the module connection side 331 of the connection plate 33 and the substrate 31 may be connected by, but are not limited to, conductive glue.

Nonetheless, it can be understood by those skilled in the art that the module connection side 331 of the substrate 31 is connected to the side face of the substrate 31, or it is possible that the module connection side 331 of the substrate 31 and the substrate 31 are integrally formed. The device connection side 332 of the connection plate 33 can be connected to the device body 200, for example, the device connection side 332 of the connection plate 33 can be provided or formed with a connector for being connected to the device body 200.

Generally, the connection plate 33 can be deformed, so that the connection plate 33 can buffer, in a manner of deformation, the displacement of the camera module 100 caused by the vibration of the electronic device during usage, thereby ensuring the reliability of the electronic device when it is used.

The photosensitive chip 20 is attached to the front face 311 of the substrate 31, and the photosensitive chip 20 is conductively connected to the substrate 31.

Specifically, the substrate 31 has at least one attaching area 313 and at least one bonding area 314, wherein the attaching area 313 and the bonding area 314 are both formed on the front face 311 of the substrate 31. Generally, the attaching area 313 of the substrate 31 is located in center, and the bonding area 314 surrounds the attaching area 313. For example, in this specific example of the camera module 100 shown in FIG. 10, the attaching area 313 of the substrate 31 is located at center of the front face 311 of the substrate 31, and the bonding area 314 of the substrate 31 is located outer portion of the front face 311 of the substrate 31, and the bonding area 314 surrounds the attaching area 313. The photosensitive chip 20 is attached to the attaching area 313 of the substrate 31.

It can be understood by those skilled in the art that, in contrast to the traditional arrangement of electronic components along the periphery of a photosensitive chip, in the camera module 100 of the present disclosure, the photosensitive chip 20 and at least one of the electronic components 32 may correspond to each other in the height direction, that is, the photosensitive chip 20 and at least a part of at least one of the electronic components 32 may overlap when viewed from a top view, in such a manner that the bonding area 314 of the substrate 31 does not need to be reserved as an attaching position for attaching the electronic component 32, so that the area of the bonding area 314 of the substrate 31 can be further reduced, that is, the attaching area 313 of the substrate 31 can occupy a larger proportion of the front face 311 of the substrate 31. In this way, the length and width of the camera module 100 can be further reduced. Nonetheless, it can be understood by those skilled in the art that in some other examples of the camera module 100 of the present disclosure, the photosensitive chip 20 and the electronic components 32 that are respectively located at two faces of the substrate 31 may not overlap each other when viewed form the top view of the camera module 100. In addition, in some other examples of the camera module 100 of the present disclosure, at least one of the electronic components 32 may be disposed on both the front face 311 and the back face 312 of the substrate 31.

In addition, the manner in which the photosensitive chip 20 and the substrate 31 are connected is not limited in the camera module 100 of the present disclosure. For example, the photosensitive chip 20 has at least one chip connector 21, and the substrate 31 has at least one substrate connector 315. In one example of the camera module 100 of the present disclosure, the chip connector 21 of the photosensitive chip 20 may be directly connected to the substrate connector 315 of the substrate 31, for example, when the photosensitive chip 20 is attached to the attaching area 313 of the substrate 31, the chip connector 21 of the photosensitive chip 20 and the substrate connector 315 of the substrate 31 are directly connected. In another example of the camera module 100 of the present disclosure, the chip connector 21 of the photosensitive chip 20 and the substrate connector 315 of the substrate 31 may be connected through a set of connection wires 1000.

Specifically, after the photosensitive chip 20 is attached to the attaching area 313 of the substrate 31, the connection wire 1000 may be formed between the chip connector 21 of the photosensitive chip 20 and the substrate connectors 315 of the substrate 31 through a wiring process so as to conductively connect the photosensitive chip 20 and the substrate 31 by the connection wire 1000.

It is worth mentioning that the wiring direction of the connection wire 1000 is not limited in the camera module 100 of the present disclosure. For example, the wiring direction of the connection wire 1000 may be from the photosensitive chip 20 to the substrate 31, and also may be from the substrate 31 to the photosensitive chip 20. Nonetheless, it can be understood by those skilled in the art that the connection wire 1000 can also have other forming methods. In addition, the material type of the connection wire 1000 is not limited in the camera module 100 of the present disclosure. For example, the connection wire 1000 may be a gold wire, a silver wire, an aluminum wire or a copper wire.

It is also worth mentioning that the shape and arrangement of the chip connector 21 of the photosensitive chip 20 and the shape and arrangement of the substrate connector 315 of the substrate 31 are not limited in the camera module 100 of the present disclosure. For example, the chip connector 21 of the photosensitive chip 20 may be in a disk shape, a spherical shape, or the like, and the chip connector 21 of the photosensitive chip 20 is generally disposed in a non-photosensitive area of the photosensitive chip 20. Correspondingly, the substrate connector 315 of the substrate 31 may be in a disk shape, a spherical shape, or the like, and the substrate connector 315 of the substrate 31 is generally disposed in the bonding area 314 of the substrate 31. Preferably, after the photosensitive chip 20 is attached to the attaching area 313 of the substrate 31, the chip connector 21 of the photosensitive chip 20 and the substrate connector 315 of the substrate 31 are corresponding to each other so as to form, by a wiring process, the connection wire 1000 for connecting the photosensitive chip 20 and the substrate 31 between the chip connector 21 of the photosensitive chip 20 and the substrate connector 315 of the substrate 31.

In an embodiment of the camera module 100 of the present disclosure, the substrate 31, the electronic component 32, the connection plate 33, the connection wire 1000 and the photosensitive chip 20 form a circuit board assembly 2000. That is, according to another aspect of the present disclosure, the present disclosure further provides the circuit board assembly 2000, wherein the circuit board assembly 2000 comprises the substrate 31, the electronic component 32, the connection plate 33, the connection wire 1000 and the photosensitive chip 20, wherein the photosensitive chip 20 is conductively connected to the substrate 31 via the connection wire 20, and the electronic component 32 and the connection plate 33 are conductively connected to the substrate 31, respectively.

With continued reference to FIG. 10 to FIG. 11B, the camera module 100 further comprises a molding unit 40, wherein the molding unit 40 is integrally bonded to the photosensitive chip 20 and the circuit board 30 to form the circuit board assembly 2000 of the present disclosure. That is, the circuit board assembly 2000 of the present disclosure further comprises the molding unit 40.

Specifically, the molding unit 40 comprises a back molding portion 41, wherein the back molding portion 41 is integrally bonded to the substrate 31 on the back face 312 of the substrate 31, wherein the back molding portion 41 can reinforce the strength of the substrate 31 and ensure the flatness of the substrate 31, so that the photosensitive chip 20 attached to the attaching area 313 of the substrate 31 is kept flat so as to improve the imaging quality of the camera module 100.

The back molding portion 41 has good inertness. When the camera module 100 is used, heat generated by the photosensitive chip 20 is transmitted to the back molding portion 41, and the back molding portion 41 does not deform, in such a manner, the flatness of the substrate 31 and the flatness of the photosensitive chip 20 attached to the attaching area 313 of the substrate 31 are not affected by the heat generated by the photosensitive chip 20, thereby facilitating to ensure the flatness of the photosensitive chip 20. In addition, the back molding portion 41 may be formed of a material having a good thermal diffusivity so that the back molding portion 41 has a good heat dissipation property. After the heat generated by the photosensitive chip 20 is conducted to the back face molding 41, the back molding portion 41 can radiate the heat generated by the photosensitive chip 20 to the external environment of the camera module 100 in time so as to ensure the reliability of the camera module 100 when it has been used for a long time.

Preferably, the back molding portion 41 may be integrally bonded to the substrate 31 on the back face 312 of the substrate 31 by a molding process.

In an example of the camera module 100 of the present disclosure, the height of the back molding portion 41 is higher than the height of the electronic component 32, or the height of the back molding portion 41 is consistent with the height of the electronic component 32, for example, the distance between surfaces of the free side face 4111 of the back molding portion 41 and the back face 312 of the substrate 31 is greater than or equal to the height between the surfaces of the free side face of the electronic component 32 and the back face 312 of the substrate 31. It is worth mentioning that the free side face 4111 of the back molding portion 41 defined by the present disclosure is opposite to the bonding side face 4112 of the back molding portion 41, wherein the bonding side face 4112 of the back molding portion 41 is integrally bonded to at least a part of an area of the back face 312 of the substrate 31, with reference to FIG. 10.

With further reference to FIG. 10, it is assumed that the height of the back molding portion 41 is a parameter H, that is, the distance parameter between the bonding side face 4112 and the free side face 4111 of the back molding portion 41 is set to be H, the height of the electronic component 32 protruding from the back face 312 of the substrate 31 is a parameter h, wherein the numerical value of the parameter H is greater than or equal to the numerical value of the parameter h, so that when the camera module 100 is mounted, it is possible to prevent other mounting components from contacting the electronic component 32, thereby ensuring the reliability of the camera module 100.

In another example of the camera module 100 of the present disclosure, the back molding portion 41 embeds at least a part of the surface of at least one of the electronic components 32. Preferably, the back molding portion 41 embeds the entire surface of at least one of the electronic components 32. More preferably, the back molding portion 41 embeds the entire surface of the electronic component 32.

It is worth mentioning that the back molding portion 41 can isolate the surface of the electronic component 32 from the external environment by embedding the electronic component 32, thereby guaranteeing the good electrical property of the electronic component 32 by avoiding oxidation of the surface of the electronic component 32.

In addition, the back molding portion 41 can isolate adjacent electronic components 32 by embedding the electronic components 32 so as to guaranteeing the imaging quality of the camera module 100 by avoiding mutual interference between the adjacent electronic components 32. Moreover, since the back molding portion 41 can isolate the adjacent electronic components 32, and there is no need to reserve a safe distance between the back molding portion 41 and the electronic component 32, more electronic components 32 with larger size can be connected on a limited area of the back face 312 of the substrate 31, for example, more electronic components 32 with larger size can be attached to a limited area of the back face 312 of the substrate 31. In this way, the performance of the camera module 100 can be further improved.

It can be understood by those skilled in the art that the photosensitive chip 20 attached to the attaching area 313 of the substrate 31 and the electronic component 32 attached to the back face 312 of the substrate 31 are respectively located on both sides of the substrate 31, so that contaminants falling off from the surface of the electronic component 32 or contaminants such as solder powder falling off from a connection position between the electronic component 32 and the substrate 31 will not contaminate the photosensitive area of the photosensitive chip 20, and in this manner, the good product yield of the camera module 100 can be ensured. And preferably, the electronic component 32 is embedded by the back molding portion 41 integrally bonded on the back face 312 of the substrate 31, and in this manner, the surface of the electronic component 32 can be prevented from producing contaminants and the connection position between the electronic component 32 and the substrate 31 can be prevented from producing contaminants.

In addition, after the back molding portion 41 embeds the electronic component 32 located on the back face 312 of the substrate 31, the electronic component 32 can also prevent the back molding portion 41 from falling off from the back face 312 of the substrate 31 so as to ensure the reliability of the camera module 100.

With reference to FIGS. 10 and 11B, the back molding portion 41 has at least one mounting space 410, wherein the module connection side 331 of the connection plate 33 can be accommodated in the mounting space 410 of the back molding portion 41 after being connected to the substrate 31 on the back face 312 of the substrate 31. In this way, it is possible to prevent the module connection side 331 of the connection plate 33 from protruding to ensure the reliability of the connection position between the module connection side 331 of the connection plate 33 and the back face 312 of the substrate 31. Nonetheless, it can be understood by those skilled in the art that in other examples of the camera module 100 of the present disclosure, the back molding portion 41 may also embed the connection position between the module connection side 331 of the connection plate 33 and the substrate 31 to prevent the module connection side 331 of the connection plate 33 from falling off from the back face 312 of the substrate 31 so as to ensure the reliability of the camera module 100.

In some other possible examples of the camera module 100, the electronic component 32 that is not embedded by the back molding portion 41 can also be accommodated in the mounting space 410 of the back molding portion 41. In this way, when the camera module 100 is moved or mounted, the electronic component 32 can be prevented from being contacted, thereby preventing the surface of the electronic component 32 or the conductive position between the electronic component 32 and the substrate 31 from being destroyed so as to further ensure the reliability of the camera module 100. Alternatively, a portion of the surface of the electronic components 32 is exposed on the mounting space 410 of the back molding portion 41.

In addition, when the camera module 100 is mounted to the electronic device, the protruding mounting components of the device body 200 can also be accommodated in the mounting space 410 of the back molding portion 41. In this way, the internal space of the device body 200 can be effectively utilized so as to facilitate the lighting and thinning and miniaturization of the electronic device.

With continued reference to FIG. 10 to FIG. 11B, the molding unit 40 further comprises a molding base 42, wherein the molding base 42 has at least one light window 420, and the molding base 42 is integrally bonded to at least a part of the bonding area 314 of the substrate 31 and at least a part of the non-photosensitive area of the photosensitive chip 20 such that the substrate 31, the photosensitive chip 20, and the molding base 42 are integrally bonded, and the photosensitive area of the photosensitive chip 20 corresponds to the light window 420 of the molding base 42, thus, the light window 420 of the molding base 42 can provide a light path for the optical lens 10 and the photosensitive chip 20. That is, the light reflected by the object can pass through the light window 420 to be received by the photosensitive chip 20 after entering the interior of the camera module 100 from the optical lens 10.

It can be understood by those skilled in the art that the molding base 42 forms a part of the circuit board assembly 2000.

In a specific example of the camera module 100 of the present disclosure, the back molding portion 41 and the molding base 42 are simultaneously and integrally bonded to the back face 312 and the front side 311 of the substrate 31, respectively. That is, in the same molding process, the back molding portion 41 is integrally bonded to the back face 312 of the substrate 31, and the molding base 42 is integrally bonded to the front face 311 of the substrate 31. Nonetheless, in other examples of the camera module 100, the circuit board assembly 2000 of the present disclosure may also be formed by different molding processes, respectively.

In the present disclosure, the molding base 42 of the molding unit 40 is integrally bonded to the front face 311 of the substrate 31 by a molding process, such that there is no need for a connection medium such as glue between the molding base 42 and the front face 311 of the substrate 31. In this way, not only the manufacturing process of the camera module 100 can be reduced, but also the height of the camera module 100 can be lowered. It is more important that during the process of manufacturing the camera module 100, there is no need to worry that the connection medium such as glue contaminates the photosensitive area of the photosensitive chip 20, thereby ensuring the good product yield of the camera module 100.

In the present disclosure, the molding base 42 of the molding unit 40 is integrally bonded to the non-photosensitive area of the photosensitive chip 20, so that there is no need to reserve a safe distance between the molding base 42 and the photosensitive chip 20. In this way, the length and width of the camera module 100 can be further reduced, so that the camera module 100 is particularly suitable for being applied to electronic devices that are intended to be lighter and thinner.

It can be understood that, in the present disclosure, the molding base 42 of the molding unit 40 embeds the connection wire 1000, thereby being able to isolate the surface of the connection wire 1000 from the external environment to avoid oxidation of the surface of the connection wire 1000 so as to ensure the good electrical property of the connection wire 1000.

With continued reference to FIG. 10, the camera module 100 comprises at least one filtering element 50, wherein the filtering element 50 is held between the optical lens 10 and the photosensitive chip 20, so that the light entering the interior of the camera module 100 from the optical lens 10 is received by the photosensitive chip 20 after passing through the filtering element 50. In this way, the imaging quality of the camera module 100 can be ensured.

Specifically, the filtering element 50 can filter stray light in the light entering the interior of the camera module 100 from the optical lens 10. In this way, the imaging quality of the camera module 100 can be improved. It is worth mentioning that the type of the filtering element 50 is not limited in the camera module 100 of the present disclosure. For example, the filtering element 50 may be, but not limited to, an infrared cut-off filtering element, a visible spectrum filtering element, etc.

Preferably, the filtering element 50 may be attached to a top surface of the molding base 42 such that the filtering element 50 is held between the optical lens 10 and the photosensitive chip 20.

With reference to FIG. 10 to FIG. 11B, the camera module 100 comprises at least one driver 60, wherein the optical lens 10 is drivably disposed in the driver 60, and the driver 60 is attached to the top surface of the molding base 42, so that the optical lens 10 is held in the photosensitive path of the photosensitive chip 20 via the driver 60. The driver 60 can drive the optical lens 10 to move along the photosensitive path of the photosensitive chip 20 relative to the photosensitive chip 20, so that the camera module 100 achieves automatic zooming and automatic focusing by means of adjusting the relative position of the optical lens 10 and the photosensitive chip 20.

It is worth mentioning that the type of the driver 60 is not limited in the camera module 100 of the present disclosure, as long as the optical lens 10 can be driven to move along the photosensitive path of the photosensitive chip 20 relative to the photosensitive chip 20. For example, the driver 60 may be implemented as, but not limited to, a voice coil motor in a specific example of the present disclosure.

Further, the driver 60 has at least one driving pin 61, wherein the driving pin 61 is electrically connected to the substrate 31. Preferably, the molding base 42 has at least one pin groove 421, wherein the pin groove 421 of the molding base 42 extends from the top surface of the molding base 42 to the front face 311 of the substrate 31, such that after the driver 60 is attached to the top surface of the molding base 42, the driving pin 61 of the driver 60 can extends, inside the pin groove 421, from the top surface of the molding base 42 to the front face 311 of the substrate 31, and the driving pin 61 of the driver 60 can be electrically connected to the substrate 31.

Preferably, the pin groove 421 extends, along the outer surface of the molding base 42, from the surface of the molding base 42 to the front face 311 of the substrate 31, thereby facilitating the electrical connection between the driving pin 61 of the driver 60 and the substrate 31 after the driver 60 is attached to the top surface of the molding base 42. It can be understood that the driving pin 61 of the driver 60 accommodated in the pin groove 421 of the molding base 42 does not protrude from the outer surface of the molding base 42. Therefore, not only the aesthetics of the camera module 100 can be ensured, but also an undesirable phenomenon of contacting the driving pin 61 of the driver 60 when assembling the camera module 100 at the device body 200 can be prevented so as to ensure the reliability and good product yield of the camera module 100.

Further, the top surface of the molding base 42 has at least one inner surface 422 and at least one outer surface 423, wherein the driver 60 is attached to the outer surface 423 of the molding base 42 such that the optical lens 10 is held in a photosensitive path of the photosensitive chip 20, wherein the filtering element 50 is attached to the inner surface 422 of the molding base 42 such that the filtering element 50 is held between the optical lens 10 and the photosensitive chip 20.

In some examples of the camera module 100 of the present disclosure, the plane where the inner surface 422 of the molding base 42 is located has a same height as the plane where the outer surface 423 is located. In some other examples of the camera module 100 of the present disclosure, there is a height difference between the plane where the inner surface 422 of the molding base 42 is located and the plane where the outer surface 423 is located. For example, in this specific example of the camera module 100 shown in FIG. 10, the plane where the inner surface 422 of the molding base 42 is located is lower than the plane where the outer surface 423 is located, so that the molding base 42 forms at least one attaching groove 424, and the attaching groove 424 of the molding base 42 is in communication with the light window 420, wherein the filtering element 50 attached to the inner surface 422 of the molding base 42 is accommodated in the attaching groove 424 to further reduce the height of the camera module 100.

With reference to FIG. 1 to FIG. 9 of the accompanying drawings of the present disclosure, the manufacturing process of the camera module 100 is illustrated in the following description.

Figure 1:
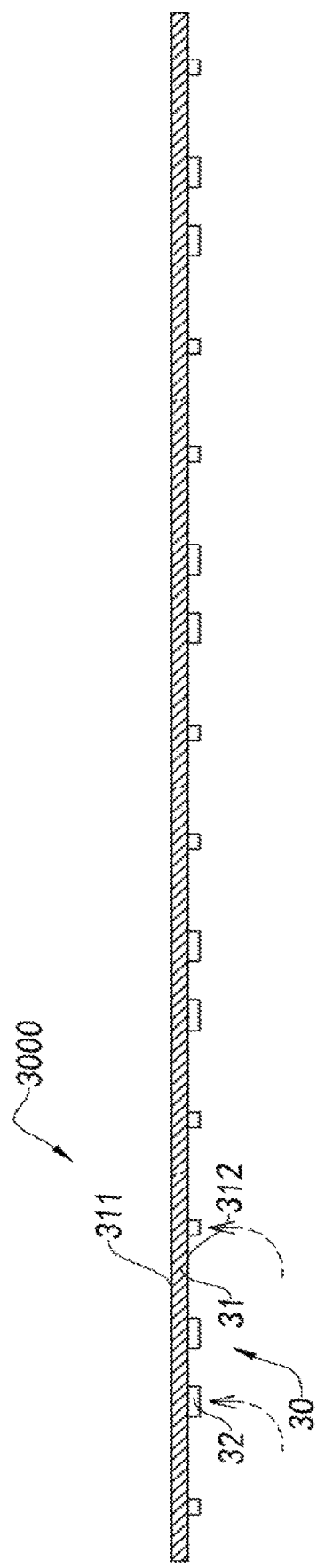
FIG. 1 is a schematic sectional view of a first manufacturing step of a camera module according to a preferred embodiment of the present disclosure.

At the stage shown in FIG. 1, the electronic component 32 is conductively connected to the substrate 31 on the back face 312 of the substrate 31, wherein two or more of the substrates 31 are disposed to form a jointed board unit 3000. It is worth mentioning that the arrangement of the plurality of the substrates 31 forming the jointed board unit 3000 is not limited in the camera module 100 of the present disclosure.

For example, in this specific example of the camera module 100 of the present disclosure, after the substrate 31 is provided or manufactured, all of the electronic components 32 may be conductively connected to the substrate 31 on the back face 312 of the substrate 31 by way of attaching. It can be understood by those skilled in the art that in other examples of the camera module 100 of the present disclosure, only a part of the electronic component 32 may also be connected to the substrate 31 on the back face 312 of the substrate 31, and the examples shown in FIG. 1 to FIG. 9 of the present disclosure do not limit the content and scope of the camera module 100 of the present disclosure.

In addition, the position where the electronic component 32 is attached on the back face 312 of the substrate 31 is not limited, and may be adjusted according to the specific application requirements of the camera module 100. In some examples of the camera module 100 of the present disclosure, a plurality of the electronic components 32 may be disposed in all area of the back face 312 of the substrate 31, and in some other specific examples of the camera module 100 of the present disclosure, a plurality of the electronic components 32 may also be disposed in a specific area of the back face 312 of the substrate 31, for example, in a corner, a side, or two sides, etc.

Figure 2:
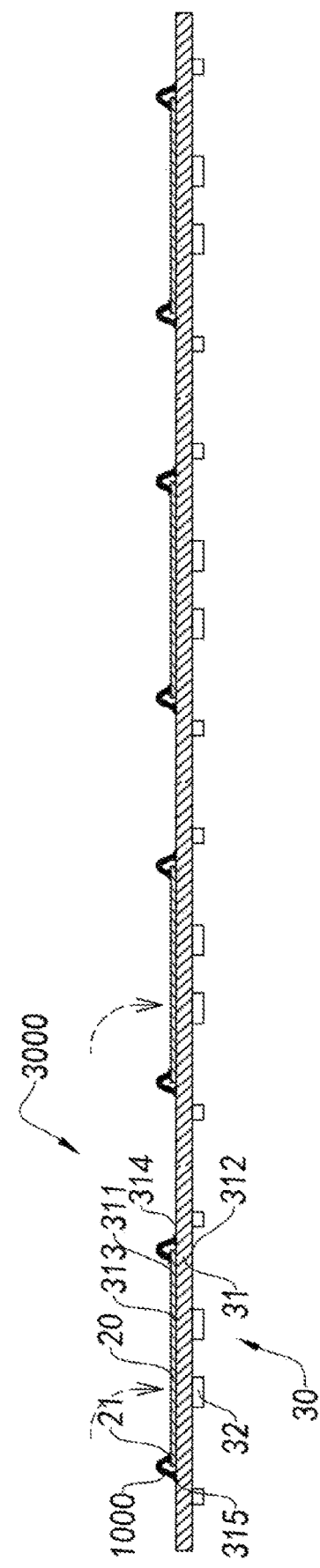
FIG. 2 is a schematic sectional view of a second manufacturing step of the camera module according to the above preferred embodiment of the present disclosure.

At the stage shown in FIG. 2, the photosensitive chip 20 is attached to the attaching area 312 of the substrate 31, and the connection wire 1000 is formed between the chip connector 21 of the photosensitive chip 20 and the substrate connectors 315 of the substrate 31 through a wiring process so as to be conductively connected to the photosensitive chip 20 and the substrate 31. For example, the photosensitive chip 20 may be attached to the attaching area 313 of the substrate 31 by a surface mounting technology (SMT), and the chip connector 21 of the photosensitive chip 20 and the substrate connector 315 of the substrate 31 may be made to correspond to each other, and then by a wiring process, the connection wire 1000 is formed between the chip connector 21 of the photosensitive chip 20 and the substrate connector 315 of the substrate 31. It is worth mentioning that the wiring direction of the connection wire 1000 may not be limited. For example, the wiring direction of the connection wire 1000 may be from the photosensitive chip 20 to the substrate 31, or also may be from the substrate 31 to the photosensitive chip 20, which is selected as needed.

In addition, it is also worth mentioning that although FIG. 2 to FIG. 10 show that the photosensitive chip 20 and the substrate 31 are connected by means of the connection wire 1000 formed between the chip connector 21 of the photosensitive chip 20 and the substrate connector 315 of substrate 31, in other examples of the camera module 100 of the present disclosure, the photosensitive chip 20 and the substrate 31 may be connected to each other by other means, for example, the chip connector 21 of the photosensitive chip 20 can be directly connected to the substrate connector 315 of the substrate 31 when the photosensitive chip 20 is attached to the attaching area 313 of the substrate 31.

At the stage shown in FIGS. 3A and 3B, the jointed board unit 3000 is placed in a molding die 300 to perform a molding process by the molding die 300.

Specifically, the molding die 300 comprises an upper die 301 and a lower die 302, wherein at least one of the upper die 301 and the lower die 302 can be operated to enable the molding die 300 to be subjected to clamping and demolding operations. For example, in one example, after placing the jointed board unit 3000 in the lower die 302 and performing the clamping operation on the molding die 300, at least a first molding space 303a is formed between the upper die 301 and the front face 311 of and the substrate 31, and at least a second molding space 303b is formed between the lower die 302 and the back face 312 of the substrate 31.

In one example of the present disclosure, at least one of the first molding spaces 303a and at least one of the second molding spaces 303b are in communication with each other to subsequently allow a fluid medium 400 to fill the first molding space 303a and the second molding space 303b, to simultaneously form the molding base 42 integrally bonded to the front face 311 of the substrate 31 and the back molding portion 41 integrally bonded to the back face 312 of the substrate 31.

Preferably, when the number of the first molding spaces 303a exceeds two, at least one first communication channel 304a may also be formed between the upper die 301 and the front face 311 of the substrate 31 for connecting the adjacent first molding spaces 303a. Correspondingly, when the number of the second molding spaces 303b exceeds two, at least one second communication channel 304b may also be formed between the lower die 302 and the back face 312 of the substrate 31 for connecting the adjacent second molding spaces 303b.

With continued reference to FIGS. 3A and 3B, the upper die 301 further comprises an upper molding guide portion 3011 and at least one light window molding portion 3012 and has at least one upper molding guide groove 3013, wherein the light window molding portion 3012 integrally extends over the upper molding guide portion 3011 to form the upper molding guide groove 3013 between the light window molding portion 3012 and the upper molding guide portion 3011 or to form the upper molding guide groove 3013 between the adjacent light window molding portions 3012.

Further, the upper molding guide portion 3011 has a first upper pressing portion 30111, so that after the molding die 300 is subjected to a clamping process, the first upper pressing portion 30111 of the upper molding guiding portion 3011 can be pressed against the front face 311 of the substrate 31.

The light window molding portion 3012 has a second upper pressing portion 30121 which may have a ring shape. For example, in the example of the molding die 300 shown in FIGS. 3A and 3B, the light window molding portion 3012 may form the second upper pressure portion 30121 around in a manner of forming a safe space 30122 by indent, so that when the molding die 300 is subjected to a clamping process, the second upper pressing portion 30121 of the light window molding portion 3012 can be pressed against the non-photosensitive area of the photosensitive chip 20, and enable the photosensitive area of the photosensitive chip 20 to correspond to the safe space 30122 of the light window molding portion 3012 so as to prevent the upper die 301 from scratching the photosensitive area of the photosensitive chip 20.

It can be understood that, when the clamping operation is performed on the molding die 300, the first molding space 303a is formed at a position corresponding to the upper molding guide groove 3013 of the upper die 301. Moreover, the second upper pressing portion 30121 of the light window molding portion 3012 of the upper die 301 surrounds the photosensitive area in a manner of being pressed against the non-photosensitive area of the photosensitive chip 20 so as to prevent the fluid medium 400 added to the first molding space 303a from entering the photosensitive area of the photosensitive chip 20 in the molding process, thereby avoiding contamination of the photosensitive area of the photosensitive chip 20 in the molding process.

With continued reference to FIGS. 3A and 3B, the lower die 302 further comprises a lower molding guide portion 3021 and at least one support portion 3022 and has at least a lower molding guide groove 3023, wherein the support portion 3022 integrally extends over the lower molding guide portion 3021 to form the lower molding guide groove 3023 between the support portion 3022 and the lower molding guide portion 3021, or to form the lower molding guide groove 3023 between the adjacent support portions 3022.

When the clamping operation is performed on the molding die 300, the second molding space 303b is formed at a position corresponding to the lower molding guide groove 3023 of the lower die 302. Further, the lower molding guide portion 3021 of the lower die 302 can be pressed against the back face 312 of the substrate 31, and the support portion 3022 of the lower die 302 is pressed against the back face 312 of the substrate 31.

Preferably, the height of the support portion 3022 of the lower die 302 is greater than the height of the electronic component 32 protruding from the back face 312 of the substrate 31. In this way, when the lower die 302 is pressed against the back face 312 of the substrate 31, there is a safe distance between the surface of the electronic component 32 and the inner surface of the lower die 302 to protect the surface of the electronic component 32 from being scratched by preventing the surface of the electronic component 32 from contacting the inner surface of the lower die 302. In addition, by having a safe distance between the surface of the electronic component 32 and the inner surface of the lower die 320, it is also possible to subsequently embed the electronic component 32 by the back molding portion 41 integrally bonded to the back face 312 of the substrate 31.

In addition, the molding die 300 further comprises at least one film layer 305. For example, in this specific example of the present disclosure, the number of the film layers 305 may be implemented as two, wherein one of the film layers 305 is disposed on the inner surface of the upper die 301 in an overlapping manner, and another of the film layers 305 is disposed on the inner surface of the lower die 302 in an overlapping manner, for example, the film layer 305 can be disposed on the inner surface of the upper die 301 in an overlapping manner by means of attaching the film layer 305 to the inner surface of the upper die 301, and the film layer 305 can be disposed on the inner surface of the lower die 302 in an overlapping manner by means of attaching the film layer 305 to the inner surface of the lower die 302.

It can be understood by those skilled in the art that when the molding die 300 is subjected to a clamping operation, the film layer 305 is held between the second upper pressing portion 30121 of the light window molding portion 3012 and the non-photosensitive area of the photosensitive chip 20, so that the film layer 305 prevents, by means of deformation when it is pressed, a gap from being formed between the second upper pressing portion 30121 of the light window molding portion 3012 and the non-photosensitive area of the photosensitive chip 20. Therefore, in a subsequent molding process, the fluid medium 400 is prevented from entering a safe space 30122 between the second upper pressing portion 30121 of the light window molding portion 3012 and the non-photosensitive area of the photosensitive chip 20, thereby preventing the photosensitive area of the photosensitive chip 20 held in the safe space 30122 from being contaminated, and avoiding an undesirable phenomenon of "flash" so as to ensure the good product yield of the camera module 100.

It can be understood that the film layer 305 can isolate the second upper pressing portion 30121 of the light window molding portion 3012 from the photosensitive chip 20, so that when the molding die 300 is clamped, on one hand, the film layer 305 can absorb the impact force generated by the molding die 300 when being clamped by means of deformation to prevent the impact force from directly acting on the photosensitive chip 20, and on the other hand, the film layer 305 can also isolate the second upper pressing portion 30121 of the light window molding portion 3012 from the photosensitive chip 20 to prevent the photosensitive chip 20 from being scratched.

In addition, after the molding process is completed, the film layer 305 can isolate the inner surface of the upper die 301 from the molding base 42, and isolate the inner surface of the lower die 302 from the back molding portion 41 so as to perform a demolding operation on the molding die 300, and in the process, the molding base 42 and the back molding portion 41 are prevented from being damaged.

After the clamping operation is performed on the molding die 300, the first upper pressing portion 30111 of the upper molding guide portion 3011 of the upper die 301 can also be pressed against the front face 311 of the substrate 31, so that on one hand, the film layer 305 held between the first upper pressing portion 30111 of the upper molding guide portion 3011 and the front face 311 of the substrate 31 is capable of absorbing the impact force generated by the molding die 300 when being clamped so as to prevent the impact force from directly acting on the substrate 31, and on the other hand, the film layer 305 is also capable of isolating the first upper pressure portion 30111 of the upper molding guide portion 3011 from the front face 311 of the substrate 31 so as to prevent the front face 311 of the substrate 31 from being scratched, thereby ensuring the good electrical property of the substrate 31. In addition, the film layer 305 can also prevent a gap from being formed between the first upper pressing portion 30111 of the upper molding guide portion 3011 and the front face 311 of the substrate 31 by means of deformation.

It can be understood that a part of the non-photosensitive area of the photosensitive chip 20, the connection wire 1000, and at least a part of the bonding area 314 of the substrate 31 are held in the first molding space 303a.

After the clamping operation is performed on the molding die 300, the lower molding guide portion 3021 and the support portion 3022 of the lower die 302 are respectively pressed against different positions of the back face 312 of the substrate 31. Therefore, on one hand, the film layer 305 held between the lower molding guide portion 3021 and the back face 312 of the substrate 31 and the film layer 305 held between the support portion 3022 and the back face 312 of the substrate 31 can absorb the impact force generated by the molding die 300 when being clamped so as to prevent the impact force from directly acting on the back face 312 of the substrate 31, and on the other hand, the film layer 305 is also capable of isolating the lower molding guide portion 3021 from the back face 312 of the substrate 31 and isolating the support portion 3022 from the back face 312 of the substrate 31 so as to prevent the back face 312 of the substrate 31 from being scratched, thereby ensuring the good electrical property of the substrate 312. In addition, the film layer 305 is also capable of preventing a gap from being formed between the lower molding guide portion 3021 and the back face 312 of the substrate 31 and preventing a gap form being formed between the support portion 3022 and the back face 312 of the substrate 31 by means of deformation.

Alternatively, after the clamping operation is performed on the molding die 300, the first upper pressing portion 30111 of the upper molding guide portion 3011 of the upper die 301 may also be directly press-fitted together with at least a part of the lower molding guide portion 3012 of the lower die portion 302, such that at least one of the first molding spaces 303a and at least one of the second molding spaces 303b are in communication.

Preferably, after the clamping operation is performed on the molding die 300, positions of the second upper pressing portion 30121 of the light window molding portion 3012 of the upper die 301 and the support portion 3022 of the lower die 302 correspond to each other, thereby preventing the photosensitive chip 20 and the substrate 31 from being deformed by uneven forces. For example, in this example of the present disclosure, when the second upper pressing portion 30121 of the light window molding portion 3012 of the upper die 301 is pressed against the non-photosensitive area of the photosensitive chip 20, which causes a deformation generating a downward displacement of the photosensitive chip 20 and the substrate 31, the support portion 3022 of the lower die 302 is pressed against a position of the substrate 31 corresponding to the non-photosensitive area of the photosensitive chip 20 to support the substrate 31 upward so as to prevent the photosensitive chip 20 and the substrate 31 from having a deformation generating a downward displacement. In this way, the flatness of the substrate 31 and the photosensitive chip 20 can be ensured, so that the good product yield of the camera module 100 is further ensured.

Figure 4:
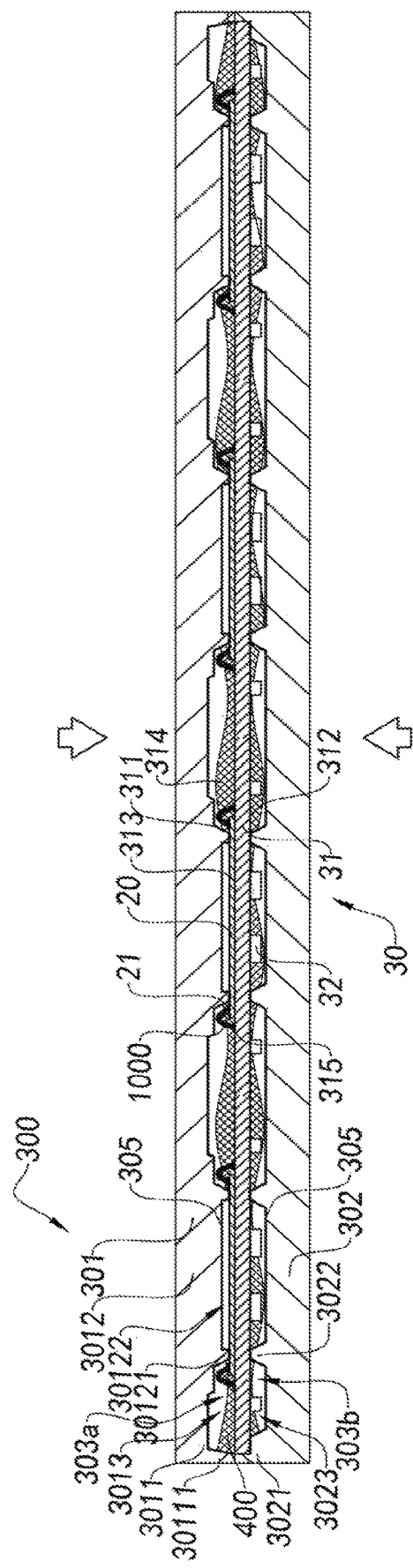
FIG. 4 is a schematic sectional view of a fourth manufacturing step of the camera module according to the above preferred embodiment of the present disclosure.
Figure 5:
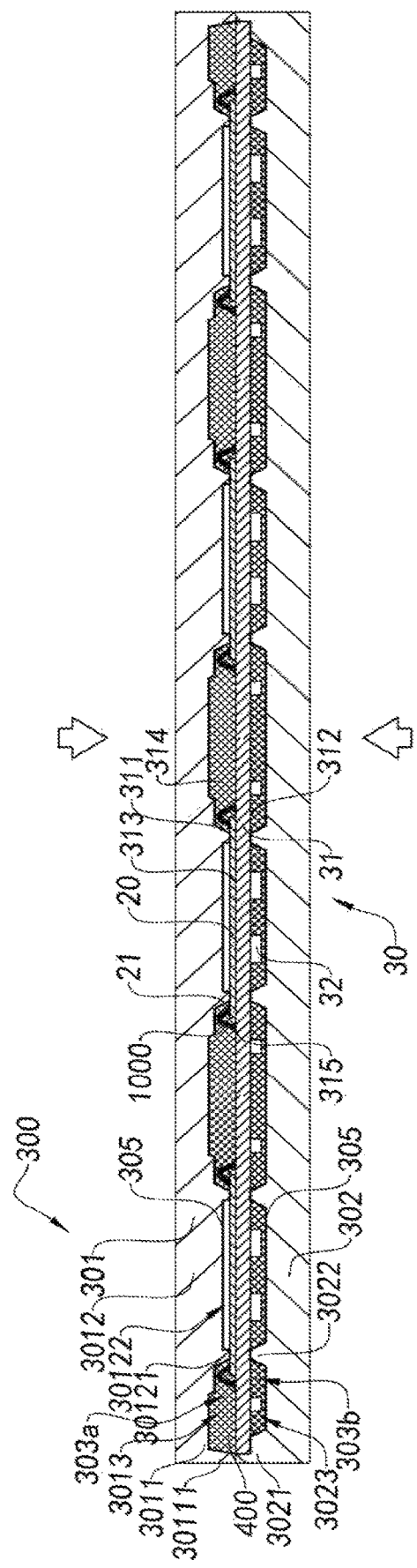
FIG. 5 is a schematic sectional view of a fifth manufacturing step of the camera module according to the above preferred embodiment of the present disclosure.
Figure 6:
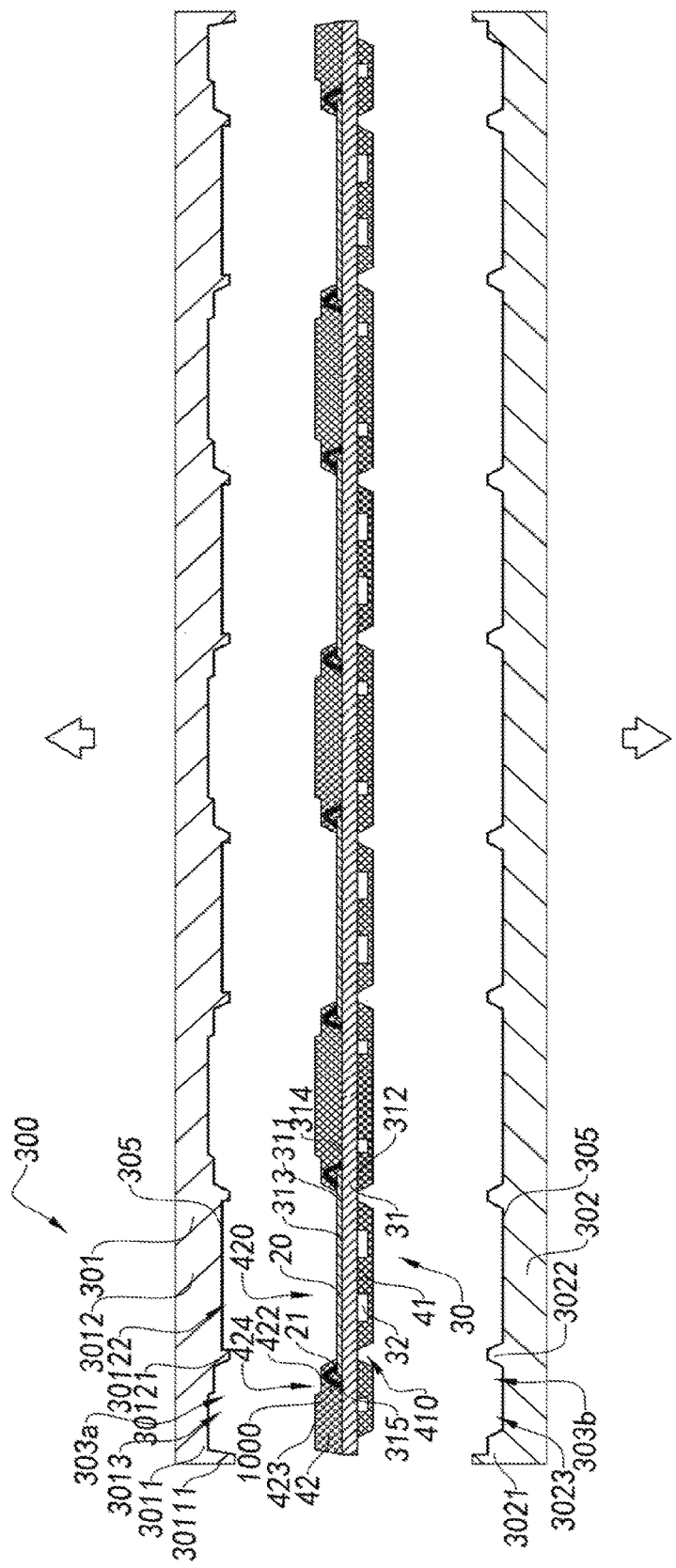
FIG. 6 is a schematic sectional view of a sixth manufacturing step of the camera module according to the above preferred embodiment of the present disclosure.

At the stage shown in FIGS. 4 and 5, the fluid medium 400 is added to at least one of the first molding spaces 303a, or the fluid medium 400 is added to at least one of the second molding spaces 303b, or the fluid medium 400 is simultaneously added to at least one of the first molding space 303a and the at least one of the second molding spaces 303b, because the adjacent first molding spaces 303a are connected through the first communication passage 304a, the adjacent second molding spaces 303b are connected through the second communication channel 304b, so that the fluid medium 400 will fill all of the first molding spaces 303a and all of the second molding spaces 303b.

It is worth mentioning that the fluid medium 400 can be a liquid, a solid or a mixture of liquid and solid, etc., to enable the fluid medium 400 to flow. In addition, the fluid medium 400 can be implemented as, but not limited to, a thermosetting material. Of course, it can be understood by those skilled in the art that in other possible examples, it is also possible that the fluid medium 400 is implemented as a photo-curable material or a self-curable material.

After the fluid medium 400 fully fill the first molding space 303a and the second molding space 303b, the fluid medium 400 may be solidified, through heating, in the first molding space 303a and the second molding space 303b, and a demolding operation can be performed on the molding die 300. With reference to the stage shown in FIG. 6, the fluid medium 400 solidified in the first molding space 303a forms the molding base 42 which is integrally bonded to the front face 311 of the substrate 31, and the light window 420 of the molding base 42 is formed at a position corresponding to the light window molding portion 3012 of the upper die 301. The photosensitive area of the photosensitive chip 20 corresponds to the light window 420 of the molding base 42, wherein the fluid medium 400 solidified in the second molding space 303b forms the back molding portion 41 which is integrally bonded to the back face 312 of the substrate 31, and the back molding portion 41 embeds the electronic component 32, and the corresponding position of the support portion 3022 of the lower die 302 forms the mounting space 410 of the back molding portion 41.

Figure 7:
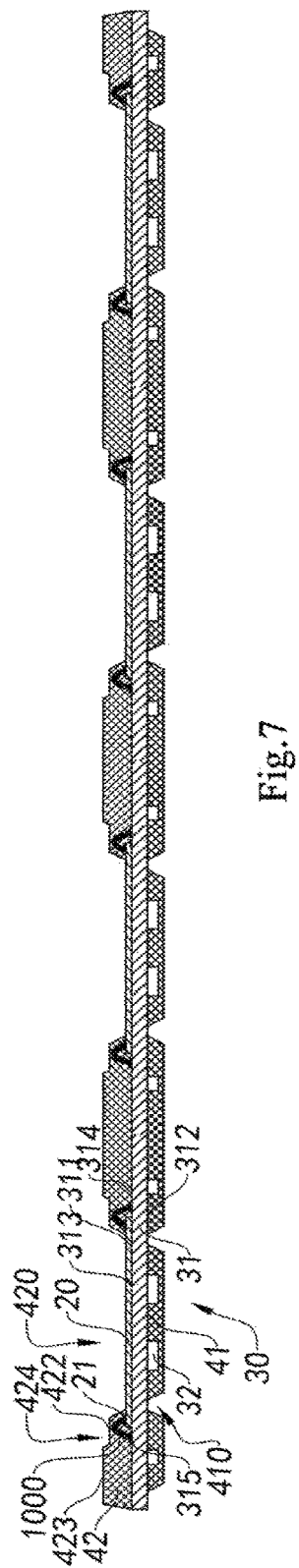
FIG. 7 is a schematic sectional view of a seventh manufacturing step of the camera module according to the above preferred embodiment of the present disclosure.

At the stage shown in FIG. 7, after the demolding operation is performed on the molding die 300, the semi-finished product of the circuit board assembly 2000 can be formed. Then at the stage shown in FIG. 8A and FIG. 8B, the semi-finished product of the circuit board assembly 2000 can be divided to form the circuit board assembly 2000. It is worth mentioning that the manner of dividing the semi-finished product of the circuit board assembly 2000 is not limited in the camera module 100 of the present disclosure. For example, the semi-finished product of the circuit board assembly 2000 may be divided by means of cutting to form the circuit board assembly 2000, and the semi-finished product of the circuit board assembly 2000 may also be divided by means of etching to form the circuit board assembly 2000.

Figure 8A:
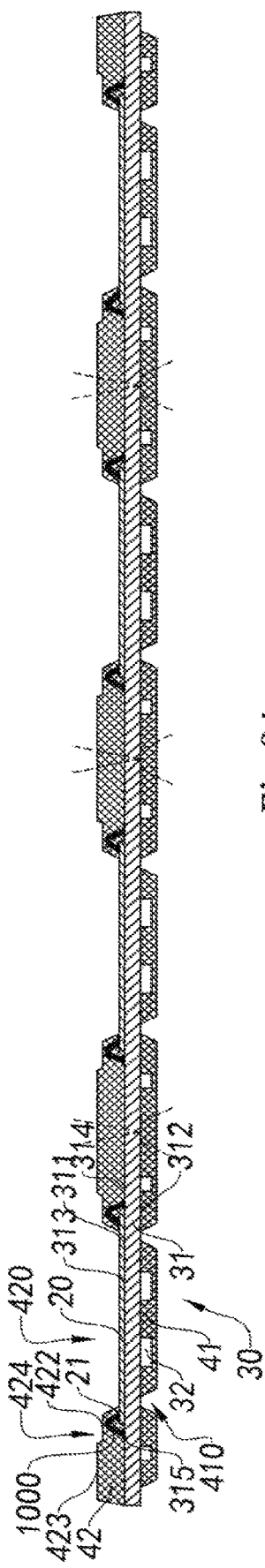
FIG. 8A and FIG. 8B are schematic sectional views of an eighth manufacturing step of the camera module according to the above preferred embodiment of the present disclosure.
Figure 8B:
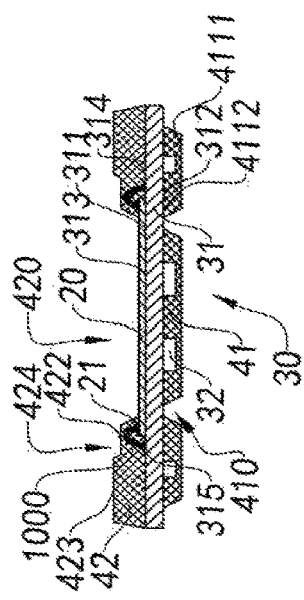

In addition, in the example shown in FIG. 8A, when the semi-finished product of the circuit board assembly 2000 is divided, the dividing direction may be from the molding base 42 to the back molding portion 41. In the example shown in FIG. 8B, in dividing the semi-finished product of the circuit board assembly 2000, the dividing direction may also be from the back molding portion 41 to the molding base 42.

Figure 9:
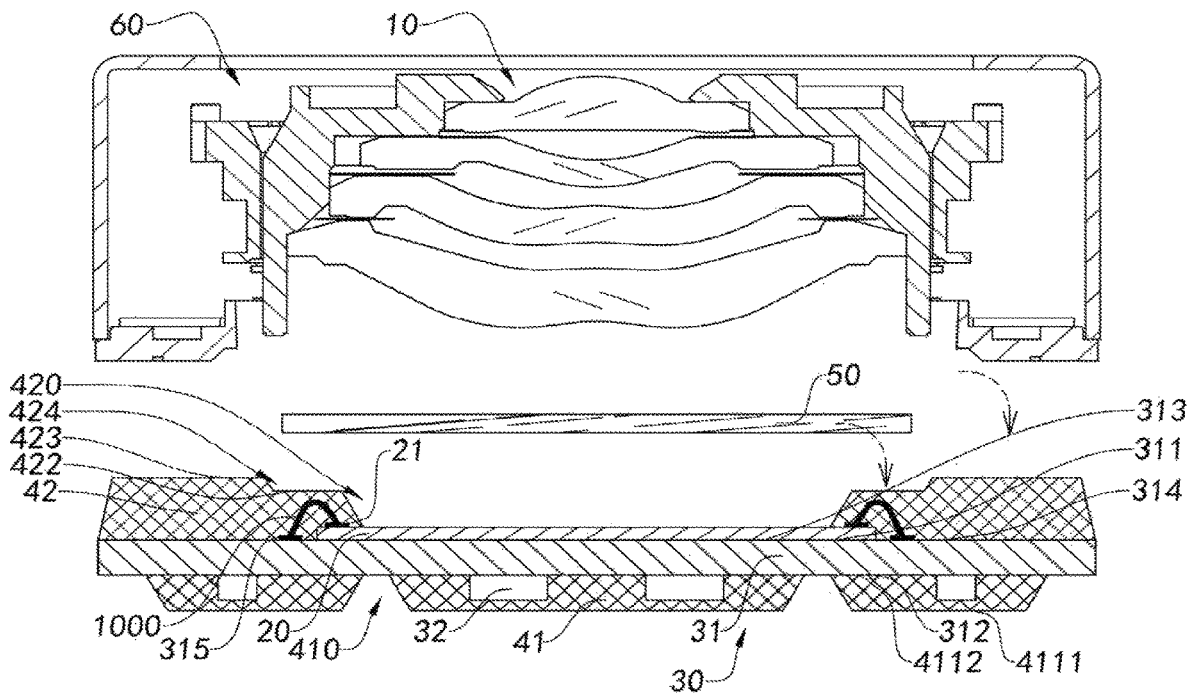
FIG. 9 is a schematic sectional view of a ninth manufacturing step of the camera module according to the above preferred embodiment of the present disclosure.

At the stage shown in FIG. 9, the filtering element 50 may be attached to the inner surface 422 of the molding base 42, and then the driver 60 assembled with the optical lens 10 is attached to the outer surface 423 of the molding base 42, to form the camera module 100 shown in FIG. 10 to FIG. 11B.

According to another aspect of the present disclosure, the present disclosure further provides a method of manufacturing the camera module 100, wherein the manufacturing method comprises the following steps:
(a) conductively connecting at least one electronic component 32 on the back face 312 of the substrate 31;
(b) simultaneously forming the back molding portion 41 integrally bonded to the substrate 31 on the back face 312 of the substrate 31 and the molding base 42 integrally bonded to the substrate 31 on a front face 311 of the substrate 31, wherein the molding base 42 has at least one light window 420;
(c) enabling the photosensitive area of the photosensitive chip 20 conductively connected to the substrate 31 to correspond to the light window 420 of the molding base 42; and
(d) holding the optical lens 10 in the photosensitive path of the photosensitive chip 20 so as to produce the camera module 100.

It is worth mentioning that in the step (a), at least one of the electronic components 32 may be conductively connected to the front face 311 of the substrate 31. That is, in some examples of the camera module 100 of the present disclosure, the electronic component 32 can be conductively connected only on the back face 312 of the substrate 31, but in some other examples of the camera module 100 of the present disclosure, the electronic component 32 is conductively connected not only on the back face 312 of the substrate 31, but also on the front face 311 of the substrate 31, that is, at least one of the electronic components 32 is conductively connected on both the front face 311 and the back face 312 of the substrate 31.

In addition, the step (c) may also precedes the step (b), so that firstly the photosensitive chip 20 is conductively connected to the substrate 31, and then the back molding portion 41 integrally bonded to the substrate 31 is formed on the back face 312 of the substrate 31 and the molding base 42 integrally bonded to the substrate 31 is formed on the front face 311 of the substrate 31 simultaneously, and the photosensitive area of the photosensitive chip 20 is made to correspond to the light window 420 of the molding base 42. Preferably, the molding base 42 may further embed the non-photosensitive area of the photosensitive chip 20. It can be understood that the photosensitive area and at least a part of the non-photosensitive area of the photosensitive chip 20 correspond to the light window 420 of the molding base 42.

Figure 13:
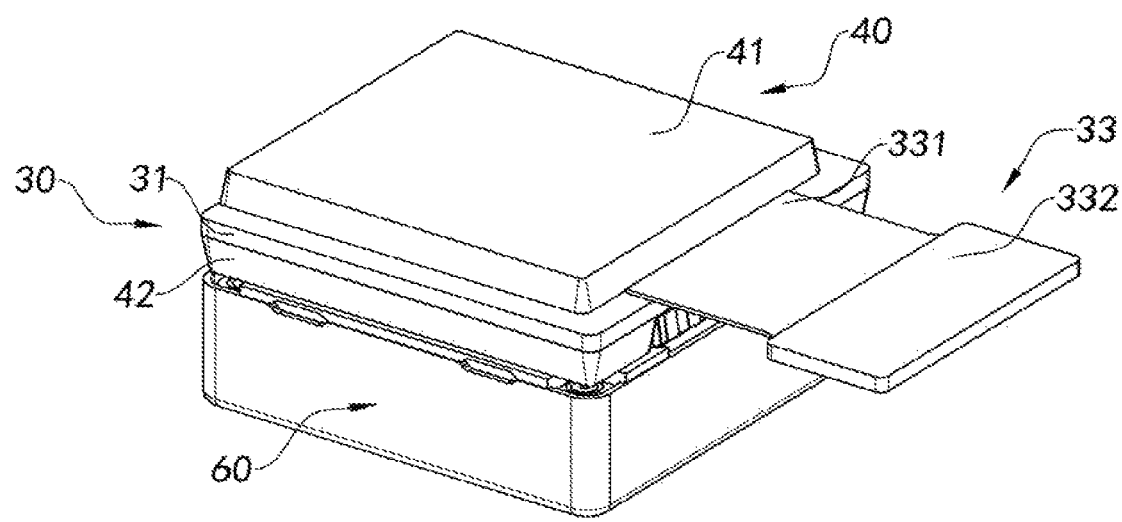
FIG. 13 is a stereoscopic schematic diagram of a variant implementation of the camera module according to the above preferred embodiment of the present disclosure.

FIG. 13 shows a variant implementation of the camera module 100, wherein the back molding portion 41 of the molding unit 40 can be integrally bonded to all area of the back face 312 of the substrate 31, that is, the back molding portion 41 may not be provided or formed with the mounting space 410.

Figure 14:
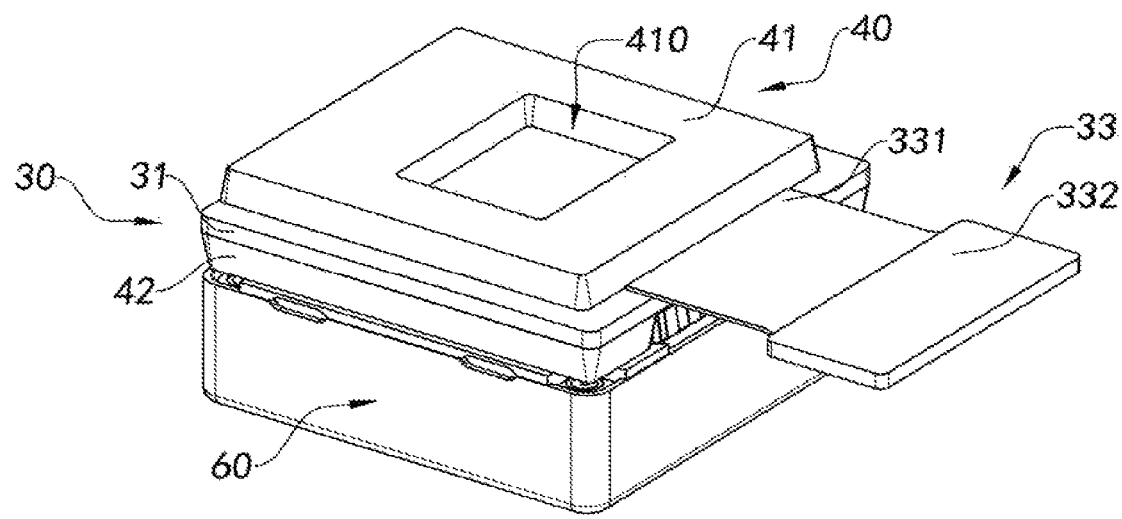
FIG. 14 is a stereoscopic schematic diagram of another variant implementation of the camera module according to the above preferred embodiment of the present disclosure.
Figure 15:
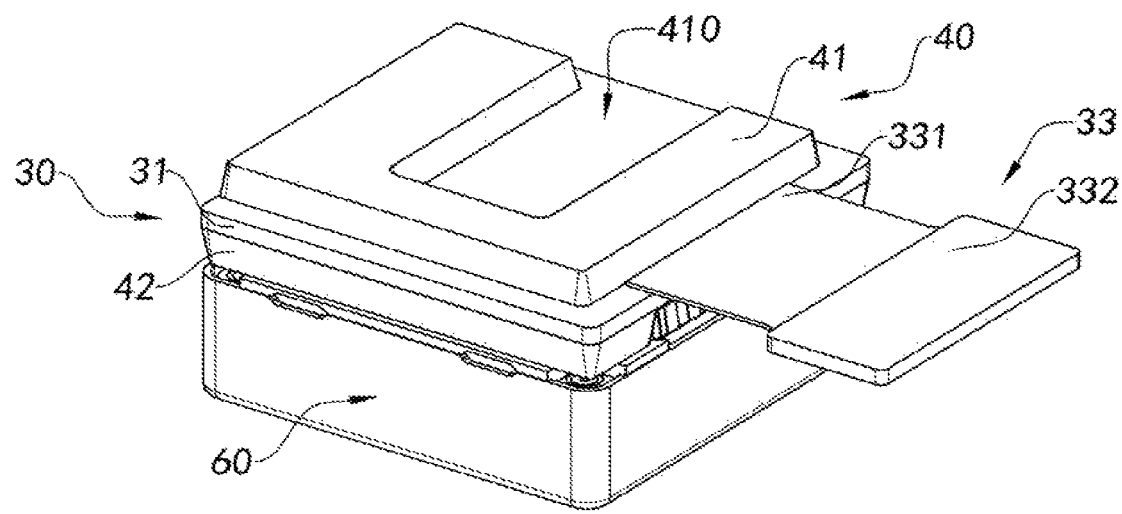
FIG. 15 is a stereoscopic schematic diagram of another variant implementation of the camera module according to the above preferred embodiment of the present disclosure.
Figure 16:
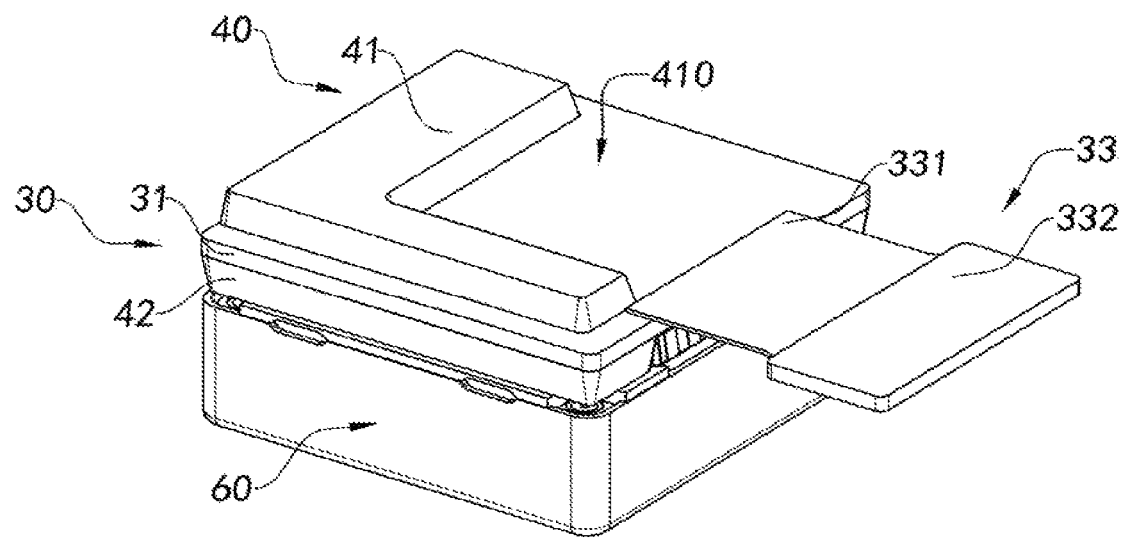
FIG. 16 is a stereoscopic schematic diagram of another variant implementation of the camera module according to the above preferred embodiment of the present disclosure.
Figure 17:
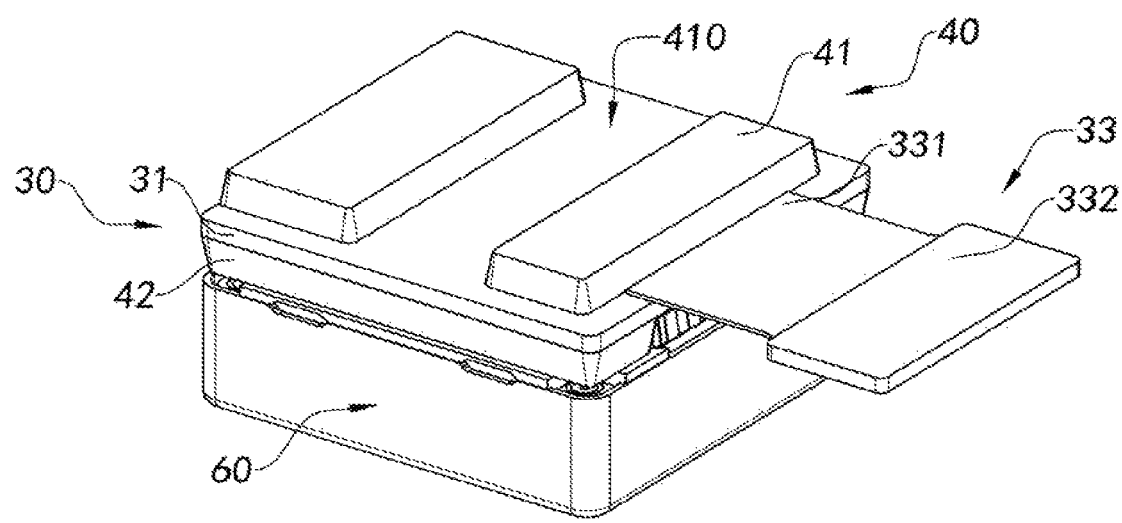
FIG. 17 is a stereoscopic schematic diagram of another variant implementation of the camera module according to the above preferred embodiment of the present disclosure.
Figure 18:
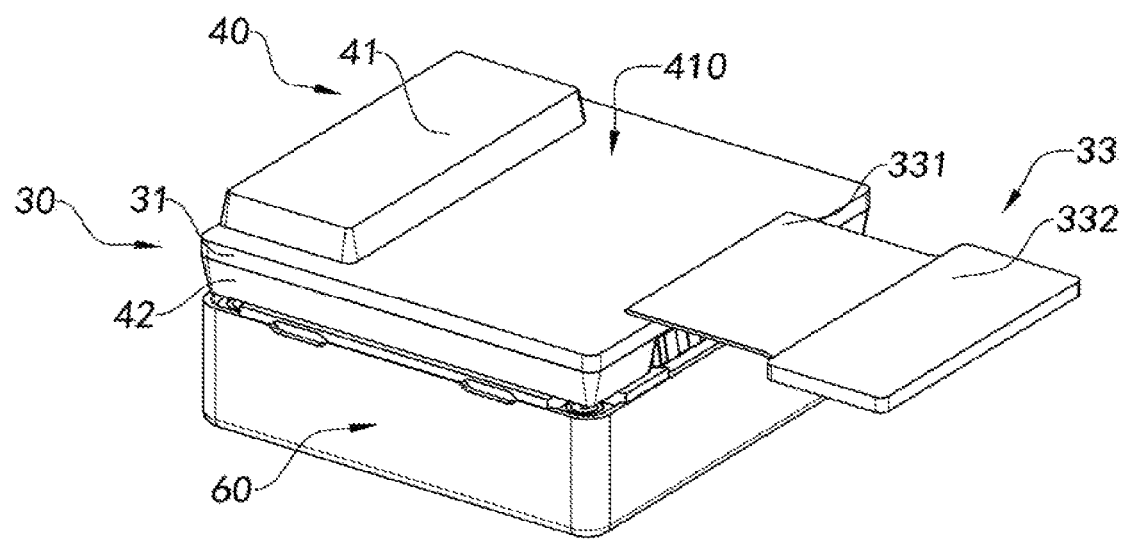
FIG. 18 is a stereoscopic schematic diagram of another variant implementation of the camera module according to the above preferred embodiment of the present disclosure.

FIG. 14 shows another variant implementation of the camera module 100, wherein the back molding portion 41 of the molding unit 40 is integrally bonded to at least one side portion of the back face 312 of the substrate 31, that is, the back molding portion 41 may not be bonded to the middle portion of the back face 312 of the substrate 31. For example, in this specific example of the camera module 100 shown in FIG. 14, the back molding portion 41 can be integrally bonded to the four side portions of the back face 312 of the substrate 31, so that the back molding portion 41 is in the shape of "☐". However, in another variant implementation of the camera module 100 shown in FIG. 15, the back molding portion 41 can be integrally bonded to three side portions of the back face 312 of the substrate 31, so that the back molding portion 41 is in the shape of "Π" or in the shape of "C". However, in another variant implementation of the camera module 100 shown in FIG. 16, the back molding portion 41 can be integrally bonded to two side portions of the back face 312 of the substrate 31, so that the back molding portion 41 is in the shape of "Γ" or in the shape of "L". However, in another variant implementation of the camera module 100 shown in FIG. 17, the number of the back molding portions 41 can be two, and each of the back molding portions 41 is integrally bonded to one side portion of the back face 312 of the substrate 31 respectively, wherein two of the back molding portions 41 are symmetrical with each other, or two of the back molding portions 41 are parallel to each other. For example, the two back molding portions 41 may have a "Π" shape. However, in another variant implementation of the camera module 100 shown in FIG. 18, the back molding portion 41 may be integrally bonded only to one side portion of the back face 312 of the substrate 31. For example, the back molding portion 41 may have an "I" shape.

It is worth mentioning that those skilled in the art would understand that the back molding portion 41 can also have other shapes, such as an "X" shape, or a "井" shape.

Figure 19:
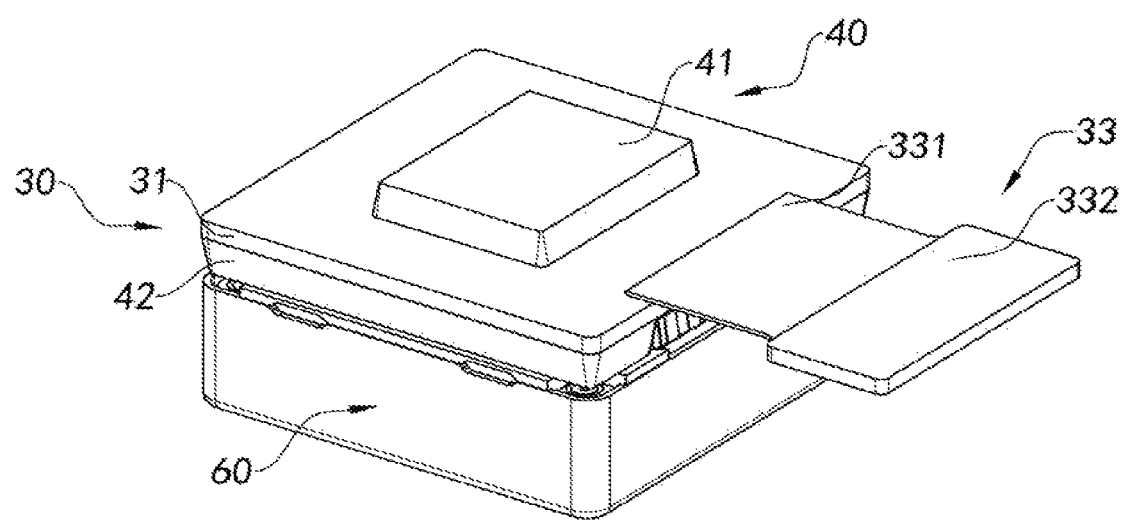
FIG. 19 is a stereoscopic schematic diagram of another variant implementation of the camera module according to the above preferred embodiment of the present disclosure.

FIG. 19 shows another variant implementation of the camera module 100, wherein the back molding portion 41 of the molding unit 40 is integrally bonded only to the middle portion of the back face 312 of the substrate 31, and at this point, the back molding portion 41 and the photosensitive chip 20 are held on both sides of the substrate 31 in correspondence with each other. On the one hand, the back molding portion 41 can reinforce the strength of a portion of the substrate 31 at the attaching area 313 to ensure the flatness of the photosensitive chip 20 attached on the attaching area 313 of the substrate 31, and on the other hand, the heat generated by the photosensitive chip 20 can be radiated to the external environment to help dissipate heat.

It is worth mentioning that in the camera module 100 of the present disclosure, the shape of the back molding portion 41 is not limited. For example, the back molding portion 41 can be in a shape of a square, a rectangular, a trapezoid, a circle, an oval and other irregular shapes.

Figure 20:
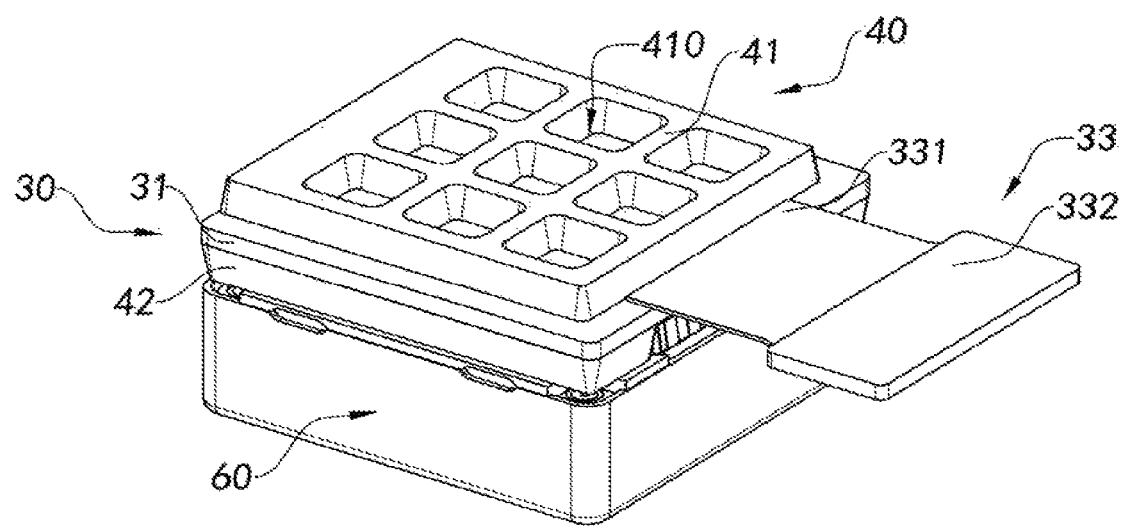
FIG. 20 is a stereoscopic schematic diagram of another variant implementation of the camera module according to the above preferred embodiment of the present disclosure.

FIG. 20 shows another variant implementation of the camera module 100, wherein the back molding portion 41 of the molding unit 40 can be provided with or formed with a plurality of the mounting spaces 410, so that the back molding portion 41 is in the shape of a grid, or the back molding portion 41 is in the shape of "日", or the back molding portion 41 is in the shape of "田".

Figure 21:
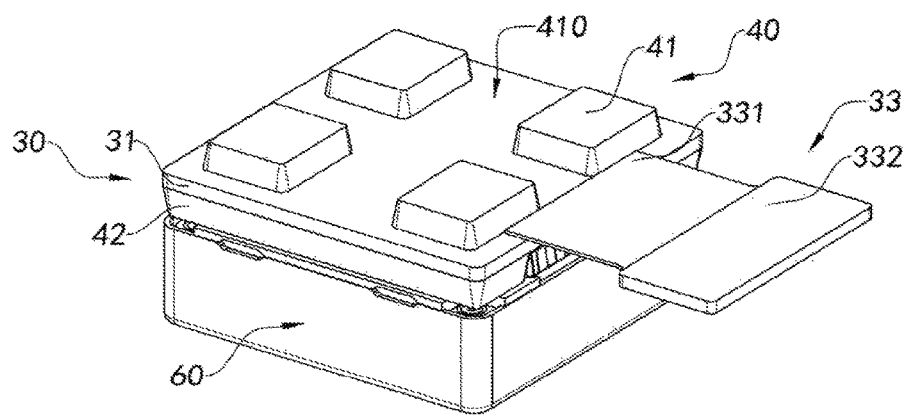
FIG. 21 is a stereoscopic schematic diagram of another variant implementation of the camera module according to the above preferred embodiment of the present disclosure.

FIG. 21 shows another variant implementation of the camera module 100, wherein the number of the back molding portions 41 of the molding unit 40 may also be implemented as four, and each of the back molding portions 41 is integrally bonded to four corners of the back face 312 of the substrate 31, respectively. Nonetheless, it is also possible that each of the back molding portions 41 is integrally bonded to the middle portion of the four sides of the back face 312 of the substrate 31, respectively. In addition, it can be understood by those skilled in the art that the number of the back molding portions 41 can also be implemented to be more or less, and the camera module 100 of the present disclosure is not limited in this respect.

It is worth mentioning that those skilled in the art would understand that the back molding portion 41 of the molding unit 40 may also have any other possible shapes, which will not be further exemplified in the following description of the present disclosure.

Figure 22A:
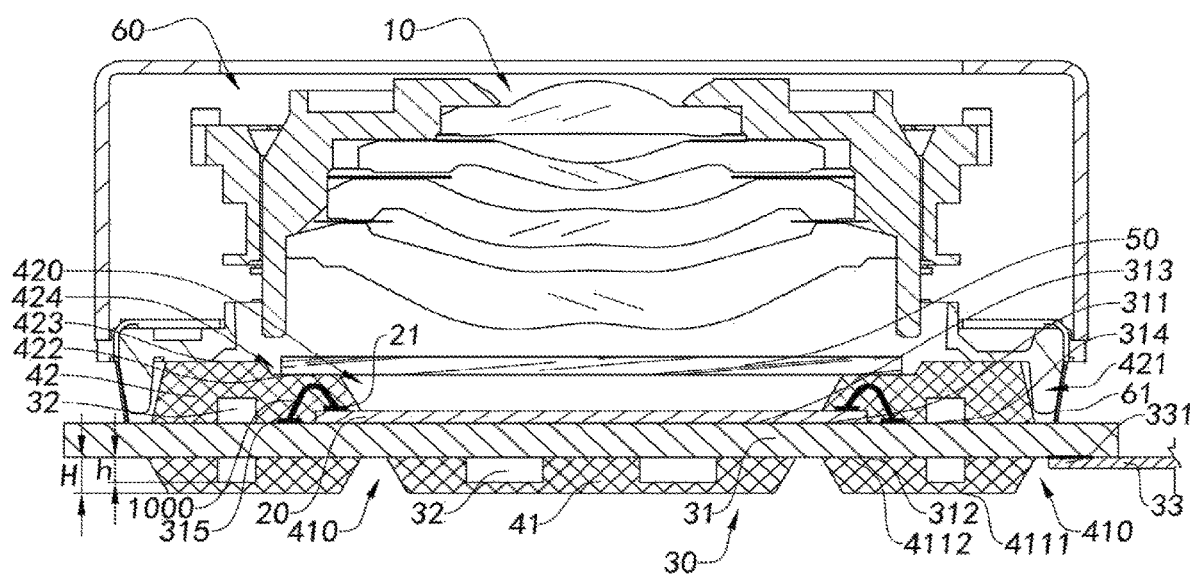
FIG. 22A is a schematic sectional view of another variant implementation of the camera module according to the above preferred embodiment of the present disclosure.

FIG. 22A shows another variant implementation of the camera module 100, wherein the back face 312 of the substrate 31 is conductively connected to at least one of the electronic components 32, for example, the electronic components 32 may be mounted to the back face 312 of the substrate 31 by, but not limited to, attaching, such that the electronic component 32 is conductively connected to the substrate 31 on the back face 312 of the substrate 31. The front face 311 of the substrate 31 may also be conductively connected to at least one of the electronic components 32. For example, the electronic component 32 may be mounted to the front face 311 of substrate 31 by, but not limited to, attaching, such that the electronic component 32 is conductively connected to the substrate 31 on the front face 311 of the substrate 31.

Figure 22B:
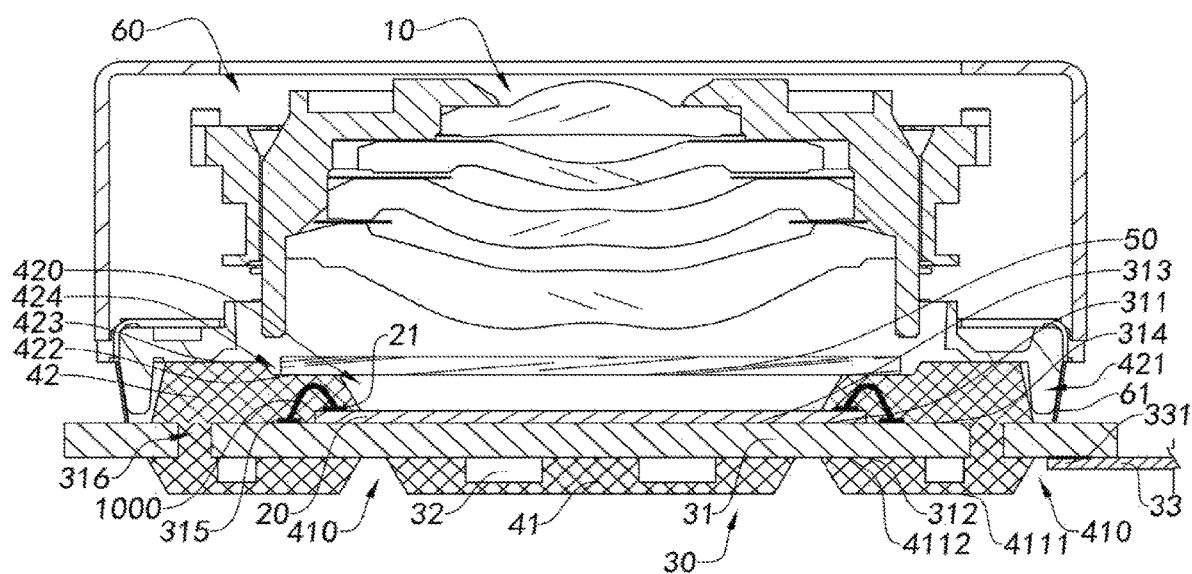
FIG. 22B is a schematic sectional view of another variant implementation of the camera module according to the above preferred embodiment of the present disclosure.

FIG. 22B shows another variant implementation of the camera module 100. The substrate 31 has at least one molding space 316, wherein the molding space 316 is disposed in the bonding area 314 of the substrate 31. A part of at least one of the back molding portion 41 and the molding base 42 is formed in the molding space 316 of the substrate 31.

Preferably, at least one of the molding spaces 316 is implemented as a through hole, that is, the front face 311 of the substrate 31 may be communicated with the back face 312 of the substrate 31 by the molding space 316, so that in the molding process, the fluid medium 400 can pass through the molding space 316 that is implemented as the through hole so as to form the molding base 42 integrally bonded to the substrate 31 on the front face 311 of the substrate 31, and to form the back molding portion 41 integrally bonded to the substrate 31 on the back face 312 of the substrate 31 simultaneously.

Figure 23:
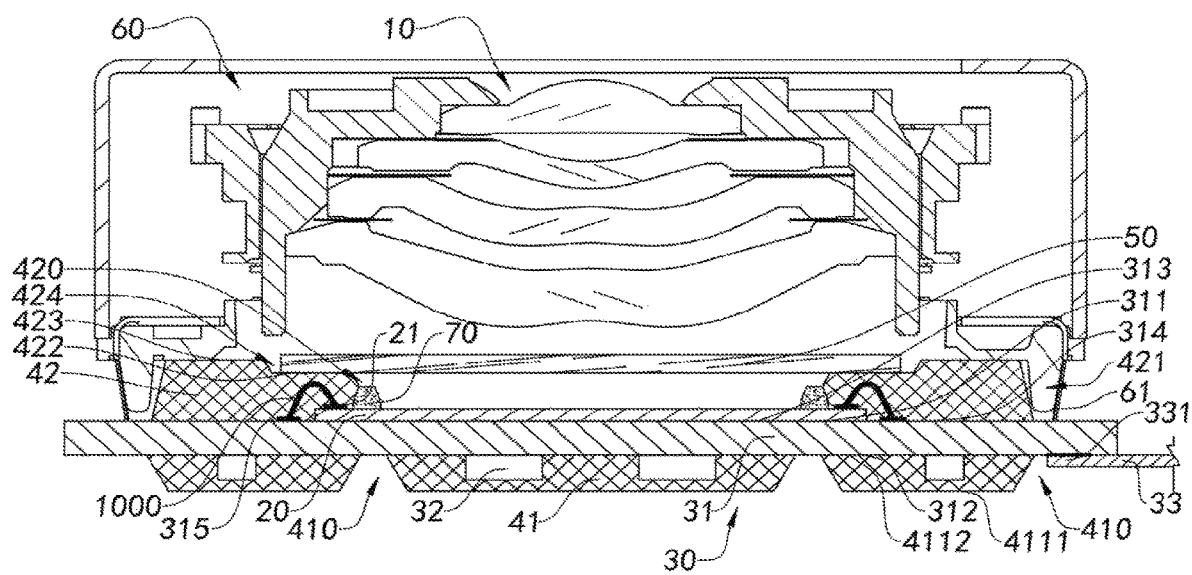
FIG. 23 is a schematic sectional view of another variant implementation of the camera module according to the above preferred embodiment of the present disclosure.

FIG. 23 shows another variant implementation of the camera module 100, wherein the circuit board assembly 2000 further comprises at least one frame-shaped supporting element 70, wherein before the molding process, the supporting element 70 is disposed in the non-photosensitive area of the photosensitive chip 20 or the supporting member 70 is formed in the non-photosensitive area of the photosensitive chip 20 to make the supporting member 70 protruding from the photosensitive chip 20, so that in the molding process, when the clamping operation is performed on the molding die 300, the second upper pressing portion 30122 of the light window molding portion 3012 of the upper die 301 of the molding die 300 is directly pressed against the supporting element 70, such that, on one hand, the supporting element 70 can absorb the impact force generated by the molding die 300 when being subject to the clamping operation so as to prevent the impact force from acting on the photosensitive chip 20, and on the other hand, the supporting element 70 can prevent a gap from being formed between the second upper pressing portion 30122 of the light window molding portion 3012 and the non-photosensitive area of the photosensitive chip 20 by means of deformation, thereby avoiding contamination of the photosensitive area of the photosensitive chip 20A by the fluid medium 400, and avoiding an undesirable phenomenon of "flash", so as to ensure the good product yield of the camera module 100. The molding base 42 embeds at least a part of the supporting element 70 after the molding process is completed.

Figure 24:
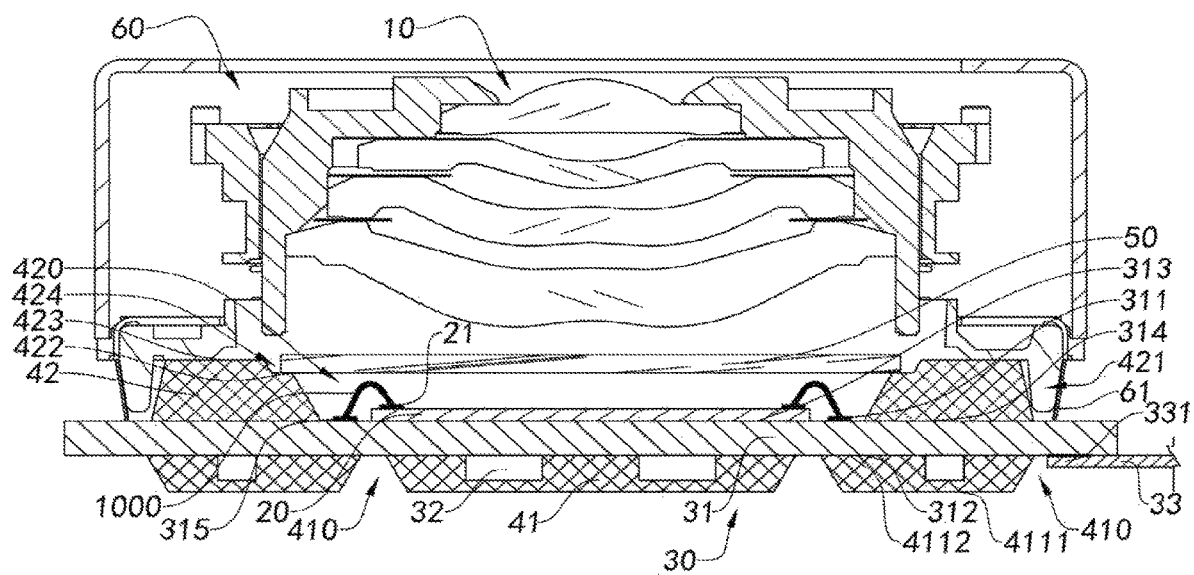
FIG. 24 is a schematic sectional view of another variant implementation of the camera module according to the above preferred embodiment of the present disclosure.

FIG. 24 shows another variant implementation of the camera module 100. The molding base 42 of the molding unit 40 may not embed the non-photosensitive area of the photosensitive chip 20. Specifically, in this specific example of the camera module 100, the molding base 42 of the molding unit 40 is integrally bonded only to at least a part of the bonding area 314 of the substrate 31, wherein the photosensitive substrate 20 may be attached to the attaching area 313 of the substrate 31 before the molding base 42 is molded, or the photosensitive chip 20 may be attached to the attaching area 313 of the substrate 31 through the light window 420 of molding base 42 after the molding base 42 is molded.

Figure 25:
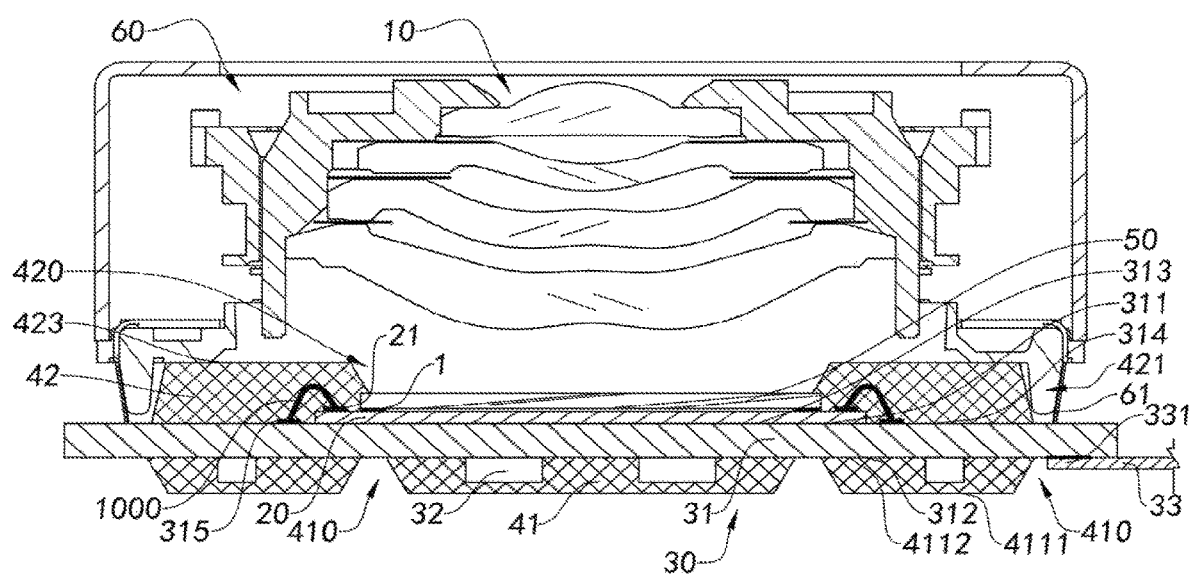
FIG. 25 is a schematic sectional view of another variant implementation of the camera module according to the above preferred embodiment of the present disclosure.

FIG. 25 shows another variant implementation of the camera module 100. Before the molding process, the filtering element 50 may be disposed on the photosensitive chip 20 in an overlapping manner, and then after the molding process is completed, the molding base 42 may embed an outer edge of the filtering element 50 such that the molding base 42, the substrate 31, the photosensitive chip 20, the filtering element 50, and the back molding portion 41 are integrally bonded. Preferably, a frame-shaped buffering portion 1 is disposed between the filtering element 50 and the photosensitive chip 20 for isolating the filtering element 50 from the photosensitive chip 20, thereby avoiding a direct contact between the filtering element 50 and the photosensitive chip 20. For example, at least a part of the non-photosensitive area of the photosensitive chip 20 may be applied with, but not limited to a substance such as resin or glue, and then the filtering element 50 may be disposed on the photosensitive chip 20 in an overlapping manner, and the substance such as resin or glue applied on the at least a part of the non-photosensitive area of the photosensitive chip 20 will form the buffering portion 1 held between the filtering element 50 and the photosensitive chip 20. It can be understood that it is also possible to form the buffering portion 1 on the filtering element 50 first and then dispose the filtering element 50 on the photosensitive chip 20 in an overlapping manner. Preferably, the buffering portion 1 is elastic.

Figure 26:
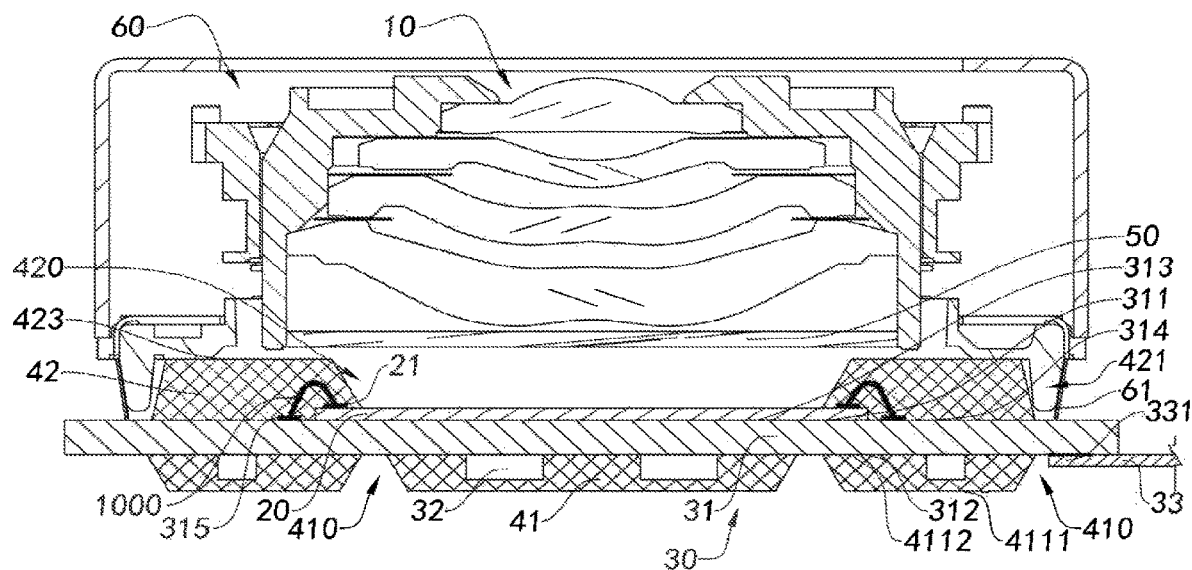
FIG. 26 is a schematic sectional view of another variant implementation of the camera module according to the above preferred embodiment of the present disclosure.

FIG. 26 shows another variant implementation of the camera module 100, wherein the filtering element 50 is attached to the optical lens 10 such that the filtering element 50 is held between the optical lens 10 and the photosensitive chip 20.

Figure 27:
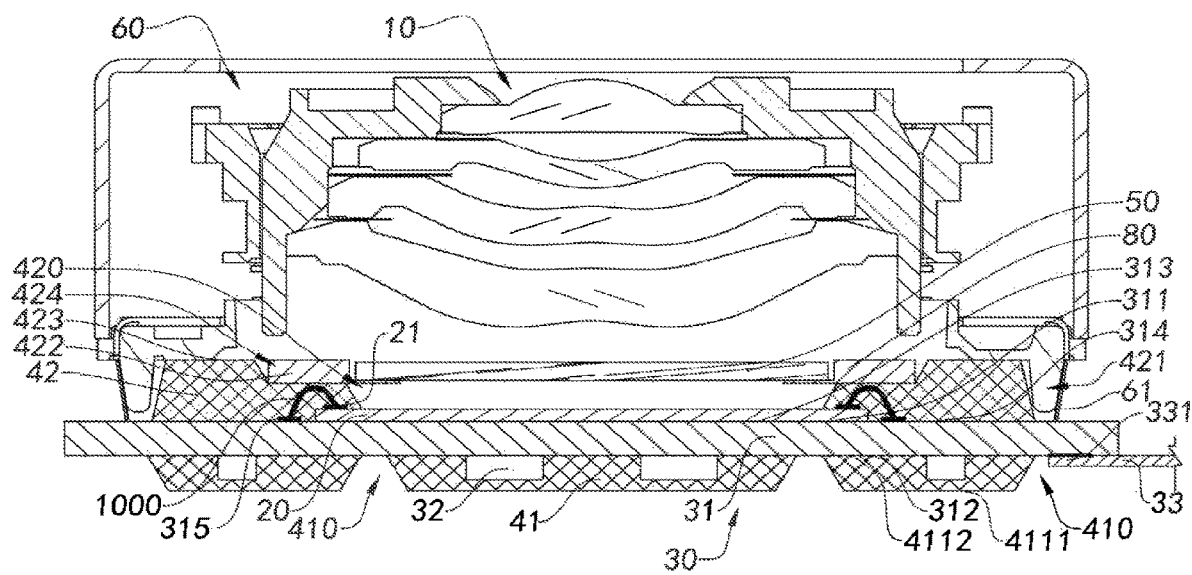
FIG. 27 is a schematic sectional view of another variant implementation of the camera module according to the above preferred embodiment of the present disclosure.

FIG. 27 shows another variant implementation of the camera module 100. The camera module 100 further comprises at least one frame-shaped bracket 80, wherein the filtering element 50 can be first attached to the bracket 80, and then the bracket 80 is attached to the top surface of the molding base 42, for example, the bracket 80 can be attached to the inner surface 422 of the molding base 42 so that the holder 80 is accommodated in the attaching groove 424 such that the filtering element 50 is held between the optical lens 10 and the photosensitive chip 20. Through the above-mentioned method, the size of the filtering element 50 can be reduced, thereby reducing the manufacturing cost of the camera module 100.

Figure 28:
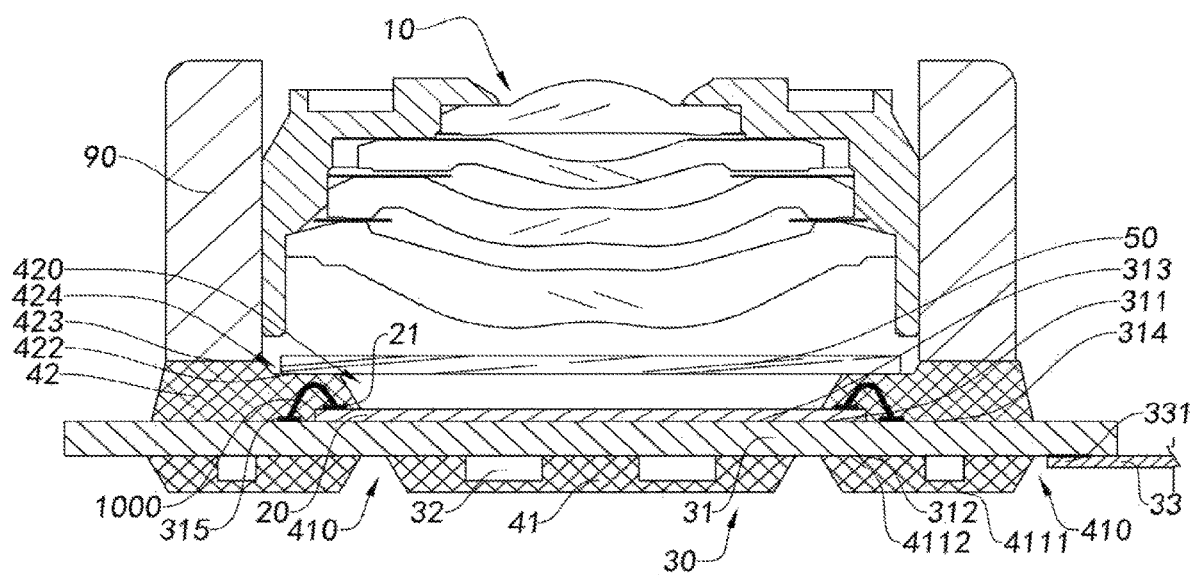
FIG. 28 is a schematic sectional view of another variant implementation of the camera module according to the above preferred embodiment of the present disclosure.

FIG. 28 shows another variant implementation of the camera module 100. The camera module 100 further comprises at least one lens tube 90, wherein the optical lens 10 is assembled into the lens tube 90, the lens tube 90 can be attached to the molding base 42 such that the optical lens 10 is held in the photosensitive path of the photosensitive chip 20. That is, the camera module 100 can be a fixed focus camera module.

Figure 29:
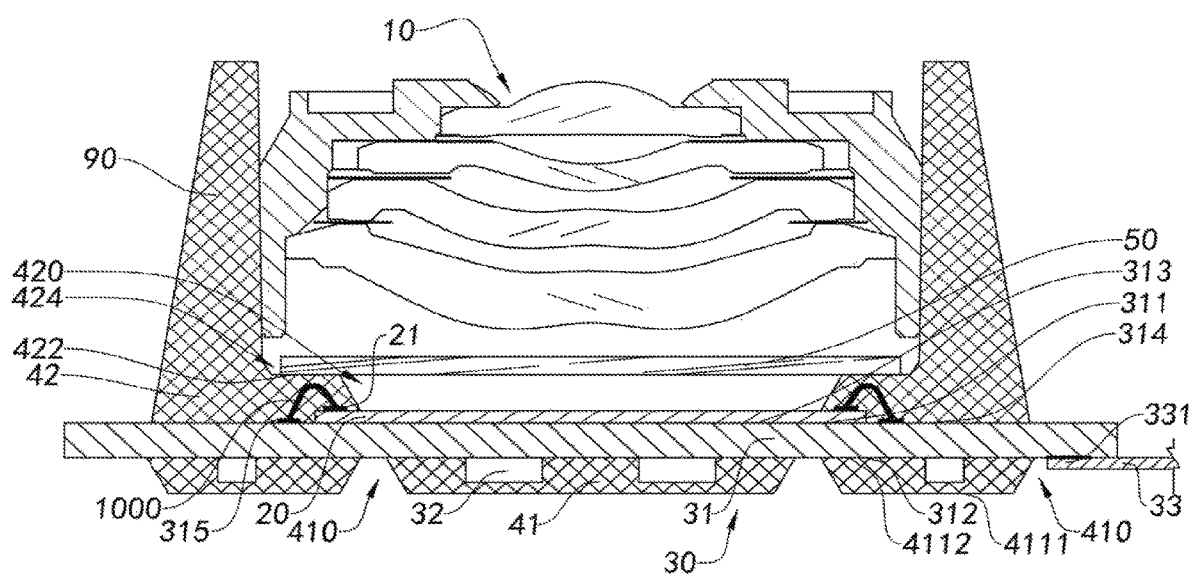
FIG. 29 is a schematic sectional view of another variant implementation of the camera module according to the above preferred embodiment of the present disclosure.

In another variant implementation of the camera module 100 shown in FIG. 29, the lens tube 90 may also integrally extend over the molding base 42, that is, the molding base 42 and the lens tube 90 can be formed integrally by a molding process.

Figure 30:
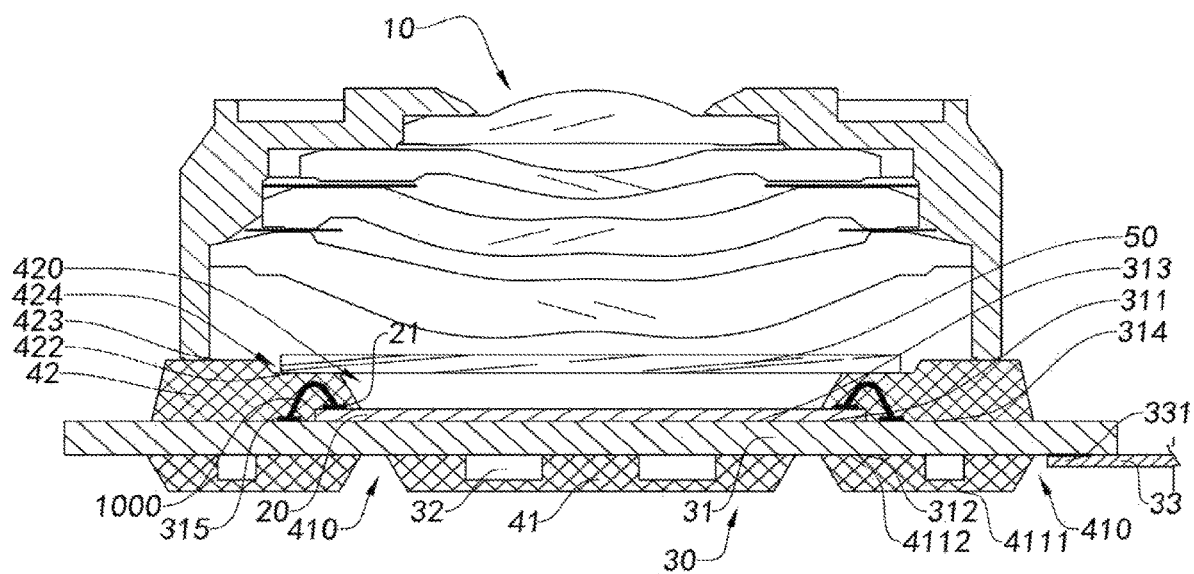
FIG. 30 is a schematic sectional view of another variant implementation of the camera module according to the above preferred embodiment of the present disclosure.

In another variant implementation of the camera module 100 shown in FIG. 30, the optical lens 10 can also be directly attached to the top surface of the molding base 42 such that the optical lens 10 is held in the photosensitive path of the photosensitive chip 20.

Figure 31:
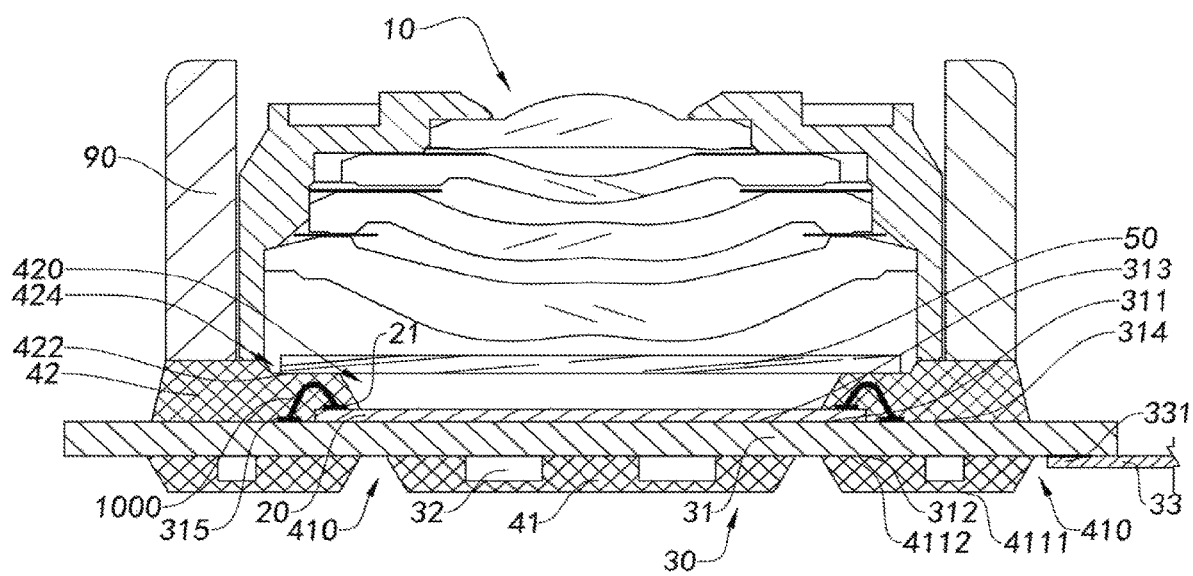
FIG. 31 is a schematic sectional view of another variant implementation of the camera module according to the above preferred embodiment of the present disclosure.

In another variant implementation of the camera module 100 shown in FIG. 31, after the optical lens 10 is directly attached to the top surface of the molding base 42, the top surface of the molding base 42 may also be attached with the lens tube 90 such that the lens tube 90 surrounds the outside of the optical lens 10, thereby protecting, by means of the lens tube 90, the optical lens 10 from collision so as to further ensure the reliability of the camera module 100.

Figure 32:
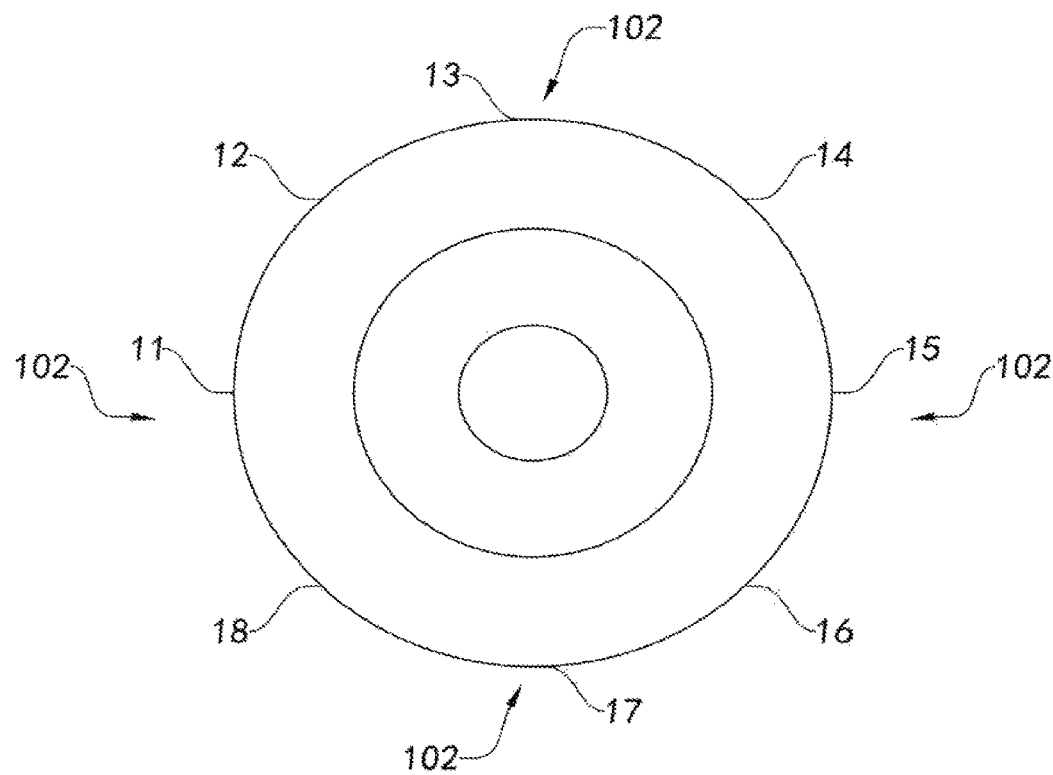
FIG. 32 is a schematic top view of an implementation of an optical lens of the camera module according to the above preferred embodiment of the present disclosure.

FIG. 32 shows a top view of an implementation of the optical lens 10 of the camera module 100, wherein the optical lens 10 has a circular shape in top view. Specifically, the optical lens 10 has a first lens side face 11, a second lens side face 12, a third lens side face 13, a fourth lens side face 14, a fifth lens side face 15, a sixth lens side face 16, a seventh lens side face 17 and an eighth lens side face 18, wherein in the example of the optical lens 10 shown in FIG. 32, the first lens side face 11, the second lens side face 12, the third lens side face 13, the fourth lens side face 14, the fifth lens side face 15, the sixth lens side face 16, the seventh lens side face 17, and the eighth lens side face 18 are curved faces respectively, and are connected end to end so as to form a circle. Moreover, the optical lens 10 forms a curved side 102 at positions corresponding to the first lens side face 11 and the second lens side face 12, the third lens side face 13 and the fourth lens side face 14, the fifth lens side face 15 and the sixth lens side face 16, and the seventh lens side face 17 and the eighth lens side face 18, respectively. That is, the optical lens 10 has four curved sides 102.

Figure 33:
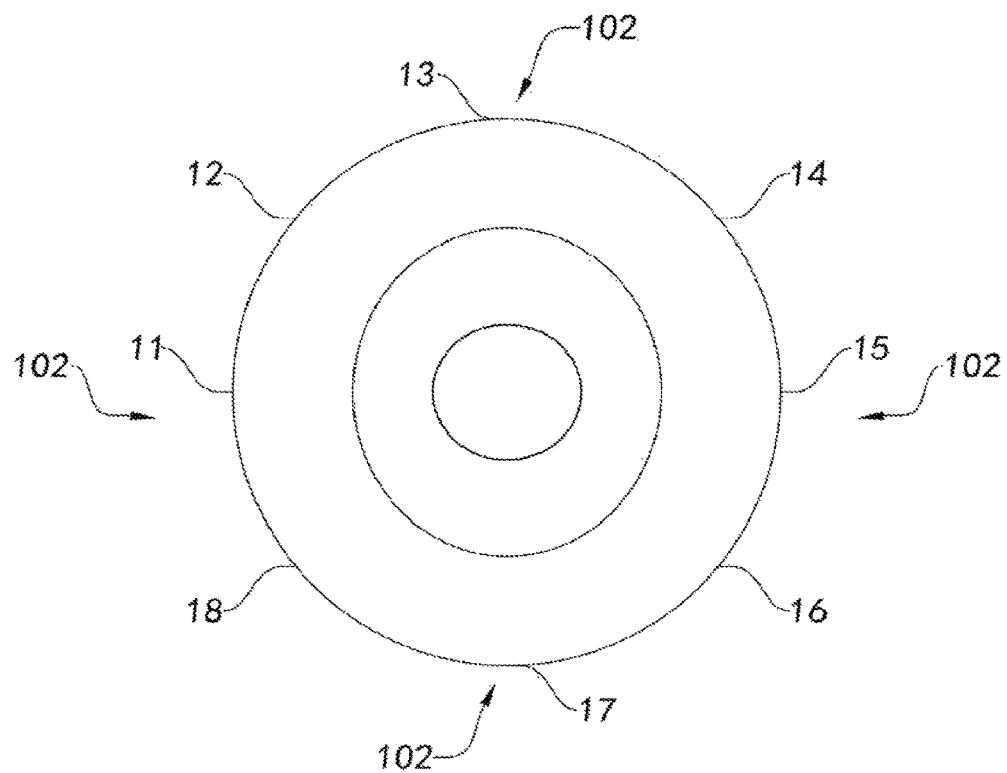
FIG. 33 is a schematic top view of a variant implementation of the optical lens of the camera module according to the above preferred embodiment of the present disclosure.

FIG. 33 shows a top view of a variant implementation of the optical lens 10 of the camera module 100, wherein the first lens side face 11, the second lens side face 12, the third lens side face 13, the fourth lens side face 14, the fifth lens side face 15, the sixth lens side face 16, the seventh lens side face 17, and the eighth lens side face 18 are curved faces, respectively, and are connected end to end so as to form an oval. Moreover, the optical lens 10 forms a curved side 102 at positions corresponding to the first lens side face 11 and the second lens side face 12, the third lens side face 13 and the fourth lens side face 14, the fifth lens side face 15 and the sixth lens side face 16, and the seventh lens side face 17 and the eighth lens side face 18, respectively. That is, the optical lens 10 has four curved sides 102.

Figure 34:
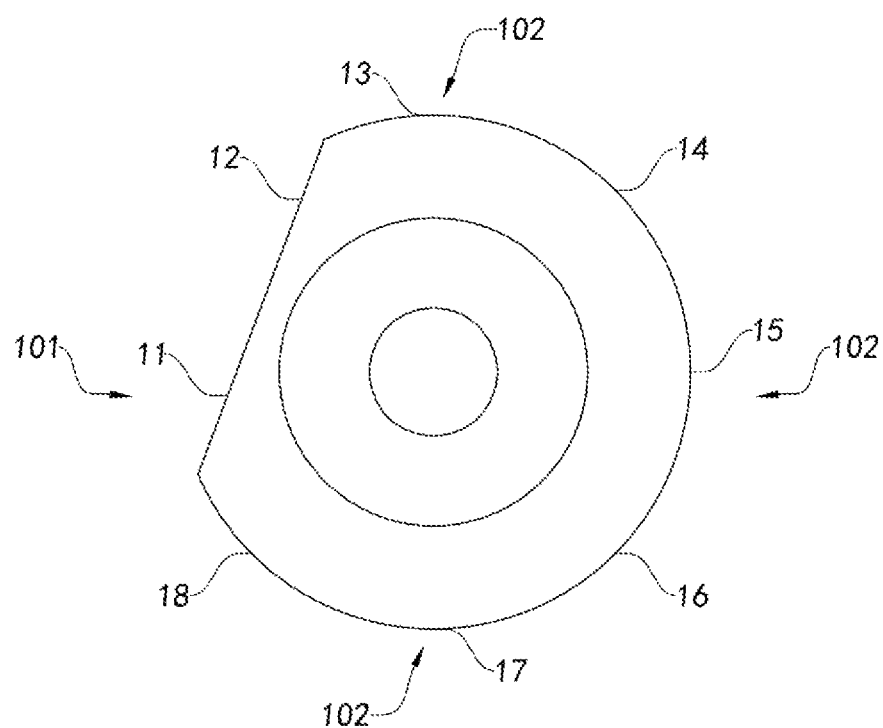
FIG. 34 is a schematic top view of another variant implementation of the optical lens of the camera module according to the above preferred embodiment of the present disclosure.

FIG. 34 shows a top view of a variant implementation of the optical lens 10 of the camera module 100, wherein the first lens side face 11 and the second lens side face 12 are planes, respectively, and the plane where the first lens side face 11 is located and the plane where the second lens side face 12 is located are the same plane, so that the optical lens 10 forms a planar side 101 at a position corresponding to the first lens side face 11 and the second lens side face 12, wherein the third lens side face 13, the fourth lens side face 14, the fifth lens side face 15, the sixth lens side face 16, the seventh lens side face 17, and the eighth lens side face 18 are curved surfaces, respectively, so that the optical lens 10 forms the curved side 102 at a position corresponding to the third lens side face 13, the fourth lens side face 14, the fifth lens side face 15, the sixth lens side face 16, the seventh lens side face 17 and the eighth lens side face 18. That is, the optical lens 10 has one planar side 101 and three curved sides 102.

Figure 35:
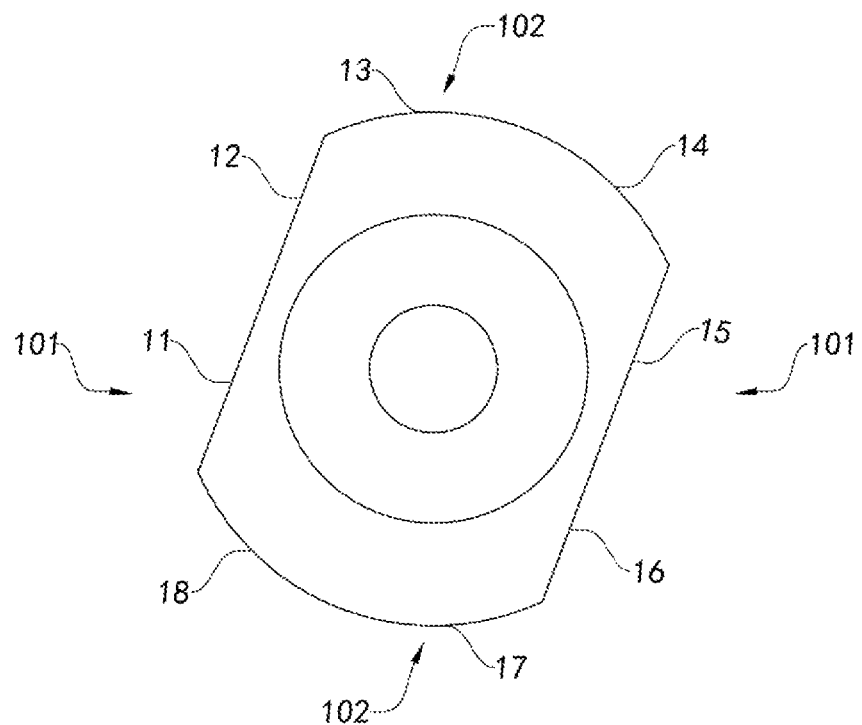
FIG. 35 is a schematic top view of another variant implementation of the optical lens of the camera module according to the above preferred embodiment of the present disclosure.

FIG. 35 shows a top view of another variant implementation of the optical lens 10 of the camera module 100, wherein the first lens side face 11 and the second lens side face 12 are planes, respectively, and the plane where the first lens side face 11 is located and the plane where the second lens side face 12 is located are the same plane, so that the optical lens 10 forms the planar side 101 at a position corresponding to the first lens side face 11 and the second lens side face 12, wherein the fifth lens side face 15 and the sixth lens side face 16 are planes, respectively, and the plane where the fifth lens side face 15 is located and the plane where the sixth lens side face 16 is located are the same plane, so that the optical lens 10 forms the planar side 101 at a position corresponding to the fifth lens side face 15 and the sixth lens side face 16, wherein the third lens side face 13 and the fourth lens side face 14 as well as the seventh lens side face 17 and the eighth lens side face 18 are curved faces respectively, so that the optical lens 10 forms the curved side 102 at a position corresponding to the third lens side face 13 and the fourth lens side face 14 and forms the curved side 102 at a position corresponding to the seventh lens side face 17 and the eighth lens side face 18. That is, the optical lens 10 has two planar sides 101 and two curved sides 102, and the two planar sides 101 of the optical lens 10 are symmetrical to each other, and the two curved sides 102 are symmetrical to each other.

Figure 36:
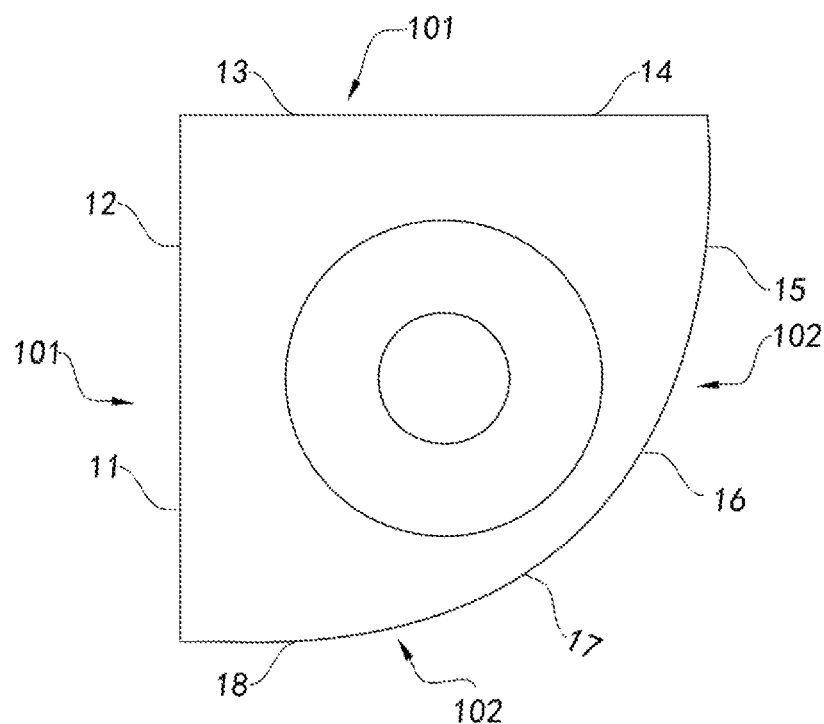
FIG. 36 is a schematic top view of another variant implementation of the optical lens of the camera module according to the above preferred embodiment of the present disclosure.

FIG. 36 shows a top view of another variant implementation of the optical lens 10 of the camera module 100, wherein the first lens side face 11, the second lens side 12, the third lens side face 13 and the fourth lens side face 14 are planes, respectively, and the plane where the first lens side face 11 is located and the plane where the second lens side face 12 is located are the same plane, and the plane where the third lens side face 13 is located and the plane where the fourth lens side face 14 is located are the same plane such that the optical lens 10 forms the planar side 101 at positions corresponding to the first lens side face 11 and the second lens side face 12 as well as the third lens side face 13 and the fourth lens side face 14, respectively, and the second lens side face 12 and the third lens side face 13 are perpendicular to each other, wherein the fifth lens side face 15 and the sixth lens side face 16 as well as the seventh lens side face 17 and the eighth lens side face 18 are curved surfaces, respectively, such that the optical lens 10 forms the curved surface 102 at a position corresponding to the fifth lens side face 15 and the sixth lens side face 16 and forms the curved side 102 at a position corresponding to the seventh lens side face 17 and the eighth lens side face 18. That is, the optical lens 10 has two planar sides 101 and two curved sides 102, and the two planar sides 101 are adjacent, and the two curved sides 102 are adjacent.

Figure 37:
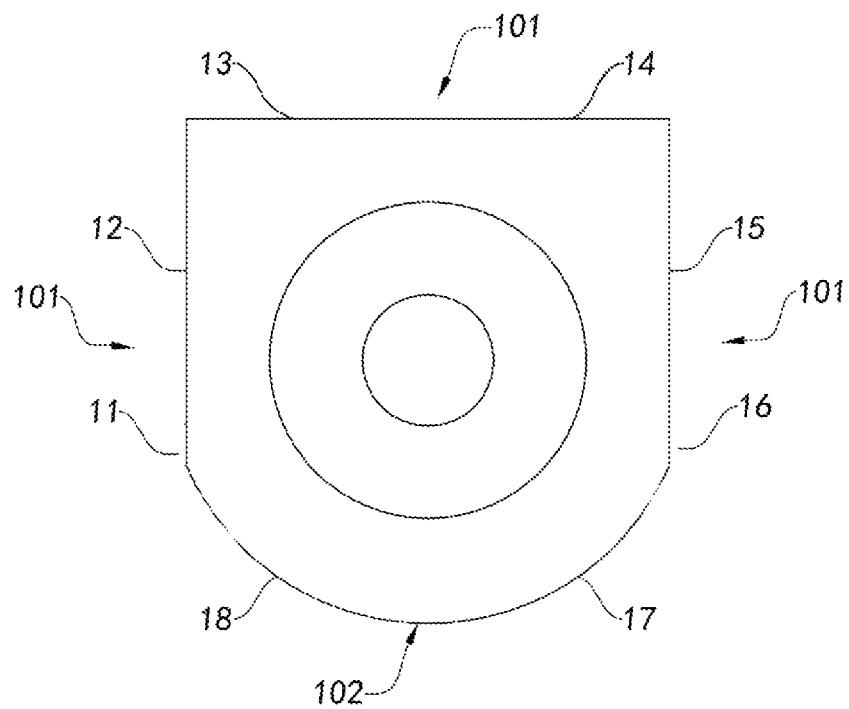
FIG. 37 is a schematic top view of another variant implementation of the optical lens of the camera module according to the above preferred embodiment of the present disclosure.

FIG. 37 shows a top view of another variant implementation of the optical lens 10 of the camera module 100, wherein the first lens side face 11, the second lens side face 12, the third lens side face 13, the fourth lens side face 14, the fifth lens side face 15, and the sixth lens side face 16 are planes respectively, and the plane where the first lens side face 11 is located and the plane where the second lens side face 12 is located are the same plane, the plane where the third lens side face 13 is located and the plane where the fourth lens side face 14 is located are the same plane, and the plane where the fifth lens side face 15 is located and the plane where the sixth lens side face 16 is located are the same plane, wherein the second lens side face 12 is perpendicular to the third lens side face 13, and the fourth lens side face 14 is perpendicular to the fifth lens side face 15, so that the optical lens 10 forms the planar side 101 at a position corresponding to the first lens side face 11 and the second lens side face 12, at a position corresponding to the third lens side face 13 and the fourth lens side face 14 and at a position corresponding to the fifth lens side face 15 and the sixth lens side face 16 respectively, wherein the seventh lens side face 17 and the eighth lens side face 18 are curved faces respectively, so that the optical lens 10 forms the curved side 102 at a position corresponding to the seventh lens side face 17 and the eighth lens side face 18. That is, the optical lens 10 has three planar sides 101 and one curved side 102.

Figure 38:
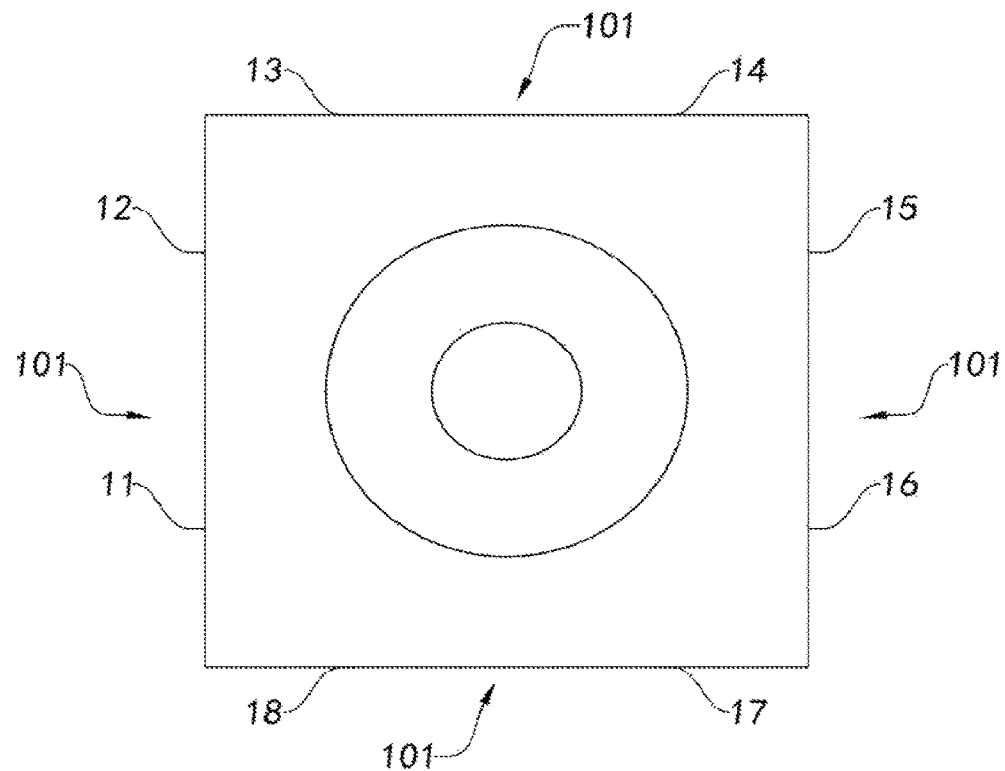
FIG. 38 is a schematic top view of another variant implementation of the optical lens of the camera module according to the above preferred embodiment of the present disclosure.

FIG. 38 shows a top view of another variant implementation of the optical lens 10 of the camera module 100, wherein the first lens side face 11, the second lens side face 12, the third lens side face 13, the fourth lens side face 14, the fifth lens side face 15, the sixth lens side face 16, the seventh lens side face 17, and the eighth lens side face 18 are planes respectively, and the plane where the first lens side face 11 is located and the plane where the second lens side face 12 is located are the same plane, the plane where the third lens side face 13 is located and the plane where the fourth lens side face 14 is located are the same plane, the plane where the fifth lens side face 15 is located and the plane where the sixth lens side face 16 is located are the same plane, and the plane where the seventh lens side face 17 is located and the plane where the eighth lens side face 18 is located are the same plane, wherein the second lens side face 12 is perpendicular to the third lens side face 13, the fourth lens side face 14 is perpendicular to the fifth lens side face 15, the sixth lens side face 16 is perpendicular to the seventh lens side face 17, and the eighth lens side face 18 is perpendicular to the first lens side face 11, so that the optical lens 10 forms the planar side 101 at a position corresponding to the first lens side face 11 and the second lens side face 12, at a position corresponding to the third lens side face 13 and the fourth lens side face 14, at a position corresponding to the fifth lens side face 15 and the sixth lens side face 16, and at a position corresponding to the seventh lens side face 17 and the eighth lens side face 18 respectively. That is, the optical lens 10 has four planar sides 101.

Figure 39:
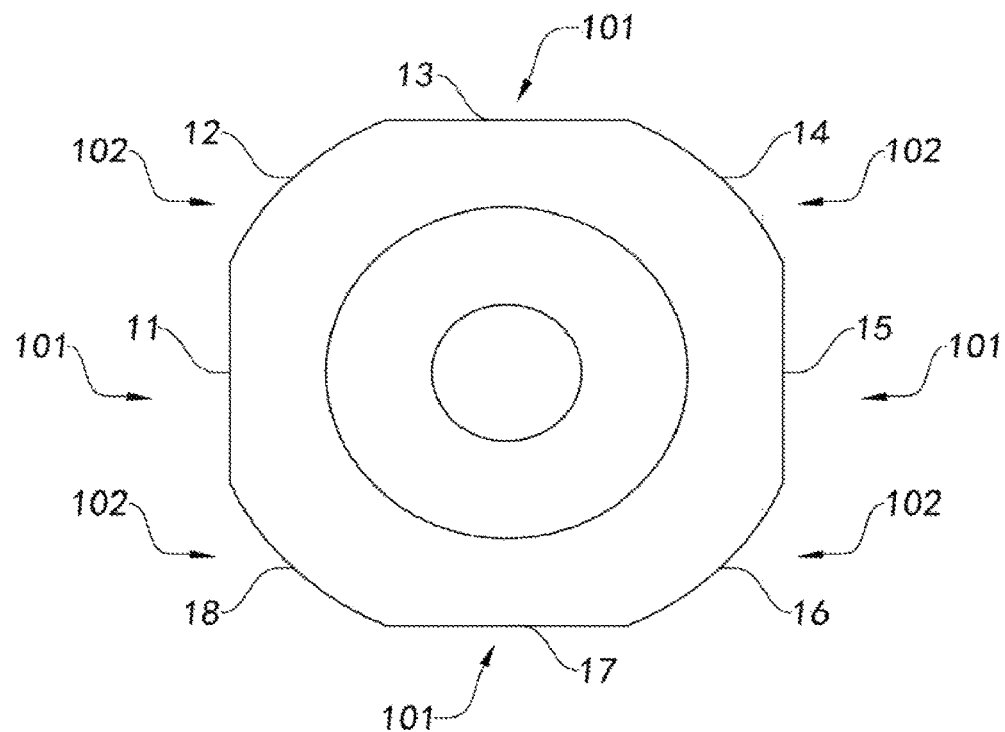
FIG. 39 is a schematic top view of another variant implementation of the optical lens of the camera module according to the above preferred embodiment of the present disclosure.

FIG. 39 shows a top view of another variant implementation of the optical lens 10 of the camera module 100, wherein the first lens side face 11, the third lens side face 13, the fifth lens side face 15, and the seventh lens side face 17 are planes respectively, so that the optical lens 10 forms the planar side 101 at a position corresponding to the first lens side face 11, the third lens side face 13, the fifth lens side face 15 and the seventh lens side face 17 respectively, wherein the first lens side face 11 and the fifth lens side face 15 are symmetrical with each other, and the third lens side face 13 and the seventh lens side face 17 are symmetrical with each other, wherein the second lens side face 12, the fourth lens side face 14, the sixth lens side face 16, and the eighth lens side face 18 are curved faces respectively, so that the optical lens 10 forms the curved side 102 at positions corresponding to the second lens side face 12, the fourth lens side face 14, the sixth lens side face 16, and the eighth lens side face 18 respectively, wherein the second lens side face 12 and the sixth lens side face 16 are symmetrical with each other, and the fourth lens side face 14 and the eighth lens side face 18 are symmetrical with each other. That is, the optical lens 10 has four planar sides 101 and four curved sides 102, and each of the planar sides 101 and each of the curved sides 102 are spaced apart from each other. In other words, there is one of the curved sides 102 between the adjacent planar sides 101 and one of the planar sides 101 between the adjacent curved sides 102.

With reference to FIG. 40 to FIG. 55 of the accompanying drawings of the present disclosure, a camera module 100A and an application of the camera module 100A according to a preferred embodiment of the present disclosure is set forth in the following description, wherein at least one of the camera modules 100A can be mounted on a device body 200A so that the camera module 100A and the device body 200A can form an electronic device, with reference to FIG. 55.

In other words, the electronic device comprises the device body 200A and at least one of the camera modules 100A disposed in the device body 200A, wherein the camera module 100A can be configured to acquire images (e.g. videos or images).

Figure 55:
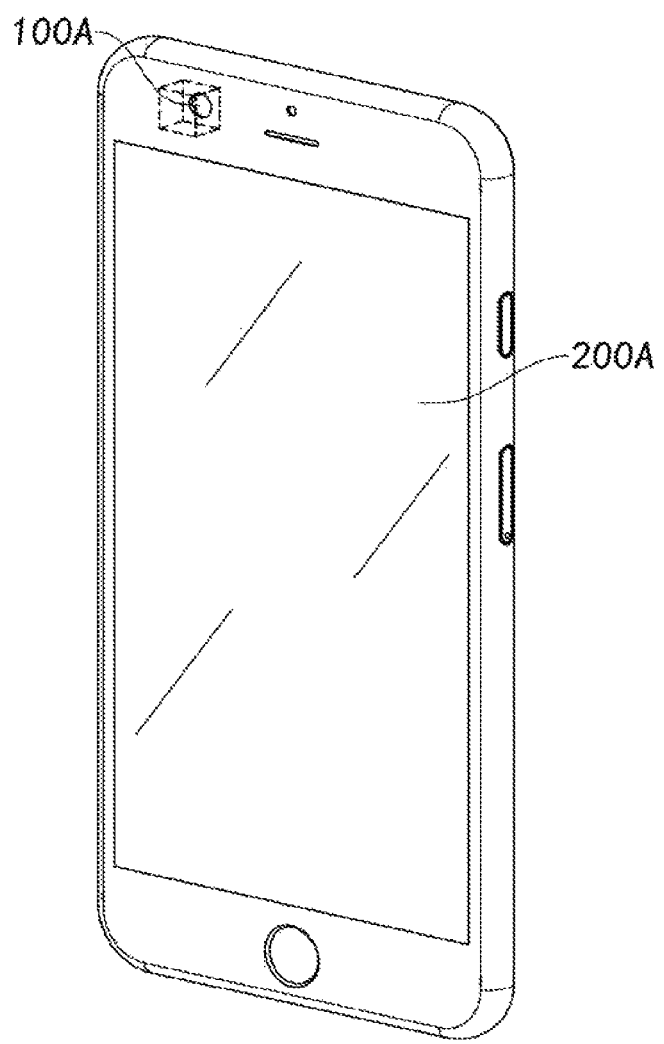
FIG. 55 is a stereoscopic schematic diagram of an application state of the camera module according to the above preferred embodiment of the present disclosure.

It is worth mentioning that, although in the example of the electronic device shown in FIG. 55, the camera module 100A is disposed on the back side of the device body 200A (the side opposite to a display screen of the device body 200A), it can be understood that the camera module 100 can also be disposed on the front side of the device body 200A (the side where the display screen of the device body 200 is located), or at least one of the camera modules 100A is disposed on the back side of the device body 200A and at least one of the camera modules 100A is disposed on the back side of the device body 200A, that is, at least one of the camera modules 100A is provided on the back side and the front side of the device body 200A. Nonetheless, it can be understood by those skilled in the art that in other examples of the electronic device, it is also possible to have one or more of the camera modules 100A disposed on the side face of the device body 200A.

In addition, although the device body 200A of the electronic device illustrated in FIG. 55 is a smart phone, in other examples, the device body 200A may also be implemented as, but not limited to, a tablet, an electronic book, an MP3/4/5, a personal digital assistant, a camera, a television, a washing machine, a refrigerator, and any electronic product that can be configured with the camera module 100A.

Figure 53:
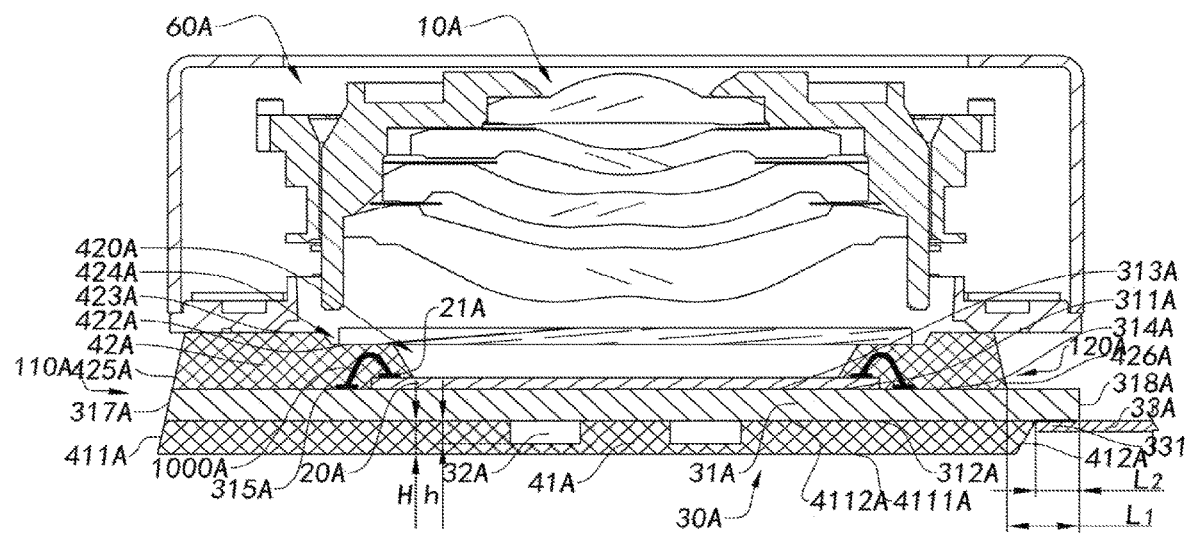
FIG. 53 is a schematic diagram of an internal structure of the camera module taken along an intermediate position according to the above preferred embodiment of the present disclosure.
Figure 54A:
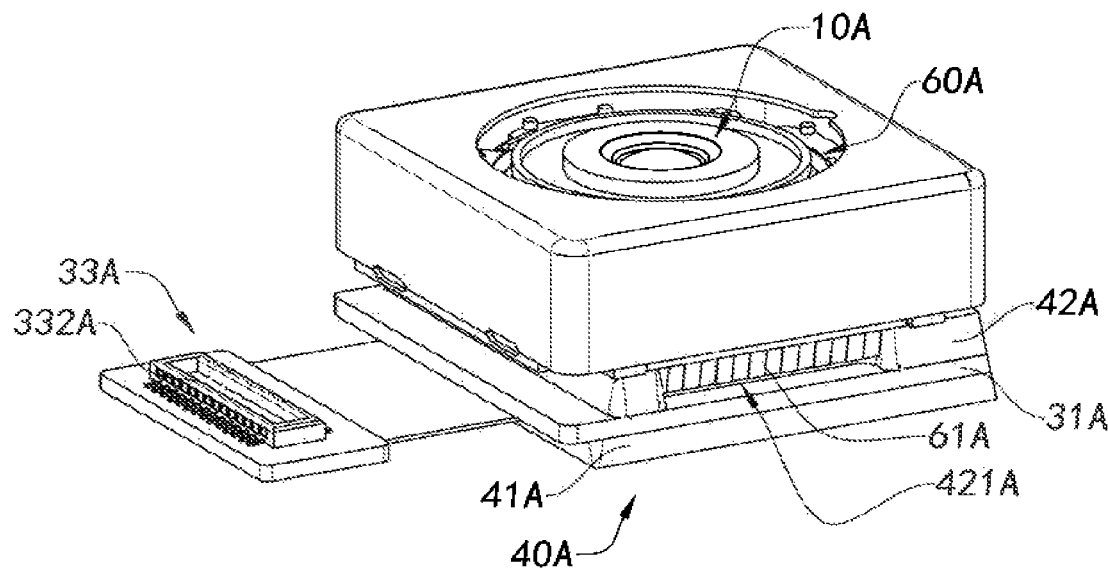
FIG. 54A is a stereoscopic schematic diagram of a angle of view of the camera module according to the above preferred embodiment of the present disclosure.
Figure 54B:
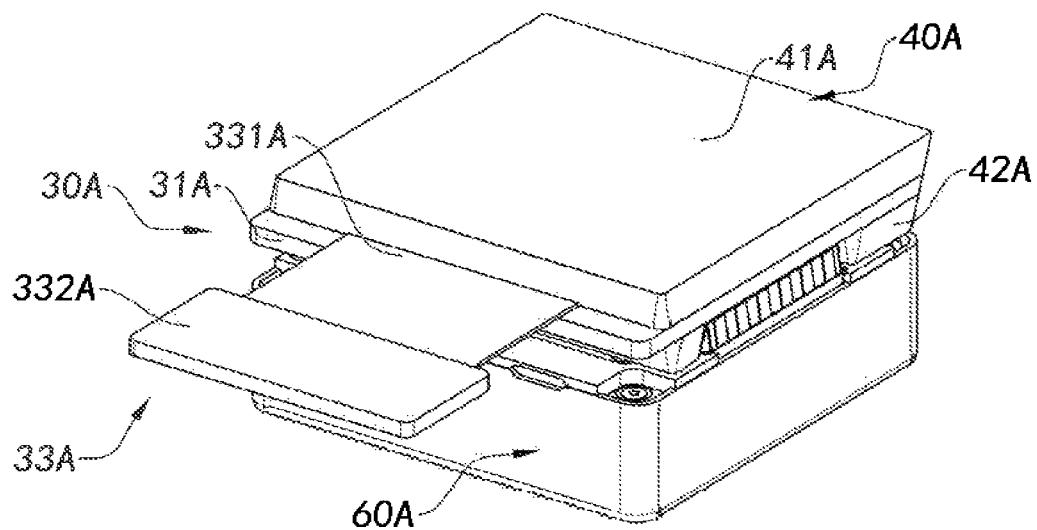
FIG. 54B is a stereoscopic schematic diagram of another angle of view of the camera module according to the above preferred embodiment of the present disclosure.

FIG. 53 is a schematic diagram showing the internal structure of the camera module 100A taken along the intermediate position, and FIG. 54A and FIG. 54B respectively show the stereoscopic state of the camera module 100A from different perspectives. Specifically, the camera module 100A comprises at least one optical lens 10A, at least one photosensitive chip 20A, and a circuit board 30A, wherein the photosensitive chip 20A is conductively connected to the circuit board 30A, the optical lens 10A is held in the photosensitive path of the photosensitive chip 20A.

The light reflected by the object enters the interior of the camera module 100A from the optical lens 10A, and then is received by the photosensitive chip 20A and imaged after photoelectric conversion. Electrical signals related to the image of an object obtained by the photoelectric conversion of the photosensitive chip 20A can be transmitted by the circuit board 30A, for example, the circuit board 30A can transmit the electrical signals related to the image of the object to the device body 200A that is connected to the circuit board 30. That is, the circuit board 30A can be conductively connected to the device body 200A to mount the camera module 100A to the device body 200A to form the electronic device.

Further, with reference to FIG. 53, the circuit board 30A comprises a substrate 31A and at least one electronic component 32A, wherein each of the electronic components 32A is conductively connected to the substrate 31A, respectively.

Specifically, the substrate 31A has a front face 311A and a back face 312A. Generally, the substrate 31A is plate-like, and the front face 311A and the back face 312A of the substrate 31A are parallel to each other, so that the distance between the front face 311A and the back face 312A of the substrate 31A can be used to define the thickness of the substrate 31A.

Nonetheless, it can be understood by those skilled in the art that in other examples of the camera module 100A of the present disclosure, at least one of the front face 311A and the back face 312A of the substrate 31A may be provided with a convex structure or a groove, and the camera module 100A of the present disclosure is not limited in this respect.

It is worth mentioning that the type of the substrate 31A is also not limited in the camera module 100A of the present disclosure. For example, the substrate 31A may be selected but not limited to a hard plate, a soft plate, a soft and hard plate, a ceramic plate, etc.

In the camera module 100A of the present disclosure, at least one of the electronic components 32A is conductively connected to the substrate 31A on the back face 312A of the substrate 31A. Preferably, all of the electronic components 32A may be conductively connected to the substrate 31A on the back face 312A of the substrate 31A. In this way, the front face 311A of the substrate 31A2 may not need to reserve a position for conductively connecting the electronic component 32A, thereby facilitating reducing the length and width of the camera module 100A.

It is worth mentioning that the type of the electronic component 32A is not limited in the camera module 100A of the present disclosure. For example, the electronic component 32A may be implemented as, but not limited to, a processor, a relay, a memory, a driver, an inductor, a resistor, a capacitor, etc.

Further, in a specific example of the camera module 100A of the present disclosure, the electronic component 32A can be attached to the back face 312A of the substrate 31A, so that the electronic component 32A is conductively connected to the substrate 31A on the back face 312A of the substrate 31A.

In another specific example of the camera module 100A of the present disclosure, the electronic component 32A may also be half-embedded in the substrate 31A on the back face 312A of the substrate 31A, so that the electronic component 32A is conductively connected to the substrate 31A, that is, a part of the electronic component 32A is exposed on the back face 312A of the substrate 31A. In this way, the height of camera module 100A can be further reduced. Alternatively, the electronic component 32A may also be entirely embedded inside the substrate 31A.

In addition, the circuit board 30A may further comprise a connection plate 33A, wherein the connection plate 33A has a module connection side 331A and a device connection side 332A, and the module connection side 331A of the connection plate 33A is connected to the substrate 31A. For example, the module connection side 331A of the connection plate 33A may be connected to the front face 311A of the substrate 31A, or the module connection side 331A of the connection plate 33A may be connected to the back face 312A of the substrate 31A. The connection manner between the module connection side 331A of the connection plate 33A and the substrate 31A is not limited. For example, the module connection side 331A of the connection plate 33A and the substrate 31A may be connected by, but are not limited to, conductive glue.

Nonetheless, it can be understood by those skilled in the art that the module connection side 331A of the substrate 31A is connected to the side face of the substrate 31A, or it is possible that the module connection side 331A of the substrate 31A and the substrate 31A are integrally formed. The device connection side 332A of the connection plate 33A can be connected to the device body 200A, for example, the device connection side 332A of the connection plate 33A can be provided or formed with a connector for being connected to the device body 200A.

Generally, the connection plate 33A can be deformed, so that the connection plate 33A can buffer, in a manner of deformation, the displacement of the camera module 100A caused by the vibration of the electronic device during usage, thereby ensuring the reliability of the electronic device when it is used.

The photosensitive chip 20A is attached to the front face 311A of the substrate 31A, and the photosensitive chip 20A is conductively connected to the substrate 31A. It can be understood by those skilled in the art that the photosensitive chip 20A attached to the front face 311A of the substrate 31A and the electronic component 32A on the back face 312A of the substrate 31A are respectively located on both sides of the substrate 31A, so that it is possible to prevent contaminants falling off from the surface of the electronic component 32A or contaminants falling off from an attaching position between the electronic component 32A and the substrate 31A from contaminating the photosensitive area of the photosensitive chip 20A, thereby ensuring the imaging quality of the camera module 100A.

Specifically, the substrate 31A has at least one attaching area 313A and at least one bonding area 314A, wherein the attaching area 313A and the bonding area 314A are both formed on the front face 311A of the substrate 31A. Generally, the attaching area 313A of the substrate 31A is located in the middle, and the bonding area 314A surrounds the attaching area 313A. For example, in this specific example of the camera module 100A shown in FIG. 53, the attaching area 313A of the substrate 31A is located at a middle of the front face 311A of the substrate 31A, and the bonding area 314A of the substrate 31A is located at outer part of the front face 311A of the substrate 31A, and the bonding area 314A surrounds the attaching area 313A. The photosensitive chip 20A is attached to the attaching area 313A of the substrate 31A.

It can be understood by those skilled in the art that, in contrast to the traditional arrangement of electronic components along the periphery of a photosensitive chip, in the camera module 100A of the present disclosure, the attaching area 313A of the substrate 31A and the electronic components 32A may correspond to each other in the height direction, that is, the attaching area 313A of the substrate 31A may cover at least a part of at least one of the electronic components 32A when viewed from a top view, in such a manner that the bonding area 314A of the substrate 31A does not need to be reserved as an attaching position for attaching the electronic component 32A, so that the area of the bonding area 314A of the substrate 31A can be further reduced, that is, the attaching area 313A of the substrate 31A can occupy a larger proportion of the front face 311A of the substrate 31A. In this manner, the length and width of the camera module 100A can be further reduced.

In addition, the manner in which the photosensitive chip 20A and the substrate 31A are connected is not limited in the camera module 100A of the present disclosure. For example, the photosensitive chip 20A has at least one chip connector 21A, and the substrate 31A has at least one substrate connector 315A. In one example of the camera module 100A of the present disclosure, the chip connector 21A of the photosensitive chip 20A may be directly connected to the substrate connector 315A of the substrate 31A, for example, when the photosensitive chip 20A is attached to the attaching area 313A of the substrate 31A, the chip connector 21A of the photosensitive chip 20A and the substrate connector 315A of the substrate 31A are directly connected. In another example of the camera module 100A of the present disclosure, the chip connector 21A of the photosensitive chip 20A and the substrate connector 315A of the substrate 31A may be connected through a set of connection wires 1000A.

Specifically, after the photosensitive chip 20A is attached to the attaching area 313A of the substrate 31A, the connection wire 1000A may be formed between the chip connector 21A of the photosensitive chip 20A and the substrate connectors 315A of the substrate 31A through a wiring process so as to conductively connect the photosensitive chip 20A and the substrate 31A by the connection wire 1000A.

It is worth mentioning that the wiring direction of the connection wire 1000A is not limited in the camera module 100A of the present disclosure. For example, the wiring direction of the connection wire 1000A may be from the photosensitive chip 20A to the substrate 31A, and also may be from the substrate 31A to the photosensitive chip 20A. Nonetheless, it can be understood by those skilled in the art that the connection wire 1000A may also have other formation methods. In addition, the material type of the connection wire 1000A is not limited in the camera module 100A of the present disclosure. For example, the connection wire 1000A may be a gold wire, a silver wire, an aluminum wire or a copper wire.

It is also worth mentioning that the shape and arrangement of the chip connector 21A of the photosensitive chip 20A and the shape and arrangement of the substrate connector 315A of the substrate 31A are not limited in the camera module 100A of the present disclosure. For example, the chip connector 21A of the photosensitive chip 20A may be in a disk shape, a spherical shape, or the like, and the chip connector 21A of the photosensitive chip 20A is generally disposed in a non-photosensitive area of the photosensitive chip 20A. Correspondingly, the substrate connector 315A of the substrate 31A may be in a disk shape, a spherical shape, or the like, and the substrate connector 315A of the substrate 31A is generally disposed in the bonding area 314A of the substrate 31A. Preferably, after the photosensitive chip 20A is attached to the attaching area 313A of the substrate 31A, the chip connector 21A of the photosensitive chip 20A and the substrate connector 315A of the substrate 31A are corresponding to each other so as to form, by a wiring process, the connection wire 1000A for connecting the photosensitive chip 20A and the substrate 31A between the chip connector 21A of the photosensitive chip 20A and the substrate connector 315A of the substrate 31A.

In an embodiment of the camera module 100A of the present disclosure, the substrate 31A, the electronic component 32A, the connection plate 33A, the connection wire 1000A and the photosensitive chip 20A form a part of the circuit board assembly 2000A. That is, according to another aspect of the present disclosure, the present disclosure further provides the circuit board assembly 2000A, wherein the circuit board assembly 2000A comprises the substrate 31A, the electronic component 32A, the connection plate 33A, the connection wire 1000A and the photosensitive chip 20A, wherein the photosensitive chip 20A is conductively connected to the substrate 31A via the connection wire 20, and the electronic component 32A and the connection plate 33A are conductively connected to the substrate 31A, respectively.

With continued reference to FIG. 53 to FIG. 54B, the camera module 100A further comprises a molding unit 40A, wherein the molding unit 40A comprises a back molding portion 41A and a molding base 42A, wherein the back molding portion 41A is integrally bonded to at least a part of the back face 312A of the substrate 31A, and the molding base 42A is integrally bonded to at least a part of the front face 311A of the substrate 31A. Alternatively, the molding base 42A is integrally bonded to a part of an area of the front face 311A of the substrate 31A. Preferably, the molding base 42A is further integrally bonded to at least a part of the non-photosensitive area of the photosensitive chip 20A, so that the molding base 42A embeds the non-photosensitive area of the photosensitive chip 20A. Therefore, the molding base 42A, the substrate 31A, the photosensitive chip 20A, and the back molding portion 41A can be integrated.

Specifically, the back molding portion 41A may be integrally bonded to at least a part of an area of the back face 312A of the substrate 31A by a molding process. Correspondingly, the molding base 42A may also be integrally bonded to a part of an area of the front face 311A of the substrate 31A by a molding process.

The back molding portion 41A can reinforce the strength of the substrate 31A and ensure the flatness of the substrate 31A, so that the photosensitive chip 20A attached to the attaching area 313A of the substrate 31A is kept flat so as to improve the imaging quality of the camera module 100A.

The back molding portion 41A has good inertness, and when the camera module 100A is used, heat generated by the photosensitive chip 20A is transmitted to the back molding portion 41A, and the back molding portion 41A does not deform, in such a manner, the flatness of the substrate 31A and the flatness of the photosensitive chip 20A attached to the attaching area 313A of the substrate 31A are also not affected by the heat generated by the photosensitive chip 20A, thereby facilitating to ensure the flatness of the photosensitive chip 20A. In addition, the back molding portion 41A may be formed of a material having a good thermal diffusivity so that the back molding portion 41A has a good heat dissipation property. After the heat generated by the photosensitive chip 20A is conducted to the back molding portion 41A, the back molding portion 41A can radiate the heat generated by the photosensitive chip 20A to the external environment of the camera module 100A in time so as to ensure the reliability of the camera module 100A when it has been used for a long time.

In an example of the camera module 100A of the present disclosure, the height of the back molding portion 41A is higher than the height of the electronic component 32A, or the height of the back molding portion 41A is consistent with the height of the electronic component 32A, for example, the distance between surfaces of the free side face 4111A of the back molding portion 41A and the back face 312A of the substrate 31A is greater than or equal to the height between the surfaces of the free side face of the electronic component 32A and the back face 312A of the substrate 31A. With reference to FIG. 53, it is assumed that the height of the back molding portion 41A is a parameter H and the height of the electronic component 32A protruding from the back face 312A of the substrate 31A is a parameter h, wherein the numerical value of the parameter H is greater than or equal to the numerical value of the parameter h, so that when the camera module 100A is mounted, it is possible to prevent other mounting components from contacting the electronic component 32A, thereby ensuring the reliability of the camera module 100A. It is worth mentioning that the free side face 4111A of the back molding portion 41A defined by the present disclosure is opposite to the bonding side face 4112A of the back molding portion 41A, wherein the bonding side face 4112A of the back molding portion 41 is integrally bonded to at least a part of an area of the back face 312A of the substrate 31A, with reference to FIG. 53.

In another example of the camera module 100A of the present disclosure, the back molding portion 41A embeds at least a part of the surface of at least one of the electronic components 32A. Preferably, the back molding portion 41A embeds the entire surface of at least one of the electronic components 32A. More preferably, the back molding portion 41A embeds the entire surface of the electronic component 32A.

It is worth mentioning that the back molding portion 41A can isolate the surface of the electronic component 32A from the external environment by embedding the electronic component 32A, thereby guaranteeing the good electrical property of the electronic component 32A by avoiding oxidation of the surface of the electronic component 32A.

In addition, the back molding portion 41A can isolate adjacent electronic components 32A by embedding the electronic components 32A so as to guaranteeing the imaging quality of the camera module 100A by avoiding mutual interference between the adjacent electronic components 32A. Moreover, since the back molding portion 41A can isolate the adjacent electronic components 32A, and there is no need to reserve a safe distance between the back molding portion 41A and the electronic component 32A, more electronic components 32A with larger size can be connected on a limited area of the back face 312A of the substrate 31A, for example, more electronic components 32A with larger size can be attached to a limited area of the back face 312A of the substrate 31A. In this way, the performance of the camera module 100A can be further improved.

In addition, it also can be understood by those skilled in the art that the electronic component 32A is embedded by the back molding portion 41A integrally bonded on the back face 312A of the substrate 31A, and in this manner, the surface of the electronic component 32A can be prevented from producing contaminants and the connection position between the electronic component 32A and the substrate 31A can be prevented from producing contaminants.

In addition, after the back molding portion 41A embeds the electronic component 32A located on the back face 312A of the substrate 31A, the electronic component 32A can also prevent the back molding portion 41A from falling off from the back face 312A of the substrate 31A so as to ensure the reliability of the camera module 100A.

With continued reference to FIG. 53, the molding base 42A has at least one light window 420A, wherein the molding base 42A is integrally bonded to at least a part of the bonding area 314A of the substrate 31A and at least a part of the area of the non-photosensitive area of the photosensitive chip 20A such that the substrate 31A, the photosensitive chip 20A, the molding base 42A, and the back molding portion 41A are integrally bonded, and the photosensitive area of the photosensitive chip 20A corresponds to the light window 420A of the molding base 42A, such that the light window 420A of the molding base 42A can provide a light path for the optical lens 10A and the photosensitive chip 20A. That is, the light reflected by the object can pass through the light window 420A to be received by the photosensitive chip 20A after entering the interior of the camera module 100A from the optical lens 10A.

It can be understood by those skilled in the art that the back molding portion 41A and the molding base 42A form a part of the molding circuit board assembly 2000A.

It can be understood that, in this example of the camera module 100A of the present disclosure, the molding base 42A of the molding unit 40A is integrally bonded to a part of the area of the front face 311A of the substrate 31A by a molding process, such that there is no need for a connection medium such as glue between the molding base 42A and the front face 311A of the substrate 31A. In this way, not only the manufacturing process of the camera module 100A can be reduced, but also the height of the camera module 100A can be lowered. It is more important that during the process of manufacturing the camera module 100A, there is no need to worry that the connection medium such as glue contaminates the photosensitive area of the photosensitive chip 20A, thereby ensuring the good product yield of the camera module 100A.

The molding base 42A embeds the non-photosensitive area of the photosensitive chip 20A, so that no safe distance is required to be reserved between the molding base 42A and the photosensitive chip 20A either in the height direction of the camera module 100A or in the circumferential direction of the camera module 100A. In this way, the length and width of the camera module 100A can be further reduced and the height of the camera module 100A can be reduced. Therefore, the camera module 100A is particularly suitable for being applied to the electronic device that is intended to be lighter and thinner.

It can be understood that the molding base 42A of the molding unit 40A embeds the connection wire 1000A, thereby being capable of isolating the surface of the connection wire 1000A from the external environment to avoid oxidation of the surface of the connection wire 1000 so as to ensure the good electrical property of the connection wire 1000.

With continued reference to FIG. 53, the camera module 100A has at least one dividing side 110A and at least one die releasing side 120A. The back molding portion 41A has at least a first dividing face 411A and at least a first die releasing face 412A, wherein the first dividing face 411A of the back molding portion 41A corresponds to the dividing side 110A of the camera module 100A, and the first die releasing face 412A of the back molding portion 41A corresponds to the die releasing side 120A of the camera module 100A. Correspondingly, the molding base 42A has at least a second dividing face 425A and at least a second die releasing face 426A, wherein the second dividing face 425A of the molding base 42A corresponds to the dividing side 110A of the camera module 100A, the second die releasing face 426A of the molding base 42A corresponds to the die releasing side 120A of the camera module 100A. In addition, the substrate 31A has at least a dividing edge 317A and at least a die releasing edge 318A, wherein the dividing edge 317A of the substrate 31A corresponds to the dividing side 110A of the camera module 100A, and the die releasing edge 318A of the substrate 31A corresponds to the die releasing side 120A of the camera module 100A. In addition, the module connection side 331A of the connection plate 33A may be connected to the substrate 31A on the dividing side 110A of the camera module 100A, or may also be connected to the substrate 31A on the die releasing side 120A of the camera module 100A, and the camera module 100A of the present disclosure is not limited in this respect.

In this example of the camera module 100A shown in FIG. 53, the first dividing face 411A of the back molding portion 41A extends to the dividing edge 317A of the substrate 31A, and the second dividing face 425A of the molding base 42A extends to the dividing edge 317A of the substrate 31A such that the first dividing face 311A of the back molding portion 41A, the second dividing face 425A of the molding base 42A and the dividing edge 317A of the substrate 31A are aligned with each other. The first die releasing side 412A of the back molding portion 41A does not extend to the die releasing side 318A of the substrate 31A to make the first die releasing side 412A of the back molding portion 41A and the die releasing edge 318A of the substrate 31A are displaced from each other, wherein a distance parameter between the first die releasing side 412A of the back molding portion 41A and the die releasing edge 318A of the substrate 31A is L1, where the value range of the parameter L1 is: 0.1 mm≤L1≤10 mm, preferably, the value range of the parameter L1 is: 0.2 mm≤L1≤1 mm. Correspondingly, the second die releasing side 426A of the molding base 42A does not extend to the die releasing side 318A of the substrate 31A to make the second die releasing side 426A of the molding base 42A and the die releasing edge 318A of the substrate 31A are displaced from each other, wherein a distance parameter between the second die releasing side 426A of the molding base 42A and the die releasing edge 318A of the substrate 31A is L2, where the value range of the parameter L2 is: 0.1 mm≤L2≤10 mm, preferably, the value range of the parameter L2 is: 0.3 mm≤L2≤2 mm. It can be understood that the numerical value of the parameter L2 may not be equal to the numerical value of the parameter L1. Preferably, the numerical value of the parameter L2 is greater than the numerical value of the parameter L1.

It is worth mentioning that, in other examples of the camera module 100A of the present disclosure, the camera module 100A may only have the dividing side 110A without the die releasing side 120A, or the camera module 100A may also have only the die releasing side 120A without the dividing side 110A.

With continued reference to FIG. 53, the camera module 100A comprises at least one filtering element 50A, wherein the filtering element 50A is held between the optical lens 10A and the photosensitive chip 20A, such that the light entering the interior of the camera module 100A from the optical lens 10A is received by the photosensitive chip 20A after passing through the filtering element 50A. In this way, the imaging quality of the camera module 100A can be ensured.

Specifically, the filtering element 50A can filter stray light in the light entering the interior of the camera module 100A from the optical lens 10A. In this way, the imaging quality of the camera module 100A can be improved. It is worth mentioning that the type of the filtering element 50A is not limited in the camera module 100A of the present disclosure. For example, the filtering element 50A may be, but not limited to, an infrared cut-off filtering element, a visible spectrum filtering element, etc.

Preferably, the filtering element 50A may be attached to the top surface of the molding base 42A such that the filtering element 50A is held between the optical lens 10A and the photosensitive chip 20A.

With reference to FIG. 53 to FIG. 54B, the camera module 100A comprises at least one driver 60A, wherein the optical lens 10A is drivably disposed on the driver 60A, and the driver 60A is attached to the top surface of the molding base 42A, so that the optical lens 10A is held in the photosensitive path of the photosensitive chip 20A via the driver 60A. The driver 60A can drive the optical lens 10A to move relative to the photosensitive chip 20A along the photosensitive path of the photosensitive chip 20A, so that the camera module 100A achieves automatic zooming and automatic focusing by means of adjusting the relative position of the optical lens 10A and the photosensitive chip 20A.

It is worth mentioning that the type of the driver 60A is not limited in the camera module 100A of the present disclosure, as long as the optical lens 10A can be driven to move relative to the photosensitive chip 20A along the photosensitive path of the photosensitive chip 20A. For example, the driver 60A may be implemented as, but not limited to, a voice coil motor in a specific example of the present disclosure.

Further, the driver 60A has at least one driving pin 61A, wherein the driving pin 61A is electrically connected to the substrate 31A. Preferably, the molding base 42A has at least one pin groove 421A, wherein the pin groove 421A of the molding base 42A extends from the top surface of the molding base 42A to the front face 311A of the substrate 31A, such that after the driver 60A is attached to the top surface of the molding base 42A, the driving pin 61A of the driver 60A can extends, inside the pin groove 421A, from the top surface of the molding base 42A to the front face 311A of the substrate 31A, and the driving pin 61 of the driver 60 can be electrically connected to the substrate 31A.

Preferably, the pin groove 421A extends, along the outer surface of the molding base 42A, from the surface of the molding base 42A to the front face 311A of the substrate 31A, thereby facilitating the electrical connection between the driving pin 61A of the driver 60A and the substrate 31A after the driver 60A is attached to the top surface of the molding base 42A. It can be understood that the driving pin 61A of the driver 60A accommodated in the pin groove 421A of the molding base 42A does not protrude from the outer surface of the molding base 42A. Therefore, not only the aesthetics of the camera module 100A can be ensured, but also an undesirable phenomenon of contacting the driving pin 61A of the driver 60A when assembling the camera module 100A at the device body 200A can be prevented so as to ensure the reliability and good product yield of the camera module 100A.

In addition, the pin groove 421A of the molding base 42A may be formed on the second dividing face 425A of the molding base 42A, or may be formed on the second die releasing face 426A of the molding base 42A. The camera module 100A of the present disclosure is not limited in this respect.

Further, the top surface of the molding base 42A has at least one inner surface 422A and at least one outer surface 423A, wherein the driver 60A is attached to the outer surface 423A of the molding base 42A such that the optical lens 10A is held in a photosensitive path of the photosensitive chip 20A, wherein the filtering element 50A is attached to the inner surface 422A of the molding base 42A such that the filtering element 50A is held between the optical lens 10A and the photosensitive chip 20A.

In some examples of the camera module 100A of the present disclosure, the plane where the inner surface 422A of the molding base 42A is located has a same height as the plane where the outer surface 423A is located. In some other examples of the camera module 100A of the present disclosure, there is a height difference between the plane where the inner surface 422A of the molding base 42A is located and the plane where the outer surface 423A is located. For example, in this specific example of the camera module 100A shown in FIG. 49, the plane where the inner surface 422A of the molding base 42A is located is lower than the plane where the outer surface 423A is located, so that the molding base 42A forms at least one attaching groove 424A, and the attaching groove 424A of the molding base 42A is in communication with the light window 420A, wherein the filtering element 50A attached to the inner surface 422A of the molding base 42A is accommodated in the attaching groove 424A to further reduce the height of the camera module 100A.

With reference to FIG. 40 to FIG. 52 of the accompanying drawings of the present disclosure, the manufacturing process of the camera module 100A will be illustrated in the following description.

Figure 40:
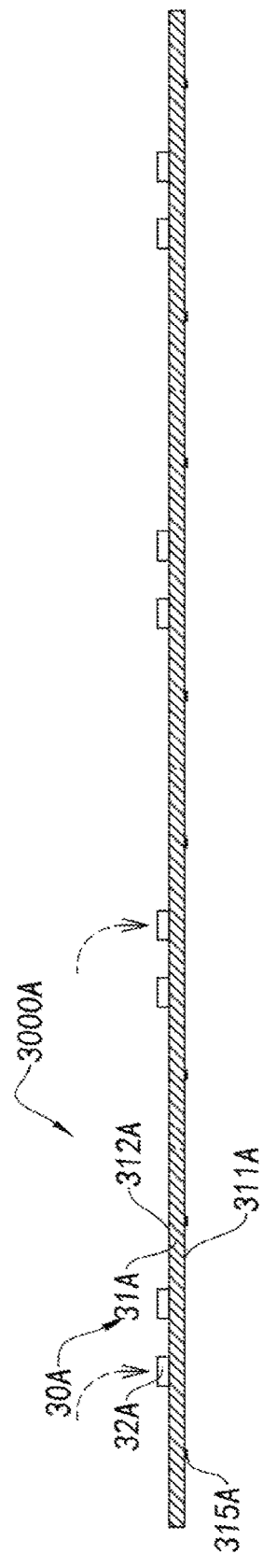
FIG. 40 is a schematic sectional view of a first manufacturing step of a camera module according to a preferred embodiment of the present disclosure.

At the stage shown in FIG. 40, the electronic component 32A is conductively connected to the substrate 31A on the back face 312A of the substrate 31A, wherein two or more of the substrates 31A are disposed to form a jointed board unit 3000A. It is worth mentioning that the arrangement of the plurality of the substrates 31A forming the jointed board unit 3000A is not limited in the camera module 100A of the present disclosure.

For example, in this specific example of the camera module 100A of the present disclosure, after the substrate 31A is provided or manufactured, all of the electronic components 32A may be conductively connected to the substrate 31A on the back face 312A of the substrate 31A by way of attaching. It can be understood by those skilled in the art that in other examples of the camera module 100A of the present disclosure, only a part of the electronic component 32A may also be connected to the substrate 31A on the back face 312A of the substrate 31A, and the examples shown in FIG. 40 to FIG. 53 of the present disclosure do not limit the content and scope of the camera module 100A of the present disclosure.

In addition, the position where the electronic component 32A is attached on the back face 312A of the substrate may also not be limited, and may be adjusted according to the specific application requirements of the camera module 100A. In some examples of the camera module 100A of the present disclosure, a plurality of the electronic components 32A may be disposed in all area of the back face 312A of the substrate 31A, and in other specific examples of the camera module 100A of the present disclosure, a plurality of the electronic components 32A may also be disposed in a specific area of the back face 312A of the substrate 31A, for example, in a corner, a side, or two sides, etc.

Figure 41:
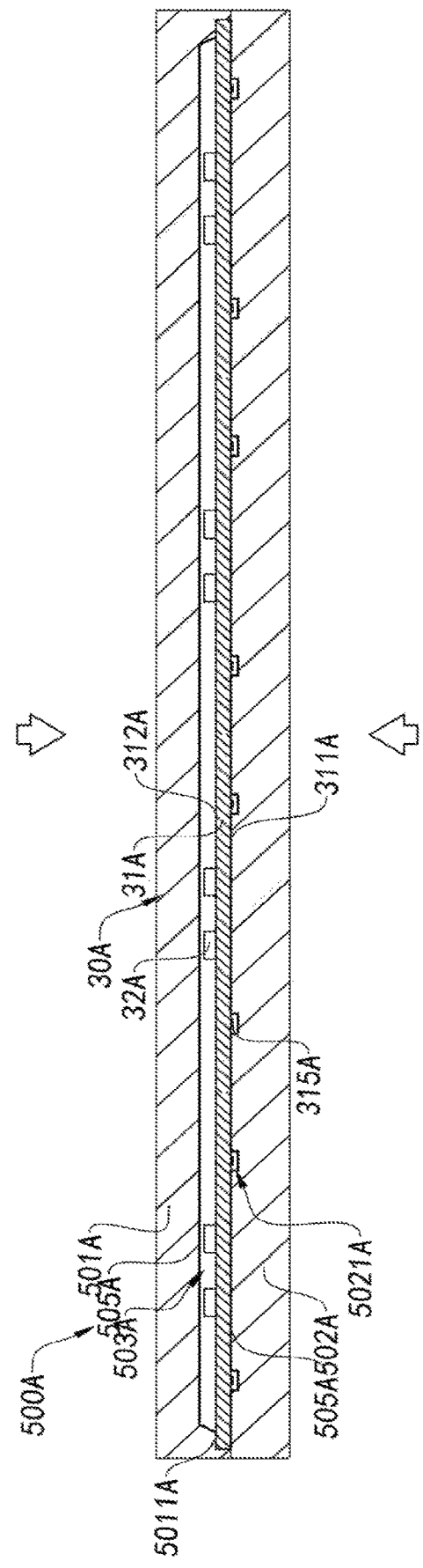
FIG. 41 is a schematic sectional view of a second manufacturing step of the camera module according to the above preferred embodiment of the present disclosure.

At the stage shown in FIG. 41, the jointed board unit 3000A is placed in a back molding die 500A to form the back molding portion 41A integrally bonded to at least a part of the area of the back face 312A of the substrate 31A by performing a molding process by the back molding die 500A.

Specifically, the back molding die 500A comprises a back upper die 501A and a back lower die 502A, wherein at least one of the back upper die 501A and the back lower die 502A can be operated to enable the back molding die 500A to be subjected to clamping and demolding operations.

When the jointed board unit 3000A is placed on the back molding die 500A, and a clamping operation is performed on the back molding die 500A so that the back upper die 501A and the back lower die 502A are respectively pressed against the substrate 31A on the back face 312A and the front face 311A of the substrate 31A, at least one back molding space 503A is formed between the back upper die 501A and the back face 312A of the substrate 31A. It can be understood that the electronic component 32A that is conductively connected to the substrate 31A on the back face 312A of the substrate 31A is accommodated in the back face molding space 503A so as to prevent a back upper die pressing portion 5011A of the back upper die 501A from being pressed against the electronic component 32A.

Preferably, the depth of the back molding space 503A of the back upper die 501A is greater than the height that the electronic component 32A protrudes from the back face 312A of the substrate 31A. In this manner, when the back face upper die 501A is pressed against the back face 312A of the substrate 31A, a safe distance is provided between the surface of the electronic component 32A and the inner surface of the back upper die 501A so as to prevent the surface of the electronic component 32A from being scratched by means of preventing the surface of the electronic component 32A from being in contact with the inner surface of the back upper die 501A. In addition, by providing a safe distance between the surface of the electronic component 32A and the inner surface of the back upper die 501A, it is also possible for the back molding portion 41A that is integrally bonded to at least a part of an area of the back face 312A of the substrate 31A to embed the electronic component 32A subsequently.

Further, the back lower die 502A is recessed to form a back safe space 5021A, wherein the substrate connector 315A protruding from the front face 311A of the substrate 31A can be accommodated in the back safe space 5021A, so that when the back molding die 500A is clamped, the back lower die 502A can be prevented from being pressed against the substrate connector 315A of the substrate 31A. In this way, the electrical property and reliability of the substrate 31A can be ensured.

In addition, the back molding die 500A further comprises at least one back film layer 505A. For example, in this specific example of the present disclosure, the number of the back film layers 505A may be implemented as two, one of the back film layers 505A is disposed on the inner surface of the back upper die 501A in an overlapping manner, and the other back film layer 505A is disposed on the inner surface of the back lower die 502A in an overlapping manner. For example, the back film layer 505A is disposed on the inner surface of the back upper die 501A in an overlapping manner by attaching the back film layer 505A to the back upper die 501A, and the back film layer 505A is disposed on the inner surface of the back lower die 502A in an overlapping manner by attaching the back film layer 505A to the back lower die 502A.

It can be understood that when the back molding die 500A is subjected to a clamping operation, the back film layer 505A that is disposed on the inner surface of the back upper die 501A in an overlapping manner is held between the back face 312A of the substrate 31A and the inner surface of the back upper die 501A, and the back film layer 505A that is overlapped disposed on the inner surface of the back lower die 502A is held between the front face 311A of the substrate 31A and the back lower die 502A. In this manner, on one hand, the back film layer 505A can prevent the back upper die 501A from directly contacting the back face 312A of the substrate 31A and prevent the back lower die 502A from directly contacting the front face 311A of the substrate 31A, thereby ensuring the good electrical property of the substrate 31A by avoiding scratching the surface of the substrate 31A; and on the other hand, the back film layer 505A can absorb, by means of deformation, the impact force generated by the back molding die 500A when being clamped so as to prevent the impact force from directly acting on the substrate 31A, thereby securing the good electrical property of the substrate 31A.

In addition, after the molding process is completed, the back film layer 505A is also capable of isolating the inner surface of the back upper die 501A from the back molding portion 41A, thereby facilitating performing a demolding operation on the back molding die 500A, and in the process, the back molding portion 41A is prevented from being damaged.

Figure 44:
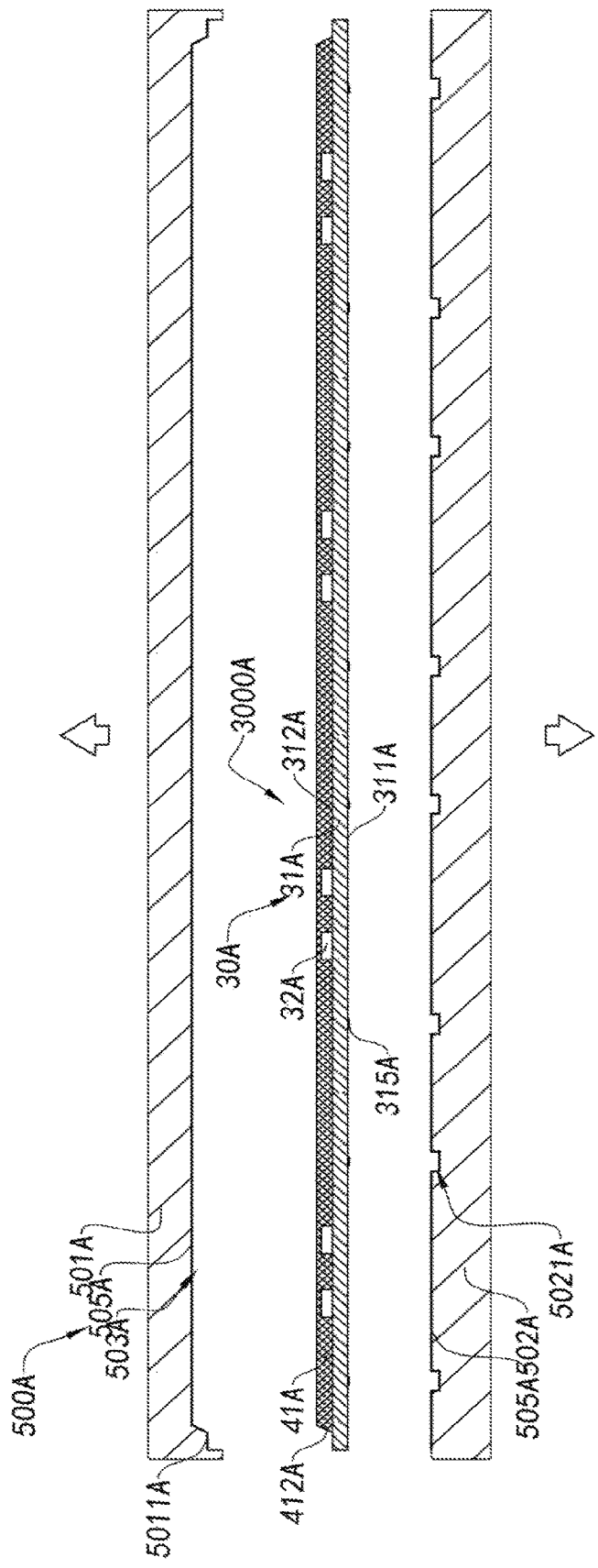
FIG. 44 is a schematic sectional view of the fifth manufacturing step of the camera module according to the above preferred embodiment of the present disclosure.

At the stage shown in FIG. 42 and FIG. 43, the fluid medium 400A is added to the back molding space 503A, after the fluid medium 400A fills up the back molding space 503A, the fluid medium 400A may be solidified in the back molding space 503A by means of heating, after a demolding operation is performed on the back molding die 500A, the back molding portion 41A that is integrally bonded to at least a part of an area of the back face 312A of the substrate 31A is formed, and a semi-finished product of the circuit board assembly 2000A is obtained with reference to the stage shown in FIG. 44.

It is worth mentioning that the fluid medium 400A may be liquid, solid or mixture of liquid and solid and the like so as to enable the fluid medium 400A to flow. In addition, the fluid medium 400A can be implemented as, but not limited to, a thermo-curable material. Of course, those skilled in the art would understand that in other possible examples, it is also possible that the fluid medium 400A is implemented as a photo-curable material or a self-curable material.

Figure 45:
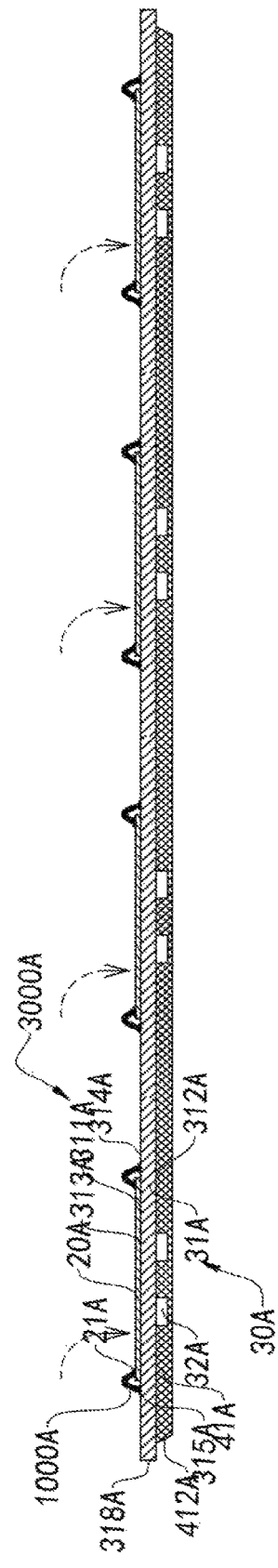
FIG. 45 is a schematic sectional view of the sixth manufacturing step of the camera module according to the above preferred embodiment of the present disclosure.

At the stage shown in FIG. 45, the photosensitive chip 20A is attached to the attaching area 311A of the substrate 31A, and the connection wire 1000A is formed between the chip connector 21A of the photosensitive chip 20A and the substrate connector 315A of the substrate 31A by a wiring process so as to be conductively connected to the photosensitive chip 20A and the substrate 31A. For example, the photosensitive chip 20A may be attached to the attaching area 313A of the substrate 31A through a COB process (Chip On Board), and the chip connector 21A of the photosensitive chip 20A and the substrate connector 315A of the substrate 31A may be made to correspond to each other, and then the connection wire 1000A is formed between the chip connector 21A of the photosensitive chip 20A and the substrate connector 315A of the substrate 31A by a wiring process. It is worth mentioning that the wiring direction of the connection wire 1000A may not be limited. For example, the wiring direction of the connection wire 1000A may be from the photosensitive chip 20A to the substrate 31A, and also may be from the substrate 31A to the photosensitive chip 20A, which is selected as needed.

In addition, it is also worth mentioning that although FIG. 45 shows that the photosensitive chip 20A and the substrate 31A are connected by means of the connection wire 1000A formed between the chip connector 21A of the photosensitive chip 20A and the substrate connector 315A of the substrate 31A, in other examples of the camera module 100A of the present disclosure, the photosensitive chip 20A and the substrate 31A may be connected to each other by other means, for example, the chip connector 21A of the photosensitive chip 20A is directly connected to the substrate connector 315A of the substrate 31A when the photosensitive chip 20A is attached to the attaching area 313A of the substrate 31A.

Figure 46A:
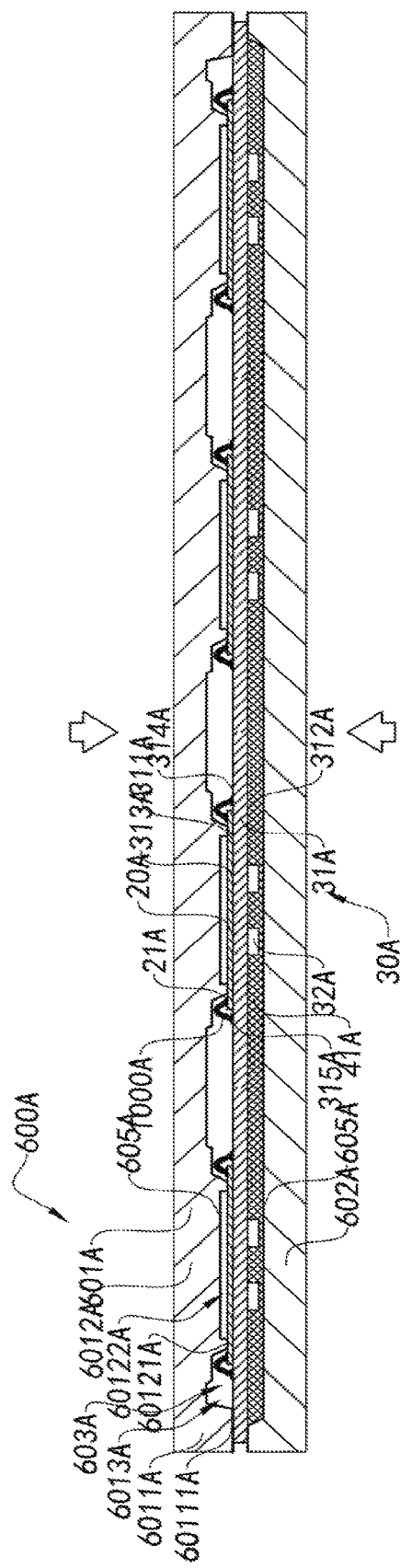
FIG. 46A and FIG. 46B are schematic sectional views of the seventh manufacturing step of the camera module according to the above preferred embodiment of the present disclosure.
Figure 46B:
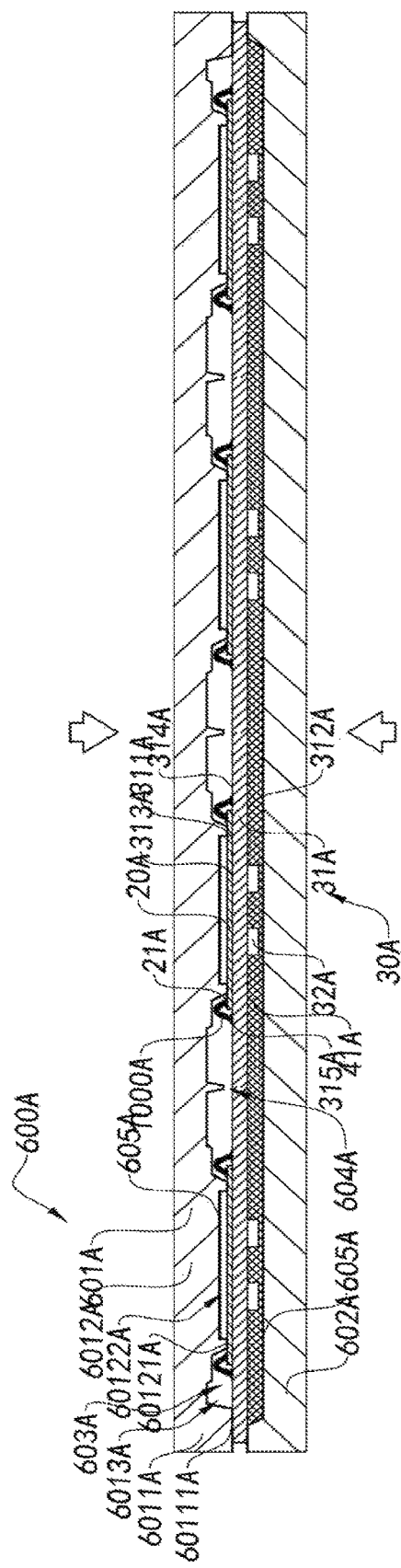
Figure 49:
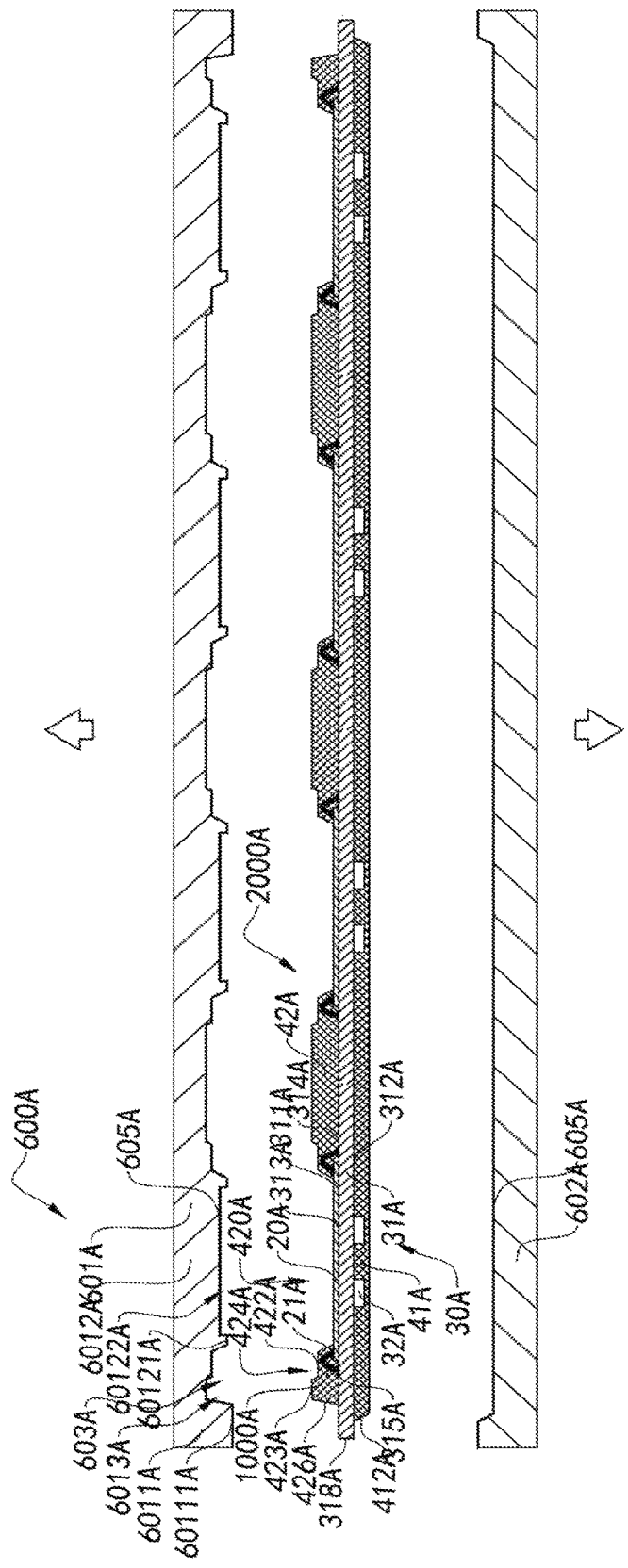
FIG. 49 is a schematic sectional view of a tenth manufacturing step of the camera module according to the above preferred embodiment of the present disclosure.

At the stage shown in FIG. 46A and FIG. 46B, a semi-finished product of the circuit board assembly 2000A is placed in a front molding die 600A so as to perform a molding process via the front molding die 600A, thereby forming the molding base 42A that is integrally bonded to a part of an area of the front face 311A of the substrate 31A.

Specifically, the front molding die 600A comprises a front upper die 601A and a front lower die 602A, wherein at least one of the front upper die 601A and the front lower die 602A can be operated to enable the front molding die 600A to be subjected to clamping and demolding operations.

When the semi-finished product of the circuit board assembly 2000A is placed in the front molding die 600A and a clamping operation is performed on the front molding die 600A so that the front upper die 601A and the front lower die 602A are respectively pressed against the front face 311A of the substrate 31A and the back molding portion 41A, at least one front molding space 603A is formed between the front upper die 601A and the front face 311A of the substrate 31A. Preferably, when the number of the front molding spaces 603A formed between the front upper die 601A and the front face 311A of the substrate 31A is two or more, at least one front communication channel 604A may also be formed between the front upper die 601A and the front face 311A of the substrate 31A, wherein at least one of the front communication channel 604A can enable adjacent front molding spaces 603A to be in communication so as to subsequently allow the fluid medium 400A to flow from one of the front molding spaces 603A to another front molding space 603A via the front communication channel 604A.

With reference to FIG. 46A and FIG. 46B, the front upper die 601A further comprises a molding guide portion 6011A and at least one light window molding 6012A and has at least one molding guide groove 6013A, wherein the light window molding portion 6012A integrally extends over the molding guide portion 6011A so as to form the molding guide groove 6013A between the light window molding portion 6012A and the molding guide portion 6011A or to form the molding guide groove 6013A between adjacent window molding portions 6012A.

Further, the molding guide portion 6011A has at least one first pressing portion 60111A, so that after the front molding die 600A is subjected to a clamping process, the first pressing portion 60111A of the molding guiding portion 6011A can be pressed against the front face 311A of the substrate 31A.

The light window molding portion 6012A has a second pressing portion 60121A which may have a ring shape. For example, in the example of the front molding die 600A shown in FIG. 46A and FIG. 46B, the light window molding portion 6012A may form the second pressing portion 60121A around in a manner of recessing to form a front safe space 60122A, so that after the front molding die 600A is subjected to a clamping process, the second pressing portion 60121A of the light window molding portion 6012A can be pressed against the non-photosensitive area of the photosensitive chip 20A, and can make the photosensitive area of the photosensitive chip 20A to correspond to the front safe space 60122A of the light window molding portion 6012A so as to prevent the front upper die 601A from scratching the photosensitive area of the photosensitive chip 20A.

It can be understood that, when the clamping operation is performed on the front molding die 600A, the front molding space 603A is formed at a position corresponding to the molding guide groove 6013A of the front upper die 601A. Moreover, the second pressing portion 60121A of the light window molding portion 6012A of the front upper die 601A surrounds the photosensitive area of the photosensitive chip 20A in a manner of being pressed against the non-photosensitive area of the photosensitive chip 20A so as to prevent the fluid medium 400A that is added to the front molding space 603A from entering the photosensitive area of the photosensitive chip 20A in a subsequent molding process, thereby avoiding contamination of the photosensitive area the photosensitive chip 20A in the molding process.

In addition, the front molding die 600A further comprises at least one front film layer 605A, wherein the front film layer 605A is disposed on an inner surface of the front upper die 601A in an overlapping manner, for example, the front film layer 605A may be disposed on the inner surface of the front upper die 601A in an overlapping manner by being attached to the inner surface of the front upper die 601A. Preferably, the front film layer 605A may also be disposed on an inner surface of the front lower die 602A in an overlapping manner.

It can be understood by those skilled in the art that when the front molding die 600A is subjected to a clamping operation, the front film layer 605A is held between the second pressing portion 60121A of the light window molding portion 6012A and the non-photosensitive area of the photosensitive chip 20A, so that the front film layer 605A prevents, by means of deformation when being pressed, a gap from being formed between the second pressing portion 60121A of the light window molding portion 6012A and the non-photosensitive area of the photosensitive chip 20A. Therefore, in a subsequent molding process, the fluid medium 400A is prevented from entering the front safe space 60122A between the second pressing portion 60121A of the light window molding portion 6012A and the photosensitive area of the photosensitive chip 20A, thereby avoiding contamination of the photosensitive area of the photosensitive chip 20A held in the front safe space 60122A, and avoiding an undesirable phenomenon of "flash" so as to ensure the good product yield of the camera module 100A.

It can be understood that the front film layer 605A can isolate the second pressing portion 60121A of the light window molding portion 6012A from the photosensitive chip 20A, so that when the front molding die 600A is clamped, on one hand, the front film layer 605A can absorb the impact force generated by the front molding die 600A when being clamped by means of deformation so as to prevent the impact force from directly acting on the photosensitive chip 20A, and on the other hand, the front film layer 605A is also capable of isolating the second pressing portion 60121A of the light window molding portion 6012A from the photosensitive chip 20A so as to prevent the photosensitive chip 20A from being scratched.

In addition, after the molding process is completed, the front film layer 605A can isolate the inner surface of the front upper die 601A from the molding base 42A, thereby facilitating performing a demolding operation on the front molding die 600A, and in the process, the molding base 42A is prevented from being damaged.

Correspondingly, the front film layer 605A can also be held between the first pressing portion 60111A of the molding guide portion 6011A and the front face 311A of the substrate 31A so as to protect the substrate 31A.

It can be understood that a part of the non-photosensitive area of the photosensitive chip 20A, the connection wire 1000A, and at least a part of the bonding area 314A of the substrate 31A are held in the front molding space 603A.

After the clamping operation is performed on the front molding die 600A, the first pressing portion 60111A of the molding guide portion 6011A of the front upper die 601A is pressed against a position of the substrate 31A where the back molding portion 41A is bonded. In this way, the substrate 31A can be prevented from being damaged or deformed due to the first pressing portion 60111A of the molding guide portion 6011A being pressed, thereby ensuring the reliability of the circuit board assembly 2000A.

At the stage shown in FIG. 47 and FIG. 48, the fluid medium 400A is added to at least one of the front molding spaces 603A, wherein the fluid medium 400A added to the front molding space 603A can be filled into adjacent front molding spaces 603A via the front communication channel 604A. After the fluid medium 400A fills up all the front molding spaces 603A, the fluid medium 400A may be solidified in the front molding space 603A by heating, and the front molding die 600A may be subjected to a demolding operation with reference to the stage shown in FIG. 49, wherein the fluid medium 400A solidified in the front molding space 603A forms the molding base 42A that is integrally bonded to the front face 311A of the substrate 31A and the non-photosensitive area of the photosensitive chip 20A, and the light window 420A of the molding base 42A is formed at a position corresponding to the light window molding portion 6012A of the front upper die 601A, and wherein the photosensitive area of the photosensitive chip 20A corresponds to the light window 420A of the molding base 42A.

It is worth mentioning that although the drawings of the present disclosure show that the back molding portion 41A that is integrally bonded to at least a portion of an area of the back face 312A of the substrate 31A is formed first, and then, the molding base 42A that is integrally bonded to at least a part of an area of the front face 311A of the substrate 31A is formed, it can be understood by those skilled in the art that in the camera module 100A of the present disclosure, it is also possible to first form the molding base 42A that is integrally bonded to at least a part of an area of the front face 311A of the substrate 31A, and then, to form the back molding portion 41A that is integrally bonded to the back face 312A of the substrate 31A. At this point, the length of the molding base 42A may be greater than the length of the back molding portion 41A.

Figure 50:
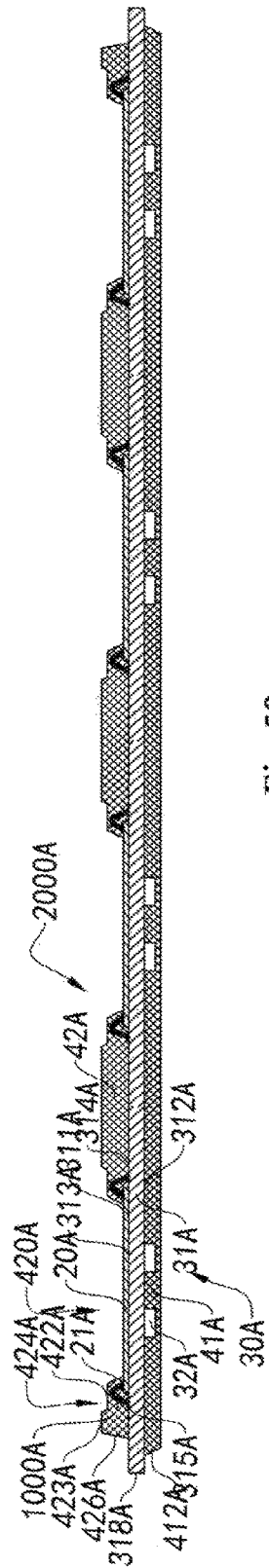
FIG. 50 is a schematic sectional view of an eleventh manufacturing step of the camera module according to the above preferred embodiment of the present disclosure.

At the stage shown in FIG. 50, after the demolding operation is performed on the front molding die 600A, the semi-finished product of the circuit board assembly 2000A can be formed. Then, at the stage shown in FIG. 51A and FIG. 51B, the semi-finished product of the circuit board assembly 2000A can then be divided so as to form the circuit board assembly 2000A. It is worth mentioning that the manner of dividing the semi-finished product of the circuit board assembly 2000A is not limited in the camera module 100A of the present disclosure. For example, the semi-finished product of the circuit board assembly 2000A may be divided by means of cutting so as to form the circuit board assembly 2000A, and the semi-finished product of the circuit board assembly 2000A may also be divided by means of etching so as to form the circuit board assembly 2000A.

In addition, in the example shown in FIG. 51A, when dividing the semi-finished product of the circuit board assembly 2000A, the dividing direction may be from the molding base 42A to the back molding portion 41A. In the example shown in FIG. 51B, when dividing the semi-finished product of the circuit board assembly 2000A, the dividing direction may also be from the back molding portion 41A to the molding base 42A.

Figure 52:
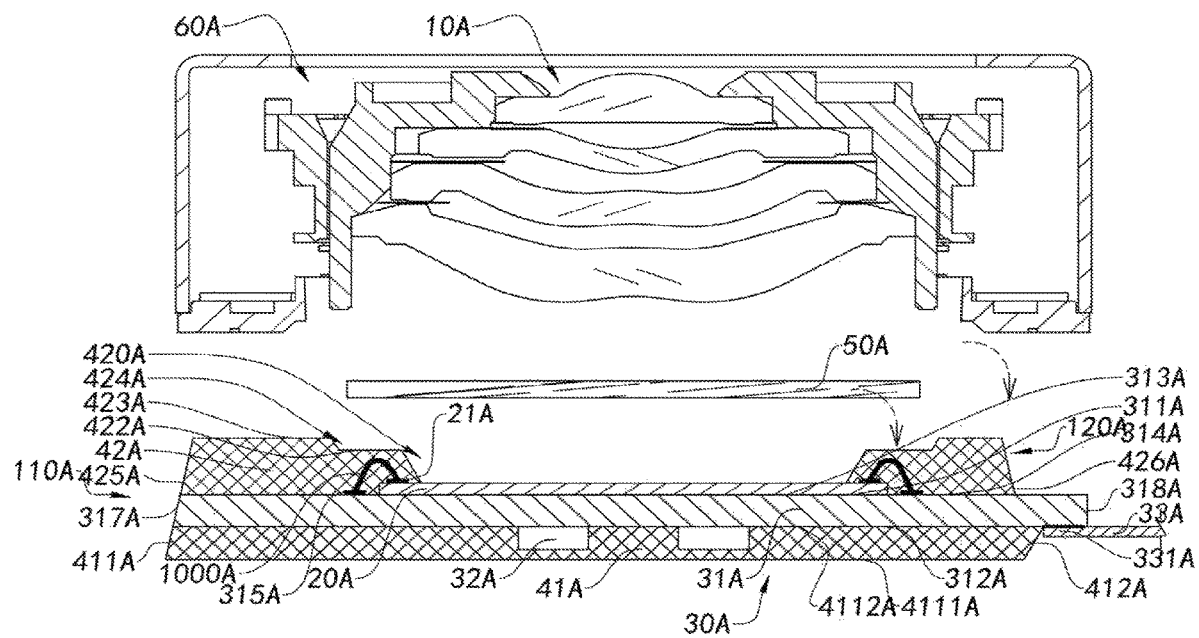
FIG. 52 is a schematic sectional view of a thirteenth manufacturing process of the camera module according to the above preferred embodiment of the present disclosure.

At the stage shown in FIG. 52, the filtering element 50A may be sequentially attached to the inner surface 422A of the molding base 42A, and the driver 60A assembled with the optical lens 10A is attached to the outer surface 423A of the molding base 42A so as to form the camera module 100A shown in FIG. 53 to FIG. 54B.

According to another aspect of the present disclosure, the present disclosure further provides a method for manufacturing the camera module 100A, wherein the manufacturing method comprises the following steps:

(a) connecting at least one electronic component 32A to the substrate 31A on the back face 312A of the substrate 31A conductively;

(b) bonding the back molding portion 41A to at least a part of an area of the back face 312A of the substrate 31A integrally by a molding process;

(c) bonding the molding base 42A to a part of an area of a front face 311A of the substrate 31A integrally by a molding process, and forming a light window 420A of the molding base 42A while the molding base 42A is formed;

(d) enabling a photosensitive area of a photosensitive chip 20A conductively connected to the substrate 31A to correspond to the light window 420A of the molding base 42A; and (e) holding an optical lens 10A in a photosensitive path of the photosensitive chip 20A, and forming a light path between the optical lens 10A and the photosensitive chip 20A by the light window 420A of the molding base 42A, thereby producing the camera module 100A.

It is worth mentioning that in the step (a), at least one of the electronic components 32A may also be conductively connected to the front face 311A of the substrate 31A. That is, in some examples of the camera module 100A of the present disclosure, the electronic component 32A may only be conductively connected to the back face 312A of the substrate 31A, but in other examples of the camera module 100A of the present disclosure, the electronic component 32A is conductively connected not only to the back face 312A of the substrate 31A, but also to the front face 311A of the substrate 31A, that is, at least one of the electronic components 32A is conductively connected to both the front face 311A and the back face 312A of the substrate 31A.

In addition, the step (d) may also precede the step (c) or the step (b), so that the photosensitive chip 20A is conductively connected to the substrate 31A first, and then, the back molding portion 41A that is integrally bonded to the substrate 31A on the back face 312A of the substrate 31A and the molding base 42A that is integrally bonded to the substrate 31A on the front face 311A of the substrate 31A are formed simultaneously, and the photosensitive area of the photosensitive chip 20A is enabled to correspond to the light window 420A of the molding base 42A. Preferably, the molding base 42A may further embed the non-photosensitive area of the photosensitive chip 20A. It can be understood that the photosensitive area and at least a part of the non-photosensitive area of the photosensitive chip 20A correspond to the light window 420A of the molding base 42A.

It is worth mentioning that in another example, the step (c) precedes the step (b), so that the molding base 42A is integrally bonded to the front face 311A of the substrate 31A first, and then, the back molding portion 41A is integrally bonded to the back face 311 of the substrate 31A.

In addition, in the step (d), the photosensitive chip 20A is attached to the front face 311A of the substrate 31A through the light window 420A of the molding base 42A, so that the photosensitive chip 20A is conductively connected to the substrate 31A, and the photosensitive area of the photosensitive chip 20A is made to correspond to the light window 420A of the molding base 42A. Alternatively, the step (d) precedes the step (c), so that the photosensitive chip 20A is attached to the front face 311A of the substrate 31A first so as to connecting the photosensitive chip 20A to the substrate 31A conductively, and then, the molding base 42A is integrally bonded to the front face 311A of the substrate 31A so as to enable the photosensitive area of the photosensitive chip 20A to correspond to the light window 420A of the molding base 42A.

Figure 56:
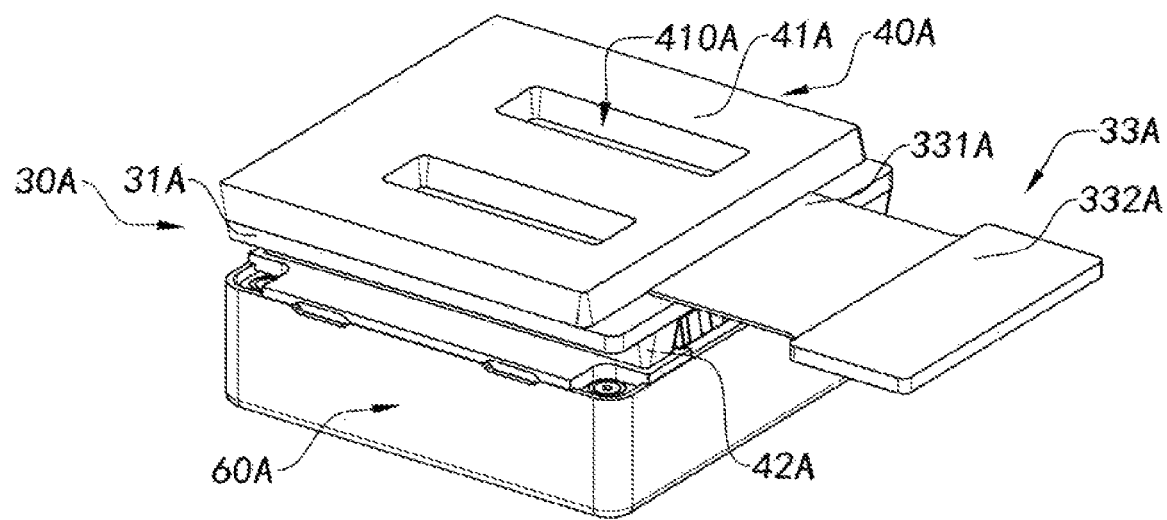
FIG. 56 is a stereoscopic schematic diagram of a variant implementation of the camera module according to the above preferred embodiment of the present disclosure.

FIG. 56 showing a schematic sectional view of a variant implementation of the camera module 100A, wherein the back molding portion 41A has at least one mounting space 410A, and wherein the module connection side 331A of the connection plate 33A can be accommodated in the mounting space 410A of the back molding portion 41A after being connected to the substrate 31A on the back face 312A of the substrate 31A. In this way, the module connection side 331A of the connection plate 33A can be prevented from protruding so as to ensure the reliability of a connection position between the module connection side 331A of the connection plate 33A and the back face 312A of the substrate 31A. Nonetheless, it can be understood by those skilled in the art that in other examples of the camera module 100A of the present disclosure, the back molding portion 41A may also embed a connection position between the module connection side 331A of the connection plate 33A and the substrate 31A so as to prevent the module connection side 331A of the connection plate 33A from falling off from the back face 312A of the substrate 31A, thereby ensuring the reliability of the camera module 100A.

In some other possible examples of the camera module 100A, the electronic component 32A that is not embedded by the back molding portion 41A may also be accommodated in the mounting space 410A of the back molding portion 41A. In this way, when the camera module 100A is moved or mounted, the electronic component 32A can be prevented from being contacted, thereby preventing the surface of the electronic component 32A or the conductive position between the electronic component 32A and the substrate 31A from being destroyed so as to further ensure the reliability of the camera module 100A. Alternatively, a part of the surface of the electronic component 32A may be exposed in the mounting space 410A of the back molding portion 41A.

In addition, when the camera module 100A is mounted to the electronic device, the protruding mounting components of the device body 200A can also be accommodated in the mounting space 410A of the back molding portion 41A. In this way, the internal space of the device body 200A can be effectively utilized so as to facilitate lightering and thinning and miniaturization of the electronic device.

It is worth mentioning that the number, size and position of the mounting space 410A can be selected as needed so as to improve the flexibility of the camera module 100A when it is mounted.

Figure 57:
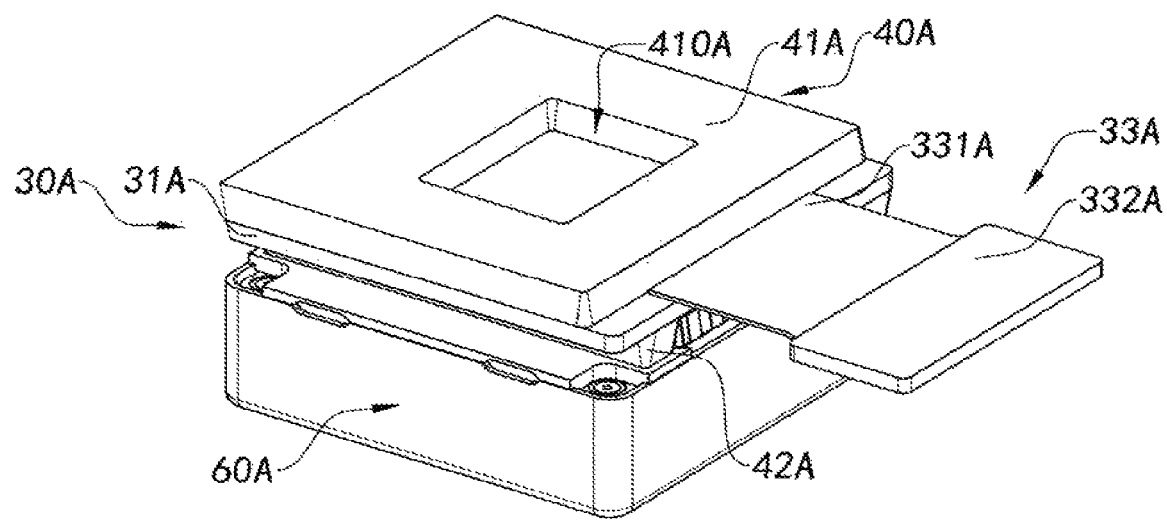
FIG. 57 is a stereoscopic schematic diagram of another variant implementation of the camera module according to the above preferred embodiment of the present disclosure.
Figure 58:
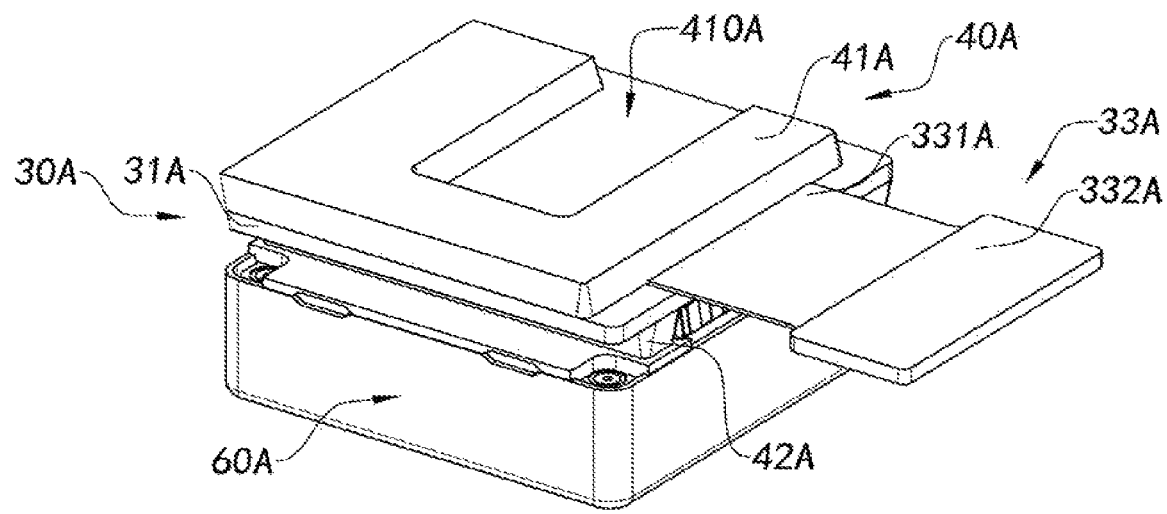
FIG. 58 is a stereoscopic schematic diagram of another variant implementation of the camera module according to the above preferred embodiment of the present disclosure.
Figure 59:
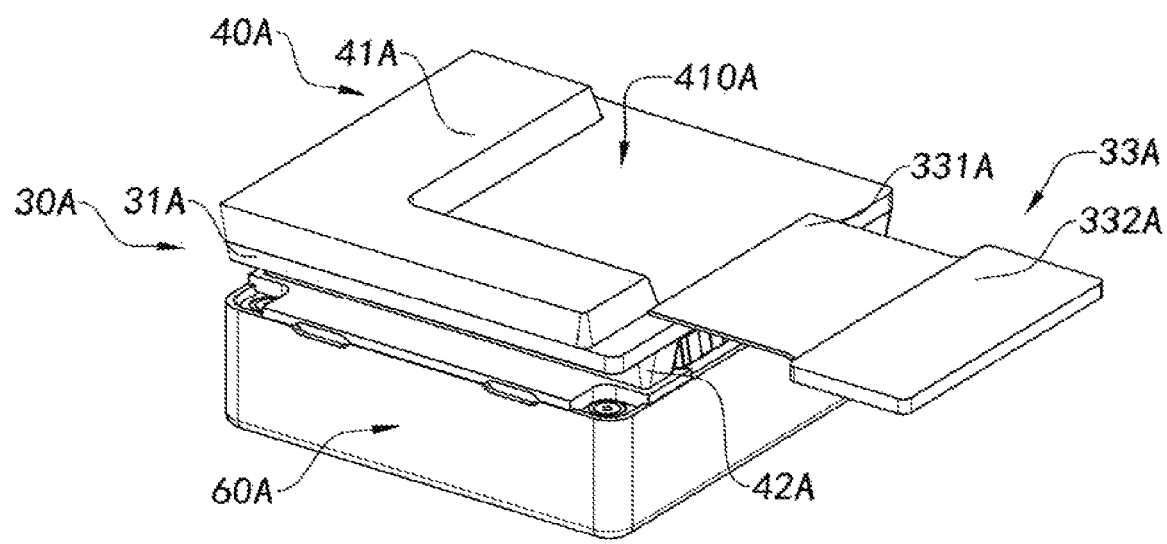
FIG. 59 is a stereoscopic schematic diagram of another variant implementation of the camera module according to the above preferred embodiment of the present disclosure.
Figure 60:
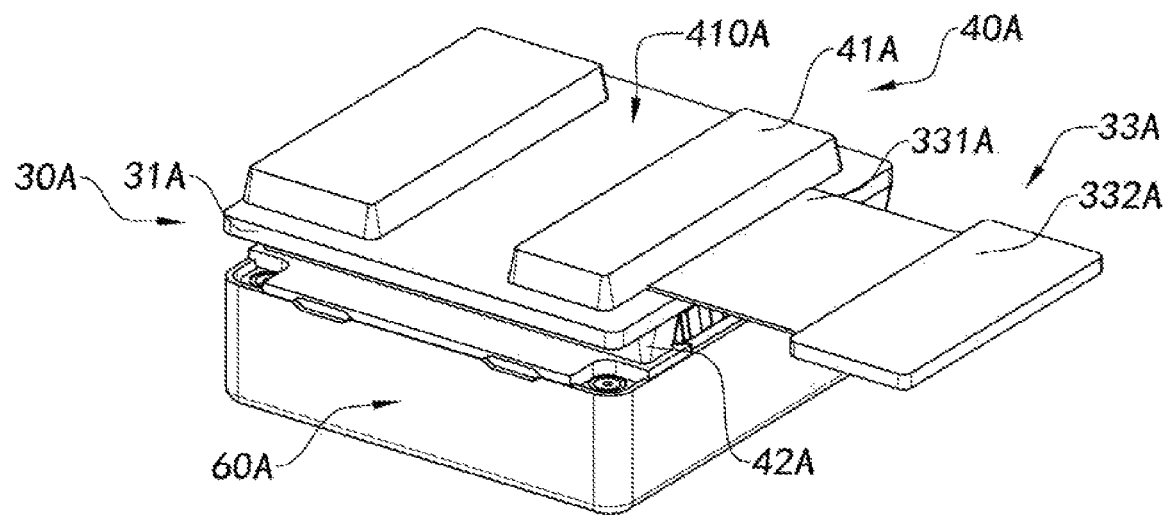
FIG. 60 is a stereoscopic schematic diagram of another variant implementation of the camera module according to the above preferred embodiment of the present disclosure.
Figure 61:
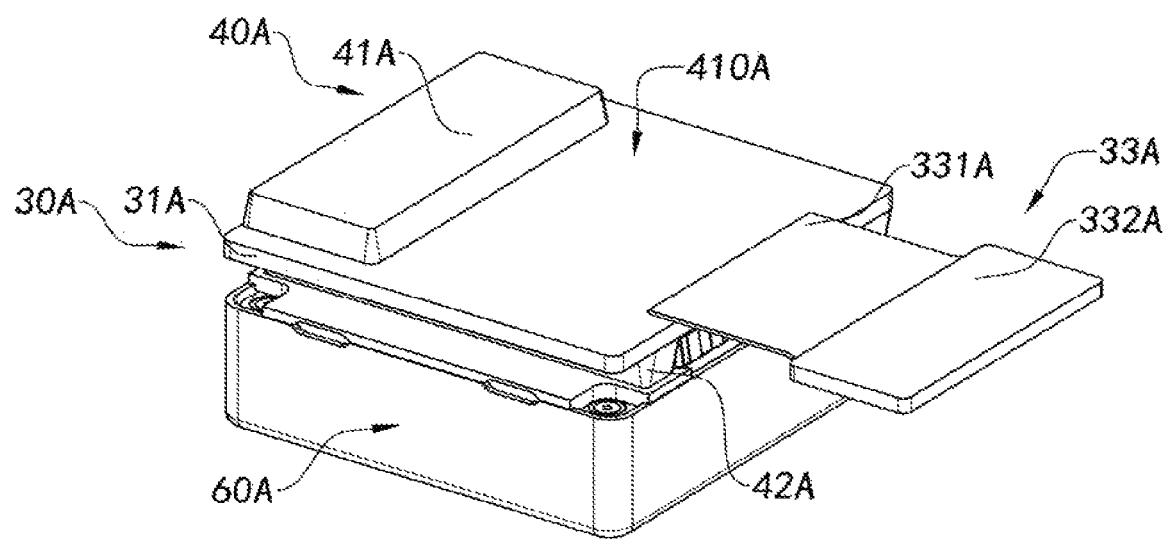
FIG. 61 is a stereoscopic schematic diagram of another variant implementation of the camera module according to the above preferred embodiment of the present disclosure.

FIG. 57 shows another variant implementation of the camera module 100A, wherein the back molding portion 41A of the molding unit 40A is integrally bonded to at least one side portion of the back face 312A of the substrate 31A, that is, the back molding portion 41A may not be bonded to the middle portion of the back face 312A of the substrate 31A. For example, in this specific example of the camera module 100A shown in FIG. 57, the back molding portion 41A may be integrally bonded to the four side portions of the back face 312A of the substrate 31A, so that the back molding portion 41A is in the shape of "☐". In another variant implementation of the camera module 100A shown in FIG. 58, the back molding portion 41A may be integrally bonded to three side portions of the back face 312A of the substrate 31A, so that the back molding portion 41A is in the shape of "Π" or "C". In another variant implementation of the camera module 100A shown in FIG. 59, the back molding portion 41A may be integrally bonded to two side portions of the back face 312A of the substrate 31A, so that the back molding portion 41A is in the shape of "Γ" or "L". In another variant implementation of the camera module 100A shown in FIG. 60, the number of the back molding portions 41A may be two, and each of the back molding portions 41A is integrally bonded to one side portion of the back face 312A of the substrate 31A respectively, wherein two of the back molding portions 41A are symmetrical with each other, or two of the back molding portions 41A are parallel to each other. For example, the two back molding portions 41A may be in the shape of "II". In another variant implementation of the camera module 100A shown in FIG. 61, the back molding portion 41A may be integrally bonded only to one side portion of the back face 312A of the substrate 31A. For example, the back molding portion 41A may be in the shape of "I".

It is worth mentioning that those skilled in the art would understand that the back molding portion 41A may also have other shapes, such as in the shape of "X" or in the shape of "井".

Figure 62:
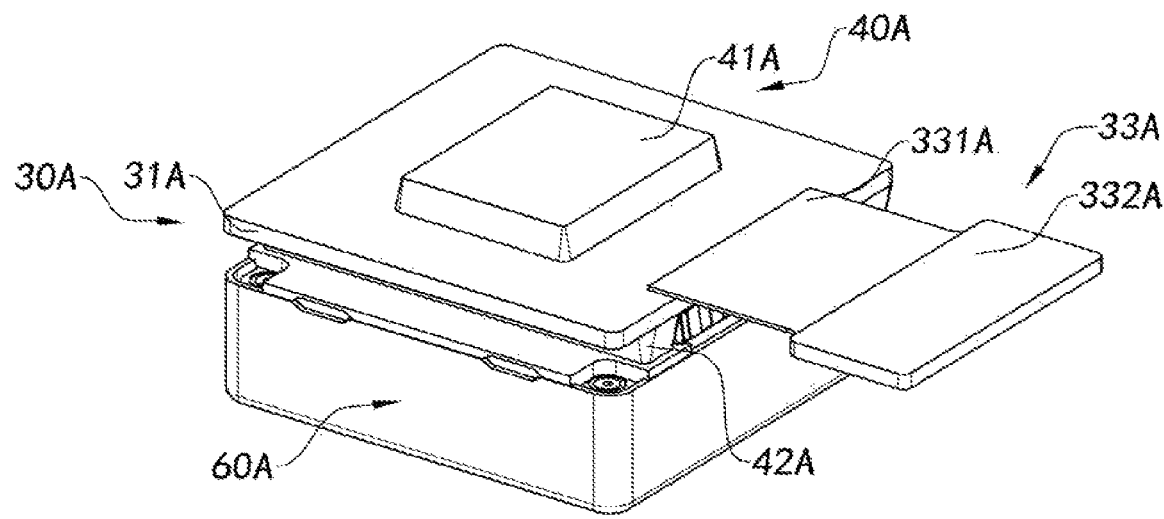
FIG. 62 is a stereoscopic schematic diagram of another variant implementation of the camera module according to the above preferred embodiment of the present disclosure.

FIG. 62 shows another variant implementation of the camera module 100A, wherein the back molding portion 41A of the molding unit 40A is integrally bonded only to the center portion of the back face 312A of the substrate 31A, and at this point, the back molding portion 41A and the photosensitive chip 20A are held on both faces of the substrate 31A in correspondence with each other. On one hand, the back molding portion 41A can reinforce the strength of a portion of the substrate 31A at the attaching area 313A so as to ensure the flatness of the photosensitive chip 20A that is attached to the attaching area 313A of the substrate 31A, and on the other hand, heat generated by the photosensitive chip 20A can be radiated to the external environment so as to help dissipate heat.

It is worth mentioning that the shape of the back molding portion 41A is not limited in the camera module 100A of the present disclosure. For example, the back molding portion 41A may be in the shape of a square, a rectangular, a trapezoid, a circle, an oval, and other irregular shapes.

Figure 63:
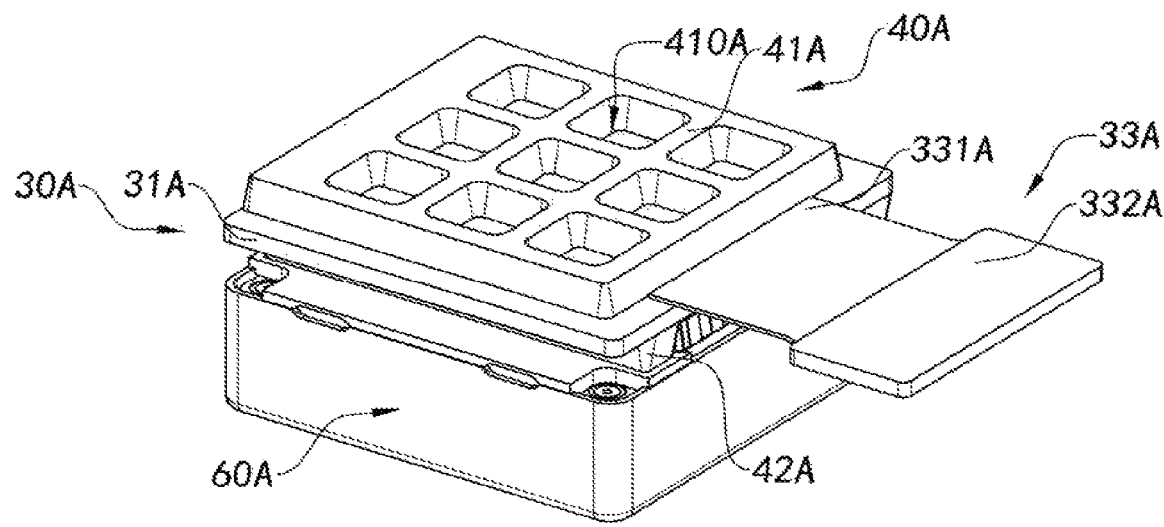
FIG. 63 is a stereoscopic schematic diagram of another variant implementation of the camera module according to the above preferred embodiment of the present disclosure.

FIG. 63 shows another variant implementation of the camera module 100A, wherein the back molding portion 41A of the molding unit 40A may be provided or formed with a plurality of mounting spaces 410A, so that the back molding portion 41A is in the shape of s a grid, or the back molding portion 41A is in the shape of "田", or the back molding portion 41A is in the shape of "井".

Figure 64:
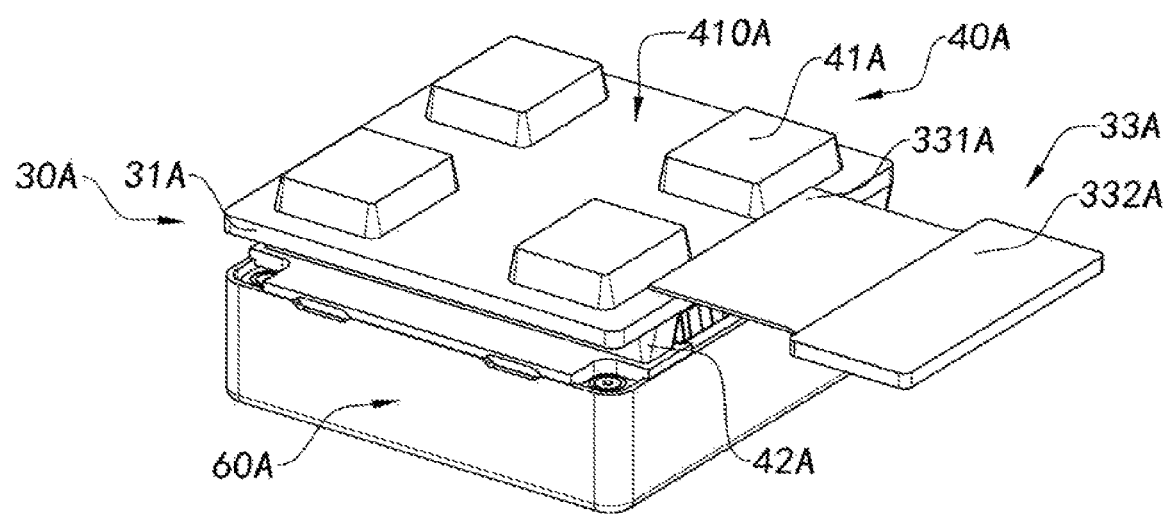
FIG. 64 is a stereoscopic schematic diagram of another variant implementation of the camera module according to the above preferred embodiment of the present disclosure.

FIG. 64 shows another variant implementation of the camera module 100A, wherein the number of the back molding portions 41A of the molding unit 40A may also be implemented as four, and each of the back molding portions 41A is integrally bonded to four corners of the back face 312A of the substrate 31A respectively. Nonetheless, it is also possible that each of the back molding portions 41A is integrally bonded to a middle portion of four sides of the back face 312A of the substrate 31A respectively. In addition, it can be understood by those skilled in the art that the number of the back molding portions 41A may also be implemented to be more or less, and the camera module 100A of the present disclosure is not limited in this respect.

It is worth mentioning that those skilled in the art would understand that the back molding portion 41A of the molding unit 40A may also have any other possible shapes, which will not be exemplified further in the following description of the present disclosure.

Figure 65A:
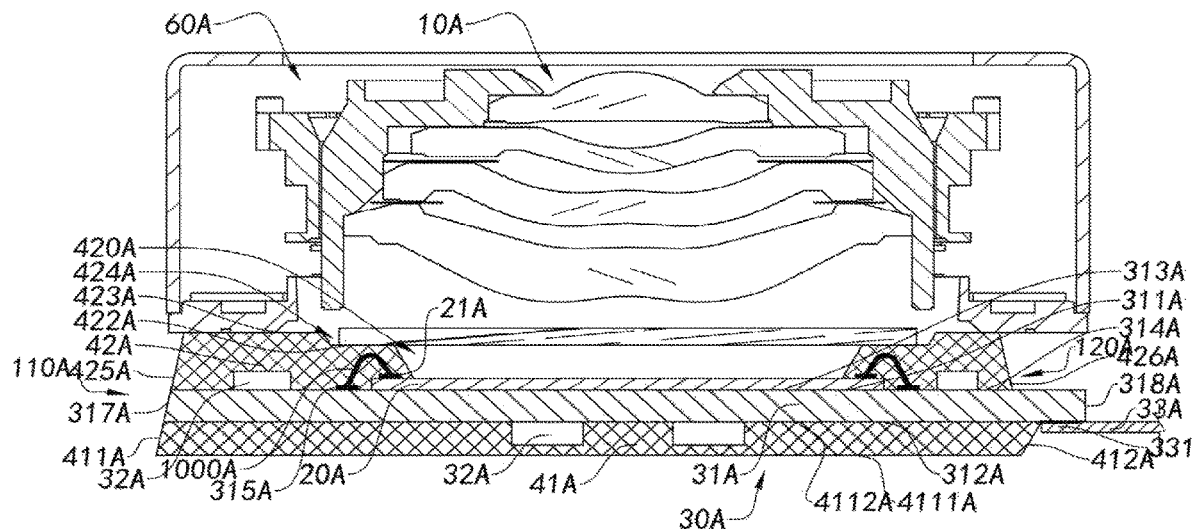
FIG. 65A is a schematic sectional view of another variant implementation of the camera module according to the above preferred embodiment of the present disclosure.

FIG. 65A shows another variant implementation of the camera module 100A. The back face 312A of the substrate 31A is conductively connected to at least one of the electronic components 32A, for example, the electronic component 32A may be attached to the back face 312A of the substrate 31A by means of, but not limited to, attaching, so that the electronic component 32A is conductively connected to the substrate 31A on the back face 312A of the substrate 31A. The front face 311A of the substrate 31A may also be conductively connected to at least one of the electronic components 32A, for example, the electronic component 32A may also be attached to the front face 311A of the substrate 31A by means of, but not limited to, attaching, so that the electronic component 32A is conductively connected to the substrate 31A on the front face 311A of the substrate 31A. Preferably, the molding base 42A can isolate the electronic component 32A from the photosensitive chip 20A that are located on the front face 311A of the substrate 31A. More preferably, the molding base 42A may also embed at least a part of at least one of the electronic components 32A, for example, the molding base 42A may embed all of the electronic components 32A that are located on the front face 311A of the substrate 31A.

Figure 65B:
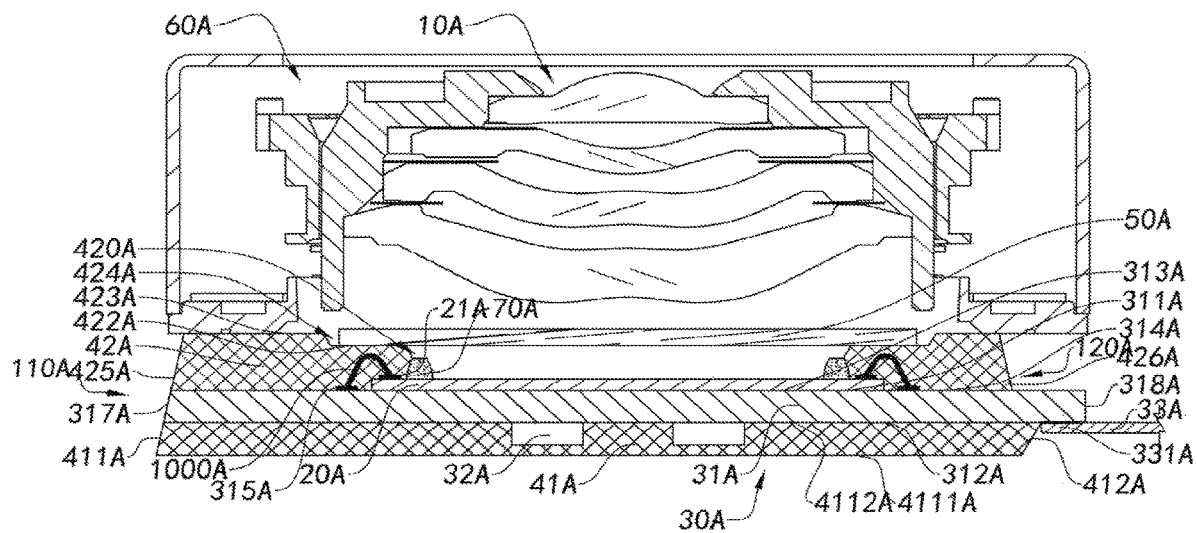
FIG. 65B is a schematic sectional view of another variant implementation of the camera module according to the above preferred embodiment of the present disclosure.

FIG. 65B shows another variant embodiment of the camera module 100A, wherein the circuit board assembly 2000A further comprises at least one frame-shaped supporting element 70A, wherein before the molding process, the supporting element 70A is disposed in the non-photosensitive area of the photosensitive chip 20A or the supporting element 70A is formed in the non-photosensitive area of the photosensitive chip 20A, so that the supporting member 70A protrudes from the photosensitive chip 20A. Therefore, in the molding process, when a clamping operation is performed on the front molding die 600A, the second pressing portion 60121A of the light window molding portion 6012A of the front upper die 601A of the front molding die 600A is directly pressed against the supporting element 70A, such that on one hand, the supporting element 70A can absorb the impact force generated by the front molding die 600A when being subject to the clamping operation so as to prevent the impact force from acting on the photosensitive chip 20A, and on the other hand, the supporting member 70A can prevent, by means of deformation, a gap from forming between the second pressing portion 60121A of the light window molding portion 6012A and the non-photosensitive area of the photosensitive chip 20A so as to prevent the fluid medium 400A from contaminating the photosensitive area of the photosensitive chip 20A and to avoid an undesirable phenomenon of "flash", thereby ensuing good product yield of the camera module 100A. After the molding process is completed, the molding base 42A embeds at least a part of the supporting element 70A. It would be understood that the supporting element 70A can also extend to at least a part of the bonding area 314A of the substrate 30.

Figure 66:
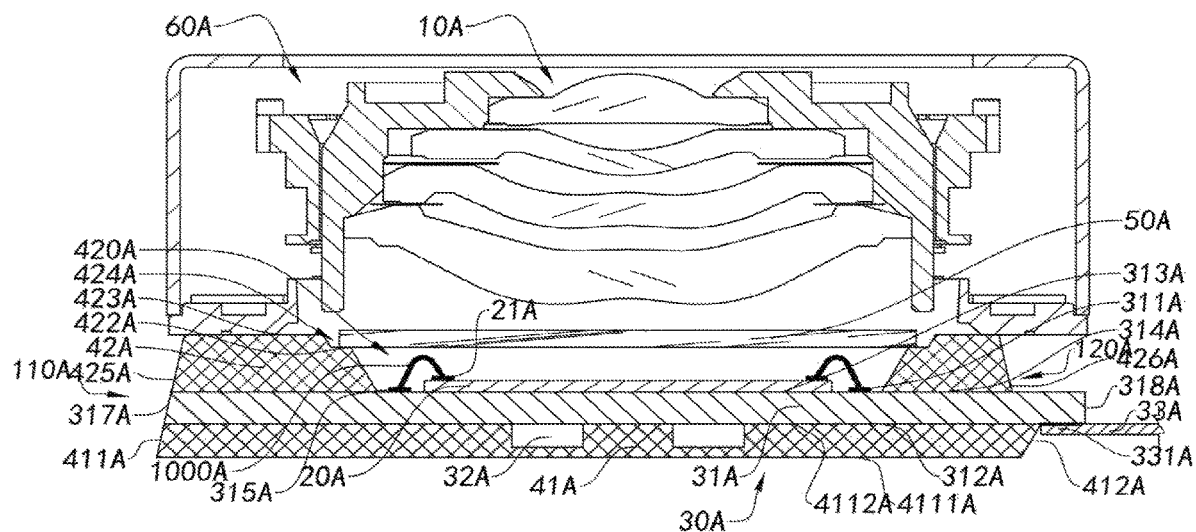
FIG. 66 is a schematic sectional view of another variant implementation of the camera module according to the above preferred embodiment of the present disclosure.

FIG. 66 shows another variant implementation of the camera module 100A. The molding base 42A of the molding unit 40A may not embed the non-photosensitive area of the photosensitive chip 20A. Specifically, in this specific example of the camera module 100A, the molding base 42A of the molding unit 40A is integrally bonded only to at least a part of the bonding area 314A of the substrate 31A, wherein the photosensitive chip 20A may be attached to the attaching area 313A of the substrate 31A before the molding base 42A is molded, or the photosensitive chip 20A may be attached to the attaching area 313A of the substrate 31A through the light window 420A of molding base 42A after the molding base 42A is molded.

Figure 67:
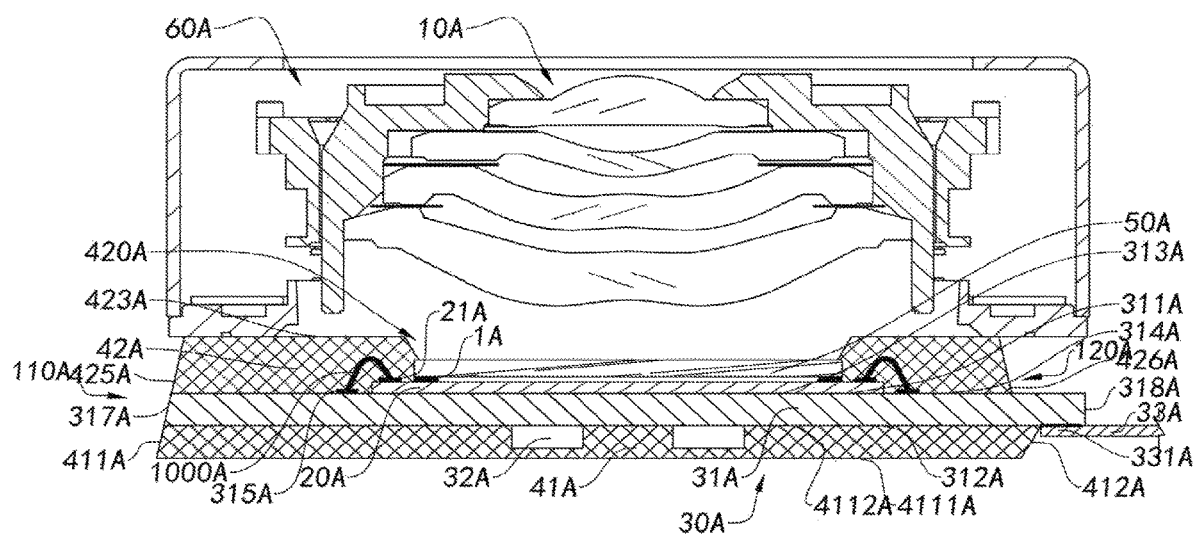
FIG. 67 is a schematic sectional view of another variant implementation of the camera module according to the above preferred embodiment of the present disclosure.

FIG. 67 shows another variant implementation of the camera module 100A. Before the molding process, the filtering element 50A may be disposed on the photosensitive chip 20A in an overlapping manner, and then, after the molding process is completed, the molding base 42A may embed an outer edge of the filtering element 50A, so that the molding base 42A, the substrate 31A, the photosensitive chip 20A, the filtering element 50A, and the back molding portion 41A are bonded integrally. Preferably, a frame-shaped buffering portion 1A is disposed between the filtering element 50A and the photosensitive chip 20A for isolating the filtering element 50A from the photosensitive chip 20A, thereby preventing the filtering element 50A from directly contacting the photosensitive chip 20A. For example, at least a part of the non-photosensitive area of the photosensitive chip 20A may be firstly applied with, but not limited to, a substance such as resin or glue, and then, the filtering element 50A is disposed on the photosensitive chip 20A in an overlapping manner, and the substance such as resin or glue that is applied in at least a part of the non-photosensitive area of the photosensitive chip 20A may form the buffering portion 1A that is held between the filtering element 50A and the photosensitive chip 20A. It can be understood that it is also possible to form the buffering portion 1A on the filtering element 50A firstly, and then, to dispose the filtering element 50A on the photosensitive chip 20A in an overlapping manner. Preferably, the buffering portion 1A is elastic.

Figure 68:
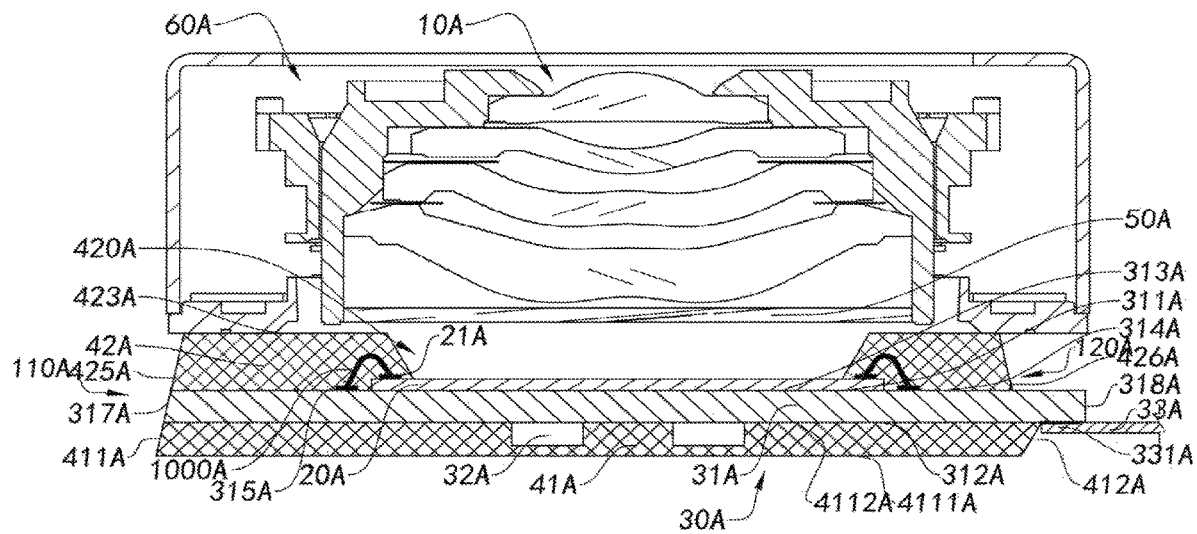
FIG. 68 is a schematic sectional view of another variant implementation of the camera module according to the above preferred embodiment of the present disclosure.

FIG. 68 shows another variant implementation of the camera module 100A. The filtering element 50A is attached to the optical lens 10A, so that the filtering element 50A is held between the optical lens Between 10A and the photosensitive chip 20A.

Figure 69:
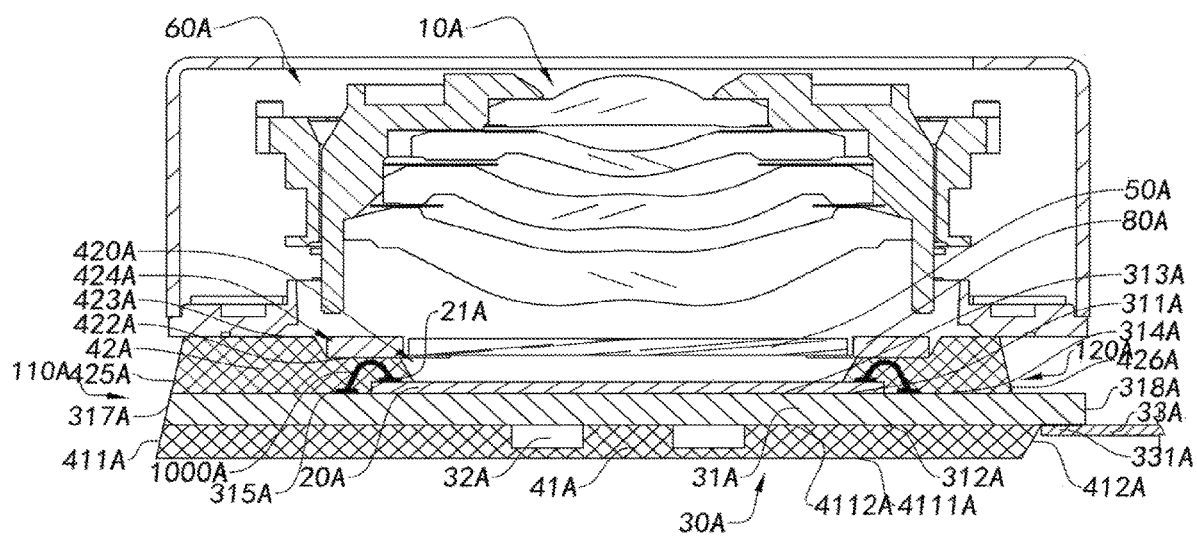
FIG. 69 is a schematic sectional view of another variant implementation of the camera module according to the above preferred embodiment of the present disclosure.

FIG. 69 shows another variant implementation of the camera module 100A. The camera module 100A further comprises at least one frame-shaped bracket 80A, wherein the filtering element 50A may be attached to the bracket 80A firstly, and then, the bracket 80A is attached to the top surface of the molding base 42A, for example, the bracket 80A may be attached to the inner surface 422A of the molding base 42A so as to enable the bracket 80A to be accommodated in the attaching groove 424A, so that the filtering element 50A is held between the optical lens 10A and the photosensitive chip 20A. In the above manner, the size of the filtering element 50A can be reduced, thereby reducing the manufacturing cost of the camera module 100A.

Figure 70:
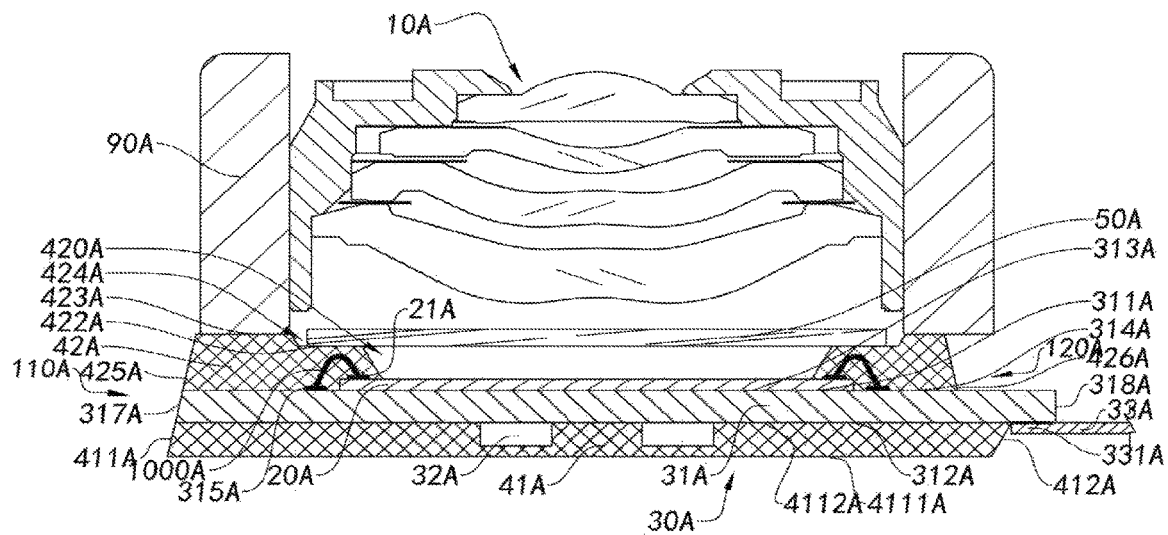
FIG. 70 is a schematic sectional view of another variant implementation of the camera module according to the above preferred embodiment of the present disclosure.

FIG. 70 shows another variant implementation of the camera module 100A. The camera module 100A further comprises at least one lens tube 90A, wherein the optical lens 10A is assembled in the lens tube 90A, and the lens tube 90A may be attached to the molding base 42A, so that the optical lens 10A is held in the photosensitive path of the photosensitive chip 20A. That is, the camera module 100A may be a fixed focus camera module.

Figure 71:
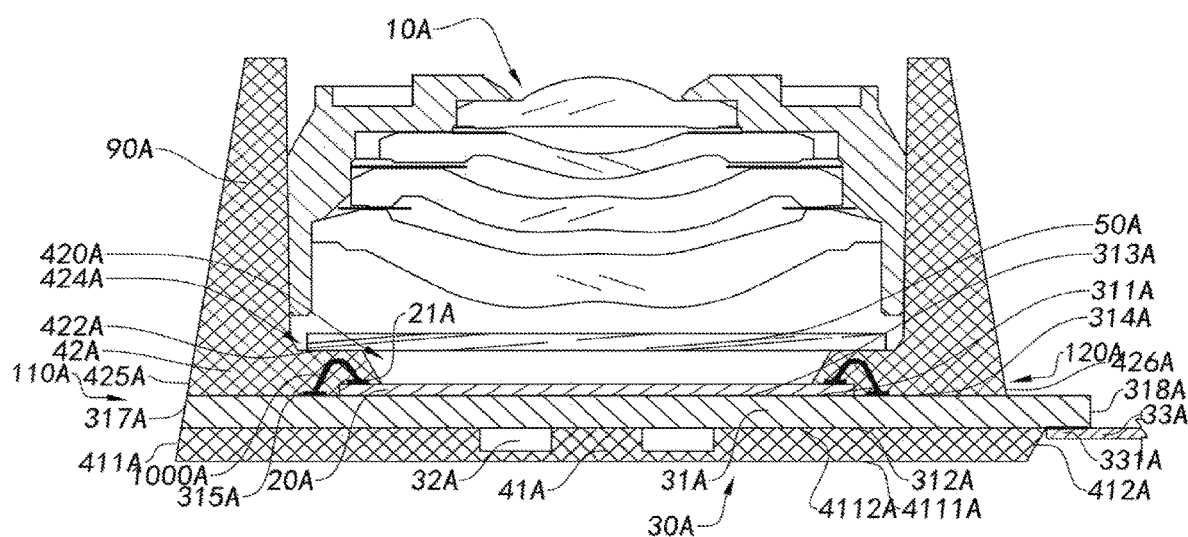
FIG. 71 is a schematic sectional view of another variant implementation of the camera module according to the above preferred embodiment of the present disclosure.

In another variant implementation of the camera module 100A shown in FIG. 71, the lens tube 90A may also integrally extend over the molding base 42A, that is, the molding base 42A and the lens tube 90A may be formed integrally by a molding process.

Figure 72:
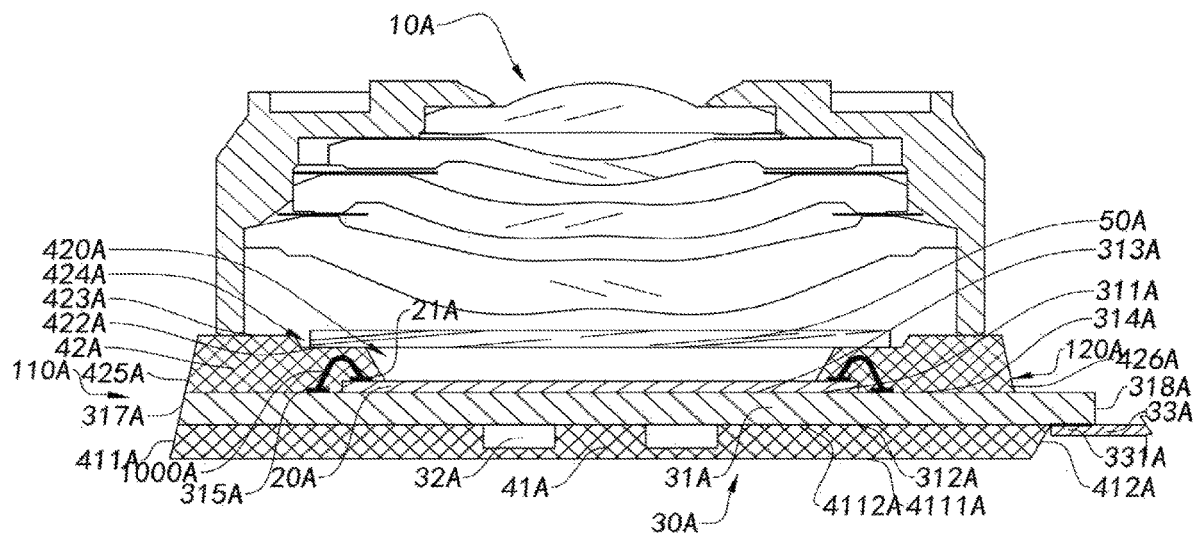
FIG. 72 is a schematic sectional view of another variant implementation of the camera module according to the above preferred embodiment of the present disclosure.

In another variant implementation of the camera module 100A shown in FIG. 72, the optical lens 10A may also be directly attached to the top surface of the molding base 42A, so that the optical lens 10A is held in the photosensitive path of the photosensitive chip 20A.

Figure 73:
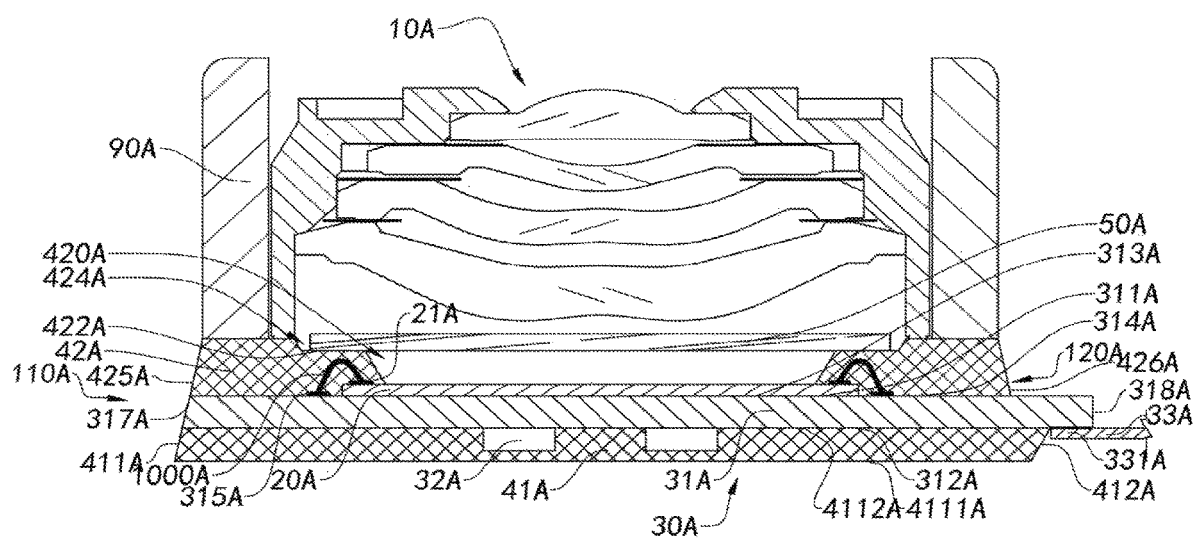
FIG. 73 is a schematic sectional view of another variant implementation of the camera module according to the above preferred embodiment of the present disclosure.

In another variant implementation of the camera module 100A shown in FIG. 73, after the optical lens 10A is directly attached to the top surface of the molding base 42A, the lens tube 90A may also be attached to the top surface of the molding base 42A so that the lens tube 90A surrounds the outside of the optical lens 10A to protect the optical lens 10A from collision via the lens tube 90A, thereby further ensuring the reliability of the camera module 100A. Alternatively, the lens tube 90A may also integrally extend over the top surface of the molding base 42A.

Figure 74:
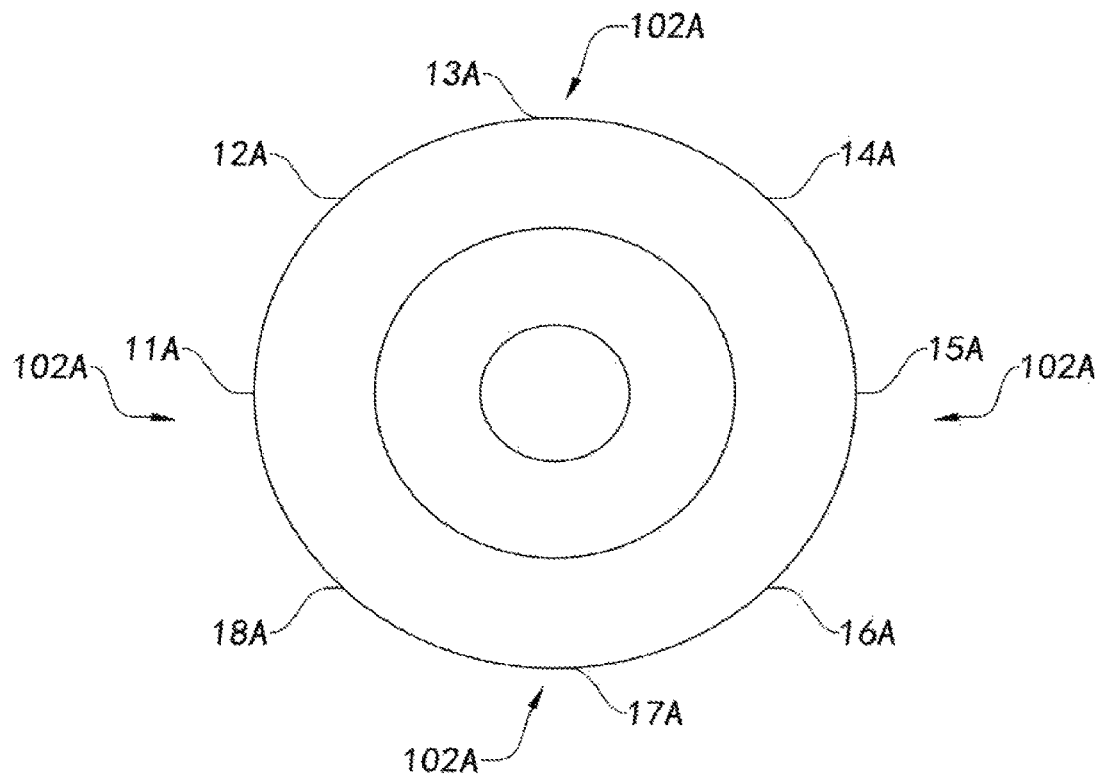
FIG. 74 is a schematic top view of an implementation of an optical lens of the camera module according to the above preferred embodiment of the present disclosure.

FIG. 74 shows a top view of an implementation of the optical lens 10A of the camera module 100A, wherein the optical lens 10A is in the shape of a circle in a top view. Specifically, the optical lens 10A has a first lens side face 11A, a second lens side face 12A, a third lens side face 13A, a fourth lens side face 14A, a fifth lens side face 15A, a sixth lens side face 16A, a seventh lens side face 17A, and an eighth lens side face 18A, wherein in the example of the optical lens 10A shown in FIG. 74, the first lens side face 11A, the second lens side face 12A, the third lens side face 13A, the fourth lens side face 14A, the fifth lens side face 15A, the sixth lens side face 16A, the seventh lens side face 17A, and the eighth lens side face 18A are curved faces respectively and connected to each other in an end-to-end manner, and form a circle. Moreover, the optical lens 10A forms a curved side 102A at positions corresponding to the first lens side face 11A and the second lens side face 12A, the third lens side face 13A and the fourth lens side face 14A, the fifth lens side face 15A and the sixth lens side face 16A as well as the seventh lens side face 17A and the eighth lens side face 18A, respectively. That is, the optical lens 10A has four curved sides 102A.

Figure 75:
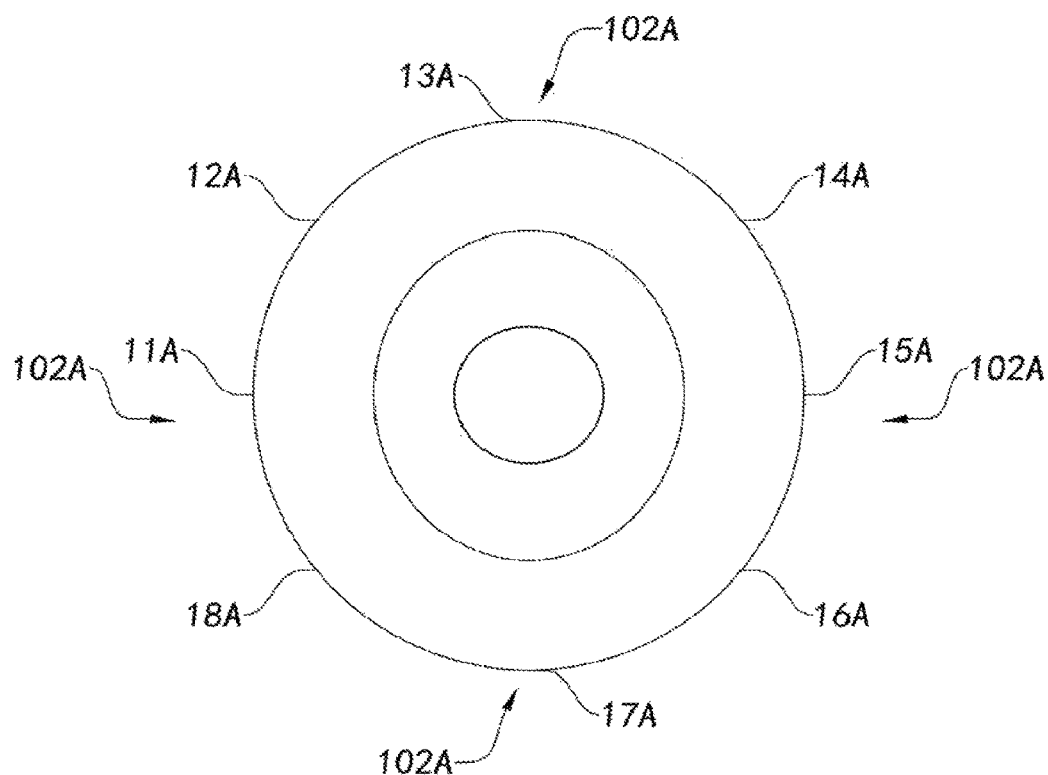
FIG. 75 is a schematic top view of a variant implementation of the optical lens of the camera module according to the above preferred embodiment of the present disclosure.

FIG. 75 shows a top view of a variant implementation of the optical lens 10A of the camera module 100A, wherein the first lens side face 11A, the second lens side face 12A, the third lens side face 13A, the fourth lens side face 14A, the fifth lens side face 15A, the sixth lens side face 16A, the seventh lens side face 17A, and the eighth lens side face 18A are curved faces respectively and connected to each other in an end-to-end manner and form an oval. Moreover, the optical lens 10A forms a curved side 102A at positions corresponding to the first lens side face 11A and the second lens side face 12A, the third lens side face 13A and the fourth lens side face 14A, the fifth lens side face 15A and the sixth lens side face 16A as well as the seventh lens side face 17A and the eighth lens side face 18A, respectively. That is, the optical lens 10A has four curved sides 102A.

Figure 76:
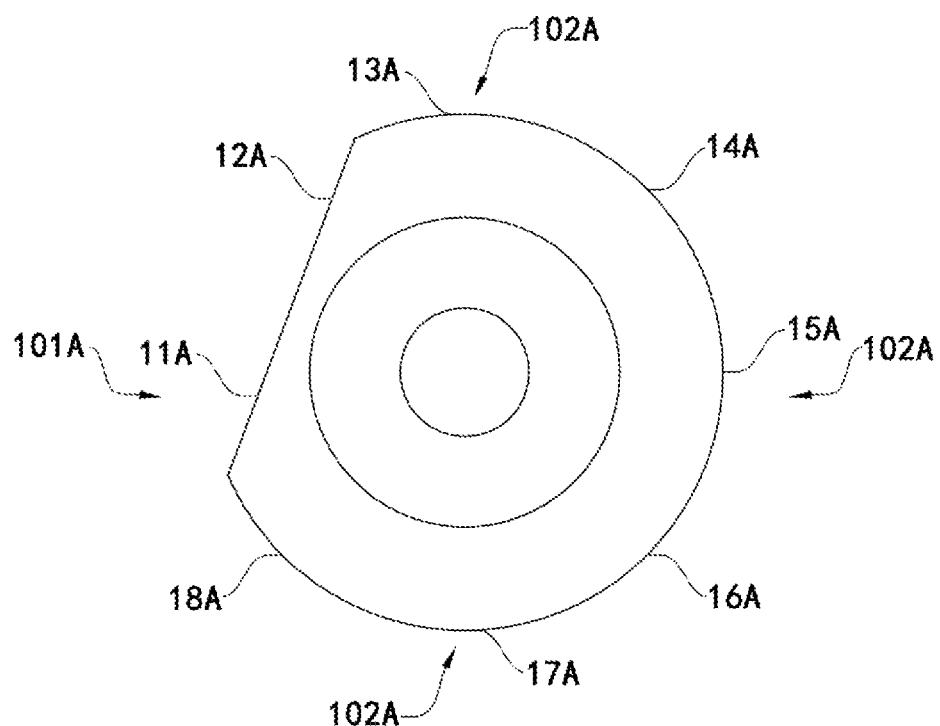
FIG. 76 is a schematic top view of another variant implementation of the optical lens of the camera module according to the above preferred embodiment of the present disclosure.

FIG. 76 shows a top view of a variant implementation of the optical lens 10A of the camera module 100A, wherein the first lens side face 11A and the second lens side face 12A are planes respectively, and the plane where the first lens side face 11A is located and the plane where the second lens side face 12A is located are the same plane, so that the optical lens 10A forms one planar side 101A at a position corresponding to the first lens side face 11A and the second lens side face 12A, wherein the third lens side face 13A, the fourth lens side face 14A, the fifth lens side face 15A, the sixth lens side face 16A, the seventh lens side face 17A, and the eighth lens side face 18A are curved faces respectively, so that the optical lens 10A forms the curved side 102A at a position corresponding to the third lens side face 13A, the fourth lens side face 14A, the fifth lens side face 15A, the sixth lens side face 16A, the seventh lens side face 17A, and the eighth lens side face 18A. That is, the optical lens 10A has one planar side 101A and three curved sides 102A.

Figure 77:
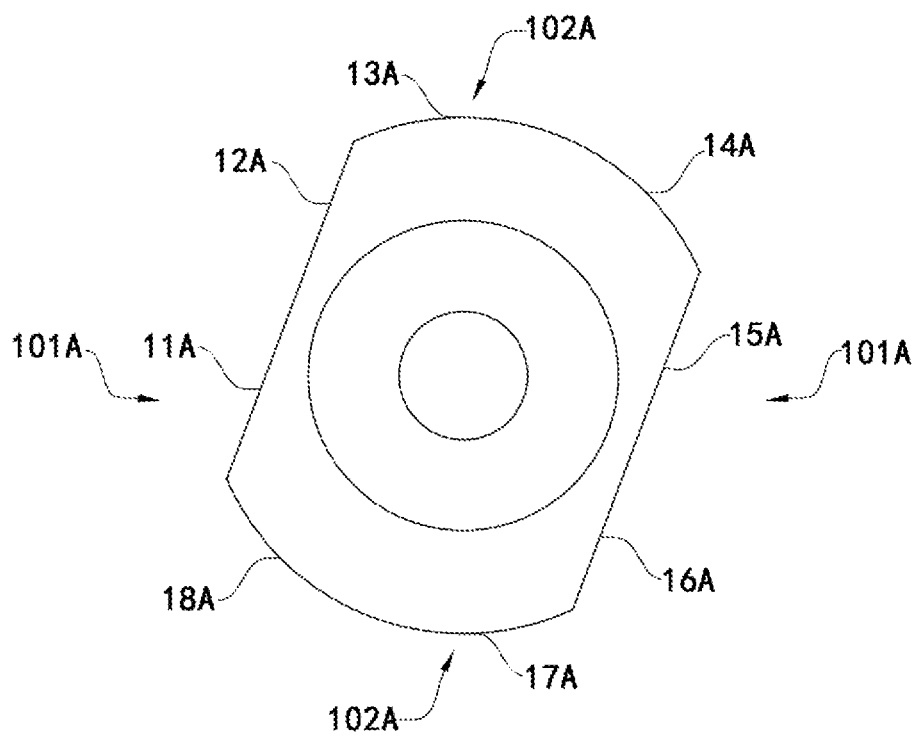
FIG. 77 is a schematic top view of another variant implementation of the optical lens of the camera module according to the above preferred embodiment of the present disclosure.

FIG. 77 shows a top view of another variant implementation of the optical lens 10A of the camera module 100A, wherein the first lens side face 11A and the second lens side face 12A are planes respectively, and the plane where the first lens side face 11A is located and the plane where the second lens side face 12A is located are the same plane, so that the optical lens 10A forms the planar side 101A at a position corresponding to the first lens side face 11A and the second lens side face 12A, wherein the fifth lens side face 15A and the sixth lens side face 16A are planes respectively, and the plane where the fifth lens side face 15A is located and the plane where the sixth lens side face 16A is located are the same plane, so that the optical lens 10A forms the planar side 101A at a position corresponding to the fifth lens side face 15A and the sixth lens side face 16A, wherein the third lens side face 13A and the fourth lens side face 14A as well as the seventh lens side face 17A and the eighth lens side face 18A are curved faces respectively, so that the optical lens 10A forms the curved side 102A at a position corresponding to the third lens side face 13A and the fourth lens side face 14A and forms the curved side 102A at a position corresponding to the seventh lens side face 17A and the eighth lens side face 18A. That is, the optical lens 10A has two planar sides 101A and two curved sides 102A, wherein two planar sides 101A of the optical lens 10A are symmetrical with each other, and two curved sides 102A are symmetrical with each other.

Figure 78:
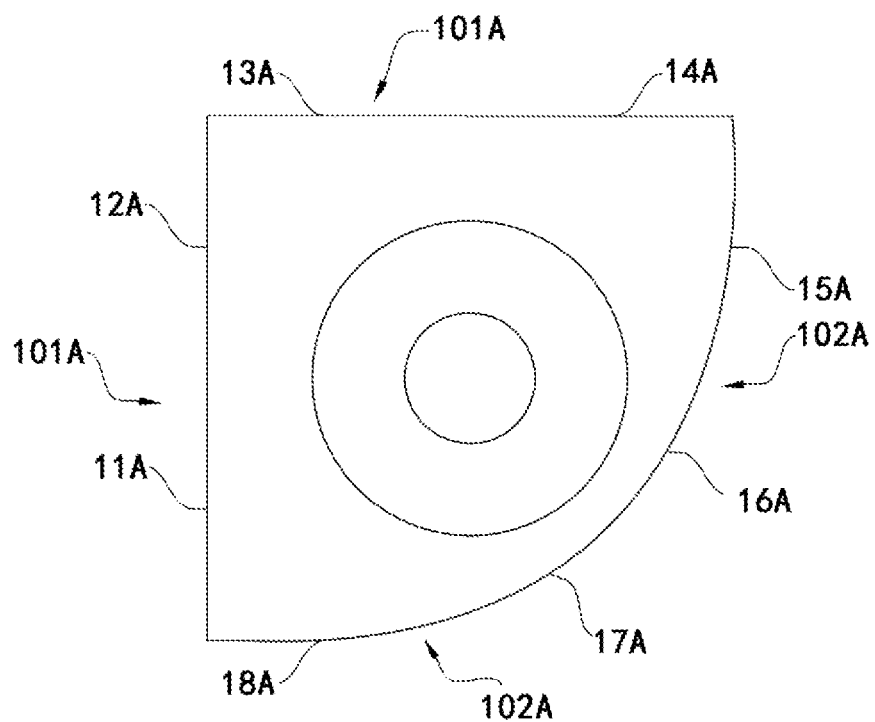
FIG. 78 is a schematic top view of another variant implementation of the optical lens of the camera module according to the above preferred embodiment of the present disclosure.

FIG. 78 shows a top view of another variant implementation of the optical lens 10A of the camera module 100A, wherein the first lens side face 11A, the second lens side face 12A, the third lens side face 13A, and the fourth lens side face 14A are planes respectively, and the plane where the first lens side face 11A is located and the plane where the second lens side face 12A is located are the same plane, the plane where the third lens side face 13A is located and the plane where the fourth lens side face 14A is located are the same plane, so that the optical lens 10A forms the planar side 101A at a position corresponding to the first lens side face 11A and the second lens side face 12A and at a position corresponding to the third lens side face 13A and the fourth lens side face 14A respectively, and the second lens side face 12A and the third lens side face 13A are perpendicular to each other, wherein the fifth lens side face 15A and the sixth lens side face 16A as well as the seventh lens side face 17A and the eighth lens side face 18A are curved faces respectively, so that the optical lens 10A forms the curved side 102A at a position corresponding to the fifth lens side face 15A and the sixth lens side face 16A and forms the curved side 102A at a position corresponding to the seventh lens side face 17A and the eighth lens side face 18A. That is, the optical lens 10A has two planar sides 101A and two curved sides 102A, wherein two planar sides 101A are adjacent, and two curved sides 102A are adjacent.

Figure 79:
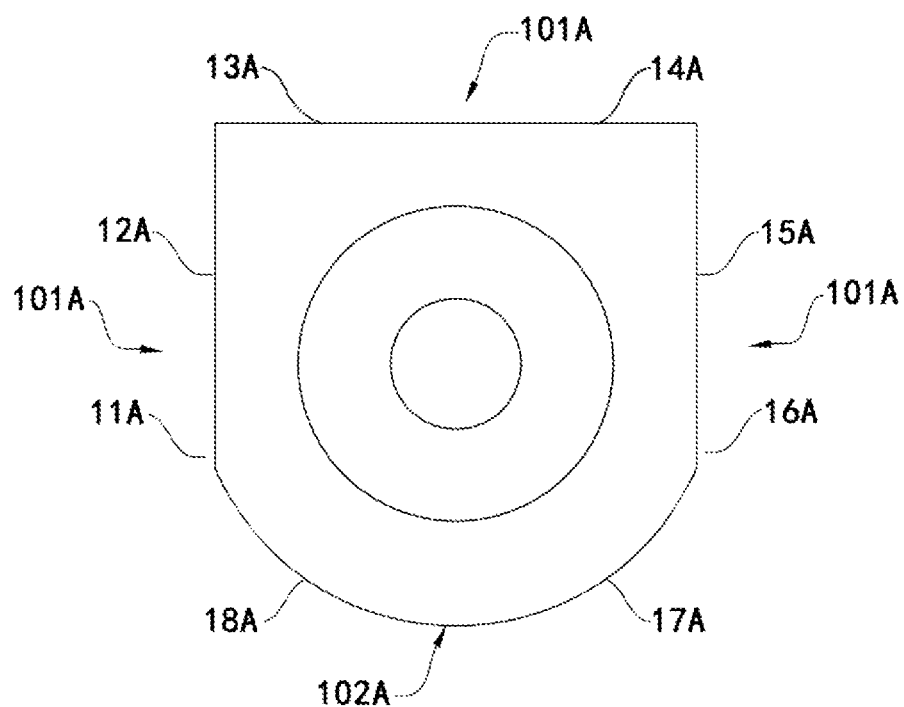
FIG. 79 is a schematic top view of another variant implementation of the optical lens of the camera module according to the above preferred embodiment of the present disclosure.

FIG. 79 shows a top view of another variant implementation of the optical lens 10A of the camera module 100A, wherein the first lens side face 11A, the second lens side face 12A, the third lens side face 13A, the fourth lens side face 14A, the fifth lens side face 15A, and the sixth lens side face 16A are planes respectively, and the plane where the first lens side face 11A is located and the plane where the second lens side face 12A is located are the same plane, the plane where the third lens side face 13A is located and the plane where the fourth lens side face 14A is located are the same plane, and the plane where the fifth lens side face 15A is located and the plane where the sixth lens side face 16A is located are the same plane, wherein the second lens side face 12A is perpendicular to the third lens side face 13A, and the fourth lens side face 14A is perpendicular to the fifth lens side face 15A, so that the optical lens 10A forms the planar side 101A at a position corresponding to the first lens side face 11A and the second lens side face 12A, at a position corresponding to the third lens side face 13A and the fourth lens side face 14A and at a position corresponding to the fifth lens side face 15A and the sixth lens side face 16A respectively, wherein the seventh lens side face 17A and the eighth lens side face 18A are curved faces respectively, so that the optical lens 10A forms the curved side 102A at a position corresponding to the seventh lens side face 17A and the eighth lens side face 18A. That is, the optical lens 10A has three planar sides 101A and one curved side 102A.

Figure 80:
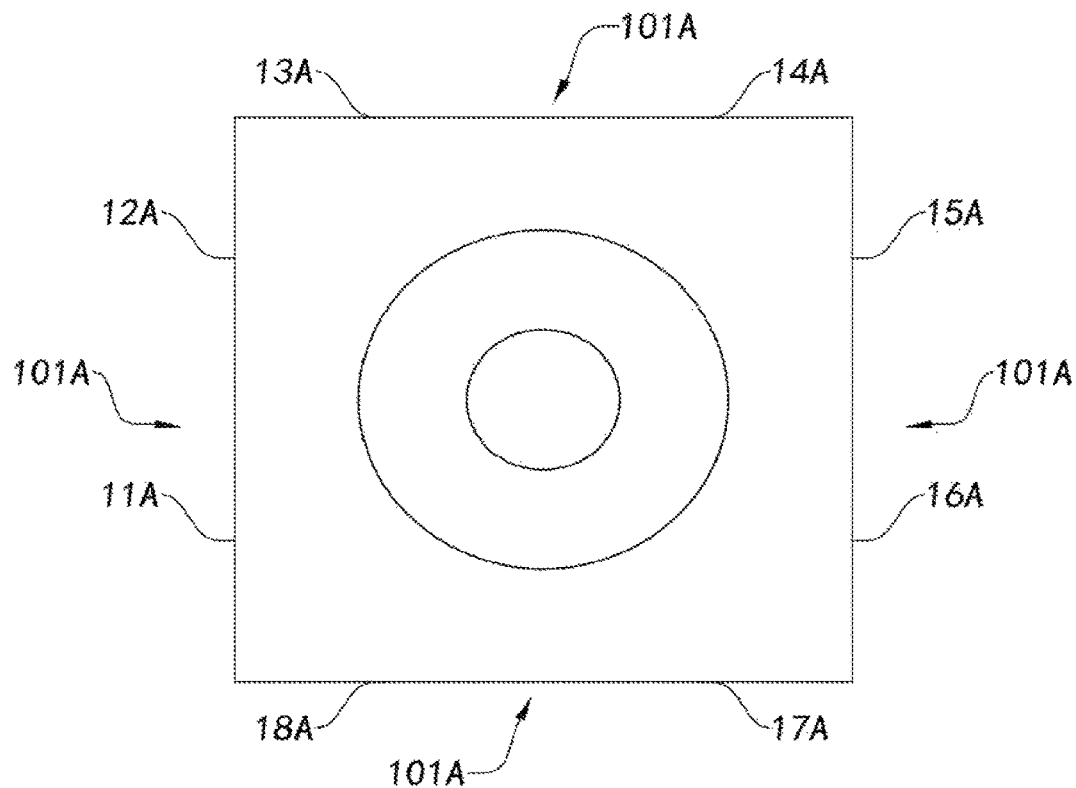
FIG. 80 is a schematic top view of another variant implementation of the optical lens of the camera module according to the above preferred embodiment of the present disclosure.

FIG. 80 shows a top view of another variant implementation of the optical lens 10A of the camera module 100A, wherein the first lens side face 11A, the second lens side face 12A, the third lens side face 13A, the fourth lens side face 14A, the fifth lens side face 15A, the sixth lens side face 16A, the seventh lens side face 17A, and the eighth lens side face 18A are planes respectively, and the plane where the first lens side face 11A is located and the plane where the second lens side face 12A is located are the same plane, the plane where the third lens side face 13A is located and the plane where the fourth lens side face 14A is located are the same plane, the plane where the fifth lens side face 15A is located and the plane where the sixth lens side face 16A is located are the same plane, and the plane where the seventh lens side face 17A is located and the plane where the eighth lens side face 18A is located are the same plane, wherein the second lens side face 12A is perpendicular to the third lens side face 13A, the fourth lens side face 14A is perpendicular to the fifth lens side face 15A, the sixth lens side face 16A is perpendicular to the seventh lens side face 17A, and the eighth lens side face 18A is perpendicular to the first lens side face 11A, so that the optical lens 10A forms the planar side 101A at a position corresponding to the first lens side face 11A and the second lens side face 12A, at a position corresponding to the third lens side face 13A and the fourth lens side face 14A, at a position corresponding to the fifth lens side face 15A and the sixth lens side face 16A, and at a position corresponding to the seventh lens side face 17A and the eighth lens side face 18A respectively. That is, the optical lens 10A has four planar sides 101A.

Figure 81:
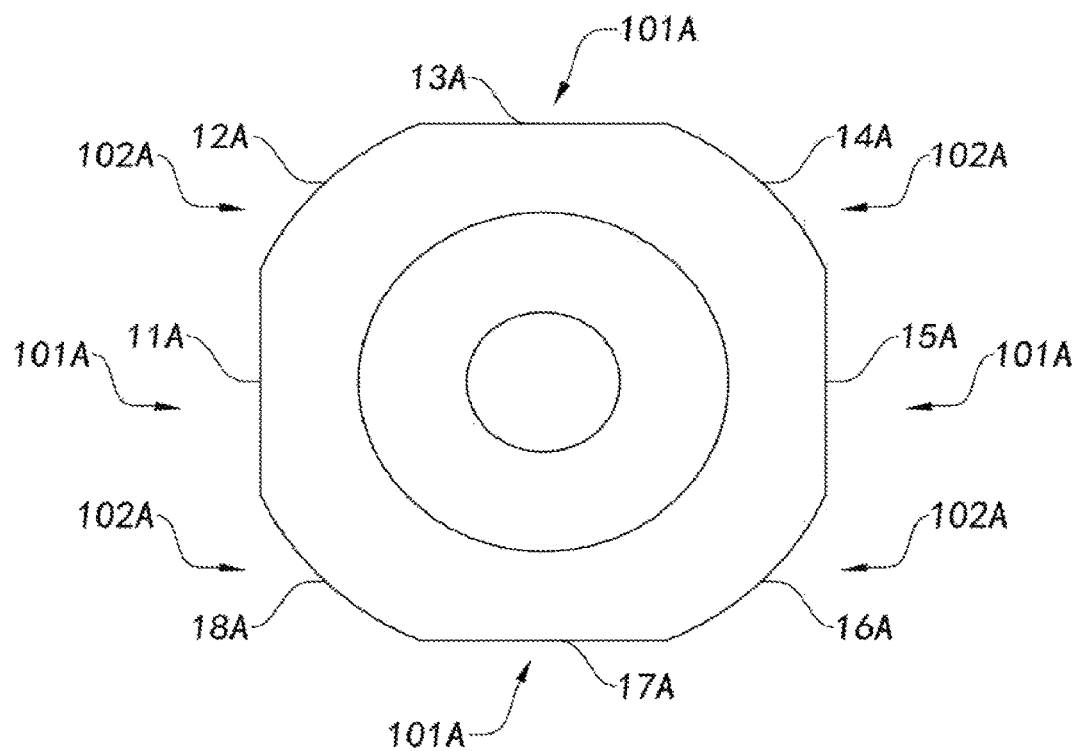
FIG. 81 is a schematic top view of another variant implementation of the optical lens of the camera module according to the above preferred embodiment of the present disclosure.

FIG. 81 shows a top view of another variant implementation of the optical lens 10A of the camera module 100A, wherein the first lens side face 11A, the third lens side face 13A, the fifth lens side face 15A, and the seventh lens side face 17A are planes respectively, so that the optical lens 10A forms the planar side 101A at a position corresponding to the first lens side face 11A, the third lens side face 13A, the fifth lens side face 15A and the seventh lens side face 17A respectively, wherein the first lens side face 11A and the fifth lens side face 15A are symmetrical with each other, and the third lens side face 13A and the seventh lens side face 17A are symmetrical with each other, wherein the second lens side face 12A, the fourth lens side face 14A, the sixth lens side face 16A, and the eighth lens side face 18A are curved faces respectively, so that the optical lens 10A forms the curved side 102A at positions corresponding to the second lens side face 12A, the fourth lens side face 14A, the sixth lens side face 16A, and the eighth lens side face 18A respectively, wherein the second lens side face 12A and the sixth lens side face 16A are symmetrical with each other, and the fourth lens side face 14A and the eighth lens side face 18A are symmetrical with each other. That is, the optical lens 10A has four planar sides 101A and four curved sides 102A, and each of the planar sides 101A and each of the curved sides 102A are spaced apart from each other. In other words, there is one curved side 102A between two adjacent planar sides 101A, and there is one planar side 101A between two adjacent curved sides 102A.

Figure 92A:
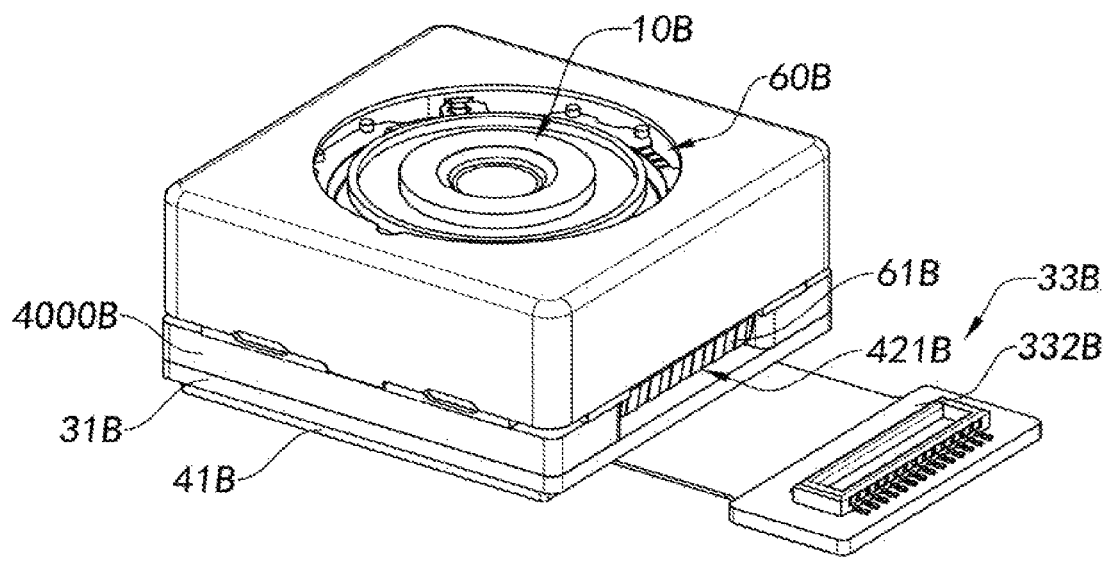
FIG. 92A is a stereoscopic schematic diagram of a angle of view of the camera module according to the above preferred embodiment of the present disclosure.
Figure 92B:
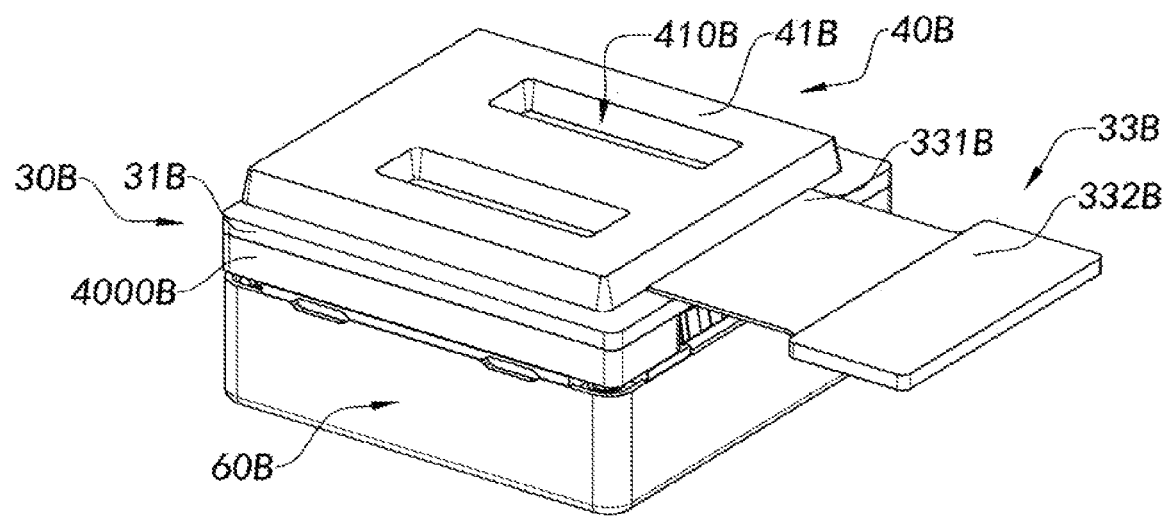
FIG. 92B is a stereoscopic schematic diagram of another angle of view of the camera module according to the above preferred embodiment of the present disclosure.
Figure 93:
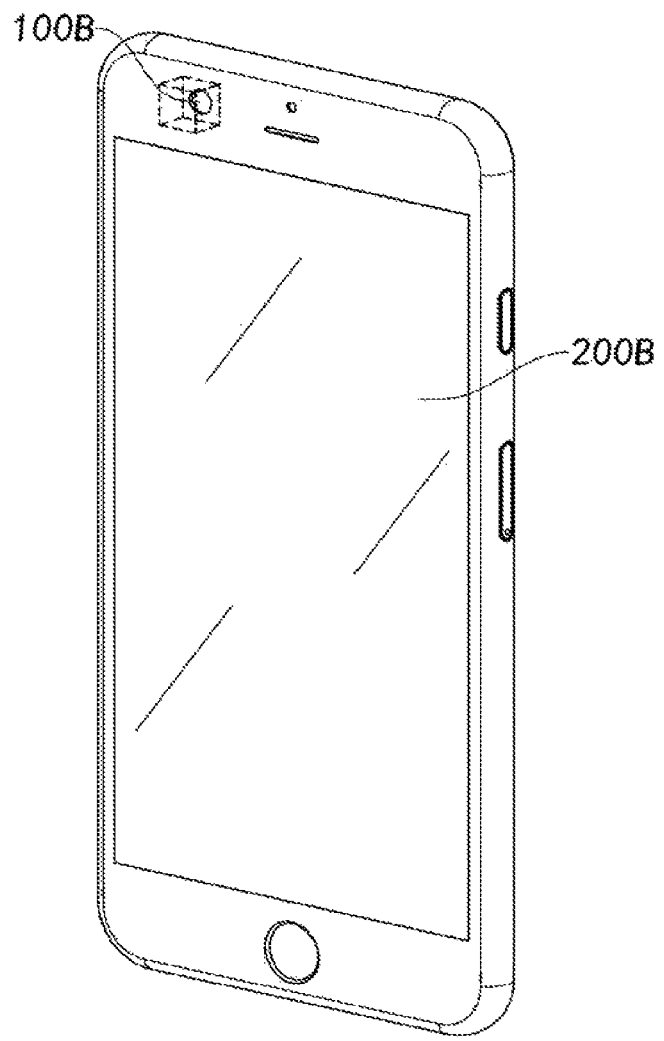
FIG. 93 is a stereoscopic schematic diagram of an application state of the camera module according to the above preferred embodiment of the present disclosure.

With reference to FIG. 82 to FIG. 93 of the accompanying drawings of the present disclosure, a camera module 100B and an application of the camera module 100B according to a preferred embodiment of the present disclosure is set forth in the following description, wherein at least one of the camera modules 100B can be mounted on a device body 200B so that the camera module 100B and the device body 200B can form an electronic device, with reference to FIG. 93.

In other words, the electronic device comprises the device body 200B and at least one of the camera modules 100B disposed in the device body 200B, wherein the camera module 100B can be configured to acquire images (such as video or images).

It is worth mentioning that, although in the example of the electronic device shown in FIG. 93, the camera module 100B is disposed on the back side of the device body 200B (the side opposite to a display screen of the device body 200B), it can be understood that the camera module 100B can also be disposed on the front side of the device body 200B (the side where the display screen of the device body 200B is located), or at least one of the camera modules 100B is disposed on the back side of the device body 200B and at least one of the camera modules 100B is disposed on the front side of the device body 200B, that is, at least one of the camera modules 100B is provided on the back side and the front side of the device body 200B. Nonetheless, it can be understood by those skilled in the art that in other examples of the electronic device, it is also possible to have one or more of the camera modules 100B disposed on the side face of the device body 200B.

In addition, although the device body 200B of the electronic device illustrated in FIG. 93 is a smart phone, in other examples, the device body 200B may also be implemented as, but not limited to, a tablet, an electronic book, an MP3/4/5, a personal digital assistant, a camera, a television, a washing machine, a refrigerator, and any electronic product that can be configured with the camera module 100B.

Figure 91:
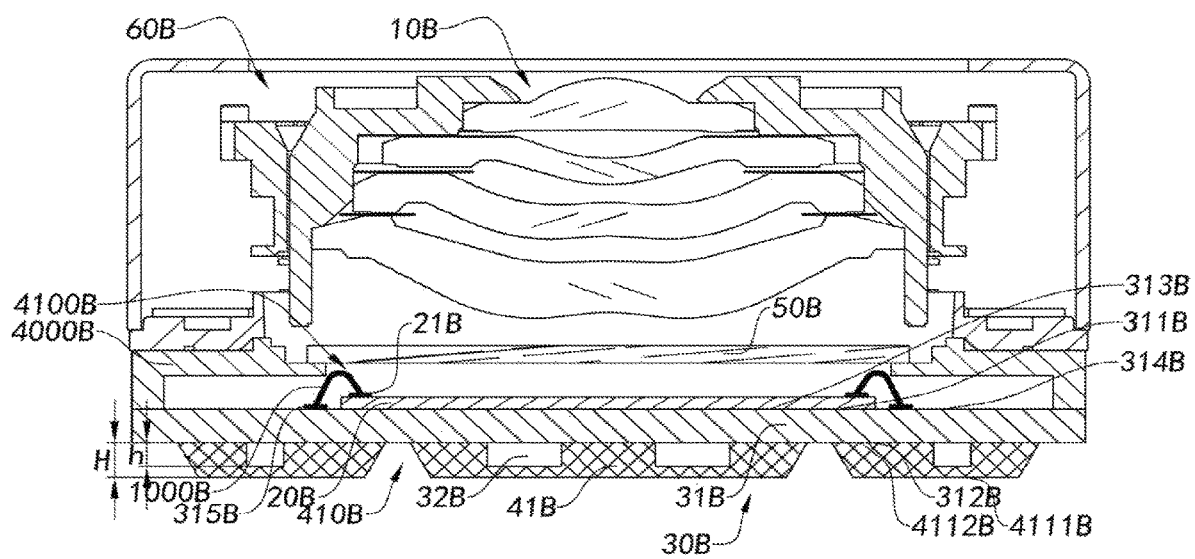
FIG. 91 is a schematic diagram of an internal structure of the camera module taken along an intermediate position according to the above preferred embodiment of the present disclosure.

FIG. 91 is a schematic diagram showing the internal structure of the camera module 100B taken along the intermediate position, and FIG. 92A and FIG. 92B respectively show the stereoscopic state of the camera module 100B from different perspectives. Specifically, the camera module 100B comprises at least one optical lens 10B, at least one photosensitive chip 20B, and a circuit board 30B, wherein the photosensitive chip 20B is conductively connected to the circuit board 30B, the optical lens 10B is held in the photosensitive path of the photosensitive chip 20B.

The light reflected by the object enters the interior of the camera module 100B from the optical lens 10B, and then is received by the photosensitive chip 20B and imaged after photoelectric conversion. Electrical signals related to the image of an object obtained by the photoelectric conversion of the photosensitive chip 20B can be transmitted by the circuit board 30B, for example, the circuit board 30B can transmit the electrical signals related to the image of the object to the device body 200B that is connected to the circuit board 30B. That is, the circuit board 30B can be conductively connected to the device body 200B to mount the camera module 100B to the device body 200B to form the electronic device.

Further, with reference to FIG. 91, the circuit board 30B comprises a substrate 31B and at least one electronic component 32B, wherein each of the electronic components 32B is conductively connected to the substrate 31B, respectively.

Specifically, the substrate 31B has a front face 311B and a back face 312B. Generally, the substrate 31B is plate-like, and the front face 311B and the back face 312B of the substrate 31B are parallel to each other, so that the distance between the front face 311B and the back face 312B of the substrate 31B can be used to define the thickness of the substrate 31B.

Nonetheless, it can be understood by those skilled in the art that in other examples of the camera module 100B of the present disclosure, at least one of the front face 311B and the back face 312B of the substrate 31B may be provided with a convex structure or a groove, and the camera module 100B of the present disclosure is not limited in this respect.

It is worth mentioning that the type of the substrate 31B is also not limited in the camera module 100B of the present disclosure. For example, the substrate 31B can be selected but not limited to a hard plate, a soft plate, and a soft and hard plate, a ceramic plate, etc.

Further, at least one of the electronic components 32B is conductively connected to the substrate 31B on the back face 312B of the substrate 31B. Preferably, in this specific example of the camera module 100B of the present disclosure, all of the electronic components 32B may be conductively connected to the substrate 31B on the back face 312B of the substrate 31B. In this manner, the front face 311B of the substrate 31B does not need to reserve a position for connecting the electronic component 32B, thereby facilitating reducing the length and width of the camera module 100B.

It is worth mentioning that the type of the electronic component 32B is not limited in the camera module 100B of the present disclosure. For example, the electronic component 32B can be implemented as, but not limited to, a processor, a relay, a memory, a driver, a resistor, a capacitor, etc.

In a specific example of the camera module 100B of the present disclosure, the electronic component 32B can be attached to the back face 312B of the substrate 31B, so that the electronic component 32B is conductively connected to the substrate 31B on the back face 312B of the substrate 31B.

In another specific example of the camera module 100B of the present disclosure, the electronic component 32B may also be half-embedded in the substrate 31B on the back face 312B of the substrate 31B, so that the electronic component 32B is be conductively connected to the substrate 31B, that is, a part of the electronic component 32B is exposed on the back face 312B of the substrate 31B. In this manner, the height of the camera module 100B can be further reduced. Alternatively, the electronic component 32B may also be entirely embedded inside the substrate 31B.

In addition, the circuit board 30B may further comprise a connection plate 33B, wherein the connection plate 33B has a mold connection side 331B and a device connection side 332B, and the module connection side 331B of the connection plate 33B is connected to the substrate 31B. For example, the module connection side 331B of the connection plate 33B may be connected to the front face 311B of the substrate 31B, or the module connection side 331B of the connection plate 33B may be connected to the back face 312B of the substrate 31B. Also, the manner in which the module connection side 331B of the connection plate 33B is connected to the substrate 31B is not limited. For example, the module connection side 331B of the connection plate 33B and the substrate 31B may be connected by, but are not limited to, conductive glue.

Nonetheless, it can be understood by those skilled in the art that the module connection side 331B of the substrate 31B is connected to the side face of the substrate 31B, or it is possible that the module connection side 331B of the substrate 31B and the substrate 31B are integrally formed. The device connection side 332B of the connection plate 33B can be connected to the device body 200B, for example, the device connection side 332B of the connection plate 33B can be provided or formed with a connector for being connected to the device body 200B.

Generally, the connection plate 33B can be deformed, so that the connection plate 33B can buffer, in a manner of deformation, the mounting displacement and deformation caused by the manufacturing tolerance of the camera module 100B and ensure the displacement of the camera module 100B caused by the vibration of the electronic device during usage, thereby ensuring the reliability of the electronic device when it is used.

The photosensitive chip 20B is attached to the front face 311B of the substrate 31B, and the photosensitive chip 20B is conductively connected to the substrate 31B.

Specifically, the substrate 31B has at least one attaching area 313B and at least one bonding area 314B, wherein the attaching area 313B and the bonding area 314B are both formed on the front face 311B of the substrate 31B. Generally, the attaching area 313B of the substrate 31B is located in the center, and the bonding area 314B surrounds the attaching area 313B. For example, in a specific example of the camera module 100B shown in FIG. 91, the attaching area 313B of the substrate 31B is located at a center of the front face 311B of the substrate 31B, and the bonding area 314B of the substrate 31B is located at outer portion of the front face 311B of the substrate 31B, and the bonding area 314B surrounds the attaching area 313B. The photosensitive chip 20B is attached to the attaching area 313B of the substrate 31B.

It can be understood by those skilled in the art that, in contrast to the traditional arrangement of electronic components along the periphery of a photosensitive chip, in the camera module 100B of the present disclosure, the photosensitive chip 20B and the electronic components 32B may correspond to each other in the height direction, that is, the photosensitive chip 20B and at least a part of at least one of the electronic components 32B may overlap when viewed from a top view, in such a manner that the bonding area 314B of the substrate 31B does not need to be reserved as an attaching position for attaching the electronic component 32B, so that the area of the bonding area 314B of the substrate 31B can be further reduced, that is, the attaching area 313B of the substrate 31B can occupy a larger proportion of the front face 311B of the substrate 31B. In this manner, the length and width of the camera module 100B can be further reduced.

In addition, the manner in which the photosensitive chip 20B and the substrate 31B are connected is not limited in the camera module 100B of the present disclosure. For example, the photosensitive chip 20B has at least one chip connector 21B, and the substrate 31B has at least one substrate connector 315B. In one example of the camera module 100B of the present disclosure, the chip connector 21B of the photosensitive chip 20B may be directly connected to the substrate connector 315B of the substrate 31B, for example, when the photosensitive chip 20B is attached to the attaching area 313B of the substrate 31B, the chip connector 21B of the photosensitive chip 20B and the substrate connector 315B of the substrate 31B are directly connected. In another example of the camera module 100B of the present disclosure, the chip connector 21B of the photosensitive chip 20B and the substrate connector 315B of the substrate 31B may be connected through a set of connection wires 1000B.

Specifically, after the photosensitive chip 20B is attached to the attaching area 313B of the substrate 31B, the connection wire 1000B may be formed between the chip connector 21B of the photosensitive chip 20B and the substrate connectors 315B of the substrate 31B through a wiring process so as to conductively connect the photosensitive chip 20B and the substrate 31B by the connection wire 1000B.

It is worth mentioning that the wiring direction of the connection wire 1000B is not limited in the camera module 100B of the present disclosure. For example, the wiring direction of the connection wire 1000B may be from the photosensitive chip 20B to the substrate 31B, and also may be from the substrate 31B to the photosensitive chip 20B. Nonetheless, it can be understood by those skilled in the art that the connection wire 1000B can also have other formation methods. In addition, the material type of the connection wire 1000B is not limited in the camera module 100B of the present disclosure. For example, the connection wire 1000B may be a gold wire, a silver wire, an aluminum wire or a copper wire.

It is also worth mentioning that the shape and arrangement of the chip connector 21B of the photosensitive chip 20B and the shape and arrangement of the substrate connector 315B of the substrate 31B are not limited in the camera module 100B of the present disclosure. For example, the chip connector 21B of the photosensitive chip 20B may be in a disk shape, a spherical shape, or the like, and the chip connector 21B of the photosensitive chip 20B is generally disposed in a non-photosensitive area of the photosensitive chip 20B. Correspondingly, the substrate connector 315B of the substrate 31B may be in the shape of a disk, a sphere, or the like, and the substrate connector 315B of the substrate 31B is generally disposed in the bonding area 314B of the substrate 31B. Preferably, after the photosensitive chip 20B is attached to the attaching area 313B of the substrate 31B, the chip connector 21B of the photosensitive chip 20B and the substrate connector 315B of the substrate 31B are corresponding to each other so as to form, by a wiring process, the connection wire 1000B for connecting the photosensitive chip 20B and the substrate 31B between the chip connector 21B of the photosensitive chip 20B and the substrate connector 315B of the substrate 31B.

In an embodiment of the camera module 100B of the present disclosure, the substrate 31B, the electronic component 32B, the connection plate 33B, the connection wire 1000B and the photosensitive chip 20B form a circuit board assembly 2000B. That is, according to another aspect of the present disclosure, the present disclosure further provides the circuit board assembly 2000B, wherein the circuit board assembly 2000B comprises the substrate 31B, the electronic component 32B, the connection plate 33B, the connection wire 1000B and the photosensitive chip 20B, wherein the photosensitive chip 20B is conductively connected to the substrate 31B via the connection wire 1000B, and the electronic component 32B and the connection plate 33B are conductively connected to the substrate 31B, respectively.

With continued reference to FIG. 91 to FIG. 92B, the camera module 100B comprises a molding unit 40B, wherein the molding unit 40B further comprises a back molding portion 41B, the back molding portion 41B is integrally bonded to the substrate 31B on the back face 312B of the substrate 31B, wherein the back molding portion 41B can reinforce the strength of the substrate 31B and ensure the flatness of the substrate 31B, so that the photosensitive chip 20B attached on the attaching area 313B of the substrate 31B is kept flat so as to improve the imaging quality of the camera module 100B.

It can be understood that the circuit board assembly 2000B further comprises the back molding portion 41B, wherein the back molding portion 41B is integrally bonded to the substrate 31B on the back face 312B of the substrate 31B.

The back molding portion 41B has good inertness. When the camera module 100B is used, heat generated by the photosensitive chip 20B is transmitted to the back molding portion 41B, and the back molding portion 41B does not deform, in such a manner that the flatness of the substrate 31B and the flatness of the photosensitive chip 20B attached to the attaching area 313B of the substrate 31B are also not affected by the heat generated by the photosensitive chip 20B, thereby facilitating to ensure the flatness of the photosensitive chip 20B. In addition, the back molding portion 41B may be formed of a material having a good thermal diffusivity so that the back molding portion 41B has a good heat dissipation property. After the heat generated by the photosensitive chip 20B is conducted to the back molding portion 41B, the back molding portion 41B can radiate the heat generated by the photosensitive chip 20B to the external environment of the camera module 100B in time so as to ensure the reliability of the camera module 100B when it has been used for a long time.

Preferably, the back molding portion 41B may be integrally bonded to the substrate 31B on the back face 312B of the substrate 31B by a molding process.

In an example of the camera module 100B of the present disclosure, the height of the back molding portion 41B is higher than the height of the electronic component 32B, or the height of the back molding portion 41B is consistent with the height of the electronic component 32B, for example, the distance between surfaces of the free side face 4111B of the back molding portion 41B and the back face 312 of the substrate 31B is greater than or equal to the height between the surfaces of the free side face of the electronic component 32B and the back face 312B of the substrate 31B. It is worth mentioning that the free side face 4111B of the back molding portion 41B defined by the present disclosure is opposite to the bonding side face 4112B of the back molding portion 41B, wherein the bonding side 4112B of the back molding portion 41B is integrally bonded to at least a part of an area of the back face 312 of the substrate 31B, with reference to FIG. 91.

With reference to FIG. 91, it is assumed that the height of the back molding portion 41B protruding from the substrate 31B is a parameter H and the height of the electronic component 32B protruding from the back face 312B of the substrate 31B is a parameter h, wherein the numerical value of the parameter H is greater than or equal to the numerical value of the parameter h, so that when the camera module 100B is mounted, it is possible to prevent other mounting components from contacting the electronic component 32B, thereby ensuring the reliability of the camera module 100B.

In another example of the camera module 100B of the present disclosure, the back molding portion 41B embeds at least a portion of the surface of at least one of the electronic components 32B. Preferably, the back molding portion 41B embeds the entire surface of at least one of the electronic components 32B. More preferably, the back molding portion 41B embeds the entire surface of the electronic component 32B.

It is worth mentioning that the back molding portion 41B can isolate the surface of the electronic component 32B from the external environment by embedding the electronic component 32B, thereby guaranteeing the good electrical property of the electronic component 32B by avoiding oxidation of the surface of the electronic component 32B.

In addition, the back molding portion 41B can isolate adjacent electronic components 32B by embedding the electronic components 32B so as to guarantee the imaging quality of the camera module 100B by avoiding mutual interference between the adjacent electronic components 32B. Moreover, since the back molding portion 41B can isolate the adjacent electronic components 32B, and there is no need to reserve a safe distance between the back molding portion 41B and the electronic component 32B, more electronic components 32B with larger size can be connected on a limited area of the back face 312B of the substrate 31B, for example, more electronic components 32B with larger size can be attached to a limited area of the back face 312B of the substrate 31B. In this manner, the performance of the camera module 100B can be further improved.

It can be understood by those skilled in the art that the photosensitive chip 20B attached on the attaching area 313B of the substrate 31B and the electronic component 32B attached on the back face 312B of the substrate 31B are respectively located on both faces of the substrate 31B, and the electronic component 32B is embedded by the back molding portion 41B integrally bonded on the back face 312B of the substrate 31B, so that contaminants falling off from the surface of the electronic component 32B or contaminants such as solder powder falling off from a connection position between the electronic component 32B and the substrate 31B will not contaminate the photosensitive area of the photosensitive chip 20B, and in this manner, the good product yield of the camera module 100B can be ensured.

In addition, after the back molding portion 41B embeds the electronic component 32B located on the back face 312B of the substrate 31B, the electronic component 32B can also prevent the back molding portion 41B from falling off from the back face 312B of the substrate 31B so as to ensure the reliability of the camera module 100B.

With reference to FIG. 91 and FIG. 92B, the back molding portion 41B has at least one mounting space 410B, wherein the module connection side 331B of the connection plate 33B can be accommodated in the mounting space 410B of the back molding portion 41B after being connected to the substrate 31B on the back face 312B of the substrate 31B. In this way, it is possible to prevent the module connection side 331B of the connection plate 33B from protruding to ensure the reliability of the connection position between the module connection side 331B of the connection plate 33B and the back face 312B of the substrate 31B. Nonetheless, it can be understood by those skilled in the art that in other examples of the camera module 100B of the present disclosure, the back molding portion 41B can also embed the connection position between the module connection side 331B of the connection plate 33B and the substrate 31B to prevent the module connection side 331B of the connection plate 33B from falling off from the back face 312B of the substrate 31B so as to ensure the reliability of the camera module 100B.

In some other possible examples of the camera module 100B of the present disclosure, the electronic component 32B that is not embedded by the back molding portion 41B can also be accommodated in the mounting space 410B of the back molding portion 41B. In this way, when the camera module 100B is moved or mounted, the electronic component 32B can be prevented from being contacted, thereby preventing the surface of the electronic component 32B or the conductive position between the electronic component 32B and the substrate 31B from being destroyed so as to further ensure the reliability of the camera module 100B. Alternatively, a part of the surface of the electronic components 32B is exposed on the mounting space 410B of the back molding portion 41B.

In addition, when the camera module 100B is mounted to the electronic device, the protruding mounting components of the device body 200B can also be accommodated in the mounting space 410B of the back molding portion 41B. In this way, the internal space of the device body 200B can be effectively utilized so as to facilitate the lightering and thinning and miniaturization of the electronic device.

Figure 94:
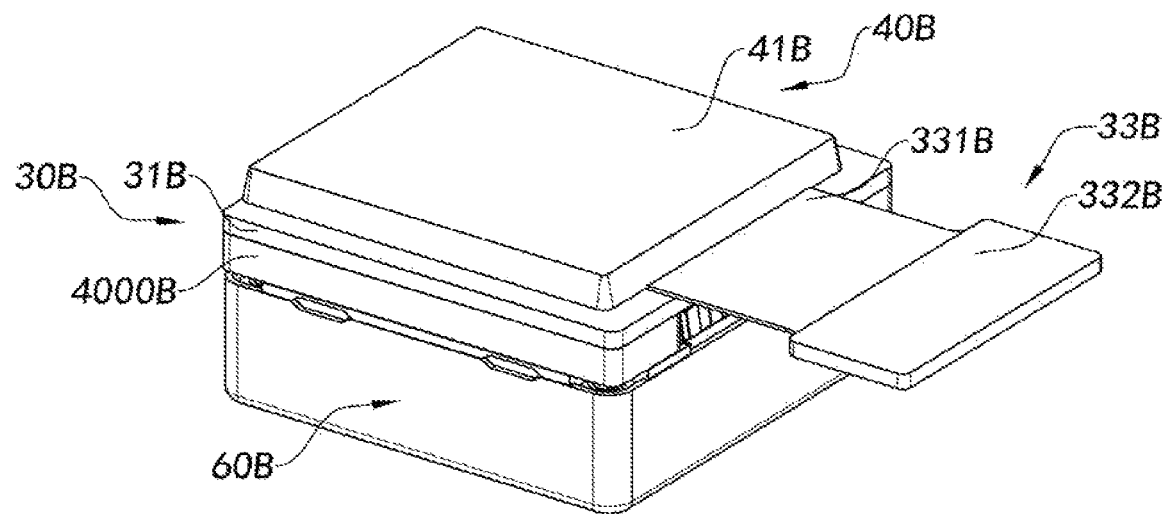
FIG. 94 is a stereoscopic schematic diagram of a variant implementation of the camera module according to the above preferred embodiment of the present disclosure.

FIG. 94 shows a variant implementation of the camera module 100B, wherein the back molding portion 41B of the molding unit 40B can be integrally bonded to all area of the back face 312B of the substrate 31B, that is, the back molding portion 41B may not be provided or formed with the mounting space 410B.

Figure 95:
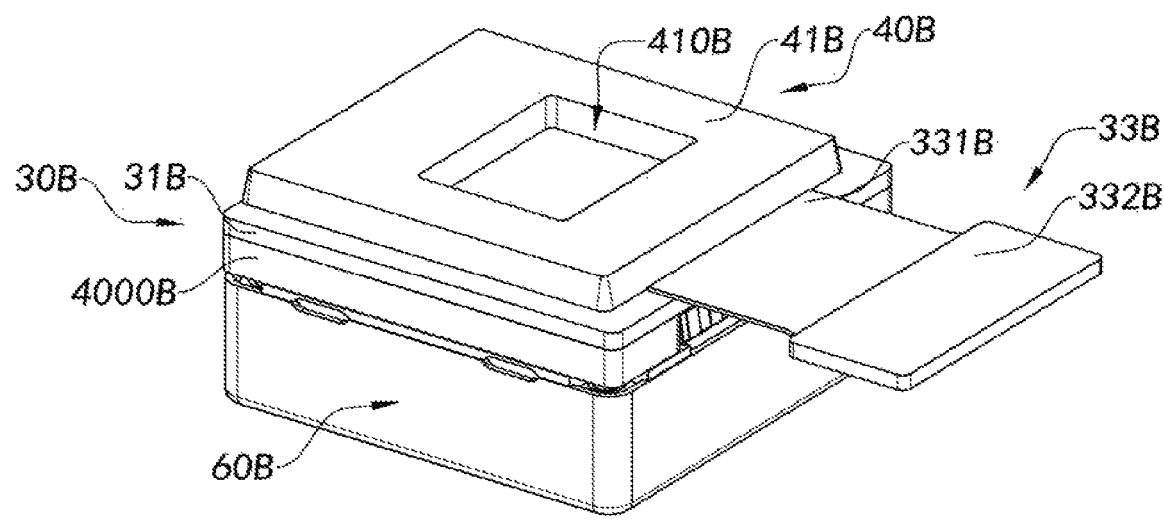
FIG. 95 is a stereoscopic schematic diagram of another variant implementation of the camera module according to the above preferred embodiment of the present disclosure.
Figure 96:
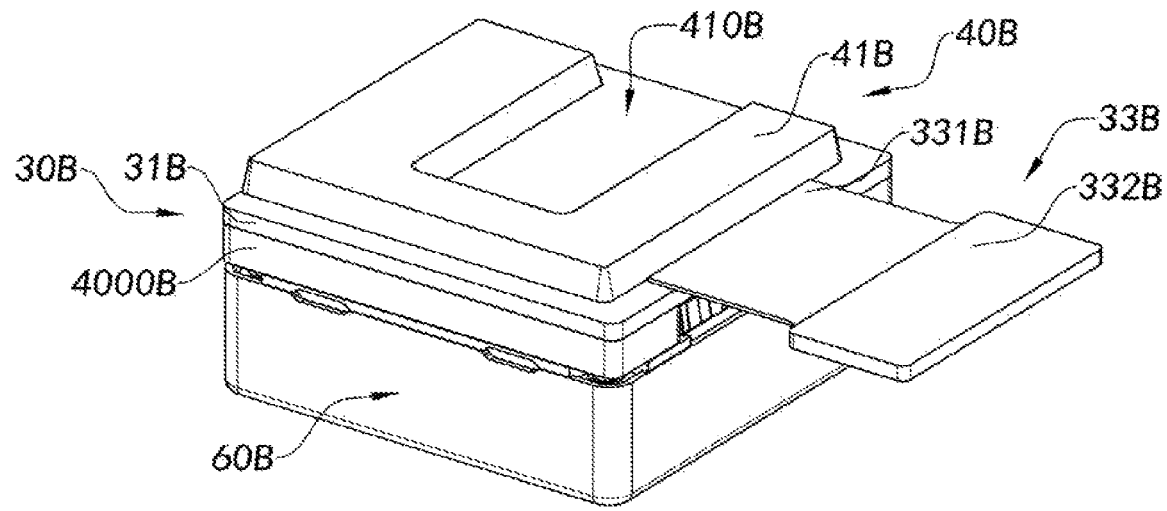
FIG. 96 is a stereoscopic schematic diagram of another variant implementation of the camera module according to the above preferred embodiment of the present disclosure.
Figure 97:
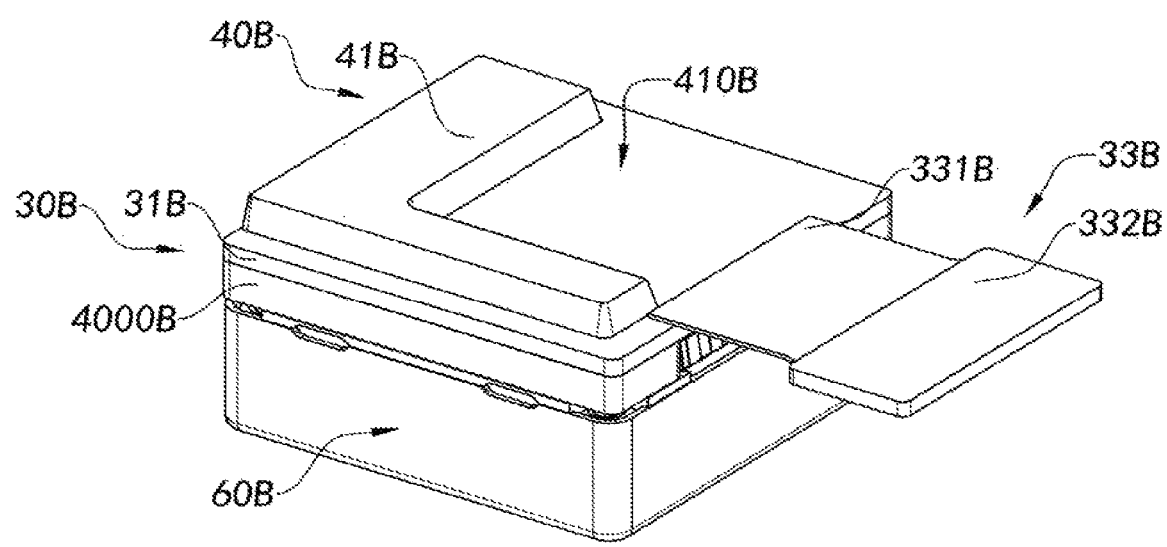
FIG. 97 is a stereoscopic schematic diagram of another variant implementation of the camera module according to the above preferred embodiment of the present disclosure.
Figure 98:
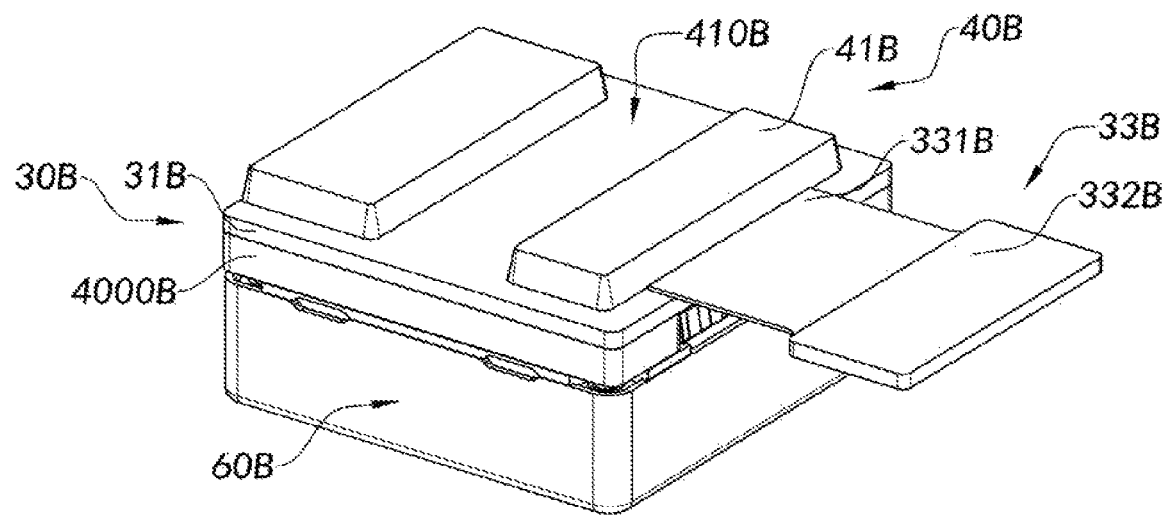
FIG. 98 is a stereoscopic schematic diagram of another variant implementation of the camera module according to the above preferred embodiment of the present disclosure.
Figure 99:
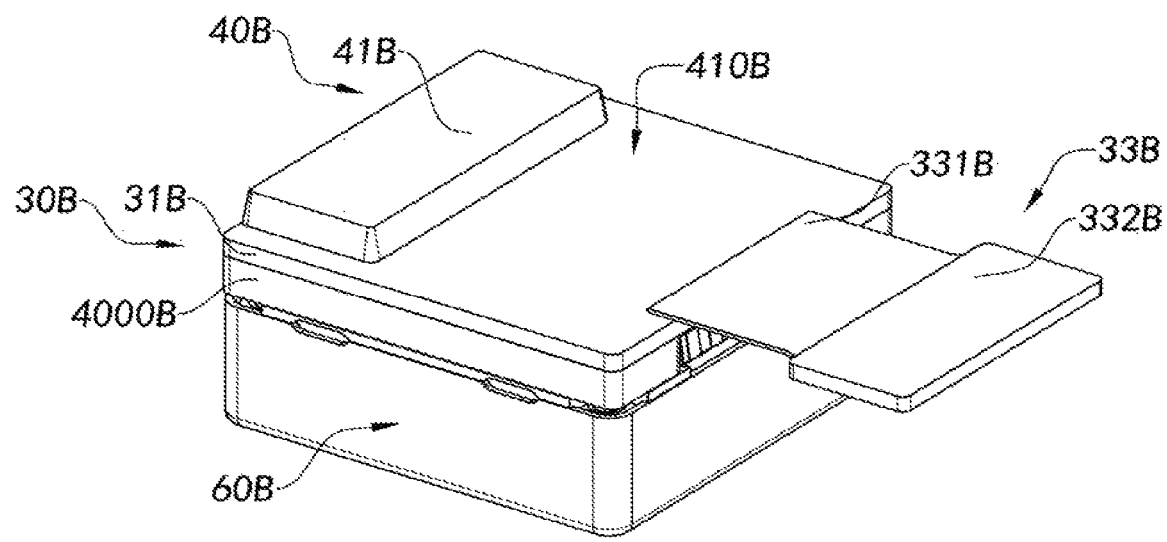
FIG. 99 is a stereoscopic schematic diagram of another variant implementation of the camera module according to the above preferred embodiment of the present disclosure.

FIG. 95 shows another variant implementation of the camera module 100B, wherein the back molding portion 41B of the molding unit 40B is integrally bonded to at least one side portion of the back face 312B of the substrate 31B, that is, the back molding portion 41B may not be bonded to the center portion of the back face 312B of the substrate 31B. For example, in this specific example of the camera module 100B shown in FIG. 95, the back molding portion 41B can be integrally bonded to the four side portions of the back face 312B of the substrate 31B, so that the back molding portion 41B is in the shape of "☐". However, in another variant implementation of the camera module 100B shown in FIG. 96, the back molding portion 41B can be integrally bonded to three side portions of the back face 312B of the substrate 31B, so that the back molding portion 41B is in the shape of "Π". However, in another variant implementation of the camera module 100B shown in FIG. 97, the back molding portion 41B can be integrally bonded to two side portions of the back face 312B of the substrate 31B, so that the back molding portion 41B is in the shape of "I". However, in another variant implementation of the camera module 100B shown in FIG. 98, the number of the back molding portions 41B can be two, and each of the back molding portions 41B is integrally bonded to one side portion of the back face 312B of the substrate 31B respectively, wherein two back molding portions 41B are symmetrical with each other, or two back molding portions 41B are parallel to each other. However, in another variant implementation of the camera module 100B shown in FIG. 99, the back molding portion 41B may be integrally bonded only to one side portion of the back face 312B of the substrate 31B.

It is worth mentioning that it can be understood by those skilled in the art that the back molding portion 41B can also be in the shape of other things, for example, in the shape "I", in the shape "II", in the shape "III", in the shape "X", in the shape "L", in the shape "C", in the shape "♯", or in the shape "日".

Figure 100:
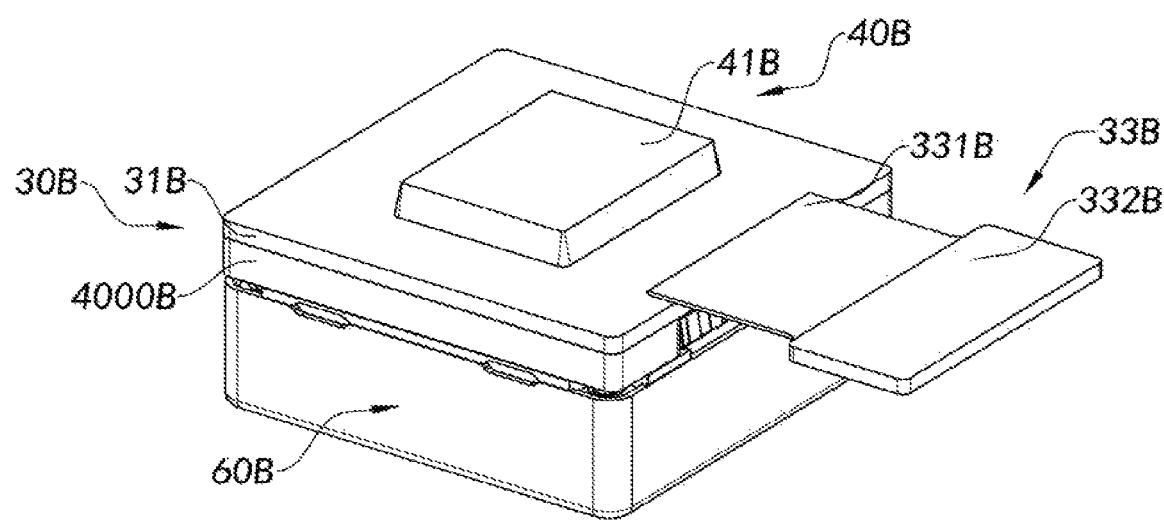
FIG. 100 is a stereoscopic schematic diagram of another variant implementation of the camera module according to the above preferred embodiment of the present disclosure.

FIG. 100 shows another variant implementation of the camera module 100B, wherein the back molding portion 41B of the molding unit 40B is integrally bonded only to the center portion of the back face 312B of the substrate 31B, and at this point, the back molding portion 41B and the photosensitive chip 20B are held on both faces of the substrate 31B in correspondence with each other. On one hand, the back molding portion 41B can reinforce the strength of a portion of the substrate 31B at the attaching area 313B to ensure the flatness of the photosensitive chip 20B attached on the attaching area 313B of the substrate 31B, and on the other hand, it can radiate the heat generated by the photosensitive chip 20B to the external environment to help dissipate heat.

It is worth mentioning that the shape of the back molding portion 41B is not limited in the camera module 100B of the present disclosure. For example, the back molding portion 41B can be in the shape of a square, a rectangular, a trapezoid, a circle, an oval and other irregular shapes.

Figure 101:
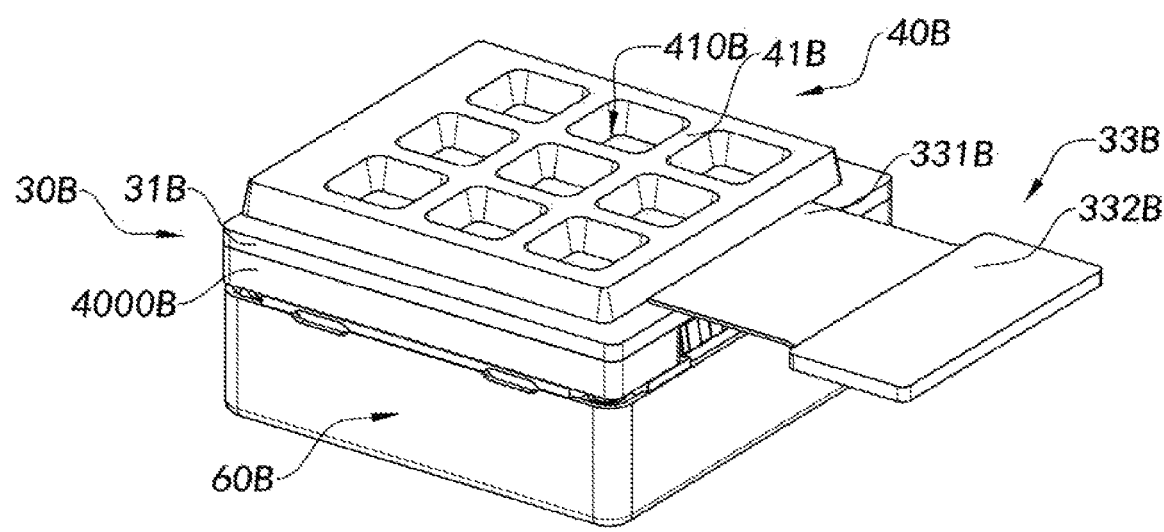
FIG. 101 is a stereoscopic schematic diagram of another variant implementation of the camera module according to the above preferred embodiment of the present disclosure.

FIG. 101 shows another variant implementation of the camera module 100B, wherein the back molding portion 41B of the molding unit 40B can be provided with or formed with a plurality of the mounting spaces 410B, so that the back molding portion 41B is in the shape of a grid, or the back molding portion 41B is in the shape of "田".

Figure 102:
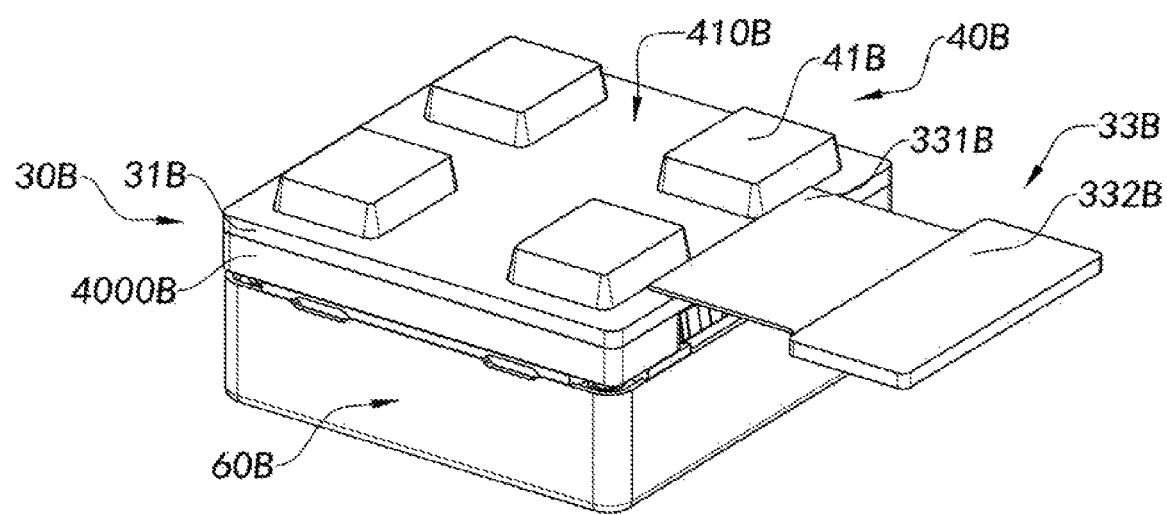
FIG. 102 is a stereoscopic schematic diagram of another variant implementation of the camera module according to the above preferred embodiment of the present disclosure.

FIG. 102 shows another variant implementation of the camera module 100B, wherein the number of the back molding portions 41B of the molding unit 40B may also be implemented as four, and each of the back molding portions 41B is integrally bonded to four corners of the back face 312B of the substrate 31B, respectively. Nonetheless, it is also possible that each of the back molding portions 41B is integrally bonded to the middle portion of the four sides of the back face 312B of the substrate 31B, respectively. In addition, it can be understood by those skilled in the art that the number of the back molding portions 41B may also be implemented to be more or less, and the camera module 100B of the present disclosure is not limited in this respect.

It is worth mentioning that it can be understood by those skilled in the art that the back molding portion 41B of the molding unit 40B may also be in any other possible shapes, which will not be further exemplified in the following description of the present disclosure.

With continued reference to FIG. 91 to FIG. 92B, the camera module 100B further comprises a holder 4000B, wherein the holder 4000B has at least one light through hole 4100B, wherein the holder 4000B is attached to the front face 311B of the substrate 31B, and the photosensitive area of the photosensitive chip 20B corresponds to the light through hole 4100B of the holder 4000B, so that the light through hole 4100B of the holder 4000B forms a light path between the optical lens 10B and the photosensitive chip 20B. In this way, after entering the interior of the camera module 100B from the optical lens 10B, the light reflected by the object can pass through the light through hole 4100B of the holder 4000B, and then is received by the photosensitive chip 20B and imaged after photoelectric conversion.

The camera module 100B further comprises at least one filtering element 50B, wherein the filtering element 50B is held between the optical lens 10B and the photosensitive chip 20B, so that the light entering the interior of the camera module 100B from the optical lens 10B is received by the photosensitive chip 20B after passing through the filtering element 50B. In this way, the imaging quality of the camera module 100B can be ensured.

Specifically, the filtering element 50B can filter stray light in the light entering the interior of the camera module 100B from the optical lens 10B. In this way, the imaging quality of the camera module 100B can be improved. It is worth mentioning that the type of the filtering element 50B is not limited in the camera module 100B of the present disclosure. For example, the filtering element 50B may be, but not limited to, an infrared cut-off filtering element, a visible spectrum filtering element, etc.

Figure 103A:
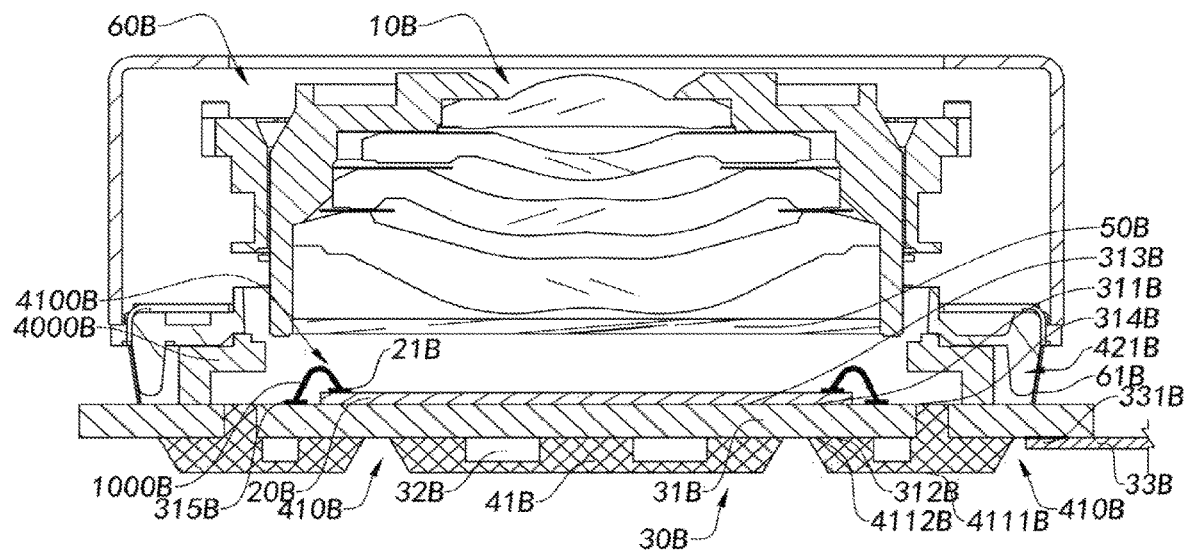
FIG. 103A is a schematic sectional view of another variant implementation of the camera module according to the above preferred embodiment of the present disclosure.

Preferably, the filtering element 50B can be attached on the holder 4000B, so that the filtering element 50B is held between the optical lens 10B and the photosensitive chip 20B. However, in a variant implementation of the camera module 100B shown in FIG. 103A, the filtering element 50B can also be attached on the optical lens 10B, so that the filtering element 50B can be held between the optical lens 10B and the photosensitive chip 20B.

Figure 103B:
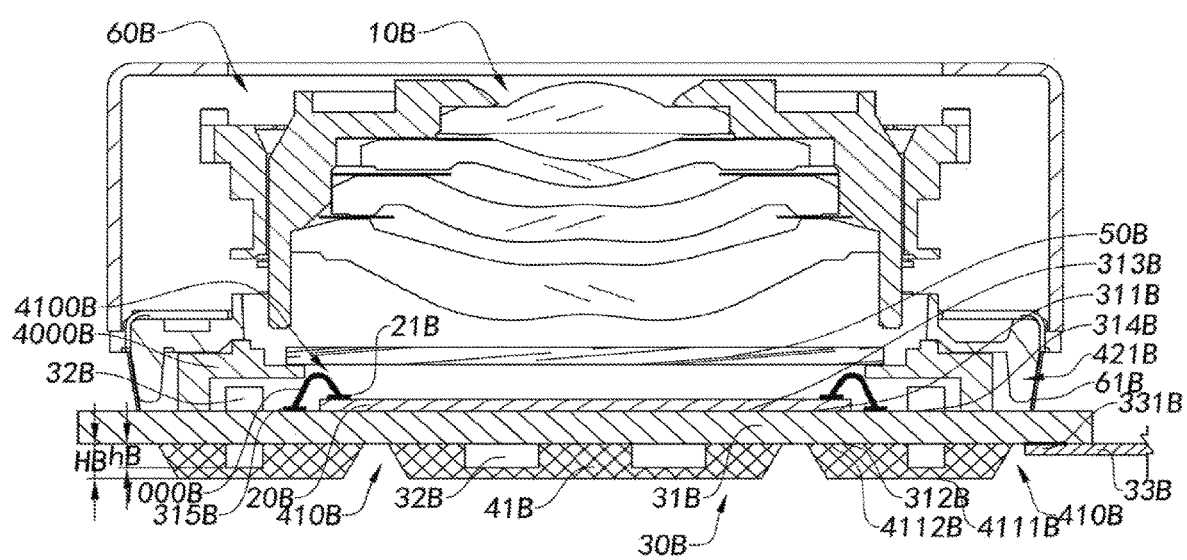
FIG. 103B is a schematic sectional view of another variant implementation of the camera module according to the above preferred embodiment of the present disclosure.

FIG. 103B shows another variant implementation of the camera module 100B, wherein at least one of the electronic components 32B can also be conductively connected to the front face 311B of the substrate 31B, for example, the electronic component 32B can be conductively connected to the front face 311B of the substrate 31B in a manner of attaching.

With reference to FIG. 91 to FIG. 92B, the camera module 100B comprises at least one driver 60B, wherein the optical lens 10B is drivably disposed in the driver 60B, and the driver 60B is attached on the holder 4000B, so that the optical lens 10B is held in the photosensitive path of the photosensitive chip 20B via the driver 60B. The driver 60B can drive the optical lens 10B to move relative to the photosensitive chip 20B along the photosensitive path of the photosensitive chip 20B, so that the camera module 100B achieves automatic zooming and automatic focusing by means of adjusting the relative position between the optical lens 10B and the photosensitive chip 20B.

It is worth mentioning that the type of the driver 60B is not limited in the camera module 100B of the present disclosure, as long as the optical lens 10B can be driven to move along the photosensitive path of the photosensitive chip 20B relative to the photosensitive chip 20B. For example, the driver 60B may be implemented as, but not limited to, a voice coil motor in a specific example of the present disclosure.

Further, the driver 60B has at least one driving pin 61B, wherein the driving pin 61B is electrically connected to the substrate 31B.

Figure 104A:
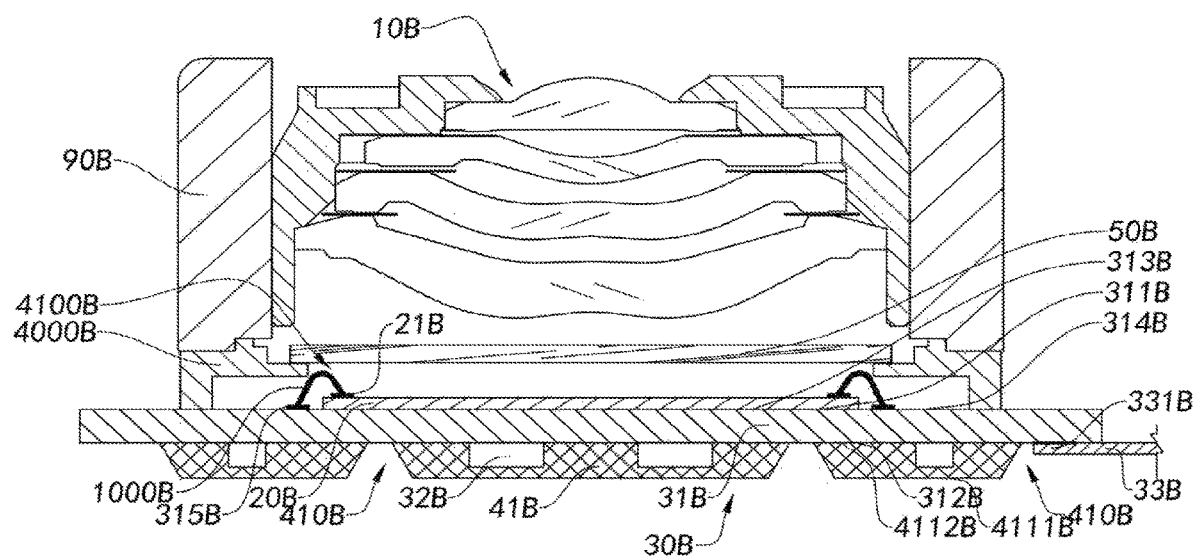
FIG. 104A is a schematic sectional view of another variant implementation of the camera module according to the above preferred embodiment of the present disclosure.

In another variant implementation of the camera module 100B shown in FIG. 104A, the camera module 100B may also be implemented as a fixed focus camera module. Specifically, the camera module further provides at least one lens tube 90B, wherein the optical lens 10B is assembled into the lens tube 90B, and the lens tube 90B is attached on the holder 4000B, so that the optical lens 10B is held in the photosensitive path of the photosensitive chip 20B via the lens tube 90B. It can be understood by those skilled in the art that the optical lens 10B can also be directly attached on the holder 4000B, so that the optical lens 10B is held in the photosensitive path of the photosensitive chip 20B.

Figure 104B:
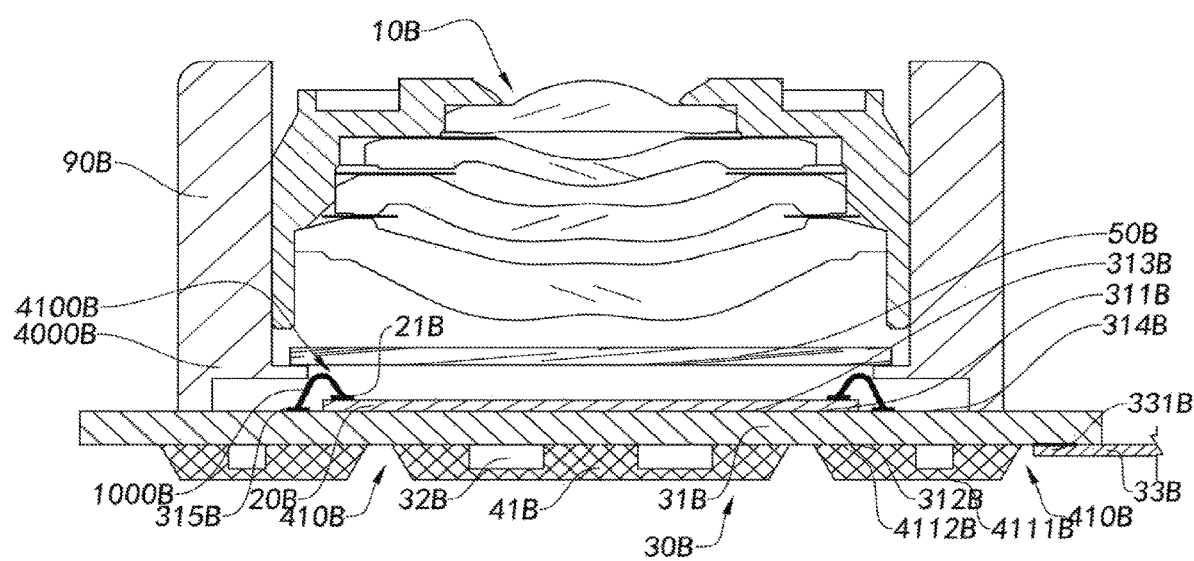
FIG. 104B is a schematic sectional view of another variant implementation of the camera module according to the above preferred embodiment of the present disclosure.

In another variant implementation of the camera module 100B shown in FIG. 104B, the lens tube 90B and the holder 4000B may also be an integrated structure, wherein the holder 4000B is attached to the front face 311B of the substrate 31B, the optical lens 10B is assembled into the lens tube 90B, so that the optical lens 10B is held in the photosensitive path of the photosensitive chip 20B by the lens tube 90B having the integrated structure and the holder 4000B.

With reference to FIG. 82 to FIG. 90 of the accompanying drawings of the present disclosure, the manufacturing process of the camera module 100B is set forth in the following description.

At the stage shown in FIG. 82, the electronic component 32B is conductively connected to the substrate 31B on the back face 312B of the substrate 31B, wherein two or more of the substrates 31B are disposed to form a jointed board unit 3000B. It is worth mentioning that the arrangement of the plurality of the substrates 31B forming the jointed board unit 3000B is not limited in the camera module 100B of the present disclosure, which may be selected as needed.

For example, in this specific example of the camera module 100B of the present disclosure, after the substrate 31B is provided or manufactured, all of the electronic components 32B may be conductively connected to the substrate 31B on the back face 312B of the substrate 31B in a manner of attaching. It can be understood by those skilled in the art that in other examples of the camera module 100B of the present disclosure, only a part of the electronic components 32B may also be connected to the substrate 31B on the back face 312B of the substrate 31B. The examples of the present disclosure shown in FIG. 82 to FIG. 90 do not limit the content and scope of the camera module 100B of the present disclosure.

In addition, the position where the electronic component 32B is attached on the back face 312B of the substrate 31B may also not be limited, and may be adjusted according to the specific application requirements of the camera module 100B. In some examples of the camera module 100B of the present disclosure, a plurality of the electronic components 32B may be disposed in all area of the back face 312B of the substrate 31B, and in other specific examples of the camera module 100B of the present disclosure, a plurality of the electronic components 32B may also be disposed in a specific area of the back face 312B of the substrate 31B, for example, in a corner, a side, or two sides, etc.

Figure 83A:
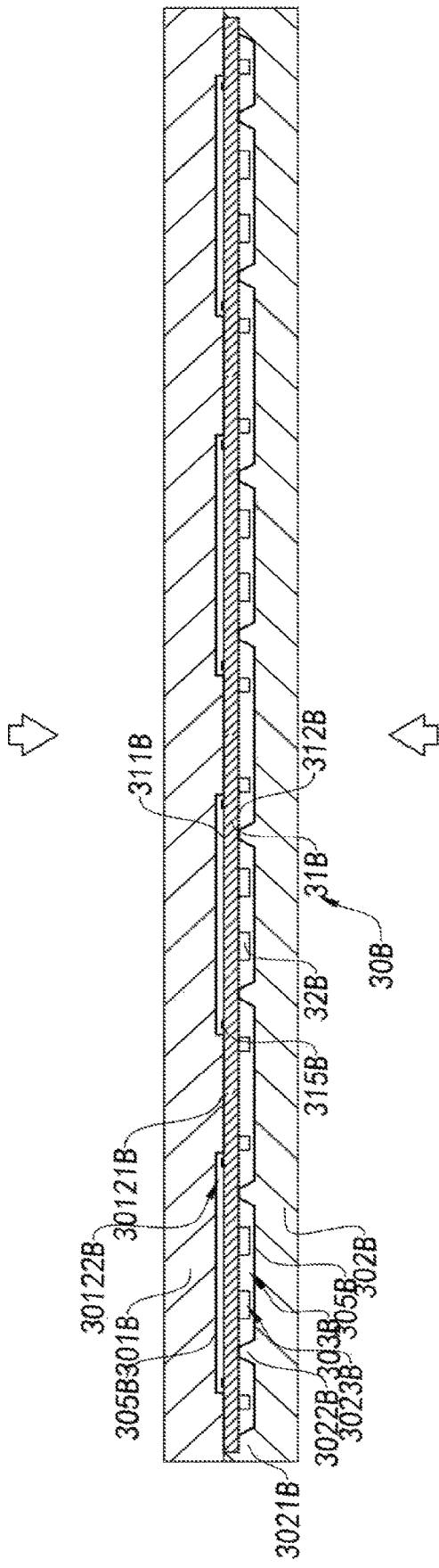
FIG. 83A and FIG. 83B are schematic sectional views of a second manufacturing step of the camera module according to the above preferred embodiment of the present disclosure.
Figure 83B:
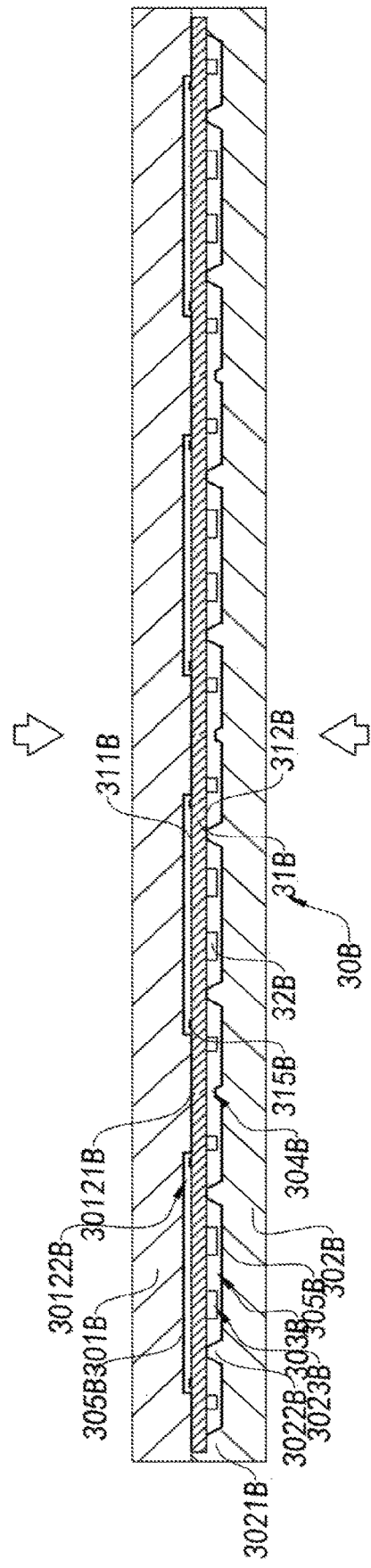
Figure 86:
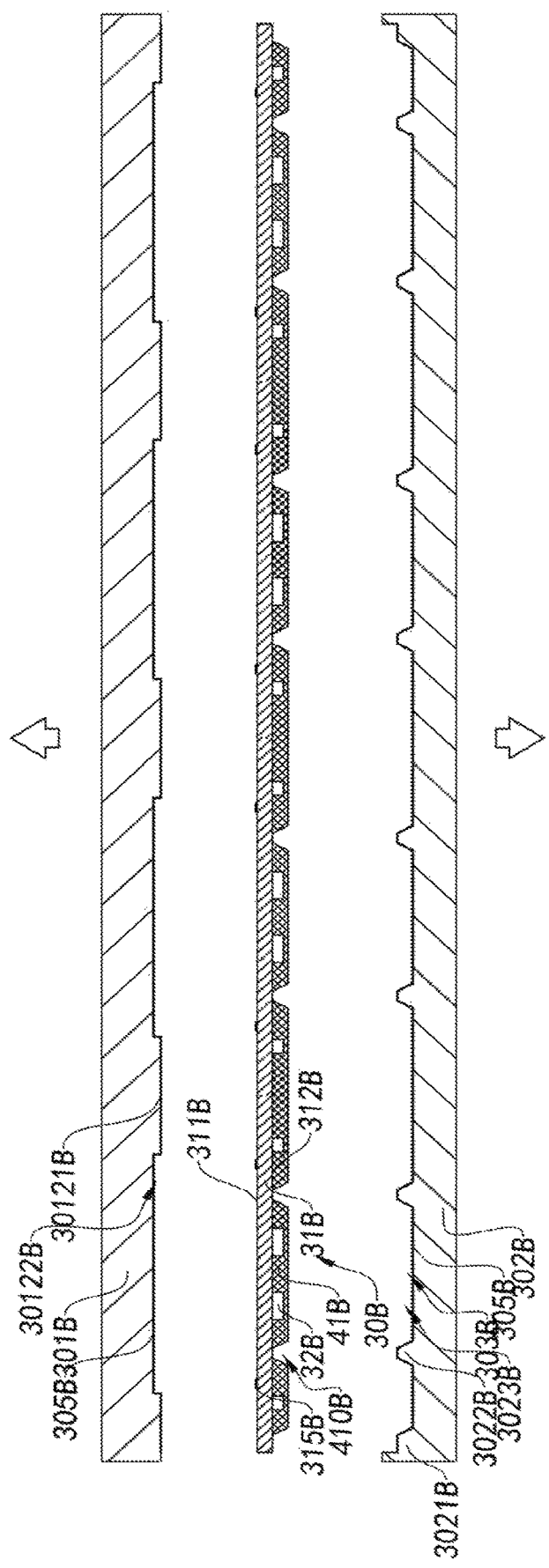
FIG. 86 is a schematic sectional view of a fifth manufacturing step of the camera module according to the above preferred embodiment of the present disclosure.

At the stage shown in FIG. 83A and FIG. 83B, the jointed board unit 3000B is placed in a molding die 300B to perform a molding process by the molding die 300B.

Specifically, the molding die 300B comprises an upper die 301B and a lower die 302B, wherein at least one of the upper die 301B and the lower die 302B can be operated to enable the molding die 300B to be subjected to clamping and demolding operations. For example, in one example, the jointed board unit 3000B can be placed in the lower die 302B and after performing a clamping operation on the molding die 300B, at least one molding space 303B is formed between the lower die 302B and the back face 312B of the substrate 31B.

Preferably, when the number of the molding spaces 303B exceeds two, at least one communication channel 304B may also be formed between the lower die 302B and the back face 312B of the substrate 31B, wherein the communication channel 304B is used for communicating the adjacent molding space 303B. In this way, a fluid medium 400B added to one of the molding spaces 303B can fill all of the molding spaces 303B through the communication channel 304B.

It is worth mentioning that the pressing face of the upper die 301B can be a plane, which can be directly pressed against the front face 311B of the substrate 31B. Preferably, the upper die 301B can form at least one safe space 30122B by means of a concave and form an upper pressing portion 30121B around the molding space 303B, wherein when the molding die 300B is performed a clamping operation, the upper pressing portion 30121B of the upper die 301B can be pressed against an area of the substrate 31B where no wiring is left, or the upper pressing portion 30121B of the upper die 310 is pressed against an area of the jointed board unit 3000B used for supporting the substrate 31B, so that the wiring area of the substrate 31B corresponds to the safe space 30122B. In this way, the upper die 301B can be prevented from scratching or crushing the substrate 31B so as to ensure the good electrical property of the substrate 31B. It can be understood by those skilled in the art that the upper die 301B particularly facilitates protecting the substrate connector 315B protruding from the front face 311B of the substrate 31B by means of providing the safe space 30122B. That is, the substrate connector 315B protruding from the front face 311B of the substrate 31B can be accommodated in the safe space 30122B of the upper die 301B so as to prevent the substrate connector 315B of the substrate 31B from being pressed when the molding die 300B is clamped.

With continued reference to FIG. 83A and FIG. 83B, the lower die 302B further comprises a molding guide portion 3021B and at least one support portion 3022B and has at least one molding guide groove 3023B, wherein the support portion 3022B integrally extends over the molding guide portion 3021B to form the molding guide groove 3023B between the support portion 3022B and the molding guide portion 3021B, or form the molding guide groove 3023B between the adjacent support portions 3022B.

When performing the clamping operation on the molding die 300B, the molding space 303B is formed at a position corresponding to the molding guide groove 3023B of the lower die 302B. Moreover, the molding guide portion 3021B of the lower die 302B can be pressed against the back face 312B of the substrate 31B, and the support portion 3022B of the lower die 302B is pressed against the back face 312B of the substrate 31B.

Preferably, the height of the support portion 3022B of the lower die 302B is greater than the height of the electronic component 32B protruding from the back face 312B of the substrate 31B. In this way, when the lower die 302B is pressed against the back face 312B of the substrate 31B, there is a safe distance between the surface of the electronic component 32B and the inner surface of the lower die 302B to protect the surface of the electronic component 32B from being scratched by preventing the surface of the electronic component 32B from contacting the inner surface of the lower die 302B. In addition, by means of having a safe distance between the surface of the electronic component 32B and the inner surface of the lower die 302B, it is also possible to subsequently embed the electronic component 32B by the back molding portion 41B integrally bonded to the back face 312B of the substrate 31B.

In addition, the molding die 300B further comprises at least one film layer 305B. For example, in this specific example of the present disclosure, the number of the film layers 305B may be implemented as two, wherein one of the film layers 305B is disposed on the inner surface of the upper die 301B in an overlapping manner, and another of the film layers 305B is disposed on the inner surface of the lower die 302B in an overlapping manner, for example, the film layer 305B can be disposed on the inner surface of the upper die 301B in an overlapping manner by means of attaching the film layer 305B to the inner surface of the upper die 301B, and the film layer 305B can be disposed on the inner surface of the lower die 302B in an overlapping manner by means of attaching the film layer 305B to the inner surface of the lower die 302B.

It can be understood by those skilled in the art that when the molding die 300B is performed a clamping operation, the film layer 305B is held between the upper pressing portion 30121B of the upper die 301B and the front face 311B of the substrate 31B. When the molding die 300B is clamped, on one hand, the film layer 305B can absorb the impact force generated by the molding die 300B when being clamped by means of deformation to prevent the impact force from directly acting on the substrate 31B, and on the other hand, the film layer 305B can further isolate the upper pressing portion 30121B of the upper die 301B from the front face 311B of the substrate 31B to prevent the upper die 301B from scratching the substrate 31B, thereby ensuring the good electrical property of the substrate 31B.

After performing the clamping operation on the molding die 300B, the molding guide portion 3021B and the support portion 3022B of the lower die 302B are respectively pressed against different positions of the back face 312B of the substrate 31B. Therefore, the film layer 305B held between the molding guide portion 3021B and the back face 312B of the substrate 31B and the film layer 305B held between the support portion 3022B and the back face 312B of the substrate 31B can, on one hand, absorb the impact force generated by the molding die 300B when being clamped to prevent the impact force from directly acting on the back face 312B of the substrate 31B, and on the other hand, the film layer 305B can further isolate the molding guide portion 3021B from the back face 312B of the substrate 31B and isolate the support portion 3022B from the back face 312B of the substrate 31B to prevent the back face 312B of the substrate 31B from being scratched, thereby ensuring the good electrical property of the substrate 31B. In addition, the film layer 305B can also prevent a gap from being formed between the molding guide portion 3021B and the back face 312B of the substrate 31B and prevent a gap from being formed between the support portion 3022B and the back face 312B of the substrate 31B by means of deformation.

At the stage shown in FIG. 84 and FIG. 85, the fluid medium 400B is added to at least one of the molding spaces 303B, and since the adjacent molding spaces 303B are in communication with each other through the communication channel 304B, the fluid medium 400B will fill all of the molding spaces 303B.

It is worth mentioning that the fluid medium 400B may be liquid, solid or a mixture of liquid and solid, etc. so as to enable the fluid medium 400B to flow. In addition, the fluid medium 400B can be implemented as, but not limited to, a thermo-curable material. Of course, it can be understood by those skilled in the art that in other possible examples, it is also possible that the fluid medium 400B is implemented as a photo-curable material or a self-curable material.

After the fluid medium 400B fills the molding space 303B, the fluid medium 400B may be solidified in the molding space 303B by means of heating, and a demolding operation may be performed on the molding die 300B. With reference to the stage shown in FIG. 86, wherein the fluid medium 400B solidified in the molding space 303B can form the back molding portion 41B integrally bonded to the back face 312B of the substrate 31B. Moreover, the back molding portion 41B can embed the electronic component 32B, and the position corresponding to the support portion 3022B of the lower die 302B may form the mounting space 410B of the back molding portion 41B.

Figure 87:
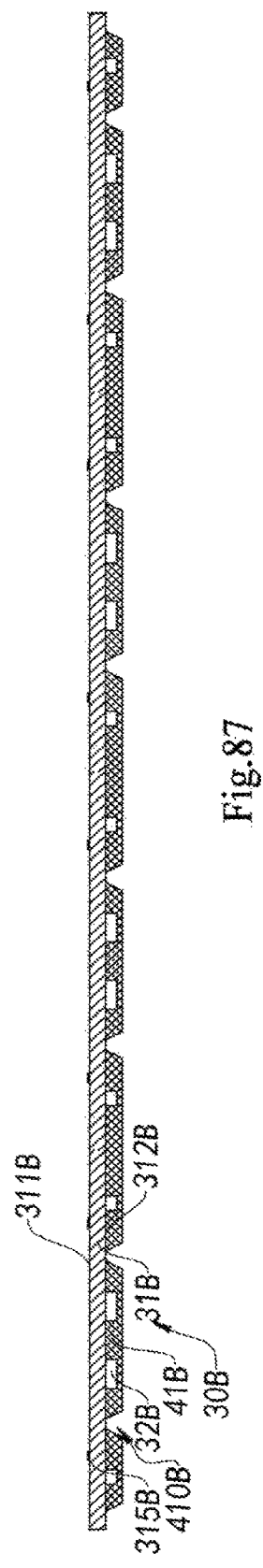
FIG. 87 is a schematic sectional view of a sixth manufacturing step of the camera module according to the above preferred embodiment of the present disclosure.

At the stage shown in FIG. 87, after performing the demolding operation on the molding die 300B, a semi-finished product of the circuit board assembly 2000B can be formed. Understandably, after performing the demolding operation on the molding die 300B, a plurality of the circuit board assemblies 2000B are connected to each other to form a semi-finished product of the circuit board assembly 2000B. Then at the stage shown in FIG. 88A and FIG. 88B, the semi-finished product of the circuit board assembly 2000B can be divided to form the circuit board assembly 2000B. The manner of dividing the semi-finished product of the circuit board assembly 2000B is not limited in the camera module 100B of the present disclosure. For example, the semi-finished product of the circuit board assembly 2000B may be divided by means of cutting to form the circuit board assembly 2000B, and the semi-finished product of the circuit board assembly 2000B may also be divided by means of etching to form the circuit board assembly 2000B.

In addition, in the example shown in FIG. 88A, when dividing the semi-finished product of the circuit board assembly 2000B, the dividing direction may be from the direction where the front face 311B of the substrate 31B is located to the direction where the back face 312B of the substrate is located. In the example shown in FIG. 88B, when dividing the semi-finished product of the circuit board assembly 2000B, the dividing direction may also be from the direction where the back face 312B of the substrate 31B is located to the direction where the front face 311B of the substrate is located.

At the stage shown in FIG. 89, the photosensitive chip 20B is attached to the attaching area 313B of the substrate 31B, and the connection wire 1000B is formed between the chip connector 21B of the photosensitive chip 20B and the substrate connectors 315B of the substrate 31B through a wiring process so as to be conductively connected to the photosensitive chip 20B and the substrate 31B. For example, the photosensitive chip 20B may be attached to the attaching area 313B of the substrate 31B by a surface mounting technology (SMT), and the chip connector 21B of the photosensitive chip 20B and the substrate connector 315B of the substrate 31B may be made to correspond to each other, and then by a wiring process, the connection wire 1000B is formed between the chip connector 21B of the photosensitive chip 20B and the substrate connector 315B of the substrate 31B. It is worth mentioning that the wiring direction of the connection wire 1000B can be not limited. For example, the wiring direction of the connection wire 1000B may be from the photosensitive chip 20B to the substrate 31B, and also may be from the substrate 31B to the photosensitive chip 20B, which are selected as needed.

In addition, it is also worth mentioning that the photosensitive chip 20B and the substrate 31B are connected by means of forming the connection wire 1000B between the chip connector 21B of the photosensitive chip 20B and the substrate connector 315B of the substrate 31B as shown in FIG. 89. In other examples of the camera module 100B of the present disclosure, the photosensitive chip 20B and the substrate 31B can be connected by other means, for example, the chip connector 21B of the photosensitive chip 20B is directly connected to the substrate connector 315B of the substrate 31B when attaching the photosensitive chip 20B to the attaching area 313B of the substrate 31B.

It is worth mentioning that the stage shown in FIG. 89 can also before the stages shown in FIG. 88A and FIG. 88B, that is, the photosensitive chip 20B can be firstly attached to the attaching area 313B of the substrate 31B and be conductively connected to the photosensitive chip 20B and the substrate 31B, and then divide the semi-finished product of the circuit board assembly 2000B.

Figure 90:
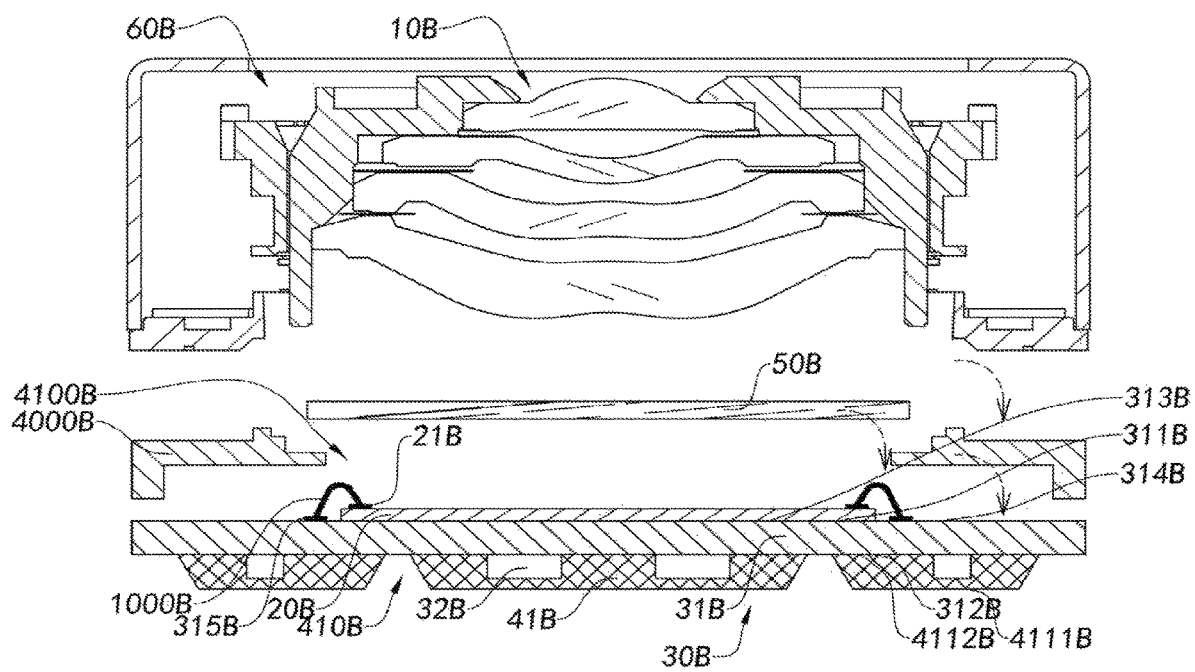
FIG. 90 is a schematic sectional view of a ninth manufacturing step of the camera module according to the above preferred embodiment of the present disclosure.

At the stage shown in FIG. 90, the holder 4000B is attached to the bonding area 314B of the substrate 31B, and makes the photosensitive area of the photosensitive chip 20B to correspond to the light through hole 4100B of the holder 4000B. Then, the filtering element 50B is attached on the holder 4000B, and the driver 60B in which the optical lens 10B is assembled is attached on the holder 4000B, so that the optical lens 10B is held in the photosensitive path of the photosensitive chip 20B and the filtering element 50B is held between the optical lens 10B and the photosensitive chip 20B so as to produce the camera module 100B.

According to another aspect of the present disclosure, the present disclosure further provides a method for manufacturing the camera module 100B, comprising the following steps:
(A) connecting at least one electronic component 32B to the substrate 31B on the back face 312B of the substrate 31B conductively;
(B) forming the back molding portion 41B integrally bonded to the back face 312B of the substrate 31B;
(C) connecting at least one photosensitive chip 20B to the substrate 31B conductively; and
(D) holding the optical lens 10B in the photosensitive path of the photosensitive chip 20B so as to produce the camera module 100B.

It is worth mentioning that in the step (A), at least one of the electronic components 32B can be conductively connected to the front face 311B of the substrate 31B. That is, in some examples of the camera module 100B of the present disclosure, the electronic component 32B can be conductively connected only to the back face 312B of the substrate 31B, but in other examples of the camera module 100B of the present disclosure, the electronic component 32B is conductively connected not only to the back face 312B of the substrate 31B, but also to the front face 311B of the substrate 31B, that is, at least one of the electronic components 32B is conductively connected to both the front face 311B and the back face 312B of the substrate 31B.

FIG. 104 shows a top view of an implementation of the optical lens 10B of the camera module 100B, wherein the optical lens 10B is in the shape of a circle in a top view. Specifically, the optical lens 10B has a first lens side face 11B, a second lens side face 12B, a third lens side face 13B, a fourth lens side face 14B, a fifth lens side face 15B, a sixth lens side face 16B, a seventh lens side face 17B, and an eighth lens side face 18B, wherein in this example of the optical lens 10B, the first lens side face 11B, the second lens side face 12B, the third lens side face 13B, the fourth lens side face 14B, the fifth lens side face 15B, the sixth lens side face 16B, the seventh lens side face 17B, and the eighth lens side face 18B are curved faces respectively, and are connected end to end so as to form a circle. Moreover, the optical lens 10B forms a curved side 102B at positions corresponding to the first lens side face 11B and the second lens side face 12B, the third lens side face 13B and the fourth lens side face 14B, the fifth lens side face 15B and the sixth lens side face 16B, and the seventh lens side face 17B and the eighth lens side face 18B, respectively. That is, the optical lens 10B has four curved sides 102B.

Figure 105:
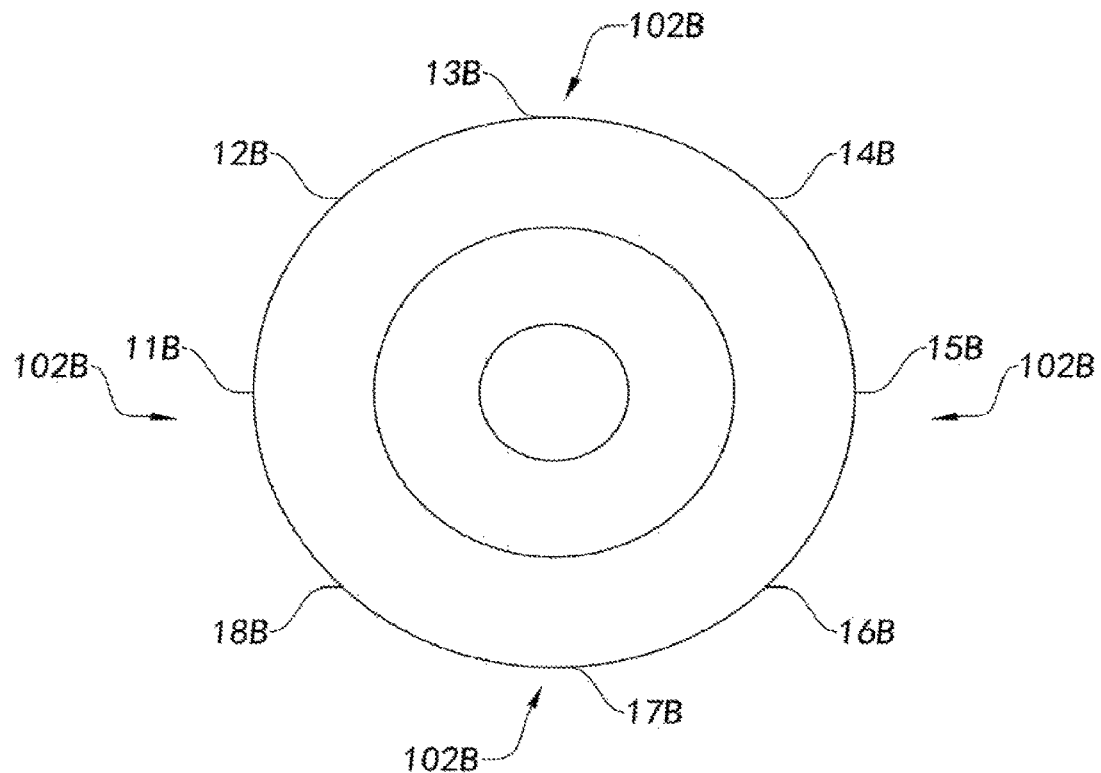
FIG. 105 is a schematic top view of an implementation of an optical lens of the camera module according to the above preferred embodiment of the present disclosure.

FIG. 105 shows a top view of a variant implementation of the optical lens 10B of the camera module 100B, wherein the first lens side face 11B, the second lens side face 12B, the third lens side face 13B, the fourth lens side face 14B, the fifth lens side face 15B, the sixth lens side face 16B, the seventh lens side face 17B, and the eighth lens side face 18B are curved faces respectively, and are connected end to end and form an oval. Moreover, the optical lens 10B forms a curved side 102B at positions corresponding to the first lens side face 11B and the second lens side face 12B, the third lens side face 13B and the fourth lens side face 14B, the fifth lens side face 15B and the sixth lens side face 16B, and the seventh lens side face 17B and the eighth lens side face 18B, respectively. That is, the optical lens 10B has four curved sides 102B.

Figure 106:
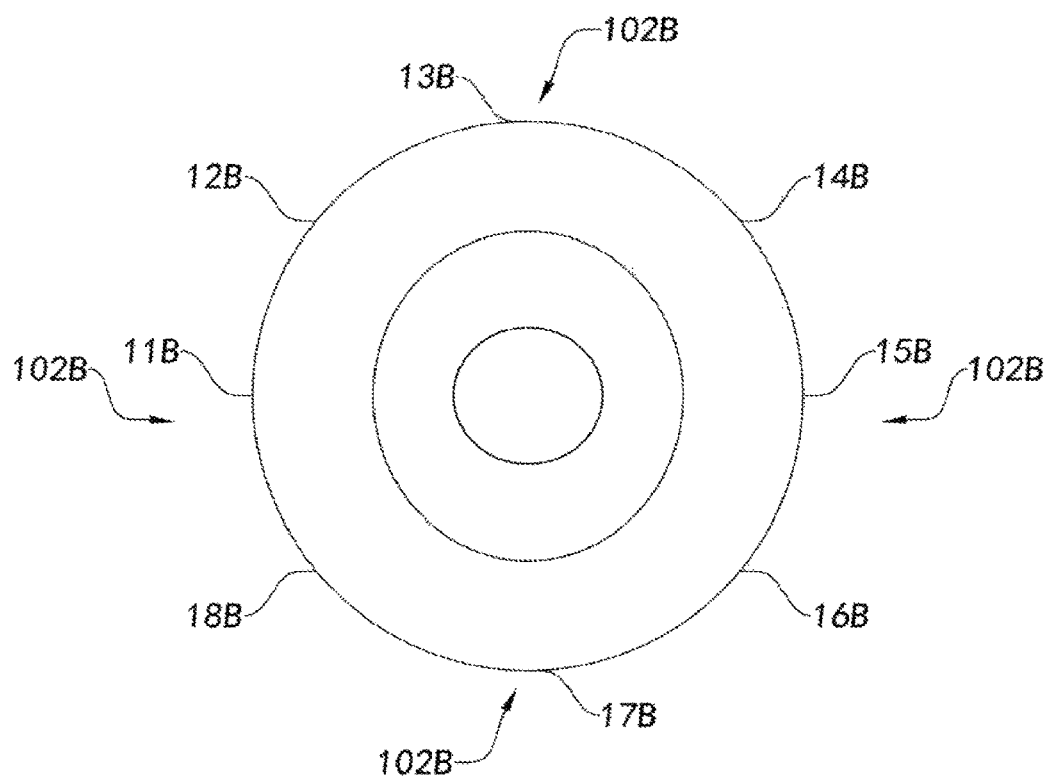
FIG. 106 is a schematic top view of a variant implementation of the optical lens of the camera module according to the above preferred embodiment of the present disclosure.

FIG. 106 shows a top view of a variant implementation of the optical lens 10B of the camera module 100B, wherein the first lens side face 11B and the second lens side face 12B are planes respectively, and the plane where the first lens side face 11B is located and the plane where the second lens side face 12B is located are the same plane, so that the optical lens 10B forms one planar side 101B at a position corresponding to the first lens side face 11B and the second lens side face 12B, wherein the third lens side face 13B, the fourth lens side face 14B, the fifth lens side face 15B, the sixth lens side face 16B, the seventh lens side face 17B, and the eighth lens side face 18B are curved faces respectively, so that the optical lens 10B forms the curved sides 102B at a position corresponding to the third lens side face 13B and the fourth lens side face 14B, at a position corresponding to the fifth lens side face 15B and the sixth lens side face 16B, at a position corresponding to the seventh lens side face 17B and the eighth lens side face 18B. That is, the optical lens 10B has one planar side 101B and three curved sides 102B.

Figure 107:
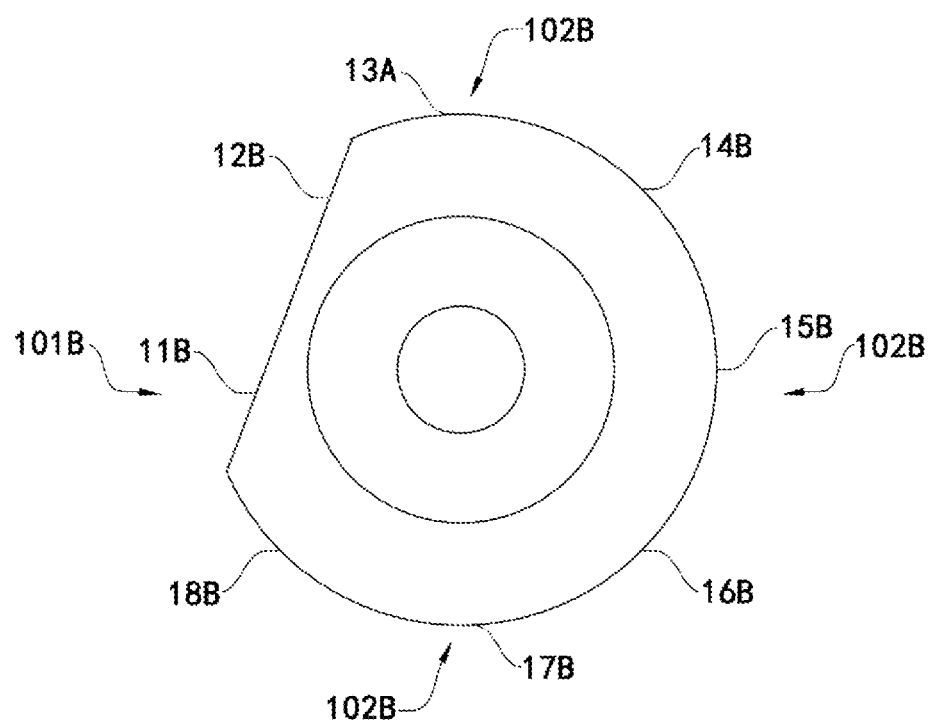
FIG. 107 is a schematic top view of another variant implementation of the optical lens of the camera module according to the above preferred embodiment of the present disclosure.

FIG. 107 shows a top view of another variant implementation of the optical lens 10B of the camera module 100B, wherein the first lens side face 11B and the second lens side face 12B are planes respectively, and the plane where the first lens side face 11B is located and the plane where the second lens side face 12B is located are the same plane, so that the optical lens 10B forms the planar side 101B at a position corresponding to the first lens side face 11B and the second lens side face 12B, wherein the fifth lens side face 15B and the sixth lens side face 16B are planes respectively, and the plane where the fifth lens side face 15B is located and the plane where the sixth lens side face 16B is located are the same plane, so that the optical lens 10B forms the planar side 101B at a position corresponding to the fifth lens side face 15B and the sixth lens side face 16B, wherein the third lens side face 13B and the fourth lens side face 14B as well as the seventh lens side face 17B and the eighth lens side face 18B are curved faces respectively, so that the optical lens 10B forms the curved side 102B at a position corresponding to the third lens side face 13B and the fourth lens side face 14B and forms the curved side 102B at a position corresponding to the seventh lens side face 17B and the eighth lens side face 18B. That is, the optical lens 10B has two planar sides 101B and two curved sides 102B, wherein the two planar sides 101B of the optical lens 10B are symmetrical with each other, and the two curved sides 102B are symmetrical with each other.

Figure 108:
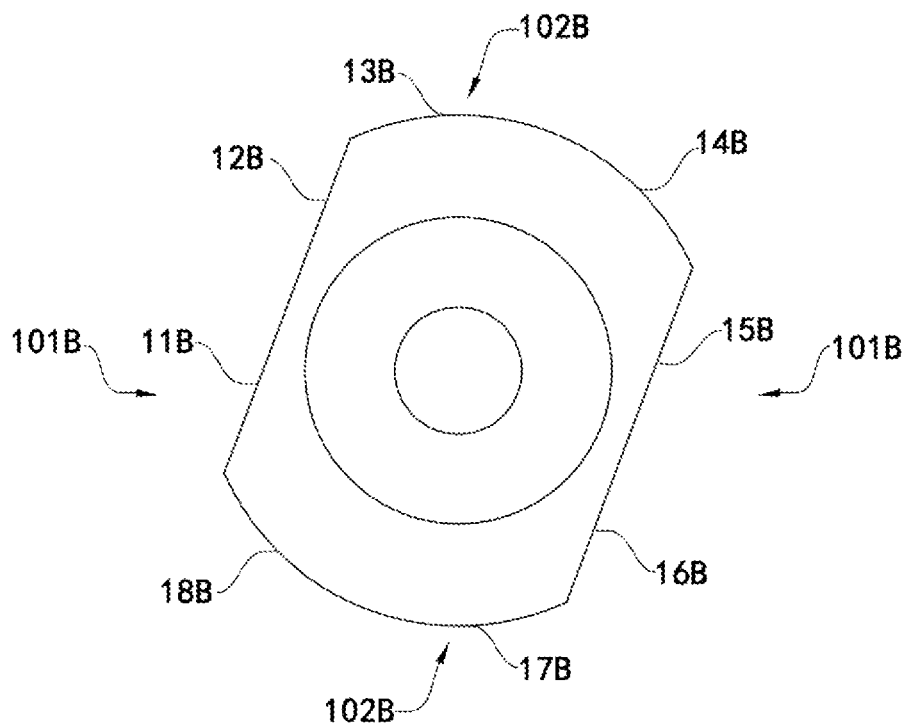
FIG. 108 is a schematic top view of another variant implementation of the optical lens of the camera module according to the above preferred embodiment of the present disclosure.

FIG. 108 shows a top view of another variant implementation of the optical lens 10B of the camera module 100B, wherein the first lens side face 11B, the second lens side face 12B, the third lens side face 13B, and the fourth lens side face 14B are planes respectively, and the plane where the first lens side face 11B is located and the plane where the second lens side face 12B is located are the same plane, the plane where the third lens side face 13B is located and the plane where the fourth lens side face 14B is located are the same plane, so that the optical lens 10B forms the planar side 101B at a position corresponding to the first lens side face 11B and the second lens side face 12B and at a position corresponding to the third lens side face 13B and the fourth lens side face 14B respectively, and the second lens side face 12B and the third lens side face 13B are perpendicular to each other, wherein the fifth lens side face 15B and the sixth lens side face 16B as well as the seventh lens side face 17B and the eighth lens side face 18B are curved faces respectively, so that the optical lens 10B forms the curved side 102B at a position corresponding to the fifth lens side face 15B and the sixth lens side face 16B and forms the curved side 102B at a position corresponding to the seventh lens side face 17B and the eighth lens side face 18B. That is, the optical lens 10B has two planar sides 101B and two curved sides 102B, wherein the two planar sides 101B are adjacent, and the two curved sides 102B are adjacent.

Figure 109:
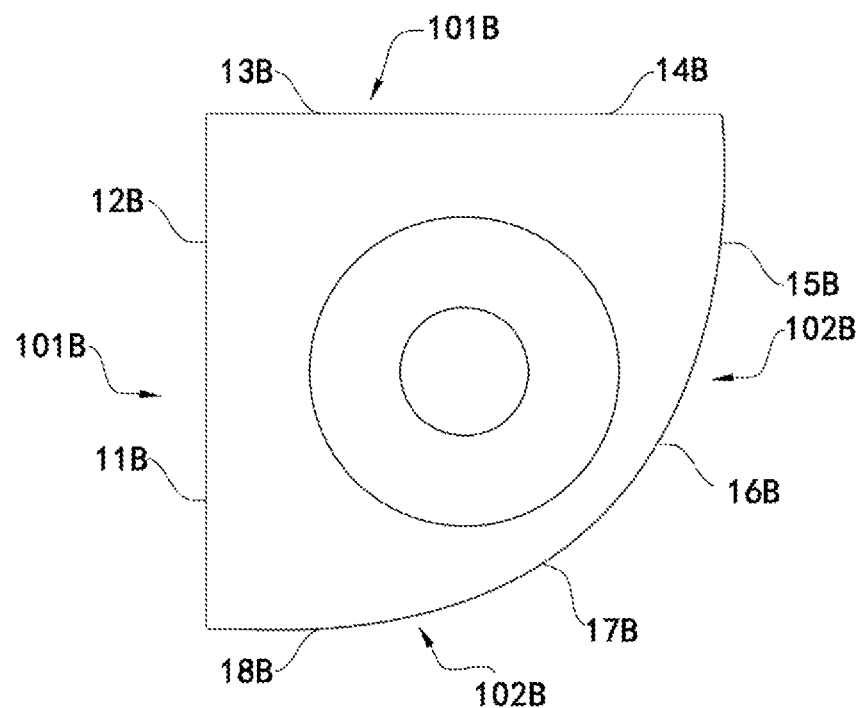
FIG. 109 is a schematic top view of another variant implementation of the optical lens of the camera module according to the above preferred embodiment of the present disclosure.

FIG. 109 shows a top view of another variant implementation of the optical lens 10B of the camera module 100B, wherein the first lens side face 11B, the second lens side face 12B, the third lens side face 13B, the fourth lens side face 14B, the fifth lens side face 15B, and the sixth lens side face 16B are planes respectively, and the plane where the first lens side face 11B is located and the plane where the second lens side face 12B is located are the same plane, the plane where the third lens side face 13B is located and the plane where the fourth lens side face 14B is located are the same plane, and the plane where the fifth lens side face 15B is located and the plane where the sixth lens side face 16B is located are the same plane, wherein the second lens side face 12B is perpendicular to the third lens side face 13B, and the fourth lens side face 14B is perpendicular to the fifth lens side face 15B, so that the optical lens 10B forms the planar side 101B at a position corresponding to the first lens side face 11B and the second lens side face 12B, at a position corresponding to the third lens side face 13B and the fourth lens side face 14B and at a position corresponding to the fifth lens side face 15B and the sixth lens side face 16B respectively, wherein the seventh lens side face 17B and the eighth lens side face 18B are curved faces respectively, so that the optical lens 10B forms the curved side 102B at a position corresponding to the seventh lens side face 17B and the eighth lens side face 18B. That is, the optical lens 10B has three planar sides 101B and one curved side 102B.

Figure 110:
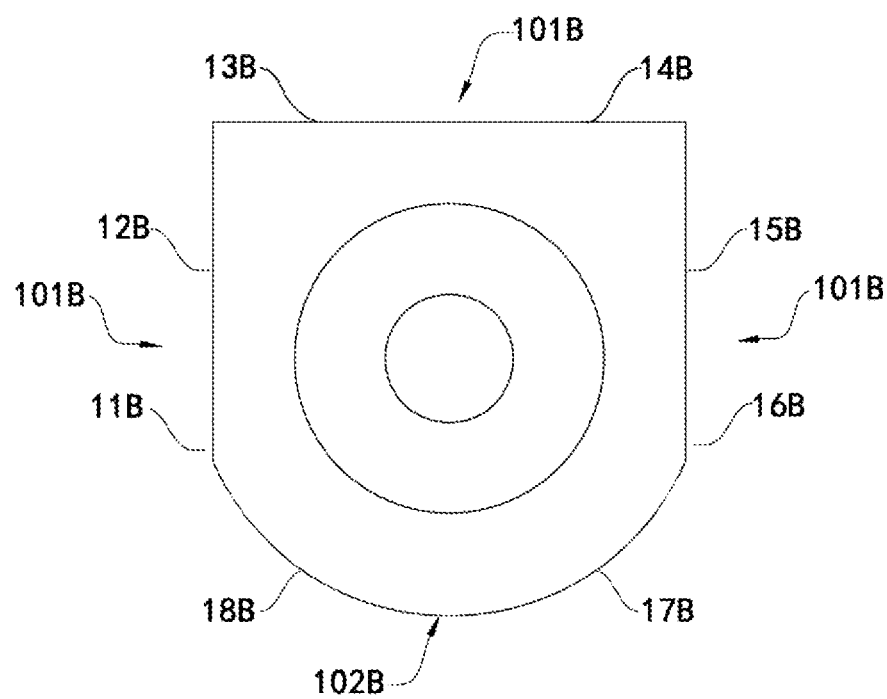
FIG. 110 is a schematic top view of another variant implementation of the optical lens of the camera module according to the above preferred embodiment of the present disclosure.

FIG. 110 shows a top view of another variant implementation of the optical lens 10B of the camera module 100B, wherein the first lens side face 11B, the second lens side face 12B, the third lens side face 13B, the fourth lens side face 14B, the fifth lens side face 15B, the sixth lens side face 16B, the seventh lens side face 17B, and the eighth lens side face 18B are planes respectively, and the plane where the first lens side face 11B is located and the plane where the second lens side face 12B is located are the same plane, the plane where the third lens side face 13B is located and the plane where the fourth lens side face 14B is located are the same plane, the plane where the fifth lens side face 15B is located and the plane where the sixth lens side face 16B is located are the same plane, and the plane where the seventh lens side face 17B is located and the plane where the eighth lens side face 18B is located are the same plane, wherein the second lens side face 12B is perpendicular to the third lens side face 13B, the fourth lens side face 14B is perpendicular to the fifth lens side face 15B, the sixth lens side face 16B is perpendicular to the seventh lens side face 17B, and the eighth lens side face 18B is perpendicular to the first lens side face 11B, so that the optical lens 10B forms the planar side 101B at a position corresponding to the first lens side face 11B and the second lens side face 12B, at a position corresponding to the third lens side face 13B and the fourth lens side face 14B, at a position corresponding to the fifth lens side face 15B and the sixth lens side face 16B, and at a position corresponding to the seventh lens side face 17B and the eighth lens side face 18B respectively. That is, the optical lens 10B has four planar sides 101B.

Figure 111:
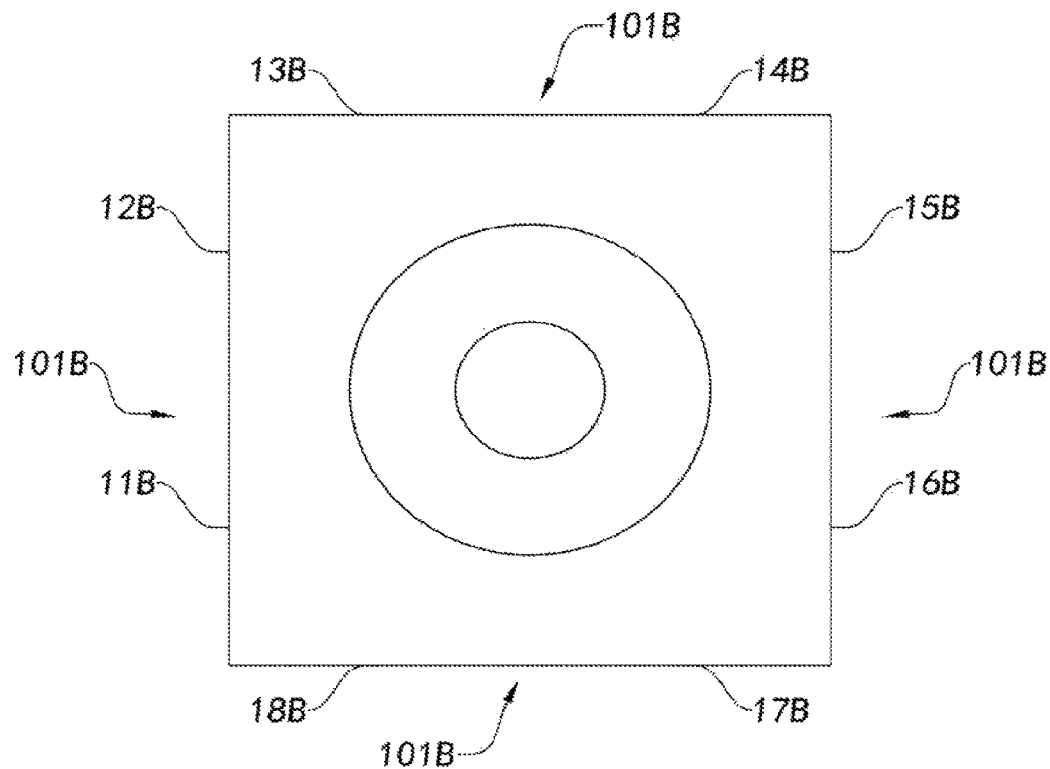
FIG. 111 is a schematic top view of another variant implementation of the optical lens of the camera module according to the above preferred embodiment of the present disclosure.
Figure 112:
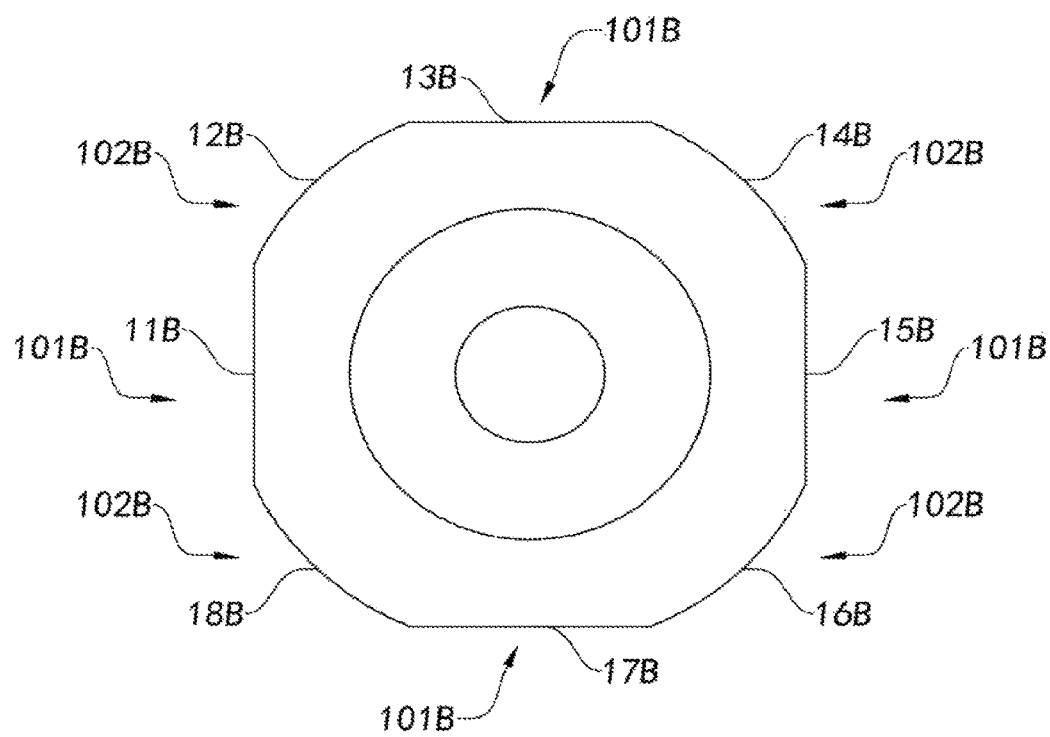
FIG. 112 is a schematic top view of another variant implementation of the optical lens of the camera module according to the above preferred embodiment of the present disclosure.

FIG. 111 shows a top view of another variant implementation of the optical lens 10B of the camera module 100B, wherein the first lens side face 11B, the third lens side face 13B, the fifth lens side face 15B, and the seventh lens side face 17B are planes respectively, so that the optical lens 10B forms the planar side 101B at a position corresponding to the first lens side face 11B, the third lens side face 13B, the fifth lens side face 15B and the seventh lens side face 17B respectively, wherein the first lens side face 11B and the fifth lens side face 15B are symmetrical with each other, and the third lens side face 13B and the seventh lens side face 17B are symmetrical with each other, wherein the second lens side face 12B, the fourth lens side face 14B, the sixth lens side face 16B, and the eighth lens side face 18B are curved faces respectively, so that the optical lens 10B forms the curved side 102B at positions corresponding to the second lens side face 12B, the fourth lens side face 14B, the sixth lens side face 16B, and the eighth lens side face 18B respectively, wherein the second lens side face 12B and the sixth lens side face 16B are symmetrical with each other, and the fourth lens side face 14B and the eighth lens side face 18B are symmetrical with each other. That is, the optical lens 10B has four planar sides 101B and four curved sides 102B, and each of the planar sides 101B and each of the curved sides 102B are spaced apart from each other. In other words, there is one curved side 102B between two adjacent planar sides 101B, and there is one planar side 101B between two adjacent curved sides 102B.

With reference to FIG. 113A to FIG. 116B of the accompanying drawings of the present disclosure, a camera module 9100 according to a preferred embodiment of the present disclosure is set forth in the following description, wherein one of the usage states of the camera module 9100 shown in FIG. 113B, for example, in the example shown in FIG. 113B, one of the camera modules 9100 can be applied to an electronic device body 9200 that is embodied as a smart phone, so that the camera module 9100 can be combined with the electronic device body 9200 to form an electronic device.

Figure 113A:
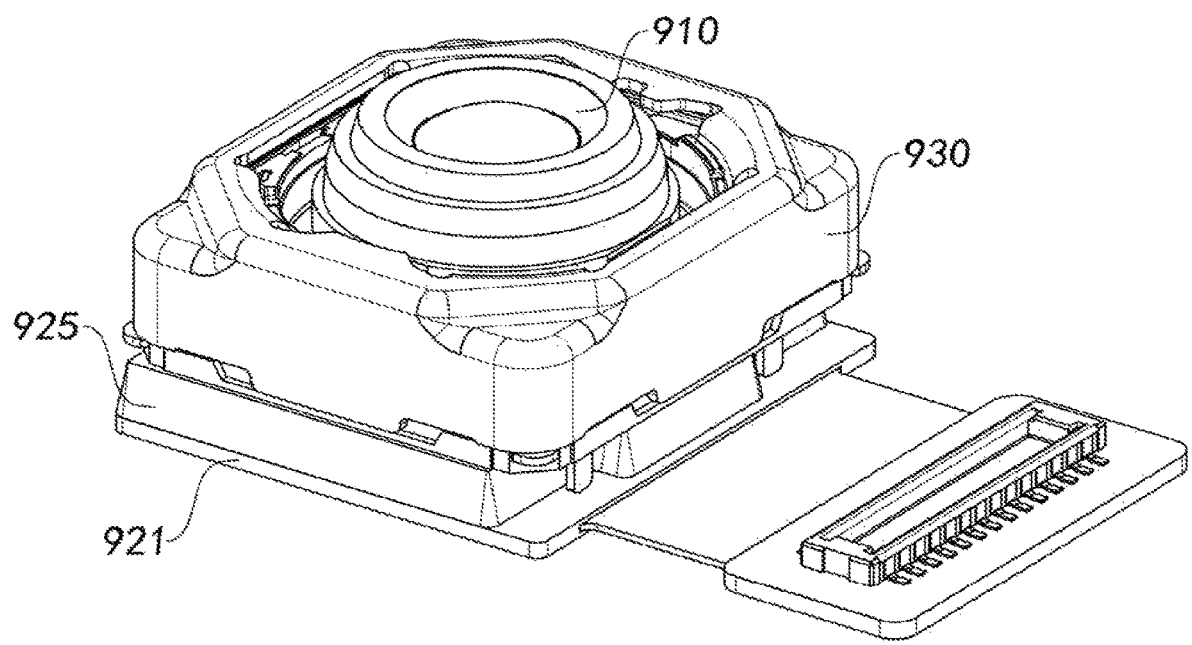
Figure 113B:
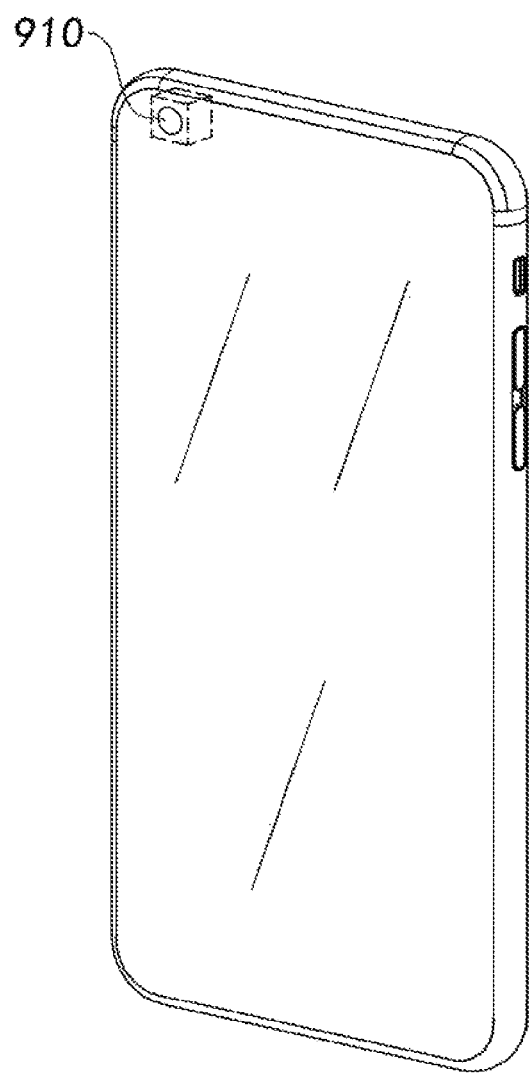
Figure 114:
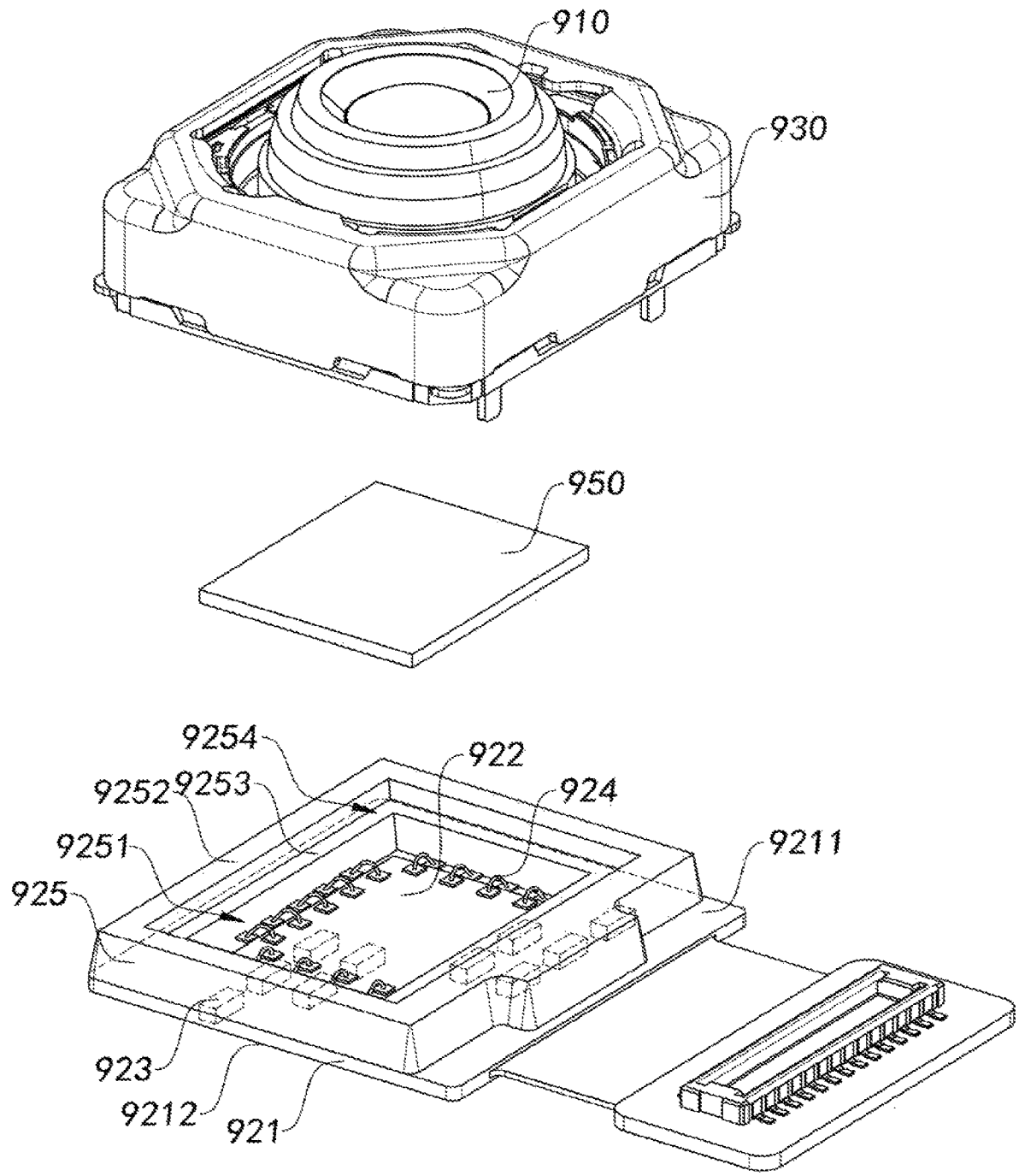
Figure 115:
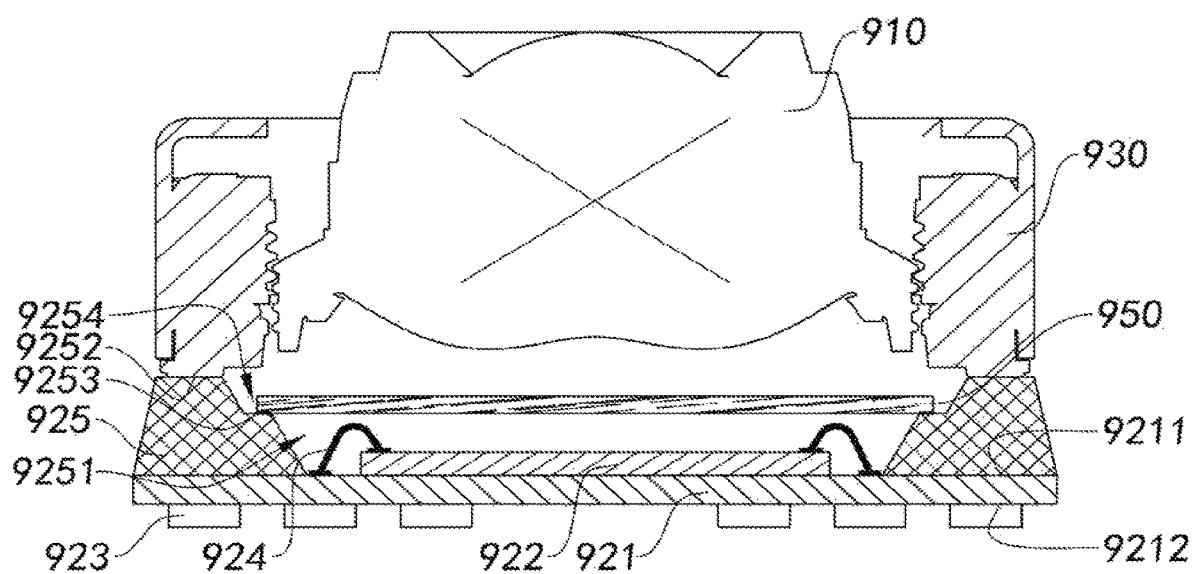

It is worth mentioning that although in the example shown in FIG. 113B, the number of the camera modules 9100 is one, and the camera module 9100 is disposed at the back of the electronic device body 9200, but in other examples, the number of the camera module 9100 is not limited to one, the type of the camera module 9100 is not limited to a single-lens camera module, and the position of the camera module 9100 is not limited to being disposed at the back of the electronic device body 9200, for example, the camera module 9100 can be disposed at the front of the electronic device body 9200, and of course, it is also possible that the camera module 9100 is disposed at other positions of the electronic device body 9200.

In addition, although the electronic device body 9200 is implemented as a smart phone in FIG. 113B, but in other examples of the present disclosure, the electronic device body 9200 can also be implemented as a tablet, a notebook computer, a camera, a personal digital assistant, an electronic book, an MP3/4/5, and any electronic device that can be configured with the camera module 9100. Of course, it can be understood by those skilled in the art that it is also possible to configure the camera module 9100 on conventional appliances such as a refrigerator, a washing machine, a television, etc., or it is possible to configure the camera module 9100 on buildings such as a security door or a wall. Therefore, the application environment and usage mode of the camera module 9100 should not be regarded as limiting the content and scope of the camera module of the present disclosure.

With reference to FIG. 113A, FIG. 114, FIG. 115, and FIG. 116A, the camera module 9100 comprises at least one optical lens 910 and a circuit board assembly 920, wherein the circuit board assembly 920 comprises a circuit board 921, a photosensitive chip 922 and at least one electronic component 923, wherein the photosensitive chip 922 and the circuit board 921 are conductively connected, each of the electronic components 923 is attached to the circuit board 921, and the optical lens 910 is held in the photosensitive path of the photosensitive chip 922. Light reflected by the object can enter the interior of the camera module 9100 from the optical lens 910 for subsequently received and imaged by the photosensitive chip 922, thereby obtaining an image associated with the object.

Figure 116A:
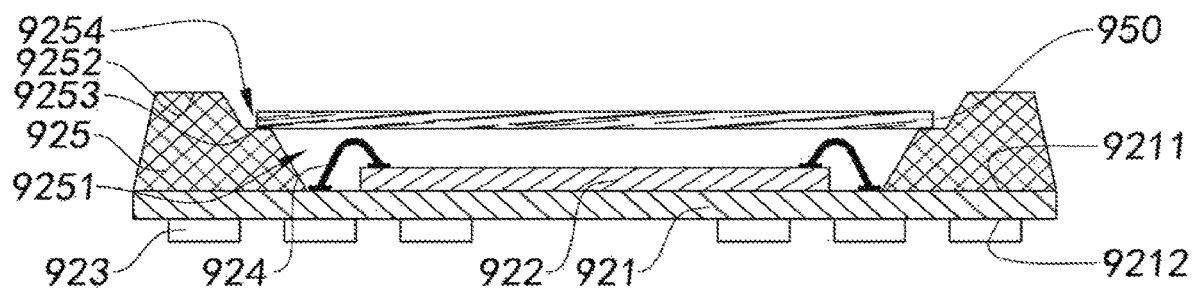

With reference to FIG. 116A, the circuit board 921 has a front face 9211 and a back face 9212 corresponding to the front face 9211, and the photosensitive chip 922 can be bonded to the circuit board 921 in a manner of being attached to the front face 9211 of the circuit board 921.

Further, the circuit board assembly 920 further comprises at least one set of leads 924, wherein two ends of each of the leads 924 are respectively connected to the circuit board 921 and the photosensitive chip 922, so that each of the leads 924 connects the photosensitive chip 922 and the circuit board 921.

For example, in one example, the photosensitive chip 922 may be firstly attached on the front face 9211 of the circuit board 921, and each of the leads 924 is then disposed between the photosensitive chip 922 and the circuit board 921 through a process such as wiring, so that the circuit board 921 and the photosensitive chip 922 are connected by each of the leads 924. It can be understood that the flatness of the photosensitive chip 922 is limited by the flatness of the circuit board 921. Of course, in some other examples, it is also not necessary to directly attach the photosensitive chip 922 to the circuit board 921, so that the flatness of the photosensitive chip 922 can be prevented from being affected by the flatness of the circuit board 921, or even if the photosensitive chip 922 is attached to the circuit board 921, the flatness of the photosensitive chip 922 may not be affected by the flatness of the circuit board 921. In this way, the circuit board 921 can be made by selecting a plate with thinner thickness.

The wiring direction of the lead 924 is not limited in the camera module 9100 of the present disclosure. For example, the wiring direction of the lead 924 may be from the photosensitive chip 922 to the circuit board 921, or may be from the circuit board 921 to the photosensitive chip 922, and of course, the lead 924 may also be used to connect the photosensitive chip 922 and the circuit board 921 in other manners, and the camera module 9100 of the present disclosure is not limited in this respect. It can be understood that the material of the lead 924 is not limited in the camera module 9100 of the present disclosure, for example, the lead 924 can be, but not limited to, a gold wire, a silver wire, a copper wire, etc.

Of course, it can be understood that in some examples, the photosensitive chip 922 can preset a chip connector, the circuit board 921 can preset a circuit board connector, and the two ends of the lead 924 can be in contact with the chip connector of the photosensitive chip 922 and the circuit board connector of the circuit board 921, respectively to connect the photosensitive chip 922 and the circuit board 921, for example, the two ends of the lead 924 may be welded to the chip connector of the photosensitive chip 922 and the circuit board connector of the circuit board 921, respectively. It is worth mentioning that the shape and size of the chip connector of the photosensitive chip 922 and the circuit board connector of the circuit board 921 can be not limited, for example, the chip connector of the photosensitive chip 922 and the circuit board connector of the circuit board 921 can be implemented as, but not limited to, a disk shape, a sphere shape, etc., respectively.

Figure 116B:
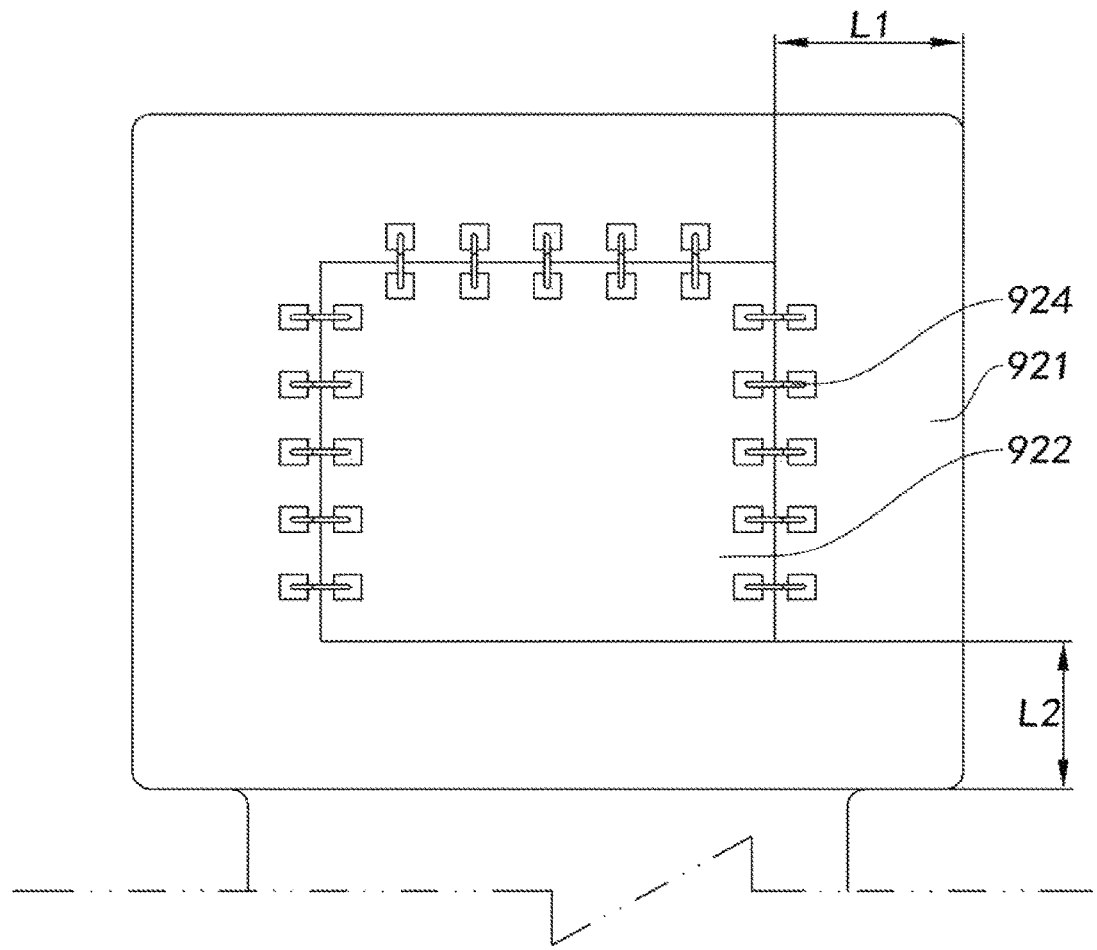

With reference to FIG. 116B, on a side where the lead 924 is provided, the distance from the outer edge of the photosensitive chip 922 to the outer edge of the circuit board 921 is L1, and on a side without the lead 924, the distance from the outer edge of the photosensitive chip 922 to the outer edge of the circuit board 921 is L2, wherein the minimum distance of L1 is 0.1 mm to 3 mm, preferably 0.3 mm to 0.8 mm, wherein the minimum distance of L2 is 0.05 mm to 3 mm, preferably 0.1 mm to 0.5 mm.

In an example of the present disclosure, the electronic component 923 can be implemented as passive electronic components such as a resistor, a capacitor, a relay, a processor, etc.

At least one of the electronic components 923 is attached on the back face 9212 of the circuit board 921.

In this embodiment of the camera module 9100 of the present disclosure, each of the electronic components 923 is respectively attached on the back face 9212 of the circuit board 921 by mutually spaced, that is, each of the electronic components 923 may not need to be disposed in the circumferential direction of the photosensitive chip 922, to reduce the length and width of the circuit board assembly 920, thereby reducing the length and width of the camera module 9100, so that the camera module 9100 can be applied to electronic devices that are intended to be lighter and thinner. The circuit board assembly 920 further comprises a molding base 925, wherein the molding base 925 may be integrally formed on the front face 9211 of the circuit board 921, wherein the molding base 925 has at least one light window 9251, the photosensitive area of the photosensitive chip 922 corresponds to the light window 9251 to form a light path between the optical lens 910 and the photosensitive chip 922 via the light window 9251. That is, the light reflected by the object can be received by the photosensitive area of the photosensitive chip 922 via the light window 9251 after entering the interior of the camera module 9100 from the optical lens 910, and is subsequently imaged via the photosensitive chip 922 after photoelectric conversion.

The molding base 925 can be integrally molded on the front face 9211 of the circuit board 921 by a molding process, and in this aspect, it is not necessary to provide substances such as glue for connecting the molding base 925 and the circuit board 921 between the molding base 925 and the circuit board 921. In this way, not only the height of the camera module 9100 can be reduced, but also the flatness of the circuit board 921 can be effectively ensured to improve the imaging quality of the camera module 9100.

The camera module 9100 further comprises at least one driver 930, wherein the optical lens 910 is drivably disposed on the driver 930, and the driver 930 is disposed on the molding base 925, so that the optical lens 910 is held in the photosensitive path of the photosensitive chip 922 via the cooperation of the driver 930 and the molding base 925. The driver 930 can drive the optical lens 910 to move along the photosensitive path of the photosensitive chip 922 to adjust the focal length of the camera module 9100, so that the camera module 9100 has the capacities of automatic zooming and automatic focusing. Preferably, the driver 930 can be implemented as, but not limited to, a voice coil motor.

Figure 117:
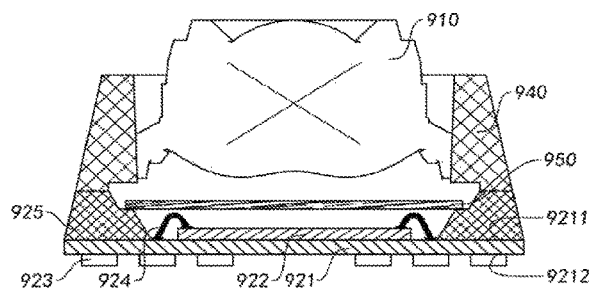

Nonetheless, in a variant implementation of the camera module 9100 shown in FIG. 117, the camera module 9100 may not have the driver 930, for example, the camera module 9100 may comprise a lens tube 940 disposed on the molding base 925, wherein the optical lens 910 is disposed on the lens tube 940 to enable the optical lens 910 to be held in the photosensitive path of the photosensitive chip 922 via the cooperation of the lens tube 940 and the molding base 925, so that the camera module 9100 forms a fixed focus camera module.

Figure 118:
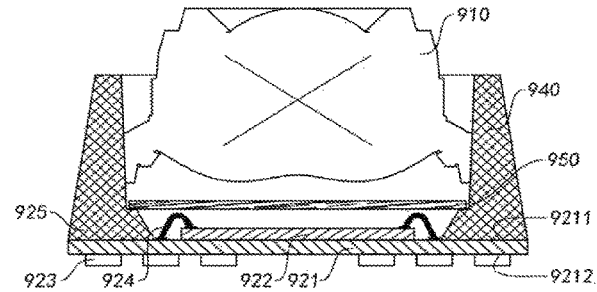

It is worth mentioning that in this embodiment of the camera module 9100 shown in FIG. 117, the lens tube 940 can be separately manufactured and then be attached or assembled to the molding base 925. In this embodiment of the camera module 9100 shown in FIG. 118, the lens tube 940 can also be integrally formed by the molding base 925 extending upward.

Figure 119:
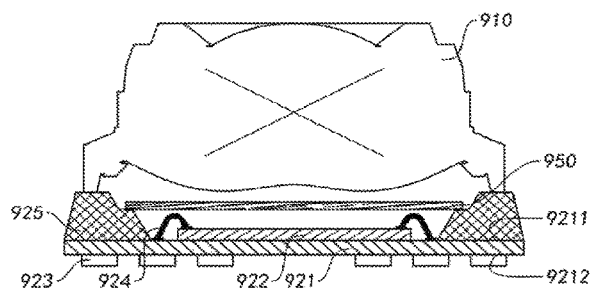
Figure 120A:
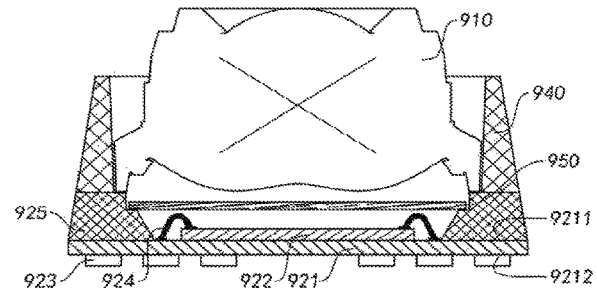

In this example of the camera module 9100 shown in FIG. 119, the optical lens 910 can also be directly attached to the molding base 925 such that the optical lens 910 is held in the photosensitive path of the photosensitive chip 922. In this example of the camera module 9100 shown in FIG. 120A, the exterior of the optical lens 910 may also be provided with the lens tube 940, for example, the lens tube 940 may also be attached to the molding base 925, and the optical lens 910 is located inside the lens tube 940, but the optical lens 910 and the lens tube 940 may not be in contact with each other so as to protect the optical lens 910 via the lens tube 940. It can be understood that the lens tube 940 can also be integrally formed by the molding base 925 extending upward.

Figure 120B:
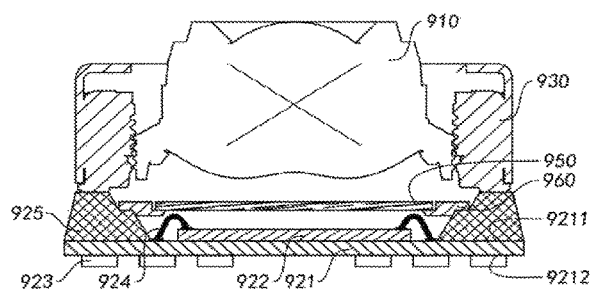

In this embodiment of the camera module 9100 shown in FIG. 120B, the camera module 9100 can also comprise at least one bracket 960 for attaching the filtering element 950, wherein the bracket 960 is attached to the molding base 925 such that the filtering element 950 is held between the photosensitive chip 922 and the optical lens 910, and in this way, the size of the filtering element 950 can be reduced to reduce the cost of the camera module 9100.

With further reference to FIG. 116A, the camera module 9100 can comprise a filtering element 950, wherein the filtering element 950 is held between the photosensitive chip 922 and the optical lens 910 for filtering stray light in the light entering the interior of the camera module 9100 from the optical lens 910, thereby improving the imaging quality of the camera module 9100. The type of the filtering element 950 is not limited, for example, the filtering element 950 may be implemented as, but not limited to, an infrared cut-off filter.

Further, the molding base 925 has an outer attaching face 9252 and an inner attaching face 9253, wherein the inner attaching face 9253 surrounds the light window 9251 of the molding base 925, and the outer attaching face 9252 surrounds the inner attaching face 9253, and wherein the driver 930 or the lens tube 940 can be attached on the outer attaching face 9252 of the molding base 925, and the filtering element 950 can be attached on the inner attaching face 9253 of the molding base 925. In this way, the optical lens 910 can be held in the photosensitive path of the photosensitive chip 922, and the filtering element 950 can be held between the photosensitive chip 922 and the optical lens 910.

In an example, the outer attaching face 9252 and the inner attaching face 9253 of the molding base 925 can be in a same plane. In another example, the outer attaching face 9252 and the inner attaching face 9253 of the molding base 925 may have a height difference to form an attaching groove 9254 of the molding base 925. Specifically, the plane where the inner attaching face 9253 of the molding base 925 is located is lower than the plane where the outer attaching face 9252 is located, so that the molding base 925 forms the attaching groove 9254 at a position corresponding to the inner attaching face 9253, and therefore, the filtering element 950 attached on the inner attaching face 9253 is held in the attaching groove 9254. In this way, the height of the camera module 9100 can be further reduced.

Figure 121:
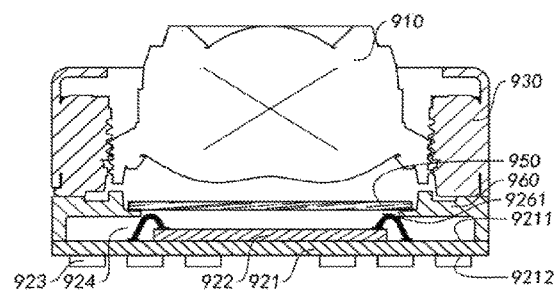

In other examples, the circuit board assembly 920 may not have the molding base 925, but comprise a lens frame 926, wherein the lens frame 926 has a light through hole 9261, and the lens frame 926 is attached on the front face 9211 of the circuit board 921 after being separately manufactured, so that the light through hole 9261 of the lens frame 926 and the photosensitive area of the photosensitive chip 922 correspond to each other, and the driver 930 can be disposed on the lens frame 926 such that the optical lens 910 is held in the photosensitive path of the photosensitive chip 922, as shown in FIG. 121.

It is worth mentioning that, in the example of the camera module 9100 shown in FIG. 116A, all of the electronic components 923 can be attached on the back face 9212 of the circuit board 921 by mutually spaced. In this specific example of the camera module 9100 shown in FIG. 122, at least one of the electronic components 923 is attached on the back face 9212 of the circuit board 921, and the other electronic component 923 is attached on the front face 9211 of the circuit board 921. For the convenience of description, in this following paper, the electronic component 923 attached on the front face 9211 of the circuit board 921 is defined as a first electronic component 923a, and the electronic component 923 attached on the back face 9212 of the circuit board 921 is defined as a second electronic component 923b.

That is, the circuit board assembly 920 can comprise at least one of the first electronic component 923a and at least one of the second electronic components 923b, wherein each of the first electronic components 923a is respectively attached on the front face 9211 of the circuit board 921 by mutually spaced, and each of the second electronic components 923b is respectively attached on the back face 9212 of the circuit board 921 by mutually spaced.

It is worth mentioning that the electronic components 923 are divided into the first electronic components 923a and the second electronic components 923b according to the position where the electronic components 923 are attached to, which is only for the convenience of description and easy understanding of the camera module 9100 of the present disclosure, and it does not limit the content and scope of the camera module 9100 of the present disclosure, wherein the type of the first electronic component 923a and the second electronic component 923b can be the same.

In addition, the electronic components 923 that achieve the same function or the same type of function can be attached on one face of the circuit board 921, and the electronic components 923 that achieve another function or another type of function can be attached on the other face of the circuit board 921, and the camera module 9100 of the present disclosure is not limited in these respects.

After each of the first electronic components 923a is attached on the front face 9211 of the circuit board 921 by mutually spaced, each of the first electronic components 923a can be disposed in the circumferential direction of the photosensitive chip 922. After each of the second electronic components 923b is attached on the back face 9212 of the circuit board 921 by mutually spaced, in the height direction of the camera module 9100, the second electronic component 923b and the photosensitive chip 922 can overlap each other, thereby facilitating reducing the length and width of the camera module 9100 and facilitating the application of the camera module 9100 to the electronic device that is intended to be lighter and thinner and intelligent.

In this example of the camera module 9100 shown in FIG. 122, at least one of the first electronic components 923a can be embedded by the molding base 925. Preferably, the molding base 925 can embed all of the first electronic components 923a. In this way, in one aspect, the first electronic component 923a can prevent the molding base 925 from falling off from the front face 9211 of the circuit board 921; in a second aspect, the molding base 925 can prevent the first electronic component 923a from coming into contact with the external environment, thereby prevent the surface of the first electronic component 923a from being oxidized, etc.; in a third aspect, the molding base 925 can isolate the adjacent first electronic components 923a, thereby preventing mutual interference from occurring to the adjacent first electronic components 923a so as to improve imaging quality of the camera module 9100; in a fourth aspect, the molding base 925 can isolate the adjacent first electronic components 923a such that the distance between the adjacent first electronic components 923a is closer, thereby facilitating attaching more and larger first electronic components 923a to the circuit board 921 with a limited area to improve the performance of the camera module 9100; in a fifth aspect, there is no need to reserve a safe distance between the molding base 925 and the first electronic component 923a, so that the length, the width, and the height of the camera module 9100 can be reduced, thereby facilitating the miniaturization of the camera module 9100; and in a sixth aspect, the molding base 925 can isolate the first electronic component 923a from the photosensitive area of the photosensitive chip 922 to prevent the photosensitive area of the photosensitive chip 922 from being contaminated by contaminants such as impurities falling from the surface of the first electronic component 923a or solder powder falling from a connection position between the first electronic component 923a and the circuit board 921, thereby facilitating ensuring the imaging quality of the camera module 9100.

In these examples of the camera module 9100 shown in FIG. 116A and FIG. 122, the second electronic component 923b is exposed. In these examples of the camera module 9100 shown in FIG. 123 and FIG. 124, the second electronic component 25b can also be embedded.

Specifically, the circuit board assembly 920 further comprises at least an embedding portion 927, wherein the embedding portion 927 is integrally formed on the back face 9212 of the circuit board 921 to embed at least one of the second electronic components 923b. Preferably, the embedding portion 927 can embed all of the second electronic components 923b. In this way, in one aspect, the second electronic component 923b can prevent the embedding portion 927 from falling off from the back face 9212 of the circuit board 921; in a second aspect, the embedding portion 927 can prevent the second electronic component 923b from coming into contact with the external environment, thereby prevent the surface of the second electronic component 923b from being oxidized, etc.; in a third aspect, the embedding portion 927 can isolate the adjacent second electronic components 923b, thereby preventing mutual interference from occurring to the adjacent second electronic components 923b so as to improve imaging quality of the camera module 9100; in a fourth aspect, the embedding portion 927 can isolate the adjacent second electronic components 923b such that the distance between the adjacent second electronic components 923b is closer, thereby facilitating attaching more and larger second electronic components 923b to the circuit board 921 with a limited area to improve the performance of the camera module 9100; and in a fifth aspect, the embedding portion 927 can also ensure the flatness of the circuit board 921, so that the circuit board 921 can employ a plate with thinner thickness, such as an FP circuit board or a soft and hard plate, thereby facilitating reducing the height of the camera module 9100.

In this example of the camera module 9100 shown in FIG. 125, the circuit board 921 can have at least one molding space 9213, wherein the molding space 9213 extends from the back face 9212 of the circuit board 921 toward the front face 9211, that is, the opening of the molding space 9213 is located on the back face 9212 of the circuit board 921. In this specific example of the camera module 9100 shown in FIG. 125, each of the molding spaces 9213 of the circuit board 921 is implemented as a groove or a blind hole, respectively, so that the embedding portion 927 may be partially filled and held in each of the molding spaces 9213 of the circuit board 921 during molding. In this way, the embedding portion 927 and the circuit board 921 can be tightly and reliably bonded together. It is worth mentioning that the number, the size and the shape of the molding space 9213 of the circuit board 921 are not limited in the camera module 9100 of the present disclosure.

In these examples of the camera module 9100 shown in FIGS. 126 and 127A, the molding space 9213 of the circuit board 921 may also be implemented as a channel such that the molding space 9213 can communicate the back face 9212 921 and the front face 9211 of the circuit board. In FIG. 126 and FIG. 127A, after the embedding portion 927 is formed, a part of the embedding portion 927 can extend from the back face 9212 of the circuit board 921 to the front face 9211 of the circuit board 921 via the molding space 9213, wherein in FIG. 126, this portion of the embedding portion 927 may not protrude from the front face 9211 of the circuit board 921, and in FIG. 127, this portion of the embedding portion 927 may protrude from the front face 9211 of the circuit board 921.

Of course, it can be understood that a part of the molding space 9213 of the circuit board 921 can also be implemented as a groove or a blind hole, and another portion of the molding space 9213 is implemented as a channel. In addition, when the molding space 9213 of the circuit board 921 is implemented as a blind hole, in one example, only the molding space 9213 can extend from the back face 9212 of the circuit board 921 toward the front face 9211; in another example, only the molding space 9213 can extend from the front face 9211 of the circuit board 921 toward the back face 9212; or in another example, at least one of the molding spaces 9213 can extend from the front face 9211 of the circuit board 921 toward the back face 9212, and at least one of the molding spaces 9213 can extend from the back face 9212 of the circuit board 921 toward the front face 9211.

It is worth mentioning that the manner of providing the molding space 9213 described above is only an example. In other examples, the circuit board 921 may be provided with the molding spaces 9213 implemented both as a blind hole and implemented as a through hole. The camera module 9100 of the present disclosure will not be exemplified one by one. Nevertheless, it can be understood by those skilled in the art that it does not limit the content and scope of the camera module 9100 of the present disclosure.

In addition, in this example of the camera module 9100 shown in FIG. 127B, the embedding portion 927 and the molding base 925 may also be integrally formed, that is, after passing through at least one of the molding spaces 9213 of the circuit board 921, a molding material forms the molding base 925 integrally bonded to the circuit board 921 on the front face 9211 of the circuit board 921, and forms the embedding portion 927 integrally bonded to the circuit board 921 on the back face 9212 of the circuit board 921.

In this embodiment, it can be understood that the embedding portion 927 and the molding base 925 can be formed by a single molding process, for example, the circuit board 921 to which the electronic component 923 is attached can be placed in a molding die 9300, and a base molding space 9301 can be formed between the front face 9211 of the circuit board 921 and the molding die, and an embedding molding space 9302 can be formed between the back face 9212 of the circuit board 921 and the molding die, wherein at least one of the molding spaces 9213 of the circuit board 921 communicates the base molding space 9301 and the embedding molding space 9302, so that when a molding material is added to the interior of the molding die 9300, the molding material can be filled in the base molding space 9301 and the embedding molding space 9302 through the molding space 9213 of the circuit board 921. Therefore, the embedding portion 927 and the molding base 925 are integrally formed after the molding material is consolidated, and as shown in FIG. 128A, FIG. 128B, FIG. 128C and FIG. 128D, this example of the camera module 9100 shown in FIG. 127B can be obtained.

Of course, the molding base 925 and the embedding portion 927 can also be formed by two molding processes. With reference to FIG. 128E to FIG. 128K, the embedding portion 927 can be molded first, and the molding base 925 is then molded, and of course, in other examples, the molding base 925 can also be molded first, and the embedding portion 927 is then molded, and the present disclosure is not limited in this respect. In FIG. 129, the circuit board 921 further has at least one holding through hole 9214, wherein the holding through hole 9214 communicates the front face 9211 and the back face 9212 of the circuit board 921, wherein the embedding portion 927 comprises an embedding body 9271 and at least one holding element 9272 integrally formed on the embedding body 9271, the embedding body 9271 embeds the second electronic component 923b, each of the holding elements 9272 is held in the holding through hole 9214 of the circuit board 921, and the photosensitive chip 922 is attached to each of the holding elements 9272 of the embedding portion 927 to maintains the flatness of the photosensitive chip 922 by each of the holding elements 9272 of the embedding portion 927, so that the flatness of the photosensitive chip 922 can be not limited to the flatness of the circuit board 921, thereby enabling the circuit board 921 to be made of a thinner plate.

Although there is no example that the photosensitive chip 922 comes into contact with the front face 9211 of the circuit board 921 shown on FIG. 129, it can be understood by those skilled in the art that in some other examples, the photosensitive chip 922 can also come into contact with the front face 9211 of the circuit board 921 to further reduce the height of the camera module 9100.

In addition, in FIG. 130 and FIG. 131, the periphery of the embedding portion 927 may also be wrapped around the periphery of the circuit board 921 such that the embedding portion 927 and the circuit board 921 can be reliably bonded together, and the embedding portion 927 can make the circuit board 921 more flat. For example, in FIG. 130, when the periphery of the embedding portion 927 is wrapped around the periphery of the circuit board 921, the periphery of the embedding portion 927 may not protrude from the front face 9211 of the circuit board 921, nevertheless, in the example shown in FIG. 131, when the embedding portion 927 is wrapped around the periphery of the circuit board 921, the periphery of the embedding portion 927 may also protrude from the front face 9211 of the circuit board 921.

In these examples of the camera module 9100 shown in FIG. 132 and FIG. 133A, the circuit board 921 may further be provided with at least one accommodation space 9215, wherein the accommodation space 9215 extends from the front face 9211 of the circuit board 921 toward the back face 9212, and the photosensitive chip 922 that is electrically connected to the circuit board 921 is accommodated in the accommodating space 9215. In this way, the height of the camera module 9100 can be further reduced. In this example of the camera module 9100 shown in FIG. 132, the accommodating space 9215 of the circuit board 921 can be implemented as a groove, and in this example of the camera module 9100 shown in FIG. 133A, the accommodation space 9215 of the circuit board 921 can also be implemented as a through hole.

It is worth mentioning that although an example in which the electronic component 923 is attached only on the back face 9212 of the circuit board 921 is shown in FIG. 132 and FIG. 133A, it can be understood by those skilled in the art that in other examples of the camera module 9100, the front face 9211 of the circuit board 921 can also be attached with the electronic component 923, and the present disclosure is not limited in this respect.

It is also worth mentioning that although the electronic component 923 attached on the back face 9212 of the circuit board 921 is embedded by the embedding portion 927 in FIG. 132 and FIG. 133A, it can be understood by those skilled in the art that in other examples of the camera module 9100, the electronic component 923 attached on the back face 9212 of the circuit board 921 is not embedded, that is, at least a part of the electronic component 923 is exposed.

In this example of the camera module 9100 shown in FIG. 133B, the circuit board 921 is provided with the accommodation space 9215, and the accommodation space 9215 is implemented as a through hole, wherein at least one of the electronic components 923 is attached on the back face 9212 of the circuit board 921. Of course, at least one of the electronic components 923 may be attached on the front face 9211 of the circuit board 921, and then the embedding portion 927 can be molded on the back face 9212 of the circuit board 921, wherein the embedding portion 927 may not embed the electronic component 923, or the embedding portion 927 may also embed at least a part of at least one of the electronic component 923, or the embedding portion 927 may embed all of the electronic components 923, and the embedding portion 927 may form an accommodating groove 9271, and the accommodating groove 9271 corresponds to the accommodation space 9215 of the circuit board 921. The photosensitive chip 922 is then attached on the embedding portion 927 through the accommodation space 9215 of the circuit board 921, and the photosensitive chip 922 is located in the accommodating groove 9271, and the circuit board 921 and the photosensitive chip 922 are connected by the lead 924. In this way, the flatness of the photosensitive chip 922 can be ensured by the embedding portion 927 so as to improve the reliability of the camera module 9100.

In this example of the camera module 9100 shown in FIG. 134, the photosensitive chip 922 can also be conductively connected to the circuit board 921 through a flip-chip process to further reduce the height of the camera module 9100. Similarly, although the example in which the electronic component 923 is attached only on the back face 9212 of the circuit board 921 is shown in FIG. 134, it can be understood by those skilled in the art that in other examples of the camera module 9100, the front face 9211 of the circuit board 921 can also be attached with the electronic component 923. In addition, although the electronic component 923 shown in FIG. 134 is embedded by the embedding portion 927, in other examples, at least a portion of the electronic component 923 can be exposed.

With reference to FIG. 116A, the molding base 925 can be formed only on the front face 9211 of the circuit board 921, and in this example of the camera module 9100 shown in FIG. 135, the molding base 925 can further embed at least a part of the non-photosensitive area of the photosensitive chip 922. In this way, the molding base 925, the circuit board 921, and the photosensitive chip 922 can be integrally bonded such that the flatness of the photosensitive chip 922 can be not limited to the circuit board 921, thereby facilitating improving the imaging quality of the camera module 9100. In addition, the molding base 925 can also embed the leads 924 and isolate the adjacent leads 924 after molding.

In this example of the camera module 9100 shown in FIG. 136, the filtering element 950 can be overlapped on the photosensitive chip 922 such that when the molding base 925 is formed, the molding base 925 can embed a portion of the filtering element 950 such that the molding base 925, the circuit board 921, the photosensitive chip 922, and the filtering element 950 are integrally bonded.

With reference to FIG. 116A, the molding base 925 and the front face 9211 of the circuit board 921 are directly bonded together, and in this example of the camera module 9100 shown in FIG. 137, the circuit board assembly 920 further comprises a frame-shaped supporting element 928, wherein the supporting element 928 can be disposed on the front face 9211 of the circuit board 921, or the supporting element 928 is formed on the front face 9211 of the circuit board 921, so that the supporting element 928 surrounds the periphery of the photosensitive chip 922. It can be understood that the supporting element 928 protrudes from the front face 9211 of the circuit board 921. For example, in an example, glue can be applied to the front face 9211 of the circuit board 921 to form the supporting element 928 after the glue has been consolidated. The supporting element 928 can be elastic to protect the circuit board 921 when the embedding portion 927 and/or the molding base 925 are molded through a molding die. The molding base 925 can embed at least a part of the supporting element 928 after molding, for example, in this example shown in FIG. 137, the molding base 925 can embed the outer side face of the supporting element 928 after molding. In other examples, the molding base 925 can also embed at least a part of a top surface of the supporting element 928 after molding.

In this example of the camera module 9100 shown in FIG. 138, the supporting element 928 can also be disposed on at least a part of the non-photosensitive area of the photosensitive chip 922, or the supporting element 928 may be formed on at least a part of the non-photosensitive area of the photosensitive chip 922 such that after the molding base 925 is formed, the molding base 925 can embed at least a part of the supporting elements 928 such that the molding base 925, the lead 924, the photosensitive chip 922, and the circuit board 921 are integrally bonded. For example, in this example shown in FIG. 137, the molding base 925 can embed the outer side face of the supporting element 928 after molding, and in other examples, the molding base 925 can embed at least a part of the top surface of the supporting element 928 after molding.

In this example of the camera module 9100 shown in FIG. 139, the supporting element 928 may also be disposed on the outer edge of the filtering element 950, or the supporting element 928 may be formed on the outer edge of the filtering element 950, so that after the molding base 925 is formed, the molding base 925 can embed at least a part of the supporting element 928 such that the molding base 925, the photosensitive chip 922, the circuit board 921 and the filtering element 950 are integrally bonded. For example, in this example shown in FIG. 139, the molded base 925 can embed the outer side face of the supporting element 928 after molding, and in other examples, the molding base 925 can also embed at least a part of the top surface of the supporting element 928 after molding.

Similarly, although the example in which the electronic component 923 is attached only on the back face 9212 of the circuit board 921 are shown in these examples of the camera module 9100 shown in FIG. 137, FIG. 138, and FIG. 139, it can be understood by those skilled in the art that in other examples of the camera module 9100, the front face 9211 of the circuit board 921 can also be attached with the electronic component 923. In addition, although the electronic component 923 shown in FIG. 137, FIG. 138, and FIG. 139 is embedded by the embedding portion 927, in other examples, at least a part of the electronic component 923 can also be exposed.

In addition, the camera module 9100 can also be implemented as an array camera module 9100. In the following description, by taking the camera module 9100 being implemented as a camera module 9100 with two optical lenses 910 as an example, the content and features of the camera module 9100 of the present disclosure is illustrated. Nonetheless, it can be understood by those skilled in the art that the camera module 9100 can also have more optical lenses 910, for example, three, four or more.

It can be understood by those skilled in the art that the above embodiments are merely examples, and the features of different embodiments can be combined with each other to obtain an embodiment which is easily conceived according to the disclosure of the present disclosure but is not explicitly indicated in the accompany drawings.

It can be understood by those skilled in the art that the embodiments of the present disclosure described in the above description and the accompanying drawings are by way of example only and do not limit the present disclosure. The object of the present disclosure has been achieved completely and effectively. The functions and structural principles of the present disclosure have been shown and described in the embodiments, and the embodiments of the present disclosure may be varied or modified without departing from the principles.

The invention claimed is:

1. A camera module, characterized by comprising:
   at least one optical lens;
   at least one photosensitive chip, wherein the at least one optical lens is provided on a photosensitive path of the at least one photosensitive chip;
   at least one circuit board, comprising a substrate having a front face and a back face, and wherein the at least one photosensitive chip is electrically connected to the circuit board at the front surface; and
   a molding unit, comprising a back molding portion and a molding base, wherein the molding base is integrally bonded to the front face of the substrate at the same time when the back molding portion is integrally bonded to at least a part of an area of the back face of the substrate, and the back molding portion have a mounting space corresponding to the photosensitive chip;
   wherein the camera module has at least one dividing side and at least one die releasing side, and the back molding portion has at least a first dividing face and at least a first die releasing face, and the first dividing face of the back molding portion corresponds to the dividing side of the camera module, and the first die releasing face of the back molding portion corresponds to the die releasing side of the camera module, and the molding base has at least a second dividing face and at least a second die releasing face, and the second dividing face of the molding base corresponds to the dividing side of the camera module, and the second die releasing face of the molding base corresponds to the die releasing side of the camera module, and the substrate has at least a dividing edge and at least a die releasing edge, and the dividing edge of the substrate corresponds to the dividing side of the camera module, and the die releasing edge of the substrate corresponds to the die releasing side of the camera module.

2. The camera module of claim 1, wherein a module connection side of a connection plate is accommodated in the mounting space of the back molding portion after being connected to the substrate on the back face of the substrate.

3. The camera module of claim 2, wherein the back molding portion embeds a connection position between the module connection side of the connection plate and the substrate.

4. The camera module of claim 2, wherein at least one electronic component is conductively connected to the substrate on the back face of the substrate.

5. The camera module of claim 4, wherein a part of the electronic component is embedded by the back molding portion.

6. The camera module of claim 5, wherein electronic component that is not embedded by the back molding portion is accommodated in the mounting space of the back molding portion.

7. The camera module of claim 6, wherein a portion of the surface of the electronic components is exposed on the mounting space of the back molding portion.

8. The camera module of claim 2, wherein when the camera module is mounted to an electronic device, protruding mounting components of a device body of the electronic device is accommodated in the mounting space of the back molding portion.

9. The camera module of claim 2, wherein the back molding portion of the molding unit is provided with a plurality of the mounting spaces, so that the back molding portion 41 is in the shape of a grid.

10. The camera module of claim 1, wherein a module connection side of a connection plate is connected to the substrate on the dividing side of the camera module 100A, or is connected to the substrate on the die releasing side of the camera module 100A.

11. The camera module of claim 10, wherein the first dividing face of the back molding portion extends to the dividing edge of the substrate, and the second dividing face of the molding base extends to the dividing edge of the substrate, such that the first dividing face of the back molding portion, the second dividing face of the molding base and the dividing edge of the substrate are aligned with each other.

12. The camera module of claim 11, wherein the first die releasing side of the back molding portion does not extend to the die releasing side of the substrate to make the first die releasing side of the back molding portion and the die releasing edge of the substrate are displaced from each other, and a distance parameter between the first die releasing side of the back molding portion and the die releasing edge of the substrate is L1, and the value range of the parameter L1 is: 0.1 mm≤L1≤10 mm.

13. The camera module of claim 12, wherein the value range of the parameter L1 is: 0.2 mm≤L1≤1 mm.

14. The camera module of claim 12, wherein the second die releasing side of the molding base does not extend to the die releasing side of the substrate to make the second die releasing side of the molding base and the die releasing edge of the substrate are displaced from each other, and a distance parameter between the second die releasing side of the molding base and the die releasing edge of the substrate is L2, and the value range of the parameter L2 is: 0.1 mm≤L2≤10 mm.

15. The camera module of claim 14, wherein the value range of the parameter L2 is: 0.3 mm≤L2≤2 mm.

16. The camera module of claim 14, wherein the numerical value of the parameter L2 is not equal to the numerical value of the parameter L1.

17. The camera module of claim 16, wherein the numerical value of the parameter L2 is greater than the numerical value of the parameter L1.

18. The camera module of claim 1, wherein the substrate has a mounting space corresponding to the mounting space of the back molding portion, and the mounting space of the substrate is a through hole so as to communicate the front face of the substrate with the back face of the substrate, and the molding base and the back molding portion are connected to each other through the mounting space.

19. An electronic device, comprising:
a device body; and
at least one of the camera modules of claim 1, wherein the camera module is disposed in the device body.

* * * * *